US006290566B1

(12) United States Patent
Gabai et al.

(10) Patent No.: US 6,290,566 B1
(45) Date of Patent: Sep. 18, 2001

(54) INTERACTIVE TALKING TOY

(75) Inventors: Oz Gabai; Moshe Cohen; Jacob Gabai, all of Tel Aviv; Dov Shlomo Eylath; Nimrod Sandlerman, both of Ramat Gan, all of (IL)

(73) Assignee: Creator, Ltd., Givat Shmuel (IL)

( * ) Notice: Subject to any disclaimer, the term of this patent is extended or adjusted under 35 U.S.C. 154(b) by 0 days.

(21) Appl. No.: 09/062,499

(22) Filed: Apr. 17, 1998

(30) Foreign Application Priority Data

Aug. 27, 1997 (IL) ........................................................ 121642

(51) Int. Cl.$^7$ .............................. A63H 30/00; A63H 3/28
(52) U.S. Cl. .......................... 446/175; 446/298; 446/302; 463/23
(58) Field of Search .................... 446/175, 71, 297–303; 463/23, 35; 704/261, 272, 277, 278, 266

(56) References Cited

U.S. PATENT DOCUMENTS

| | | | |
|---|---|---|---|
| 4,679,789 | * | 7/1987 | Okada ....................................... 463/63 |
| 4,712,184 | | 12/1987 | Haugerud . |
| 4,840,602 | | 6/1989 | Rose . |
| 4,857,030 | | 8/1989 | Rose . |
| 4,923,428 | * | 5/1990 | Curran ................................. 446/175 |
| 5,021,878 | | 6/1991 | Lang . |
| 5,109,222 | | 4/1992 | Welty . |
| 5,142,803 | | 9/1992 | Lang . |
| 5,191,615 | | 3/1993 | Aldava et al. . |
| 5,195,920 | | 3/1993 | Collier . |
| 5,270,480 | | 12/1993 | Hikawa . |
| 5,281,143 | * | 1/1994 | Arad et al. ............................ 434/185 |
| 5,289,273 | | 2/1994 | Lang . |
| 5,388,493 | | 2/1995 | Curletto . |
| 5,479,564 | | 12/1995 | Vogten et al. . |
| 5,752,880 | | 5/1998 | Gabai et al. . |

FOREIGN PATENT DOCUMENTS

| | | |
|---|---|---|
| 3009040A | 9/1981 | (DE) . |
| WO 87/06487 | 11/1987 | (WO) . |

OTHER PUBLICATIONS

M. Fujita et al., "An open architecture for robot entertainment"; *Proceedings of the 1st International Conference on Autonomous Agents*, Marina Del Rey, CA, USA, Feb. 1997, pp. 435–442.

M. Sekiguchi et al., "Behavior control for a mobile robot by multi–hierarchical neural network"; *Proceedings of the International Conference on Robotics and Automation*, Scottsdale, May 1989, vol. 3, pp. 1578–1583.

D. Taylor, "Three ways to get a–life"; *IEEE Expert*, vol. 12, No. 4, Jul. 1997, pp. 25–30.

* cited by examiner

Primary Examiner—D. Neal Muir
(74) Attorney, Agent, or Firm—Abelman, Frayne & Schwab

(57) ABSTRACT

A toy with developing skills, the toy including a fanciful figure having a capacity to perform an action, and action control circuitry operative to control the fanciful figure to perform the action at different levels of skill at different times.

32 Claims, 136 Drawing Sheets

FIGURE 1A
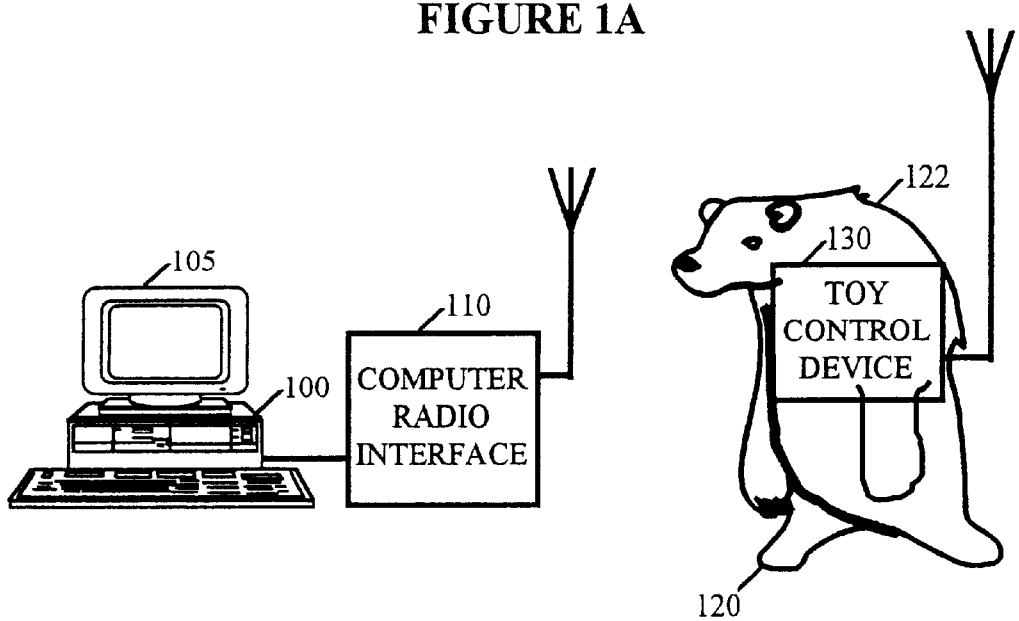
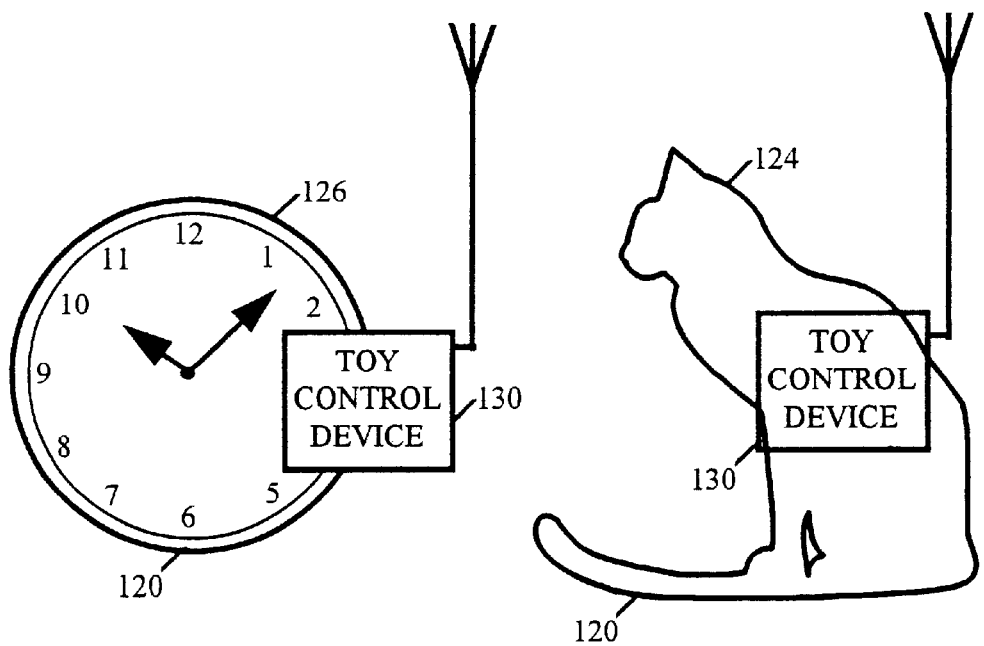

FIGURE 2B
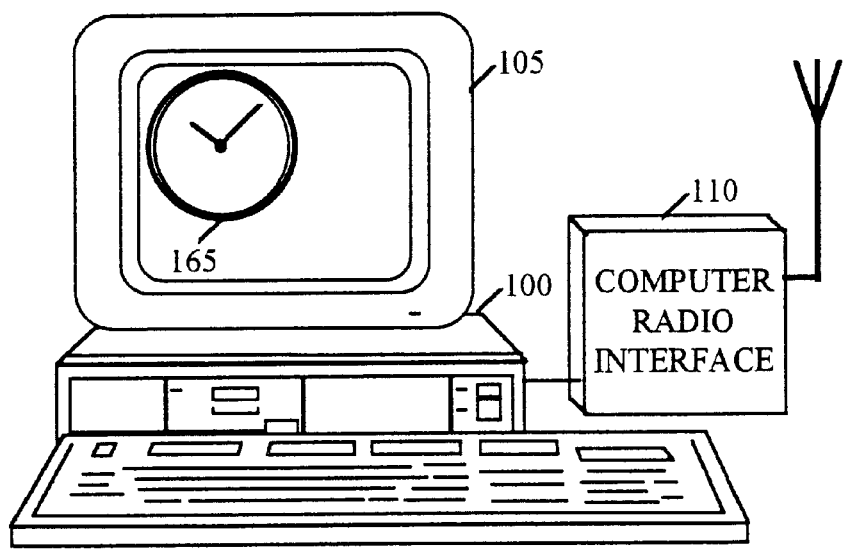
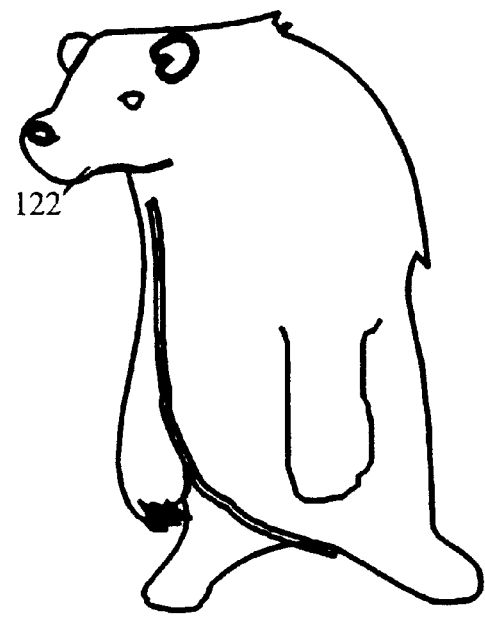

FIGURE 2C
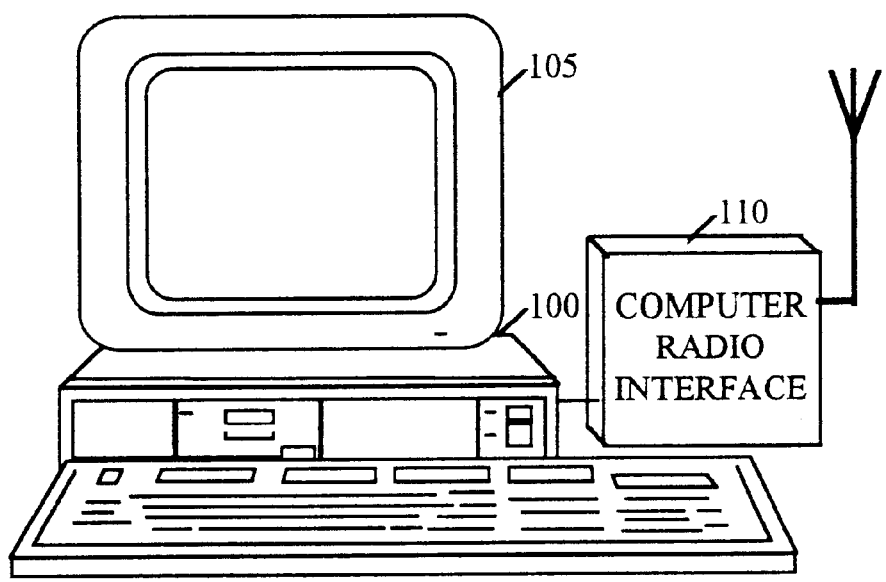
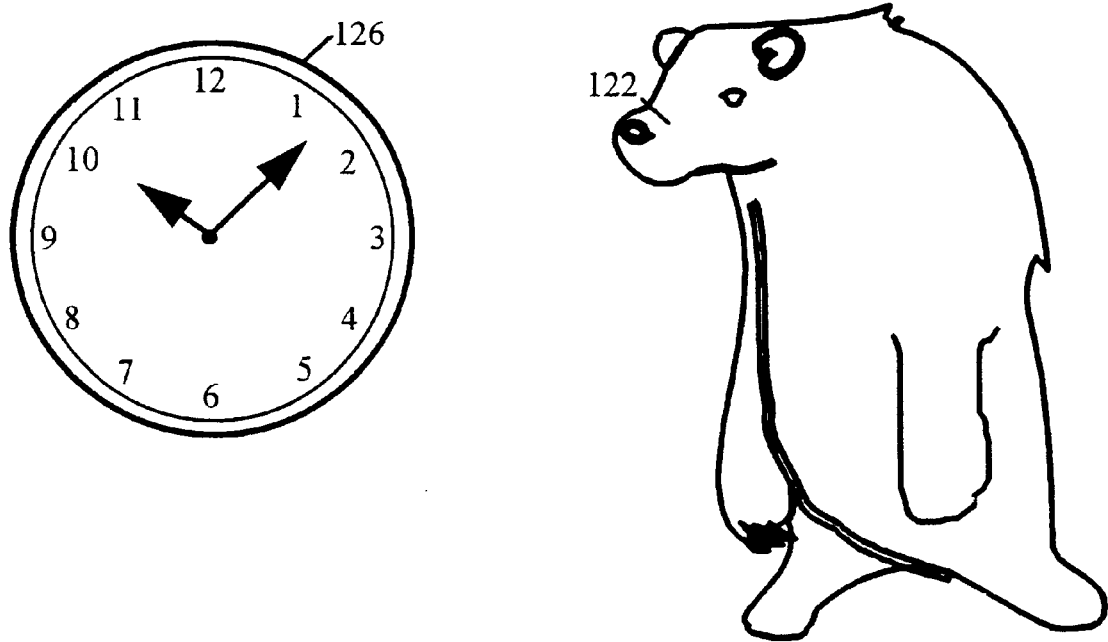

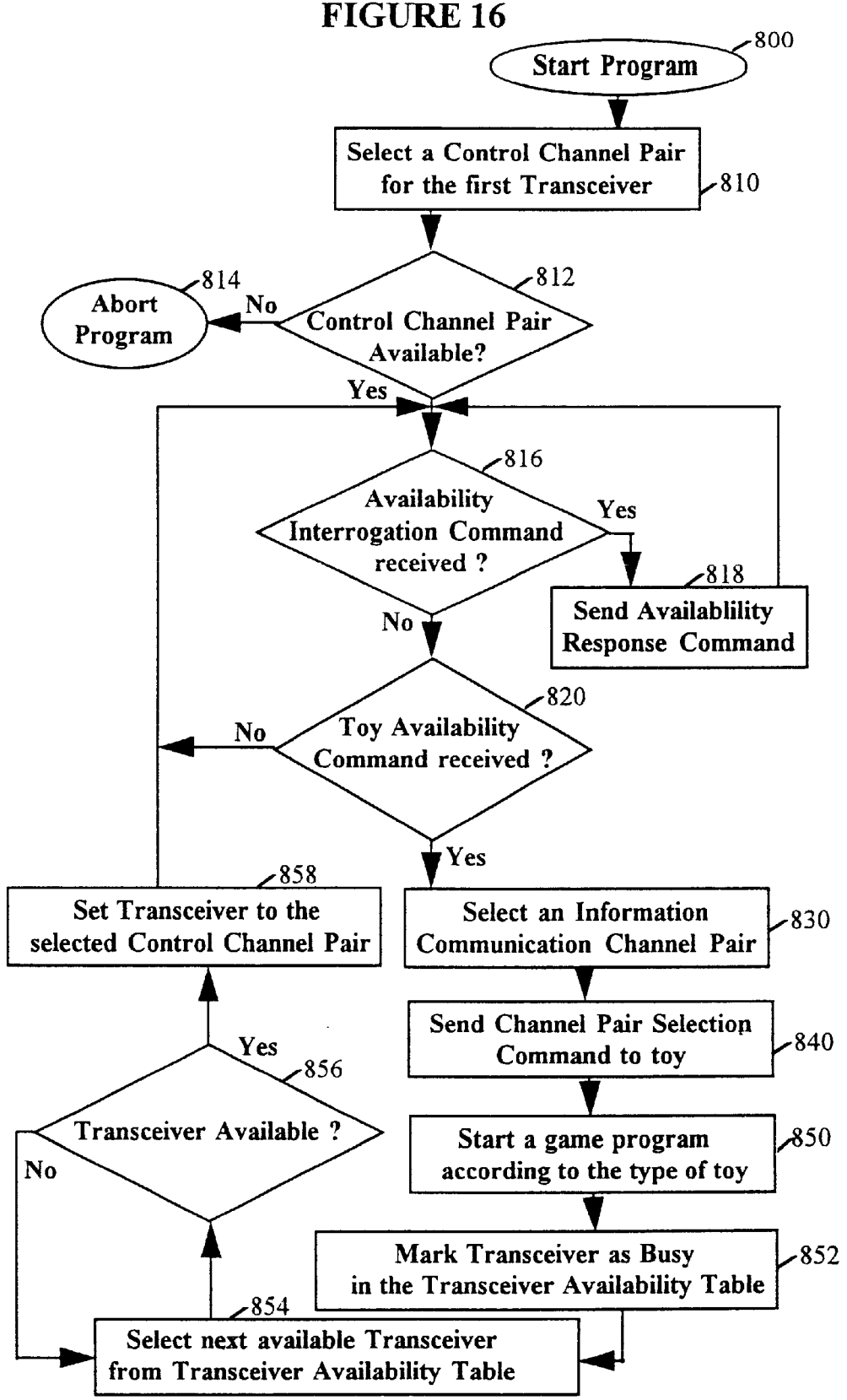

MCM6246
512K*8 SRAM

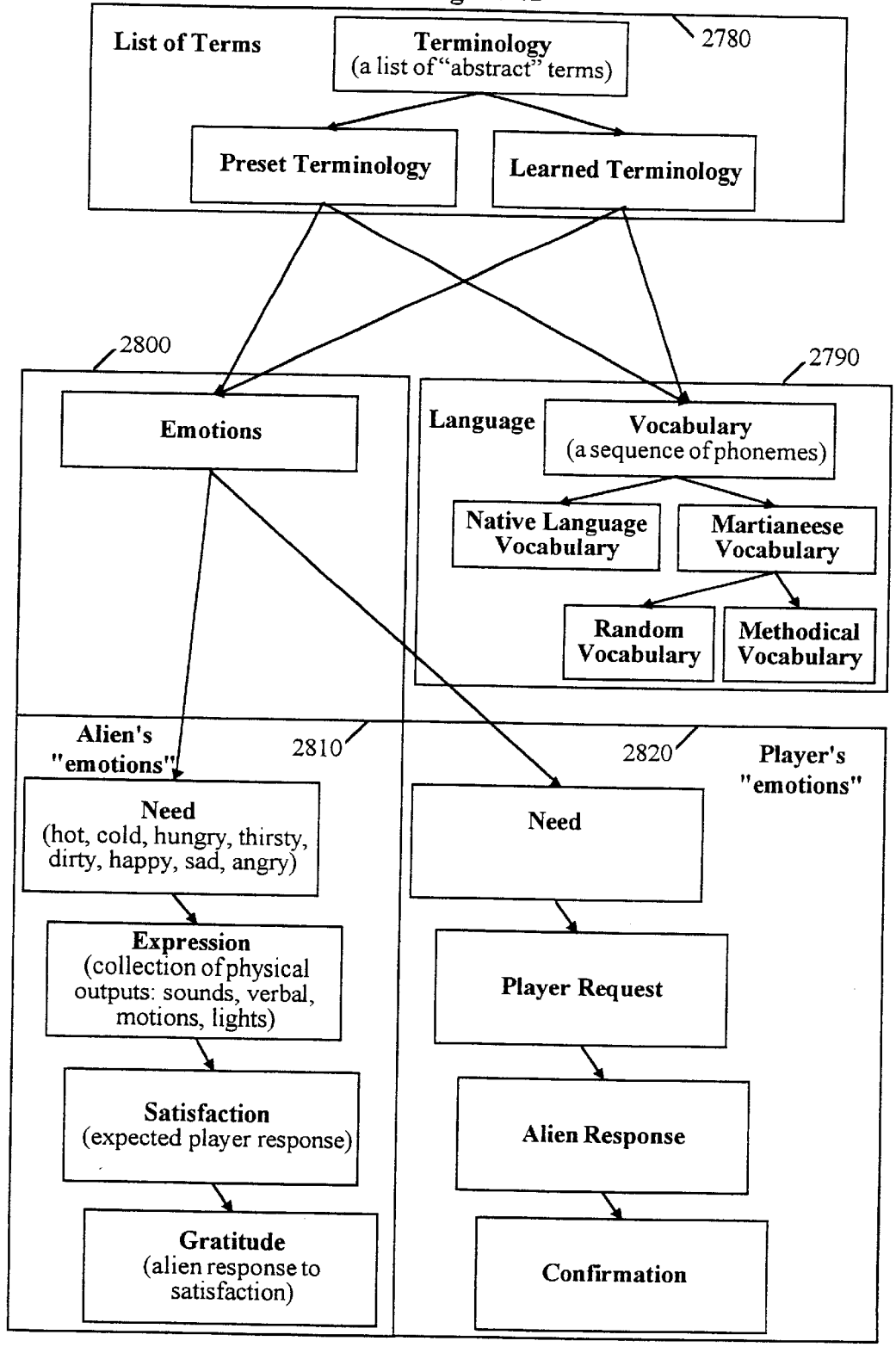

Figure 42

TABLE OF TERMS  2830

| Term | Native Language | Modified Language | Usage | Level |
|---|---|---|---|---|
| clap | clap | plak | 0 | 2 |
| cold | keold | boowooo | 0 | 2 |
| eyes | ais | weewee | 1 | 1 |
| hand | hand | dindin | 8 | 1 |
| happy | haepi | geegee | 2 | 1 |
| left-hand | lefthand | ledindin | 5 | 1 |
| left-leg | leftleg | legel | 3 | 1 |
| leg | leg | gel | 5 | 1 |
| right-hand | raithand | radindin | 2 | 1 |
| right-leg | raitleg | ragel | 3 | 1 |

TOY EMOTION RECORD  2840

| | | | |
|---|---|---|---|
| need | cold | | |
| expression | speech | cold | |
| expression | eyelights | on-time, off-time, repetitions | |
| expression | sound | TVF00008 | |
| expression | motors | left-leg | fwd-time, rev-time, repetitions |
| expression | delay | time | |
| expression | motors | right-leg | fwd-time, rev-time, repetitions |
| satisfaction | tilt-switch | closed | |
| gratitude | need | happy | |

TOY EMOTION RECORD  2850

| | | | |
|---|---|---|---|
| need | happy | | |
| expression | sound | TVF00022 | |
| expression | motors | left-hand | fwd-time, rev-time, repetitions |
| expression | motors | right-hand | fwd-time, rev-time, repetitions |
| expression | speech | happy | |
| satisfaction | none | | |
| expression | need | conversation | |

Figure 43

| TOY EMOTION RECORD 2860 | | | |
|---|---|---|---|
| need | right-hand | | |
| expression | sound | speech-file | tsf00175 |
| expression | lipsync | lsc-file | lsc00175 |
| expression | motors | right-hand | fwd-time, rev-time, repetitions |
| satisfaction | in-speech | right-hand | |
| gratitude | compute | change language | |
| gratitude | play | right-hand | |

| TOY EMOTION RECORD 2870 | | | |
|---|---|---|---|
| need | left-hand | | |
| expression | sound | speech-file | tsf00175 |
| expression | lipsync | lsc-file | lsc00175 |
| expression | motors | left-hand | fwd-time, rev-time, repetitions |
| satisfaction | record | left-hand | |
| gratitude | compute | change language | |
| gratitude | play | left-hand | |

INTERACTIVE TALKING TOY

FIELD OF THE INVENTION

The present invention relates to toys in general, and particularly to computer-controlled toys with a capacity for speech.

BACKGROUND OF THE INVENTION

Toys which are controlled by integrated or remote computer circuitry and that are capable of emitting speech are known. Such toys, however, are limited to employing known languages such as English for speech and do not incorporate the ability to modify a known language or speak with an increasing level of complexity. In addition, such toys do not have the capacity for associating words previously unknown to them with toy movements or other actions.

Also well known in the art are toys which are remotely controlled by wireless communication and which are not used in conjunction with a computer system. Typically, such toys include vehicles whose motion is controlled by a human user via a remote control device.

U.S. Pat. No. 4,712,184 to Haugerud describes a computer controlled educational toy, the construction of which teaches the user computer terminology and programming and robotic technology. Haugerud describes computer control of a toy via a wired connection, wherein the user of the computer typically writes a simple program to control movement of a robot.

U.S. Pat. No. 4,840,602 to Rose describes a talking doll responsive to an external signal, in which the doll has a vocabulary stored in digital data in a memory which may be accessed to cause a speech synthesizer in the doll to simulate speech.

U.S. Pat. No. 5,021,878 to Lang describes an animated character system with real-time control.

U.S. Pat. No. 5,142,803 to Lang describes an animated character system with real-time control.

U.S. Pat. No. 5,191,615 to Aldava et al. describes an interrelational audio kinetic entertainment system in which movable and audible toys and other animated devices spaced apart from a television screen are provided with program synchronized audio and control data to interact with the program viewer in relationship to the television program.

U.S. Pat. No. 5,195,920 to Collier describes a radio controlled toy vehicle which generates realistic sound effects on board the vehicle. Communications with a remote computer allows an operator to modify and add new sound effects.

U.S. Pat. No. 5,270,480 to Hikawa describes a toy acting in response to a MIDI signal, wherein an instrument-playing toy performs simulated instrument playing movements.

U.S. Pat. No. 5,289,273 to Lang describes a system for remotely controlling an animated character. The system uses radio signals to transfer audio, video and other control signals to the animated character to provide speech, hearing vision and movement in real-time.

U.S. Pat. No. 5,388,493 describes a system for a housing for a vertical dual keyboard MIDI wireless controller for accordionists. The system may be used with either a conventional MIDI cable connection or by a wireless MIDI transmission system.

German Patent DE 3009-040 to Neuhierl describes a device for adding the capability to transmit sound from a remote control to a controlled model vehicle. The sound is generated by means of a microphone or a tape recorder and transmitted to the controlled model vehicle by means of radio communications. The model vehicle is equipped with a speaker that emits the received sounds.

The disclosures of all publications mentioned in the specification and of the publications cited therein are hereby incorporated by reference.

SUMMARY OF THE INVENTION

The present invention seeks to provide an improved computer-controlled toy system with a capacity for modifying a known language and/or speaking in a previously unknown or whimsical language.

In accordance with a preferred embodiment of the present invention a computer or computer-controlled toy speaks a language such as English according to a set of rules (such as "pig latin" rules). The computer or computer-controlled toy may then speak in the modified language. A user may interact with the computer or computer-controlled toy by speaking in the modified language. The computer or computer-controlled toy "demodifies" the speech to arrive at an associated English word. The computer or computer-controlled toy may perform an action based on modified or demodified language.

In accordance with another preferred embodiment of the present invention a computer or computer-controlled toy speaks a language with an increasing level of complexity. The present invention also seeks to provide an improved computer-controlled toy system with a capacity for speaking, learning, and generating languages other than those used in common discourse.

In accordance with another preferred embodiment of the present invention a computer or computer-controlled toy is configured with a set of actions or concepts such as jumping, going home, anger, etc. and a vocabulary in a known language such as English, a previously unknown language such as "Martian," or both types of languages. The computer or computer-controlled toy is further capable of introducing an action to a user together with a preselected, randomly selected, or other generated word from one or all languages known to it. The computer or computer-controlled toy is additionally or alternatively capable of receiving a word chosen by the user for association with the action. The computer or computer-controlled toy may maintain associations between actions and words that represent actions for later repetition. Words of any language known to the computer or computer-controlled toy may have an associated level of complexity for controlling what words are available to the computer or computer-controlled toy over time.

In accordance with another preferred embodiment of the present invention a user and a computer or computer-controlled toy develop a "private" language interactively where a computer-displayed animated figure or computer-controlled toy performs a predefined or user-defined movement or action and the computer or computer-controlled toy or user assigns a made-up or other private word to the movement or action. The private language and the language's association with movements are maintained in a memory. The user may then command the computer or computer-controlled toy using the private language.

Further in accordance with a preferred embodiment of the present invention the computer or computer-controlled toy talks in a made-up language. The computer or computer-controlled toy accompanies its talking with known language, movements, gestures, etc. for teaching its made-up language.

Still further in accordance with a preferred embodiment of the present invention the computer or computer-controlled toy makes-up a language for a each of a set of predefined movements, gestures, etc. by randomly selecting one or more predefined and/or user defined base language units comprising monosyllabic or polysyllabic phonemes, associating a selection of base language units with a specific movement, gesture, etc., and maintaining the associations. Base language units may be predefined together with a complexity designation (e.g., those with more syllables, more difficult to pronounce) for increasingly complex selections becoming available over time.

Additionally in accordance with a preferred embodiment of the present invention the user provides the computer or computer-controlled toy with made-up words for association with predefined or user-defined movements, gestures, etc., with the associations being maintained by the computer or computer-controlled toy.

Moreover in accordance with a preferred embodiment of the present invention the computer or computer-controlled toy may generate made-up words for user-provided terms.

Further in accordance with a preferred embodiment of the present invention the computer or computer-controlled toy interprets user speech by searching made-up, modified, and/or known languages, possibly in a particular order. The user may give a cue to indicate that he is using and wishes to be understood using a particular language.

There is thus provided in accordance with a preferred embodiment of the present invention a toy with developing skills, the toy including a fanciful figure having a capacity to perform an action, and action control circuitry operative to control the fanciful figure to perform the action at different levels of skill at different times.

Further in accordance with a preferred embodiment of the present invention the capacity to perform an action includes a capacity to talk.

Still further in accordance with a preferred embodiment of the present invention the action control circuitry is operative to control the fanciful figure to perform the action at an increasing level of skill over time.

Additionally in accordance with a preferred embodiment of the present invention the action includes talking and the fanciful figure is operative to increase its vocabulary over time.

Moreover in accordance with a preferred embodiment of the present invention the capacity to perform an action includes performing at least one physical action in response to an oral stimulus.

Further in accordance with a preferred embodiment of the present invention the capacity to perform an action includes performing an action other than talking and emitting a verbalization associated with the action.

There is additionally provided in accordance with a preferred embodiment of the present invention a system for interacting with a computer-controlled fanciful figure including at least one fanciful figure, at least one speech output apparatus, at least one computer operative to control the fanciful figure and provide a speech output associated with the fanciful figure via the at least one speech output apparatus, the speech output is in a special language.

Further in accordance with a preferred embodiment of the present invention the special language is at least partly generated by the at least one computer.

Additionally in accordance with a preferred embodiment of the present invention the special language is at least partly generated by modifying at least one known language according to at least one language modification rule.

Moreover in accordance with a preferred embodiment of the present invention the at least one computer is operative to receive the at least one language modification rule from a user.

Further in accordance with a preferred embodiment of the present invention the at least one computer is operative to provide the at least one language modification rule to a user.

Still further in accordance with a preferred embodiment of the present invention the special language is at least partly generated from a predefined set of phonemes.

Additionally in accordance with a preferred embodiment of the present invention the at least one computer is operative to receive at least a portion of the special language from a user.

Moreover in accordance with a preferred embodiment of the present invention the at least one fanciful figure is action induceable for producing an action.

Further in accordance with a preferred embodiment of the present invention the action includes a movement.

Additionally in accordance with a preferred embodiment of the present invention the action includes a sound.

Moreover in accordance with a preferred embodiment of the present invention the action includes a light emission.

Still further in accordance with a preferred embodiment of the present invention the speech output is identifiable with the action.

Additionally in accordance with a preferred embodiment of the present invention the at least one computer maintains a memory including at least one the speech output identifiable with the action.

Moreover in accordance with a preferred embodiment of the present invention the at least one computer is operative to induce the fanciful figure to produce the action.

Further in accordance with a preferred embodiment of the present invention the user induces the fanciful figure to produce the action and the at least one computer is operative to detect the action.

Additionally in accordance with a preferred embodiment of the present invention at least one speech input apparatus is further included and the at least one computer is operative to receive a speech input via the at least one speech input apparatus.

Moreover in accordance with a preferred embodiment of the present invention the speech input is identifiable with the action.

Still further in accordance with a preferred embodiment of the present invention the at least one computer maintains a memory including at least one the speech input identifiable with the action.

Additionally in accordance with a preferred embodiment of the present invention the at least one computer is additionally operative to translate between the special language and at least one other language the other language includes a language of common discourse.

Moreover in accordance with a preferred embodiment of the present invention the at least one fanciful figure is displayable on a computer display.

Further in accordance with a preferred embodiment of the present invention the speech output apparatus is assembled with the at least one computer.

Additionally in accordance with a preferred embodiment of the present invention the fanciful figure is a toy in communication with the at least one computer.

Moreover in accordance with a preferred embodiment of the present invention the at least one computer is assembled with the toy.

Still further in accordance with a preferred embodiment of the present invention the toy includes at least one appendage that is actuable.

Additionally in accordance with a preferred embodiment of the present invention the toy includes at least one appendage that is articulatable.

Moreover in accordance with a preferred embodiment of the present invention the speech output apparatus is assembled with the toy.

Further in accordance with a preferred embodiment of the present invention the language is a previously unknown language.

Additionally in accordance with a preferred embodiment of the present invention the at least one fanciful figure includes a toy in communication with the at least one computer and the speech input apparatus is assembled with the toy.

Moreover in accordance with a preferred embodiment of the present invention the at least one fanciful figure includes a plurality of fanciful figures.

Still further in accordance with a preferred embodiment of the present invention the speech input apparatus is assembled with the at least one computer.

Additionally in accordance with a preferred embodiment of the present invention the special language is preassembled with the at least one computer.

There is additionally provided in accordance with a preferred embodiment of the present invention a method of playing with a toy, the method including selecting an action having an associated skill level, controlling a fanciful figure to perform the action, and increasing the skill level over time.

Moreover in accordance with a preferred embodiment of the present invention the selecting step includes selecting a talking action.

Still further in accordance with a preferred embodiment of the present invention the increasing step includes increasing a vocabulary over time.

There is additionally provided in accordance with a preferred embodiment of the present invention a method of playing with a toy, the method including providing at least one fanciful figure, controlling speech output apparatus to provide a speech output associated with the fanciful figure the speech output is in a special language.

Additionally in accordance with a preferred embodiment of the present invention the controlling step includes generating at least part of the special language.

Moreover in accordance with a preferred embodiment of the present invention the generating step includes generating the at least part of the special language by modifying at least one known language according to at least one language modification rule.

Still further in accordance with a preferred embodiment of the present invention the generating step includes generating the at least part of the special language from a predefined set of phonemes.

Additionally in accordance with a preferred embodiment of the present invention the method includes controlling the at least one fanciful figure to perform an action associated with the speech output.

There is additionally provided in accordance with a preferred embodiment of the present invention a method of playing with a toy, the method including providing at least one fanciful figure, controlling the at least one fanciful figure to produce an action, and accepting at least one speech input for association with the action.

Moreover in accordance with a preferred embodiment of the present invention the controlling-action step includes articulating at least one appendage of the fanciful figure.

Still further in accordance with a preferred embodiment of the present invention the method includes controlling speech output apparatus to provide a speech output associated with the fanciful figure.

Additionally in accordance with a preferred embodiment of the present invention the controlling speech output step further includes providing the speech output associated with the action.

Moreover in accordance with a preferred embodiment of the present invention the controlling speech output step further includes providing the speech output in a previously unknown language.

There is thus provided in accordance with a preferred embodiment of the present invention a wireless computer controlled toy system including a computer system operative to transmit a first transmission via a first wireless transmitter and at least one toy including a first wireless receiver, the toy receiving the first transmission via the first wireless receiver and operative to carry out at least one action based on the first transmission.

The computer system may include a computer game. The toy may include a plurality of toys, and the at least one action may include a plurality of actions.

The first transmission may include a digital signal. The first transmission includes an analog signal and the analog signal may include sound.

Additionally in accordance with a preferred embodiment of the present invention the computer system includes a computer having a MIDI port and wherein the computer may be operative to transmit the digital signal by way of the MIDI port.

Additionally in accordance with a preferred embodiment of the present invention the sound includes music, a prerecorded sound and/or speech. The speech may include recorded speech and synthesized speech.

Further in accordance with a preferred embodiment of the present invention the at least one toy has a plurality of states including at least a sleep state and an awake state, and the first transmission includes a state transition command, and the at least one action includes transitioning between the sleep state and the awake state.

A sleep state may typically include a state in which the toy consumes a reduced amount of energy and/or in which the toy is largely inactive, while an awake state is typically a state of normal operation.

Still further in accordance with a preferred embodiment of the present invention the first transmission includes a control command chosen from a plurality of available control commands based, at least in part, on a result of operation of the computer game.

Additionally in accordance with a preferred embodiment of the present invention the computer system includes a plurality of computers.

Additionally in accordance with a preferred embodiment of the present invention the first transmission includes computer identification data and the second transmission includes computer identification data.

Additionally in accordance with a preferred embodiment of the present invention the at least one toy is operative to transmit a second transmission via a second wireless transmitter and the computer system is operative to receive the second transmission via a second wireless receiver.

Moreover in accordance with a preferred embodiment of the present invention the system includes at least one input device and the second transmission includes a status of the at least one input device.

Additionally in accordance with a preferred embodiment of the invention the at least one toy includes at least a first toy and a second toy, and wherein the first toy is operative to transmit a toy-to-toy transmission to the second toy via the second wireless transmitter, and wherein the second toy is operative to carry out at least one action based on the toy-to-toy transmission.

Further in accordance with a preferred embodiment of the present invention operation of the computer system is controlled, at least in part, by the second transmission.

Moreover in accordance with a preferred embodiment of the present invention the computer system includes a computer game, and wherein operation of the game is controlled, at least in part, by the second transmission.

The second transmission may include a digital signal and/or an analog signal.

Still further in accordance with a preferred embodiment of the present invention the computer system has a plurality of states including at least a sleep state and an awake state, and the second transmission include a state transition command, and the computer is operative, upon receiving the second transmission, to transition between the sleep state and the awake state.

Still further in accordance with a preferred embodiment of the present invention at least one toy includes sound input apparatus, and the second transmission includes a sound signal which represents a sound input via the sound input apparatus.

Additionally in accordance with a preferred embodiment of the present invention the computer system is also operative to perform at least one of the following actions: manipulate the sound signal; and play the sound signal.

Additionally in accordance with a preferred embodiment of the present invention the sound includes speech, and the computer system is operative to perform a speech recognition operation on the speech.

Further in accordance with a preferred embodiment of the present invention the second transmission includes toy identification data, and the computer system is operative to identify the at least one toy based, at least in part, on the toy identification data.

Still further in accordance with a preferred embodiment of the present invention the first transmission includes toy identification data. The computer system may adapt a mode of operation thereof based, at least in part, on the toy identification data.

Still further in accordance with a preferred embodiment of the present invention the at least one action may include movement of the toy, movement of a part of the toy and/or an output of a sound. The sound may be transmitted using a MIDI protocol.

There is also provided in accordance with another preferred embodiment of the present invention a game system including a computer system operative to control a computer game and having a display operative to display at least one display object, and at least one toy in wireless communication with the computer system, the computer game including a plurality of game objects, and the plurality of game objects includes the at least one display object and the at least one toy.

Further in accordance with a preferred embodiment of the present invention the at least one toy is operative to transmit toy identification data to the computer system, and the computer system is operative to adapt a mode of operation of the computer game based, at least in part, on the toy identification data.

The computer system may include a plurality of computers.

Additionally in accordance with a preferred embodiment of the present invention the first transmission includes computer identification data and the second transmission includes computer identification data.

There is also provided in accordance with a preferred embodiment of the present invention a data transmission apparatus including first wireless apparatus including musical instrument data interface (MIDI) apparatus operative to receive and transmit MIDI data between a first wireless and a first MIDI device and second wireless apparatus including MIDI apparatus operative to receive and transmit MIDI data between a second wireless and a second MIDI device, the first wireless apparatus is operative to transmit MIDI data including data received from the first MIDI device to the second wireless apparatus, and to transmit MIDI data including data received from the second wireless apparatus to the first MIDI device, and the second wireless apparatus is operative to transmit MIDI data including data received from the second MIDI device to the first wireless apparatus, and to transmit MIDI data including data received from the first wireless apparatus to the second MIDI device.

Further in accordance with a preferred embodiment of the present invention the second wireless apparatus includes a plurality of wirelesses each respectively associated with one of the plurality of MIDI devices, and each of the second plurality of wirelesses is operative to transmit MIDI data including data received from the associated MIDI device to the first wireless apparatus, and to transmit MIDI data including data received from the first wireless apparatus to the associated MIDI device.

The first MIDI device may include a computer, while the second MIDI device may include a toy.

Additionally in accordance with a preferred embodiment of the present invention the first wireless apparatus also includes analog interface apparatus operative to receive and transmit analog signals between the first wireless and a first analog device, and the second wireless apparatus also includes analog interface apparatus operative to receive and transmit analog signals between the second wireless and a second analog device, and the first wireless apparatus is also operative to transmit analog signals including signals received from the first analog device to the second wireless apparatus, and to transmit analog signal including signals received from the second wireless apparatus to the first analog device, and the second wireless apparatus is also operative to transmit analog signals including signals received from the second analog device to the first wireless apparatus, and to transmit analog signals including data received from the first wireless apparatus to the second analog device.

There is also provided in accordance with another preferred embodiment of the present invention a method for generating control instructions for a computer controlled toy system, the method includes selecting a toy, selecting at least one command from among a plurality of commands associated with the toy, and generating control instructions for the toy including the at least one command.

Further in accordance with a preferred embodiment of the present invention the step of selecting at least one command includes choosing a command, and specifying at least one control parameter associated with the chosen command.

Still further in accordance with a preferred embodiment of the present invention the at least one control parameter includes at least one condition depending on a result of a previous command.

Additionally in accordance with a preferred embodiment of the present invention at least one of the steps of selecting a toy and the step of selecting at least one command includes utilizing a graphical user interface.

Still further in accordance with a preferred embodiment of the present invention the previous command includes a previous command associated with a second toy.

Additionally in accordance with a preferred embodiment of the present invention the at least one control parameter includes an execution condition controlling execution of the command.

The execution condition may include a time at which to perform the command and/or a time at which to cease performing the command. The execution condition may also include a status of the toy.

Additionally in accordance with a preferred embodiment of the present invention the at least one control parameter includes a command modifier modifying execution of the command.

Still further in accordance with a preferred embodiment of the present invention the at least one control parameter includes a condition dependent on a future event.

Additionally in accordance with a preferred embodiment of the present invention the at least one command includes a command to cancel a previous command.

There is also provided for in accordance with a preferred embodiment of the present invention a signal transmission apparatus for use in conjunction with a computer, the apparatus including wireless transmission apparatus; and signal processing apparatus including at least one of the following analog/digital sound conversion apparatus operative to convert analog sound signals to digital sound signals, to convert digital sound signals to analog sound signals, and to transmit the signals between the computer and a sound device using the wireless transmission apparatus; a peripheral control interface operative to transmit control signals between the computer and a peripheral device using the wireless transmission apparatus; and a MIDI interface operative to transmit MIDI signals between the computer and a MIDI device using the wireless transmission apparatus.

There is also provided in accordance with another preferred embodiment of the present invention a computer system including a computer, and a sound card operatively attached to the computer and having a MIDI connector and at least one analog connector, wherein the computer is operative to transmit digital signals by means of the MIDI connector and to transmit analog signals by means of the at least one analog connector.

Further in accordance with a preferred embodiment of the present invention the computer is also operative to receive digital signals by means of the MIDI connector and to receive analog signals by means of the at least one analog connector.

It is noted that throughout the specification and claims the term "special language" is intended to include any language other than languages of common discourse such as English, French, Swahili and Urdu.

It is further noted that throughout the specification and claims the term "fanciful figure" is intended to include any 2D or 3D real or virtual figure, which may or may not be based on fact, which is made or designed in a curious, intricate, imaginative or whimsical way.

It is also noted that throughout the specification and claims the term "radio" includes all forms of "wireless" communication.

BRIEF DESCRIPTION OF THE DRAWINGS

The present invention will be understood and appreciated from the following detailed description, taken in conjunction with the drawings in which:

FIGS. 1–32C illustrate a toy system for use in conjunction with a computer system wherein:

FIG. 1A is a partly pictorial, partly block diagram illustration of a computer control system including a toy, constructed and operative in accordance with a preferred embodiment of the present invention;

FIGS. 2A–2C are simplified pictorial illustrations of a portion of the system of FIG. 1A in use;

FIG. 3 is a simplified block diagram of a preferred implementation of the computer radio interface 110 of FIG. 1A;

FIG. 4 is a more detailed block diagram of the computer radio interface 110 of FIG. 3;

FIG. 6 is a simplified block diagram of a preferred implementation of the toy control device 130 of FIG. 1A;

FIG. 11 is a simplified flowchart illustration of a preferred method for generating control instructions for the apparatus of FIG. 1A;

FIG. 13 is a block diagram of a first sub-unit of a multi-port multi-channel implementation of the computer radio interface 110 of FIG. 1A, which sub-unit resides within computer 100 of FIG. 1A;

FIG. 14 is a block diagram of a second sub-unit of a multi-port multi-channel implementation of the computer radio interface 110 of FIG. 1A, which sub-unit complements the apparatus of FIG. 13 and resides exteriorly to computer 100 of FIG. 1A;

FIG. 16 is a simplified flowchart illustration of a preferred method by which a computer selects a control channel pair in anticipation of a toy becoming available and starts a game-defining communication over the control channel each time both a toy and a transceiver of the computer radio interface are available;

FIG. 17 is a simplified flowchart illustration of a preferred method for implementing the "select control channel pair" step of FIG. 16;

FIG. 19 is a simplified flowchart illustration of a preferred method of operation of the toy control device 130;

FIG. 20 is a simplified illustration of a remote game server in association with a wireless computer controlled toy system which may include a network computer;

FIG. 21 is a simplified flowchart illustration of the operation of the computer or of the network computer of FIG. 20, when operating in conjunction with the remote server;

FIG. 22 is a simplified flowchart illustration of the operation of the remote game server of FIG. 20;

FIG. 23 is a semi-pictorial semi-block diagram illustration of a wireless computer controlled toy system including a proximity detection subsystem operative to detect proximity between the toy and the computer;

FIGS. 28A–28K, taken together, form a detailed electronic schematic diagram of the multi-port multi-channel computer radio interface sub-unit of FIG. 13;

FIG. 30 is a partly pictorial, partly block diagram illustration of a computer control system including a toy, constructed and operative in accordance with a further preferred embodiment of the present invention;

FIG. 31 is a block diagram is a simplified block diagram illustrating the combination of the computer radio interface and the toy control device as used in the embodiment of FIG. 30; and FIGS. 32A, 32B and 32C taken together form a simplified block diagram of the EPLD chip of FIG. 28H; and FIGS. 33–43 illustrates embodiments of the toy system of FIGS. 1–32C, in which a computer-controlled toy system has a capacity for modifying a known language and/or speaking in a previously unknown or whimsical language, wherein:

FIG. 33 is a simplified pictorial illustration of a display-based fanciful figure interaction system constructed and operative in accordance with a preferred embodiment of the present invention;

FIG. 35 is a simplified block diagram of a fanciful figure interaction system useful in the systems of FIGS. 33, 34A, 34B, and 34C;

FIG. 36 is a simplified operational flow chart of a fanciful figure interaction system useful in describing the systems of FIGS. 33, 34A, 34B, 34C, and 35;

FIG. 37 is a simplified operational flow chart of a preferred implementation of step 3440 of FIG. 36;

FIG. 38 is a simplified operational flow chart of a preferred implementation of step 3450 of FIG. 36;

FIG. 39 is a simplified operational flow chart of a preferred implementation of step 3470 of FIG. 36;

FIG. 40 is a simplified operational flow chart of a preferred implementation of step 3490 of FIG. 36;

FIG. 41 is a simplified block diagram of a preferred logical implementation of the various sets described with reference to FIG. 35; and FIGS. 42 and 43, taken together, are simplified block diagrams of possible implementations of various tables described in FIG. 41.

Figure 8A:
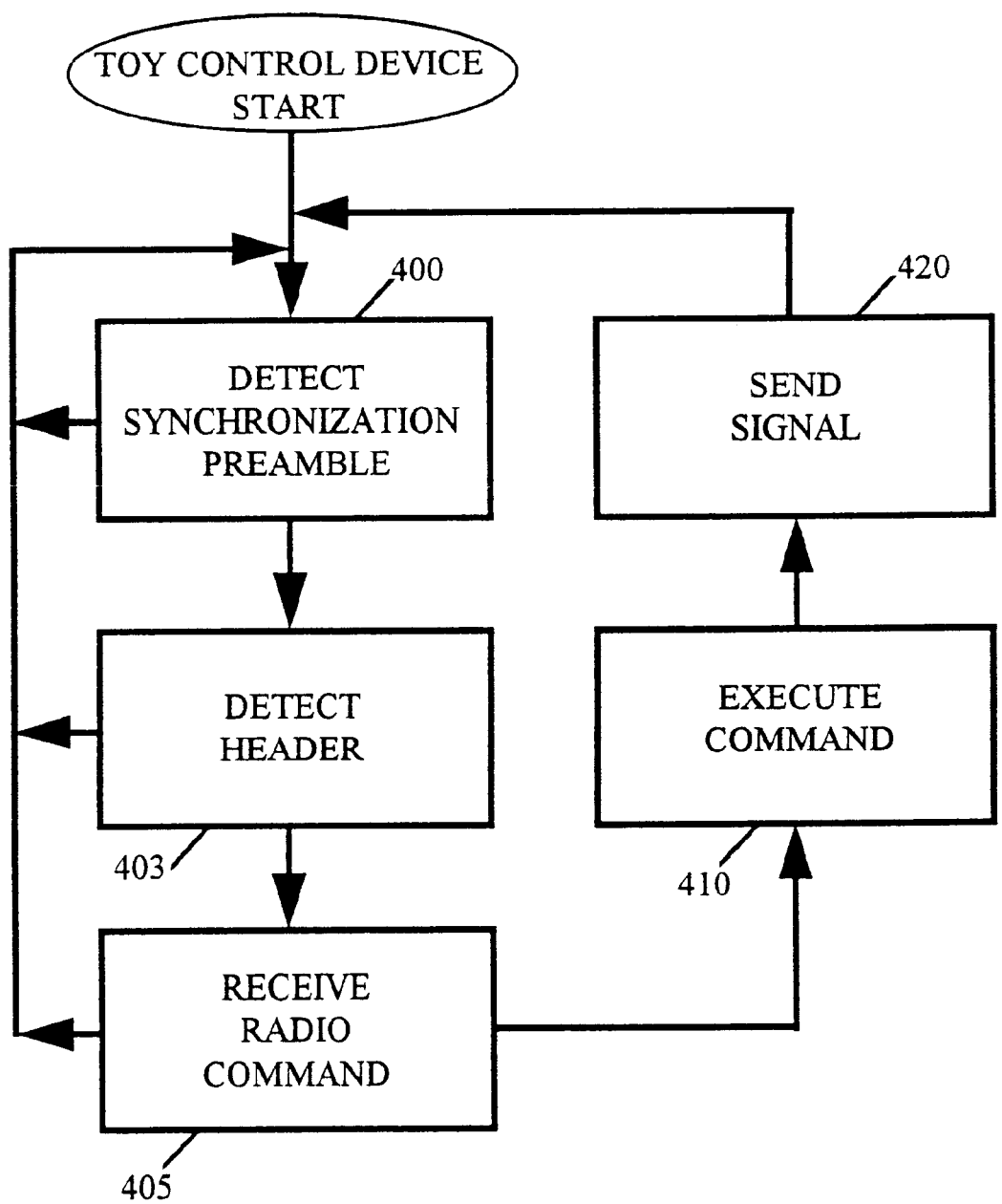
FIG. 8A is a simplified flowchart illustration of a preferred method for receiving radio signals, executing commands comprised therein, and sending radio signals, within the toy control device 130 of FIG. 1A.
Figure 8B:
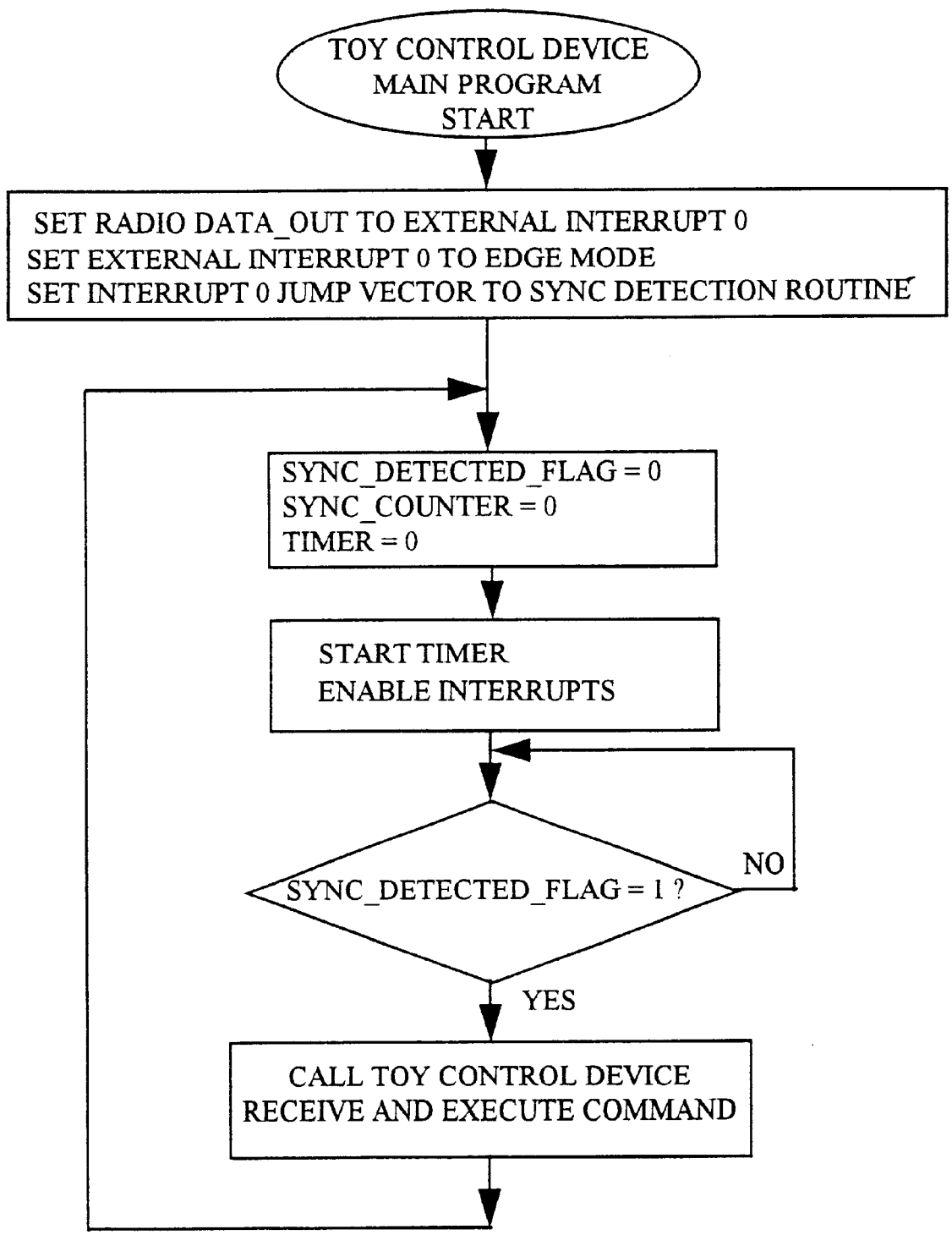
FIGS. 8B–8T, taken together, comprise a simplified flowchart illustration of a preferred implementation of the method of FIG. 8A.
Figure 8C:
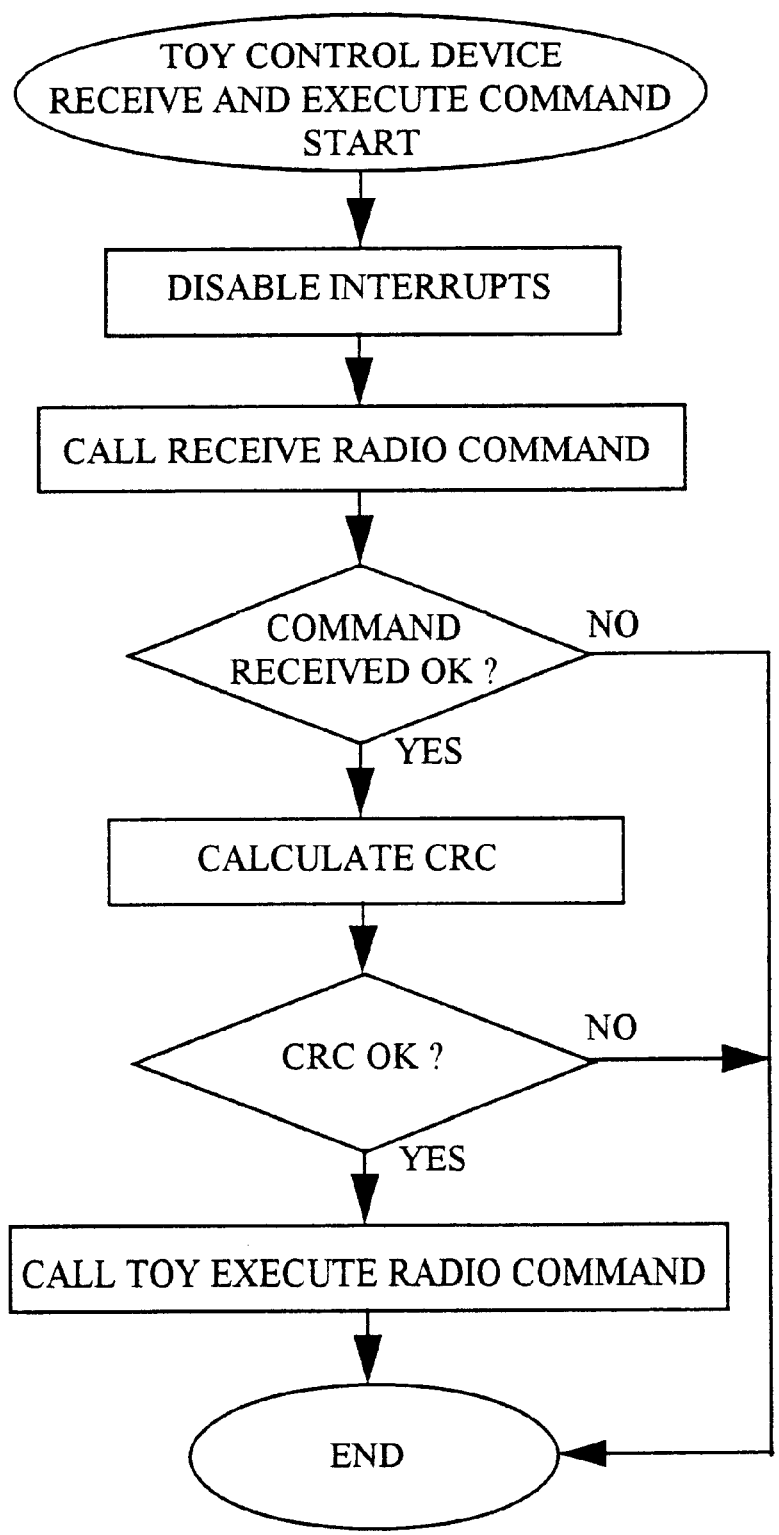
Figure 8D:
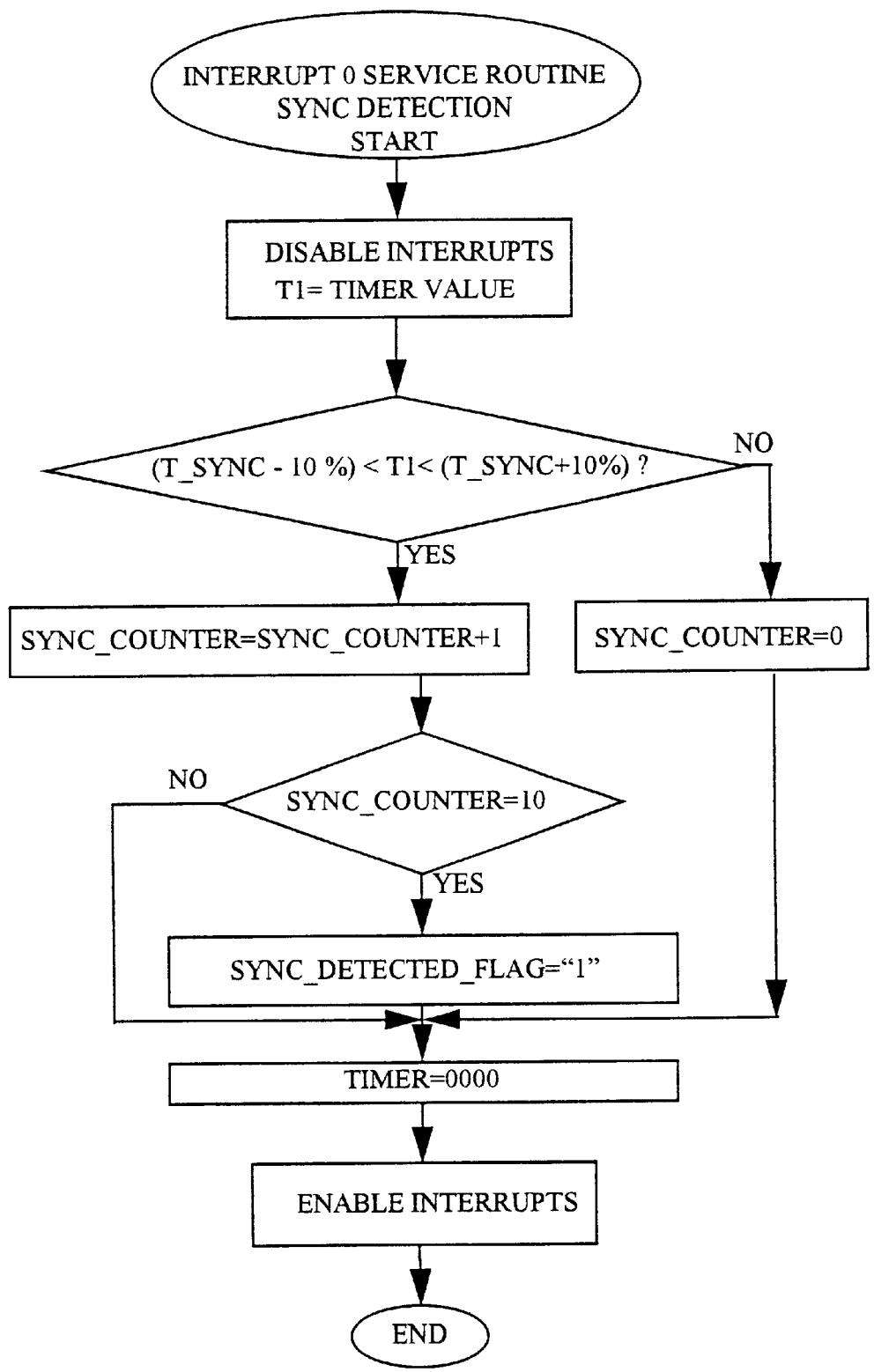
Figure 8E:
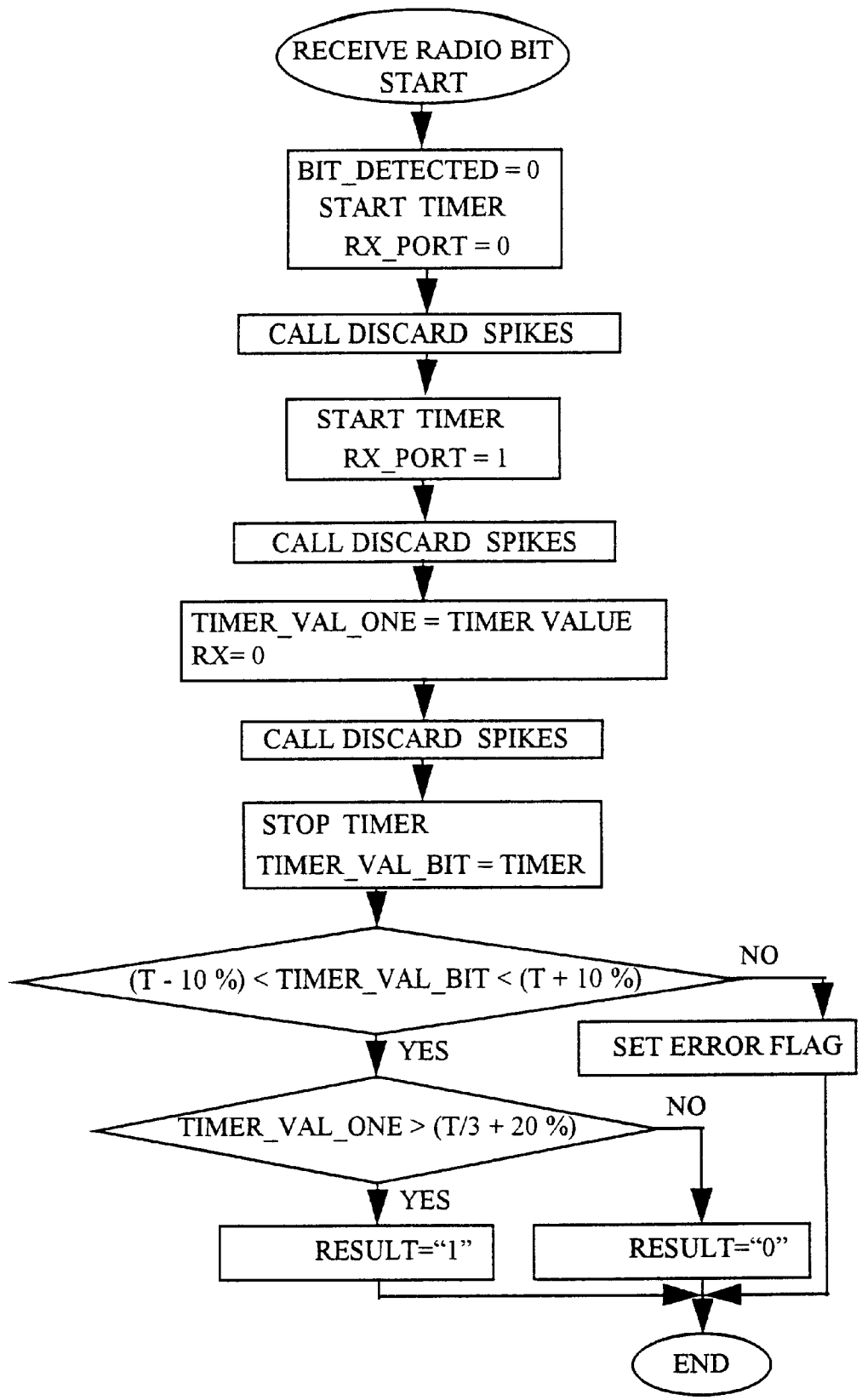
Figure 8F:
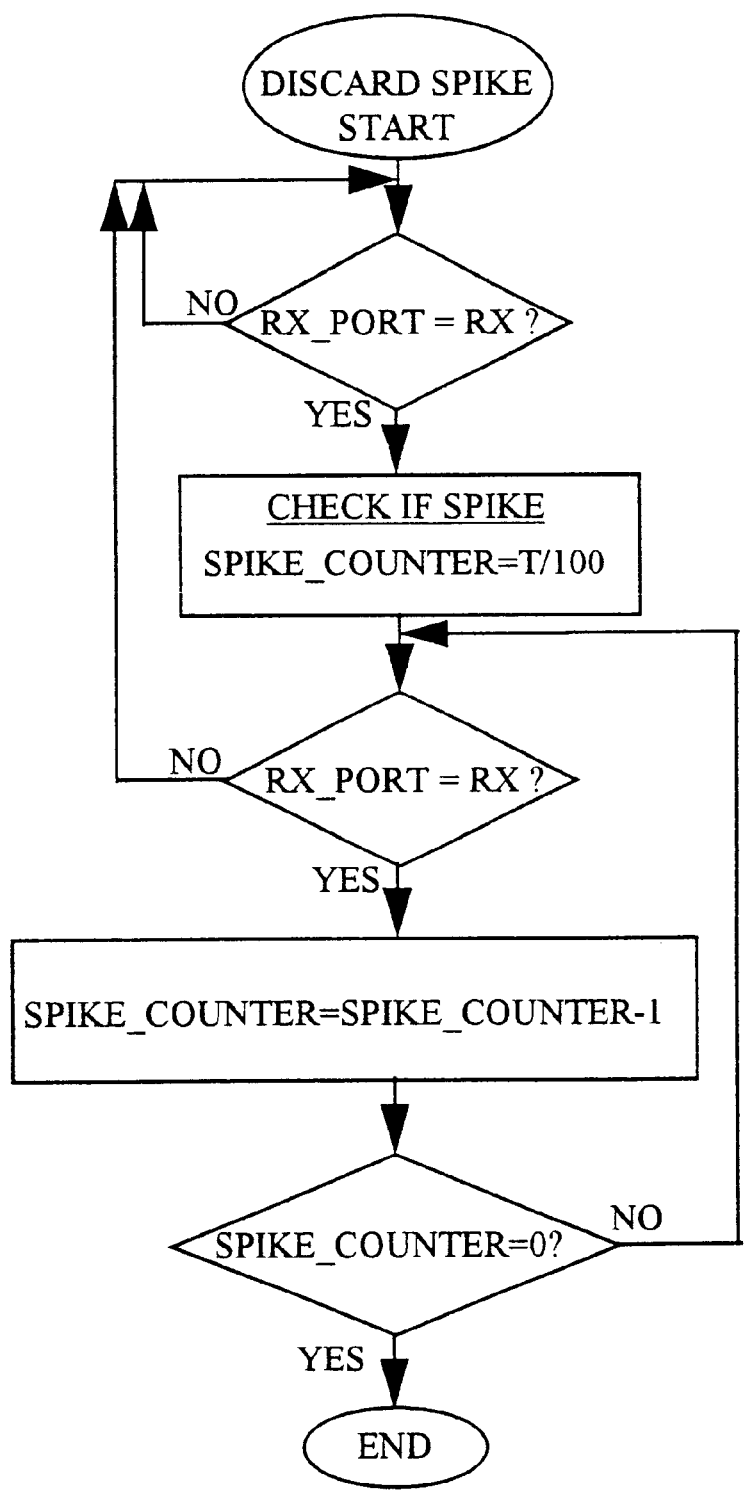
Figure 8G:
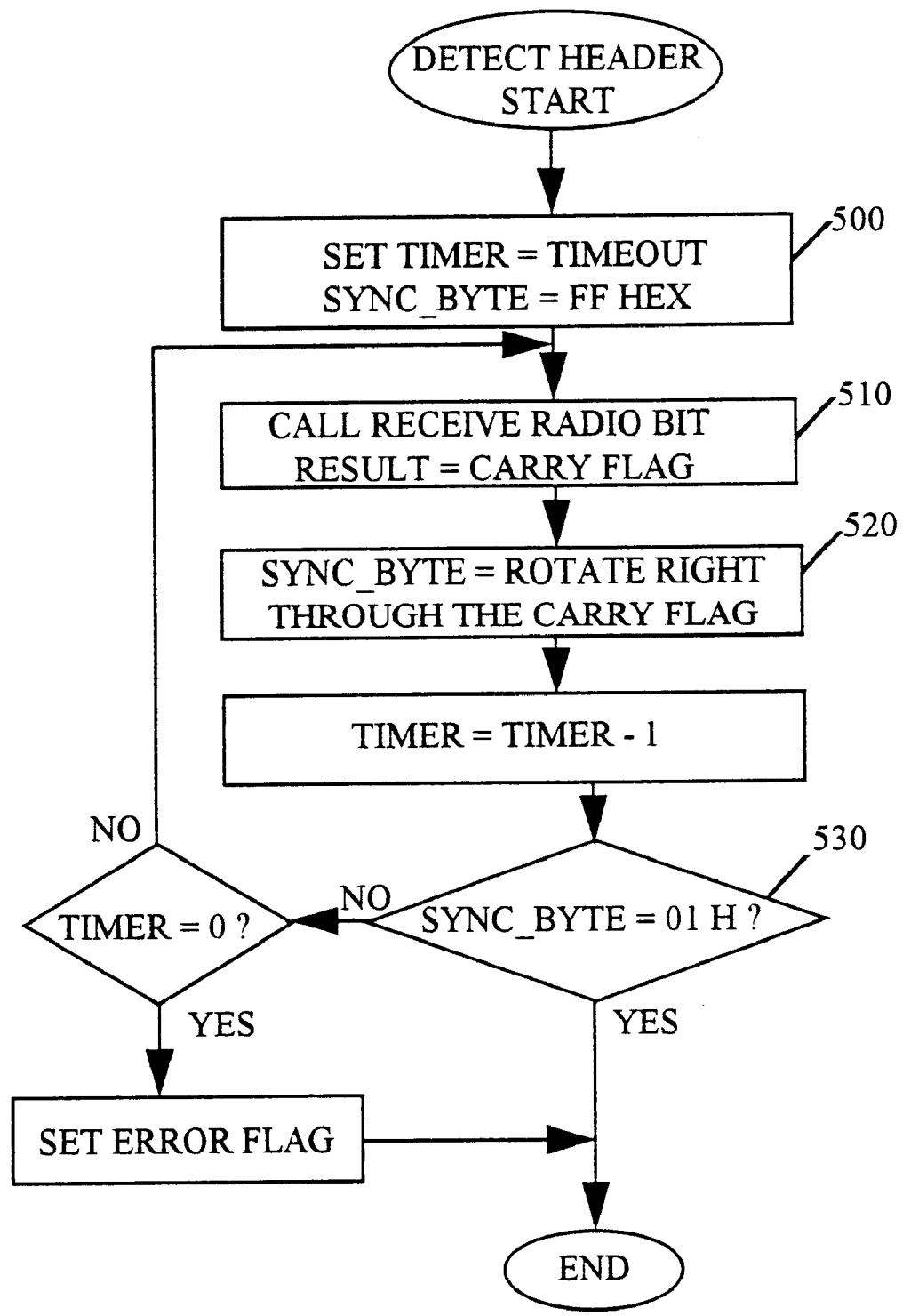
Figure 8H:
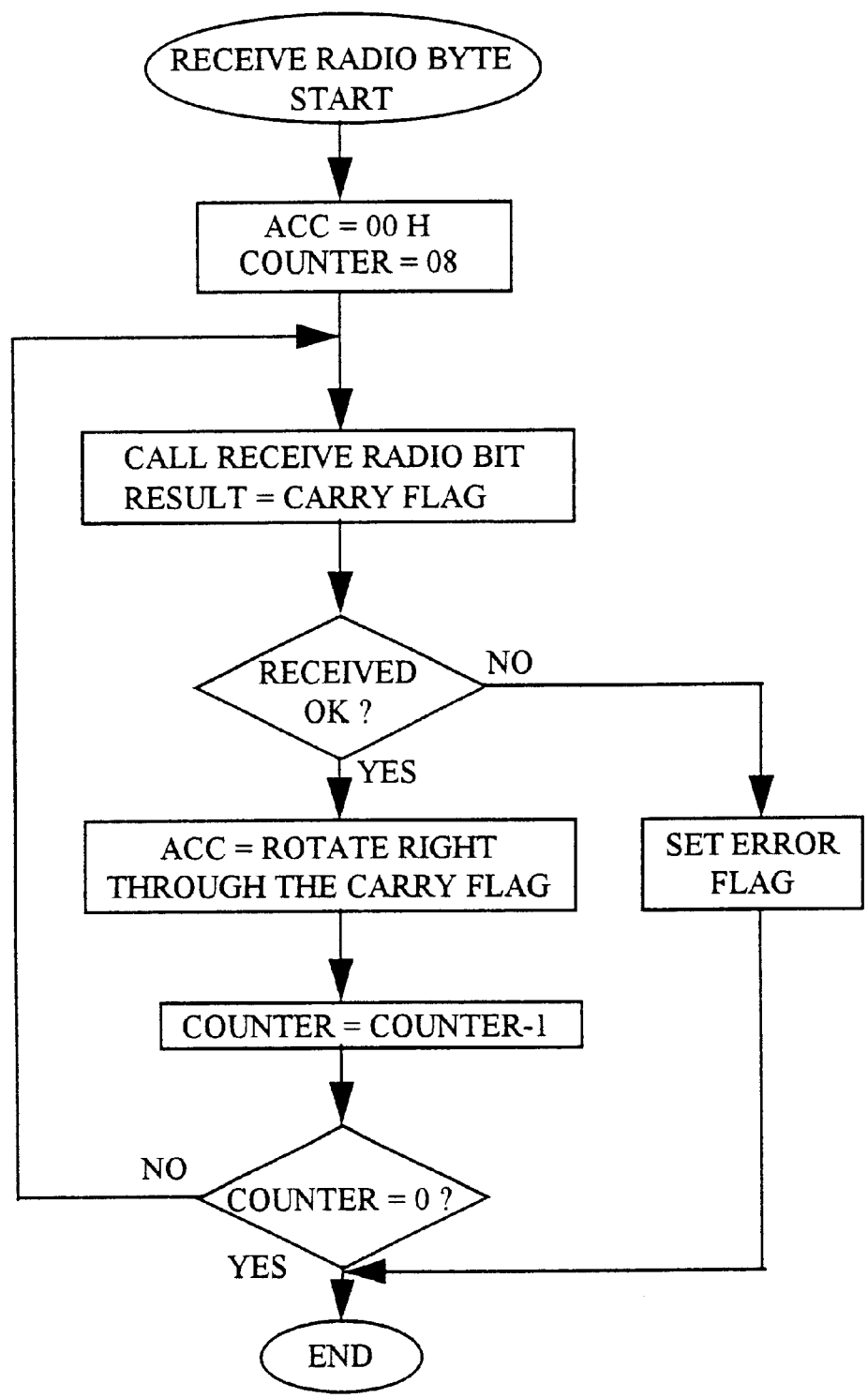
Figure 8I:
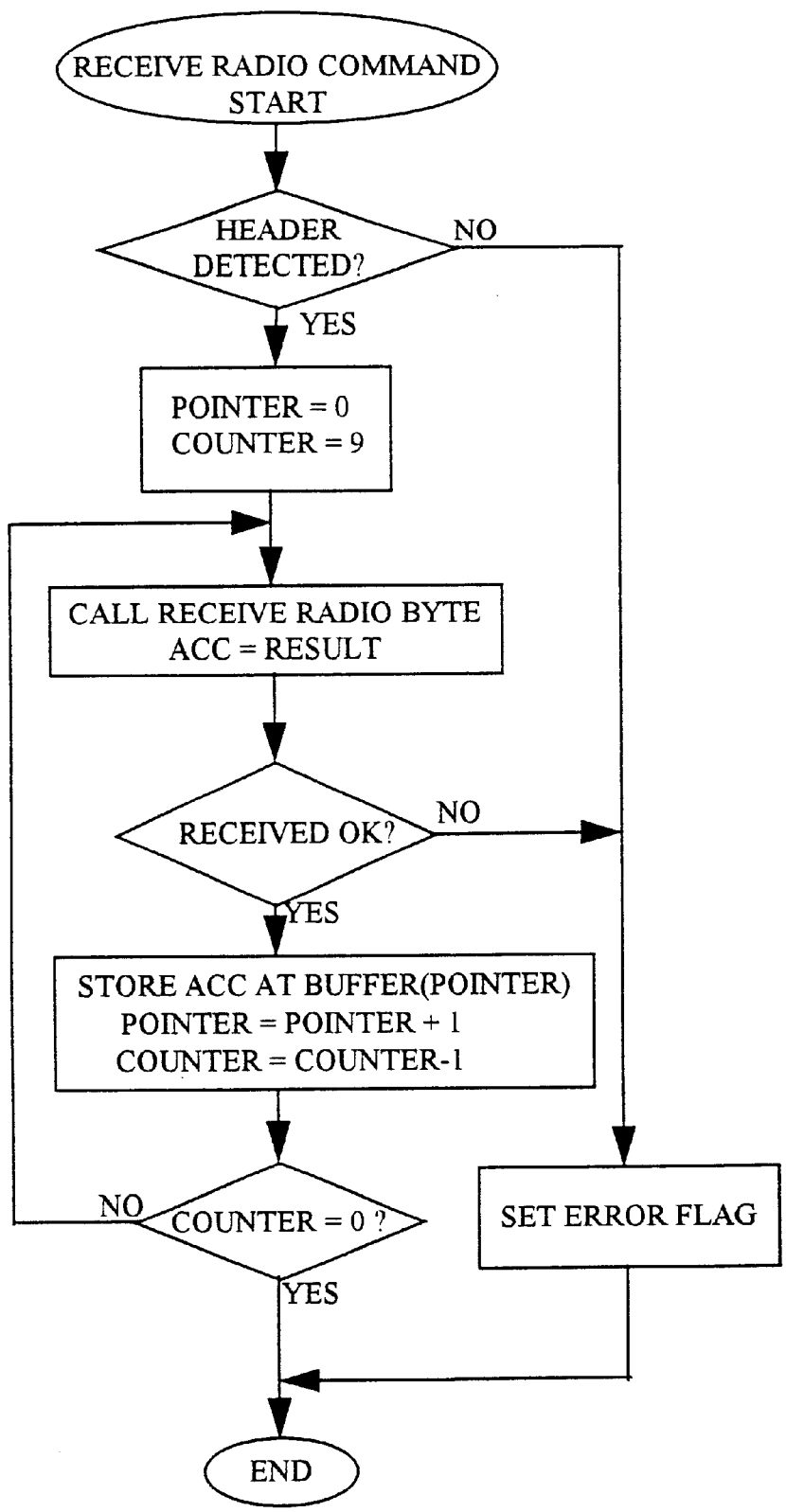
Figure 8J:
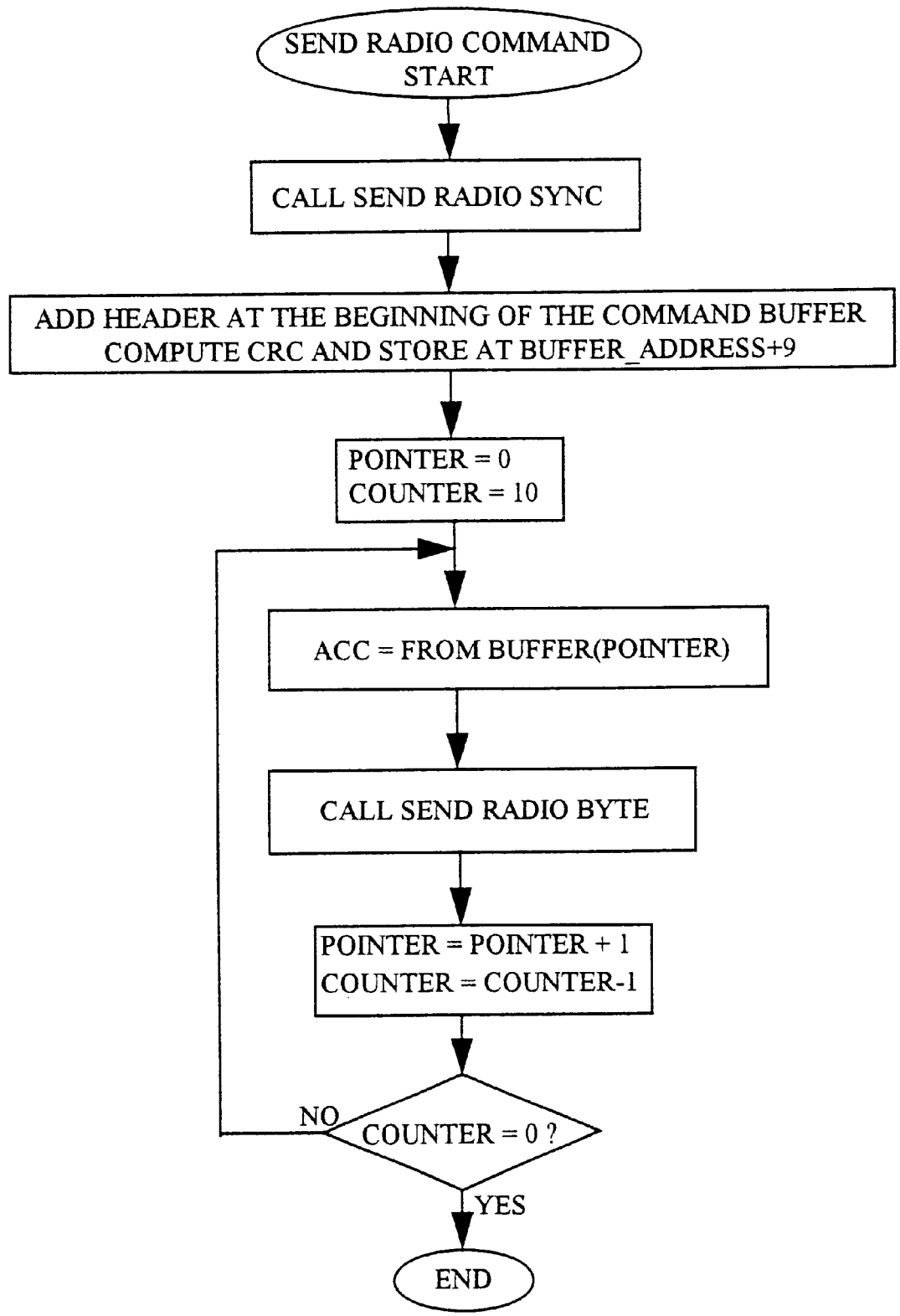
Figure 8K:
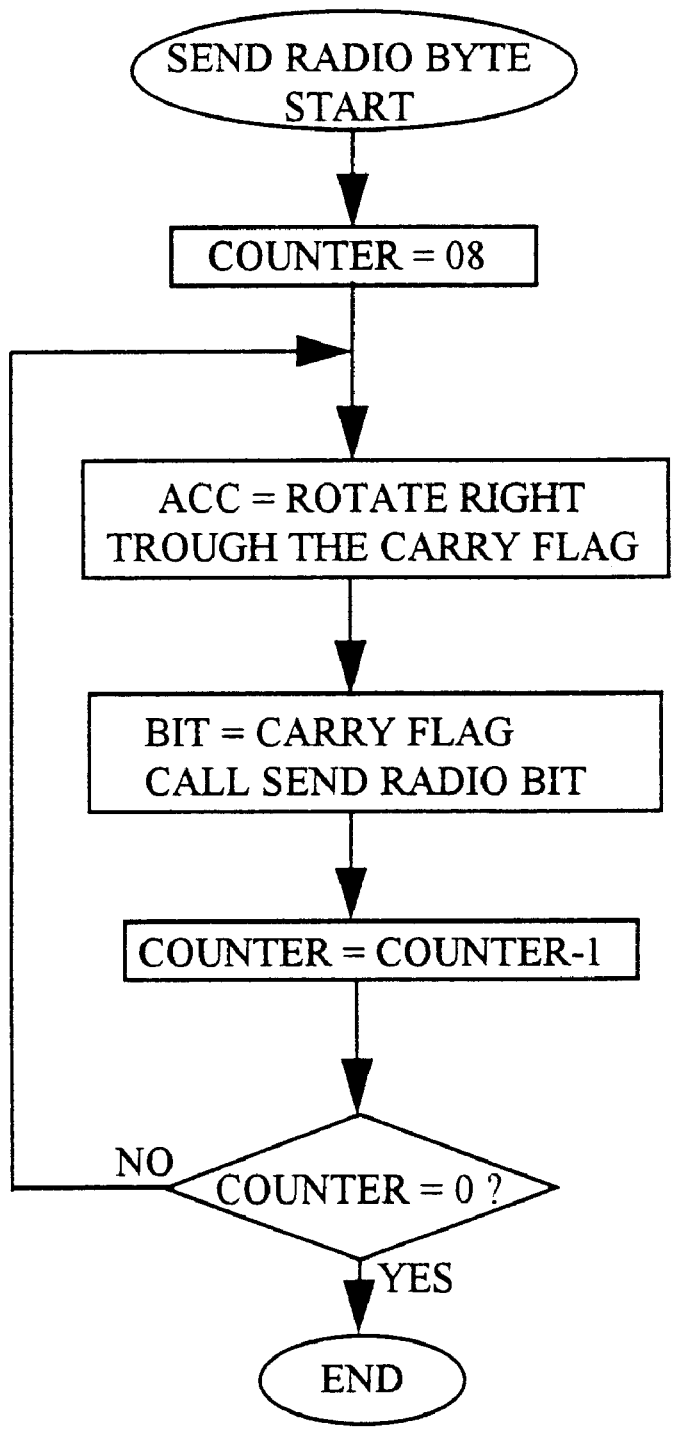
Figure 8L:
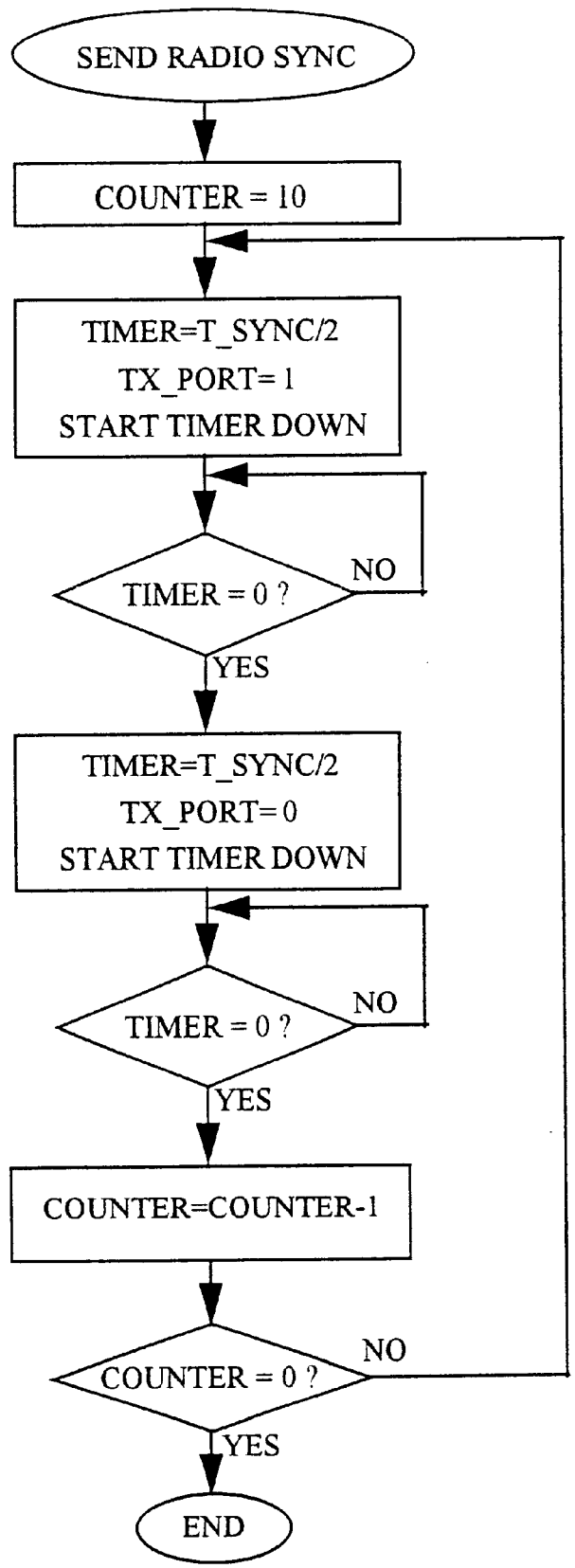
Figure 8M:
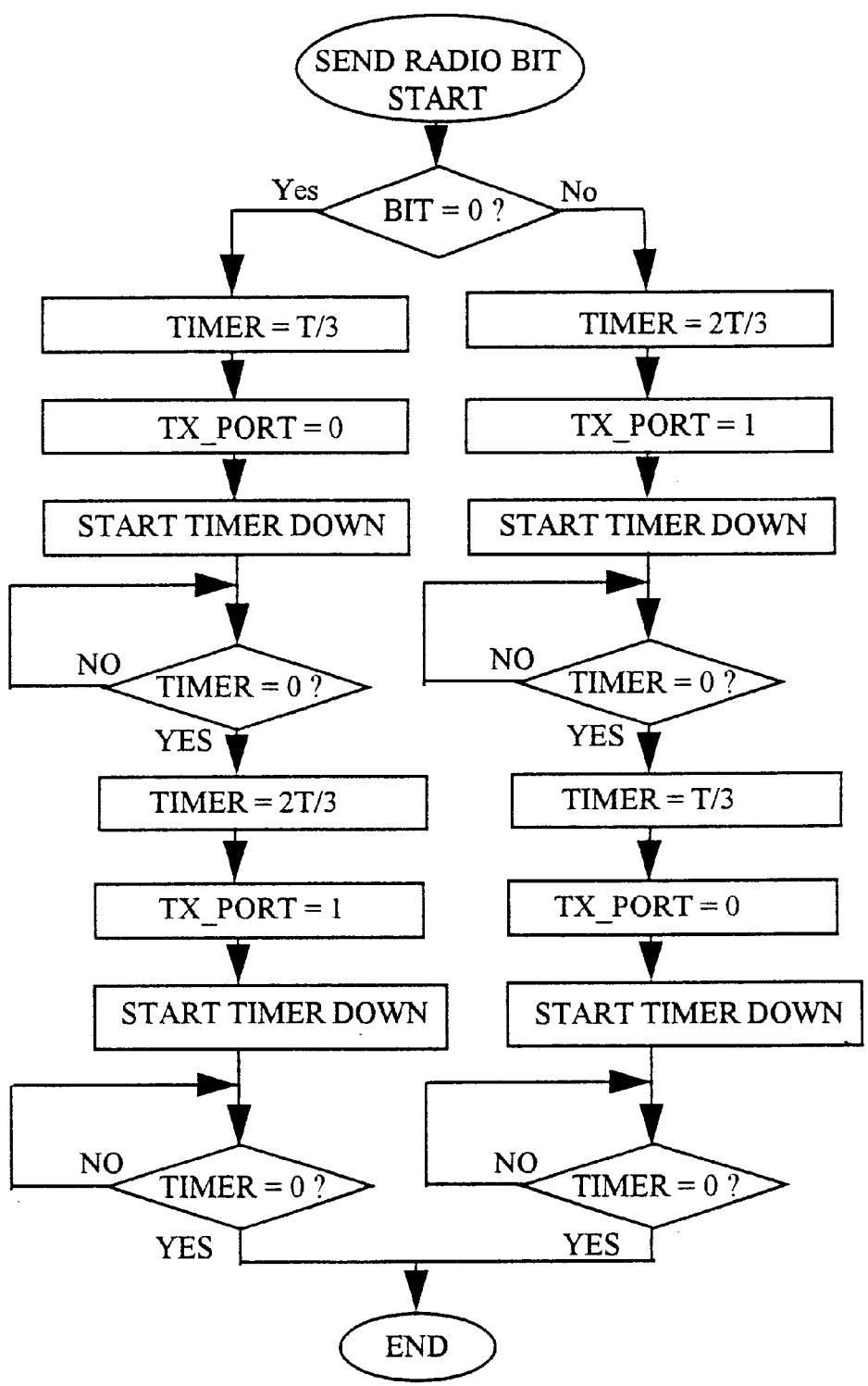
Figure 8N:
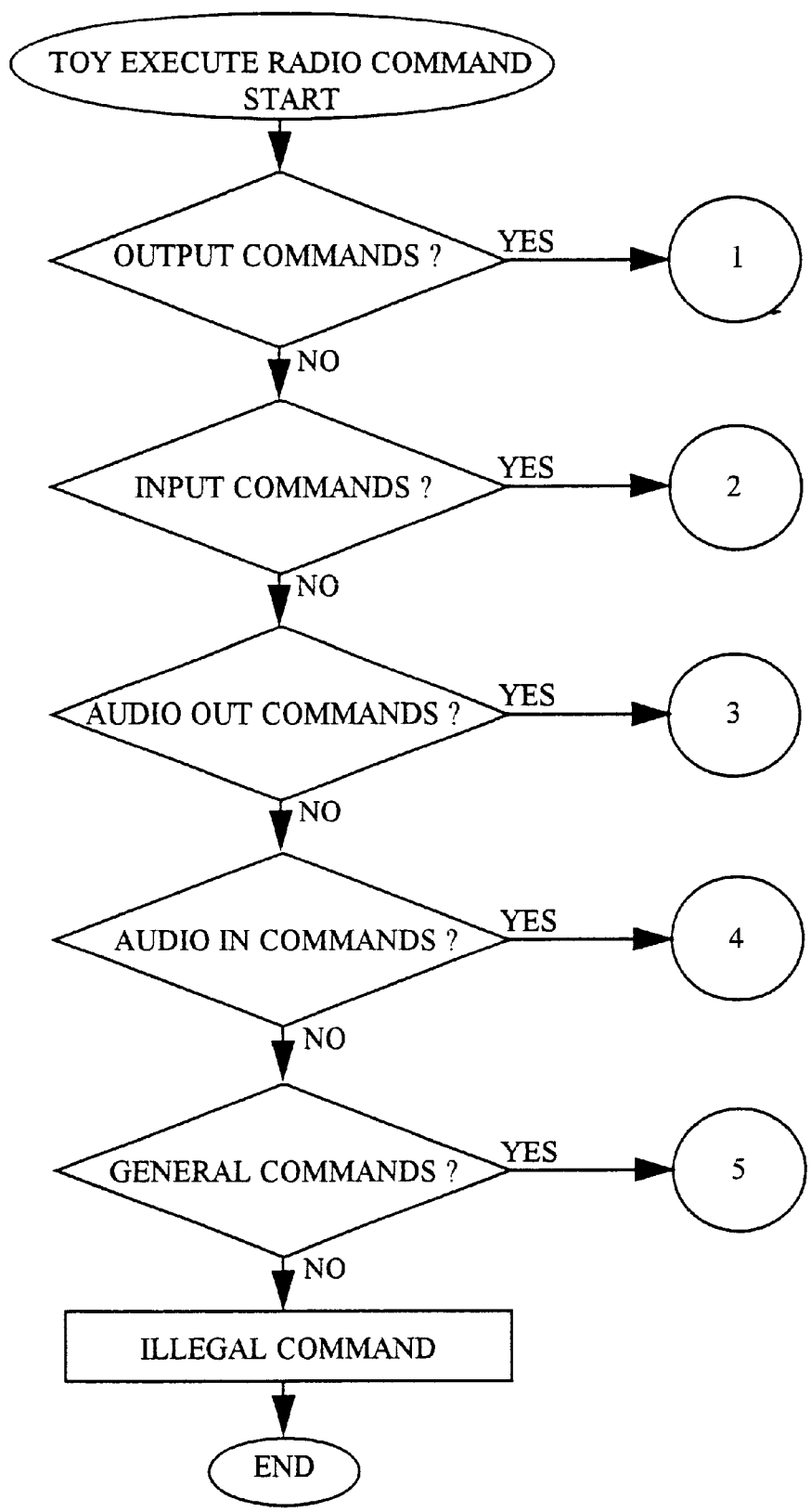
Figure 8O:
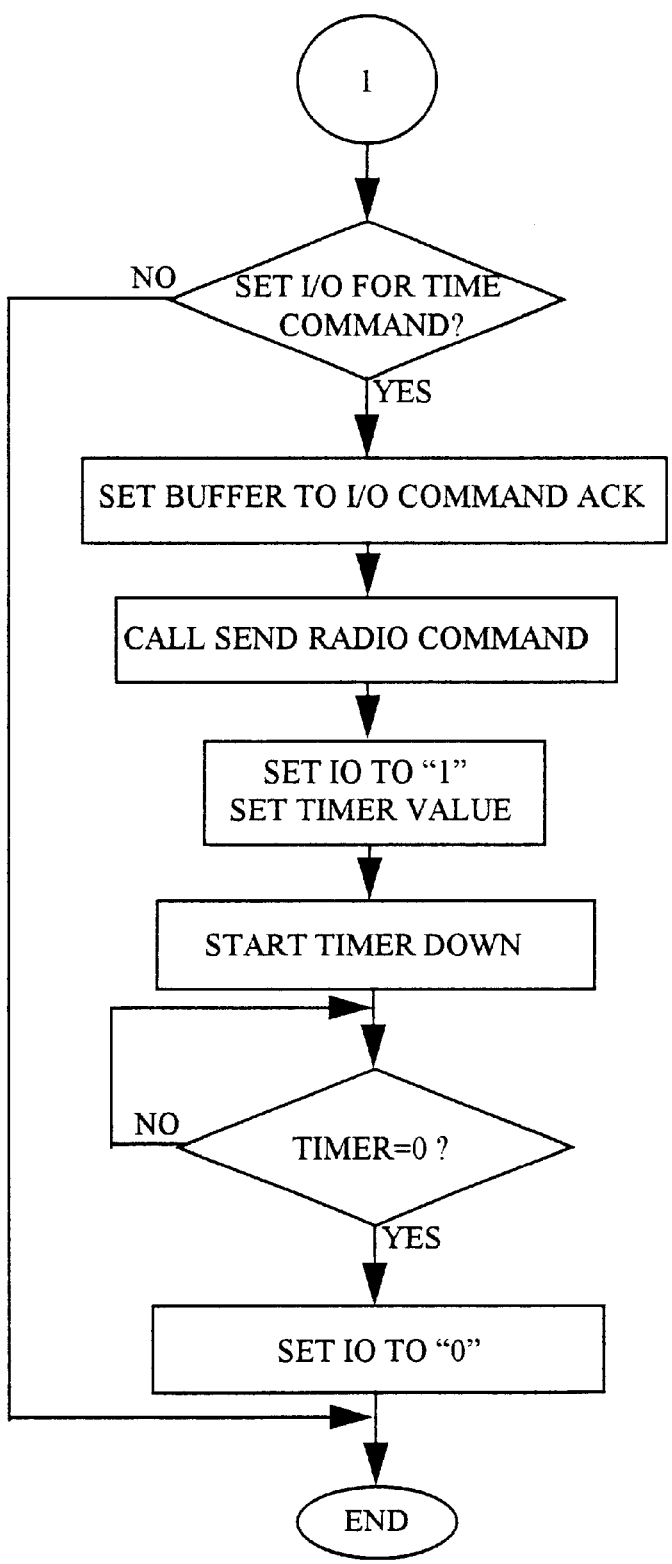
Figure 8P:
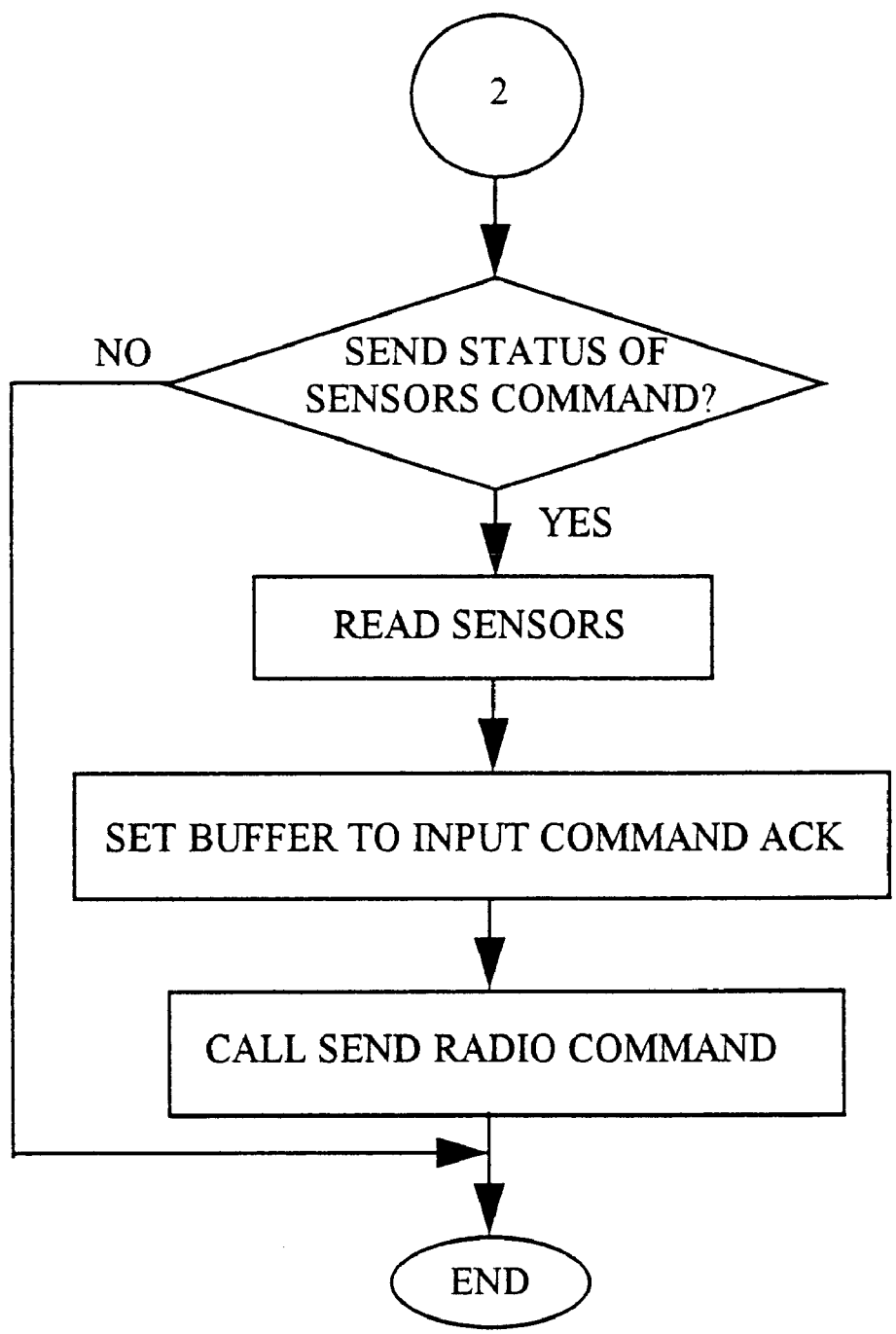
Figure 8Q:
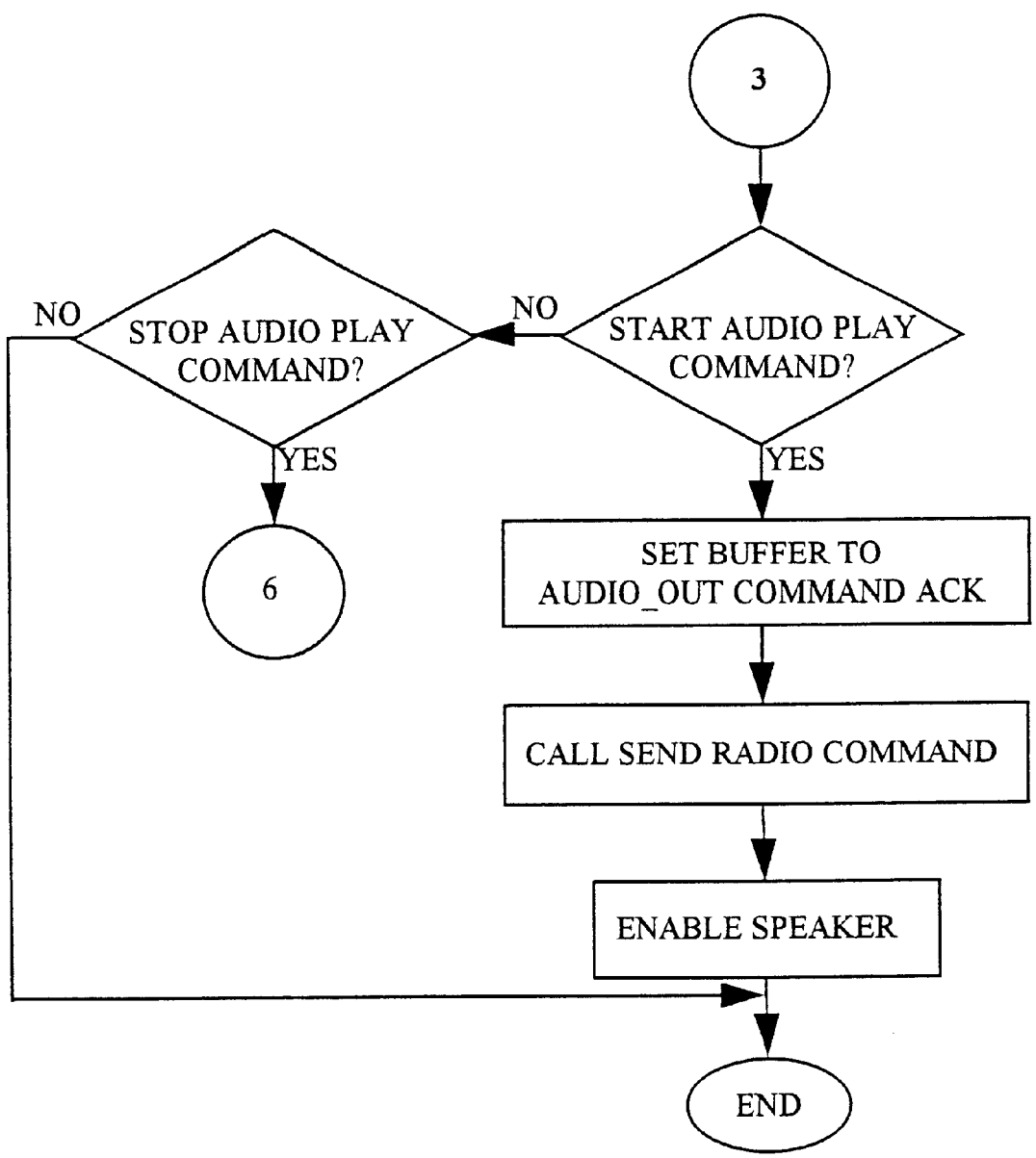
Figure 8R:
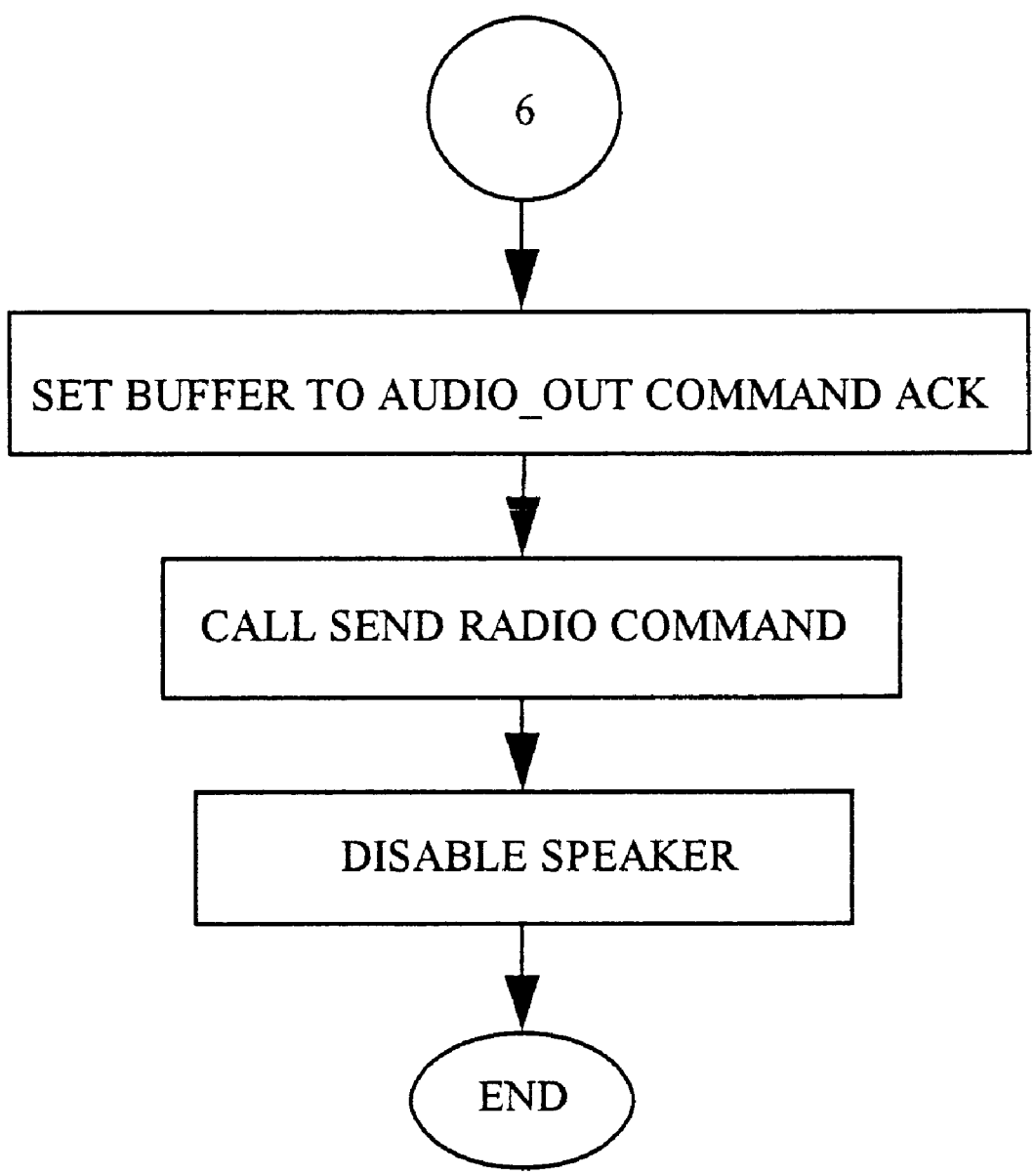
Figure 8S:
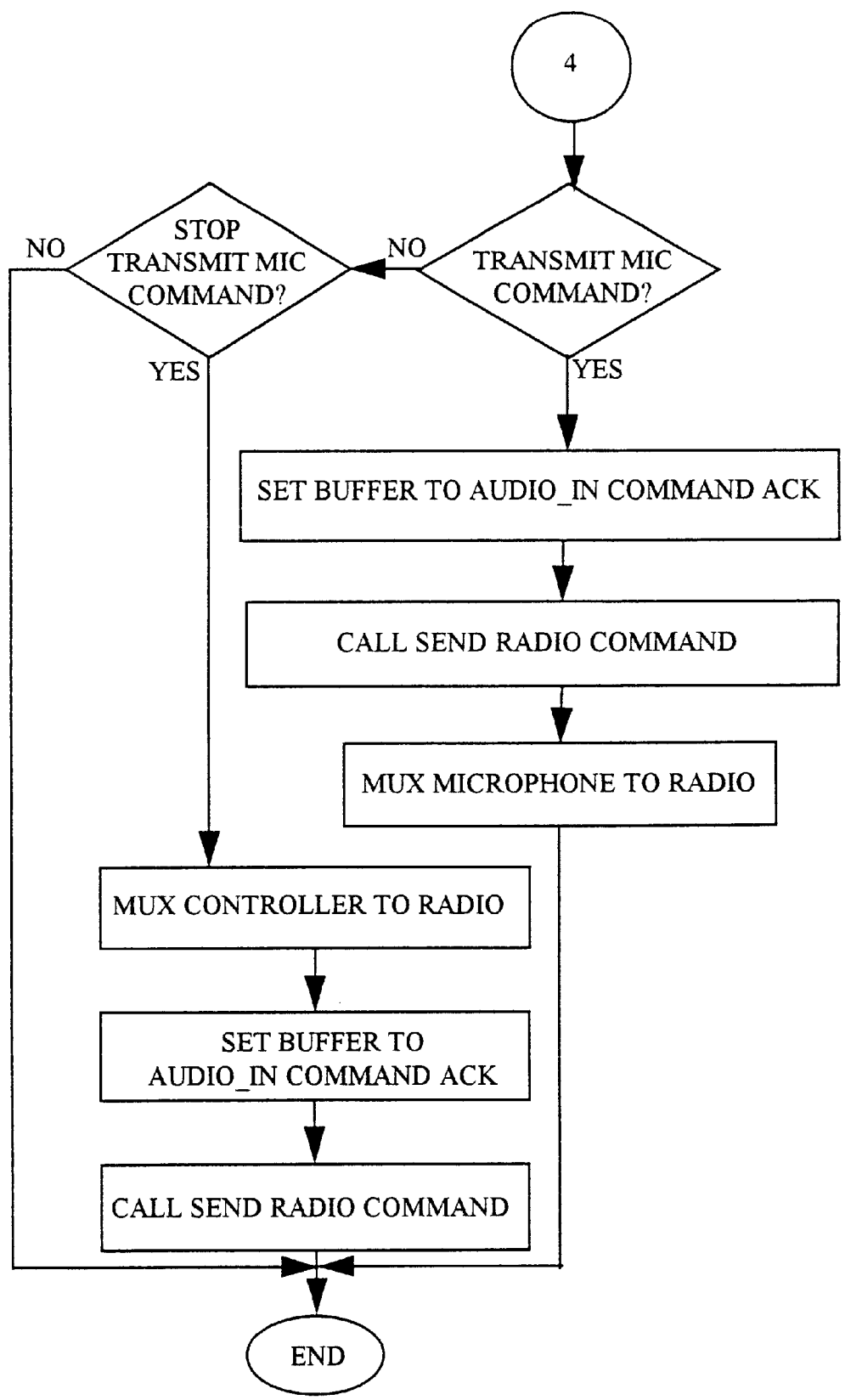
Figure 8T:
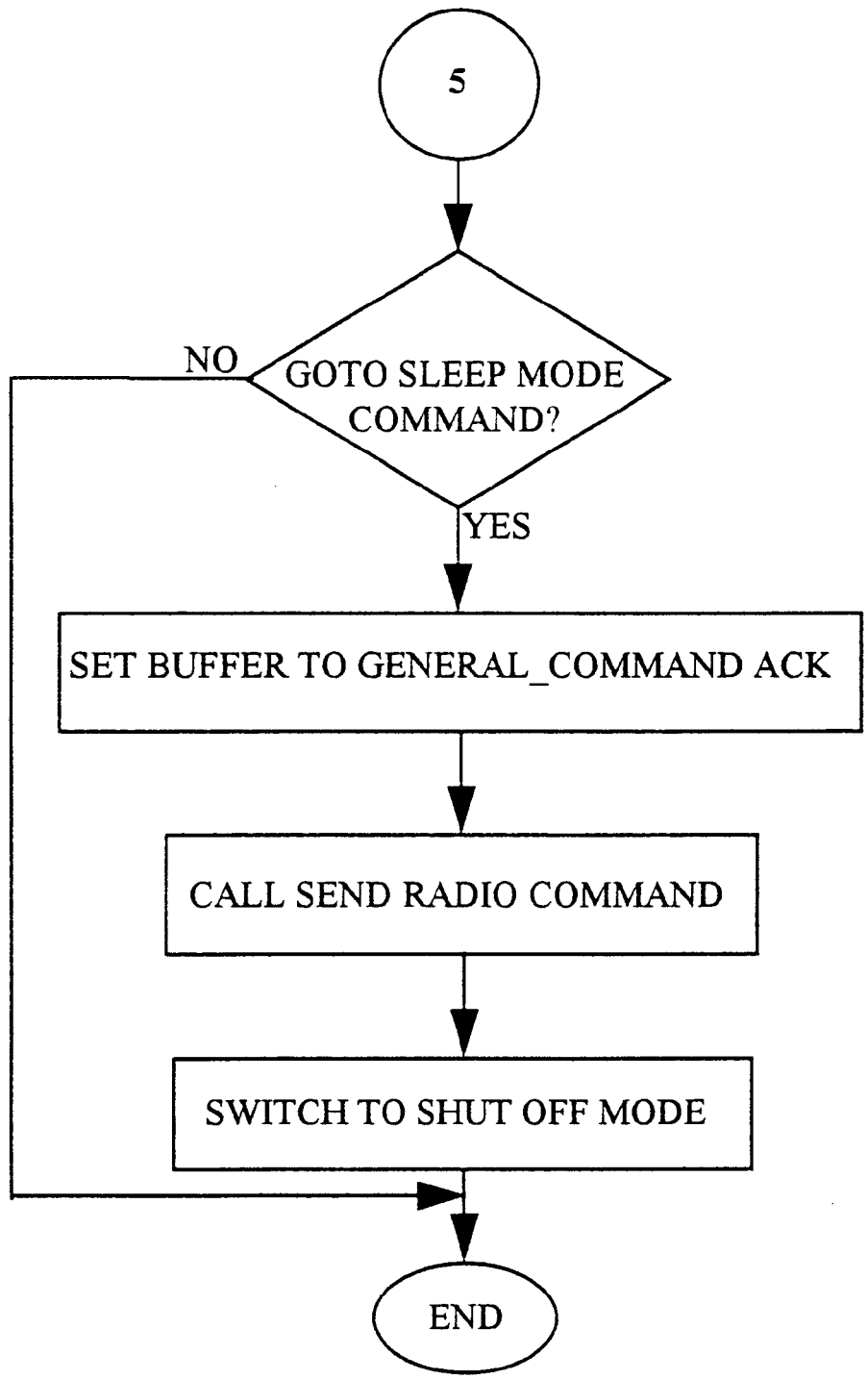
Figure 9A:
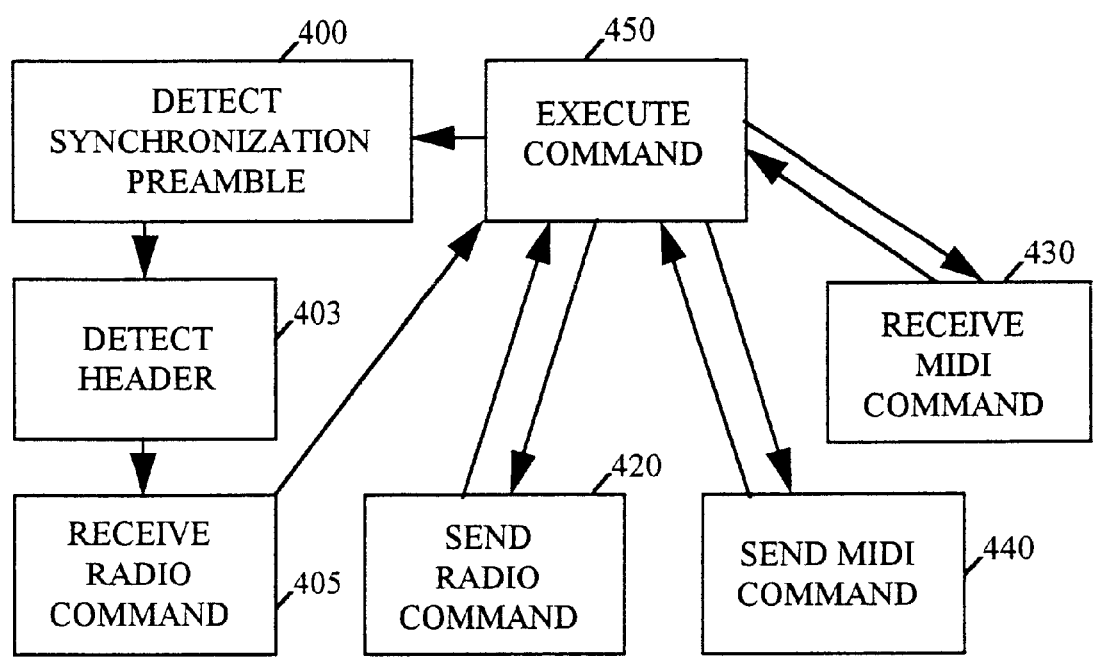
FIG. 9A is a simplified flowchart illustration of a preferred method for receiving MIDI signals, receiving radio signals, executing commands comprised therein, sending radio signals, and sending MIDI signals, within the computer radio interface 110 of FIG. 1A.
Figure 9B:
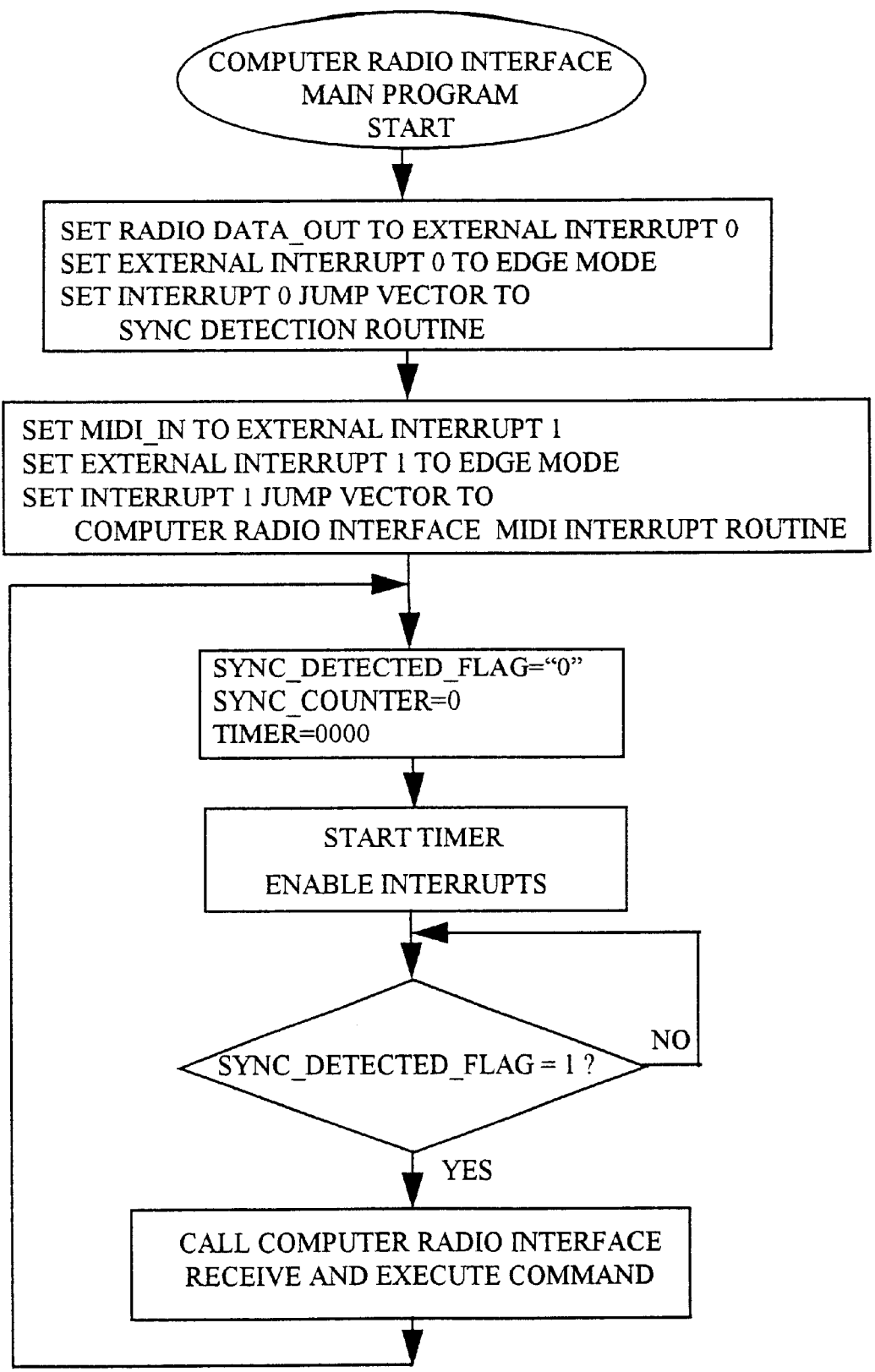
FIGS. 9B–9N, taken together with FIGS. 8D–8M, comprise a simplified flowchart illustration of a preferred implementation of the method of FIG. 9A.
Figure 9C:
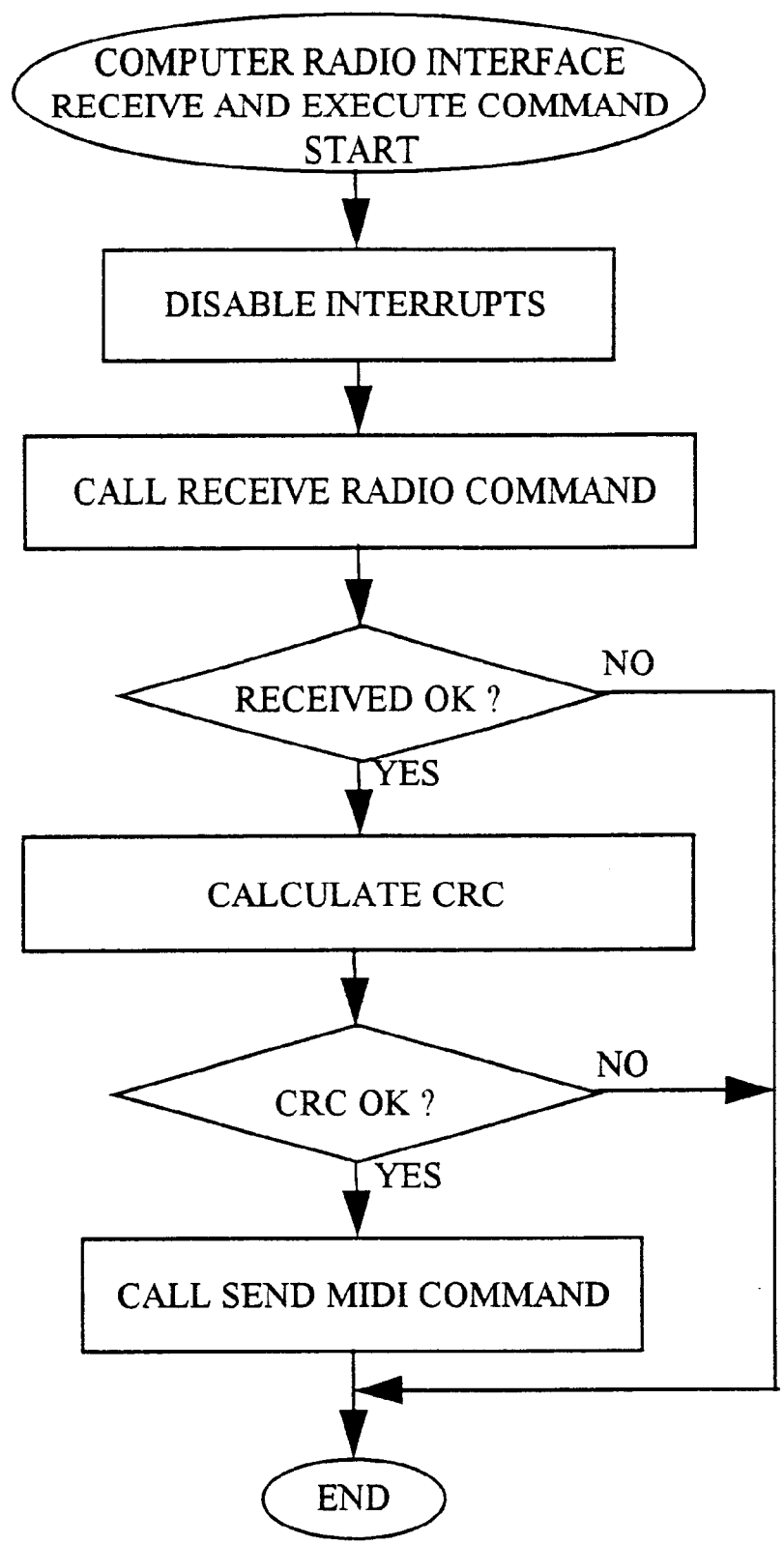
Figure 9D:
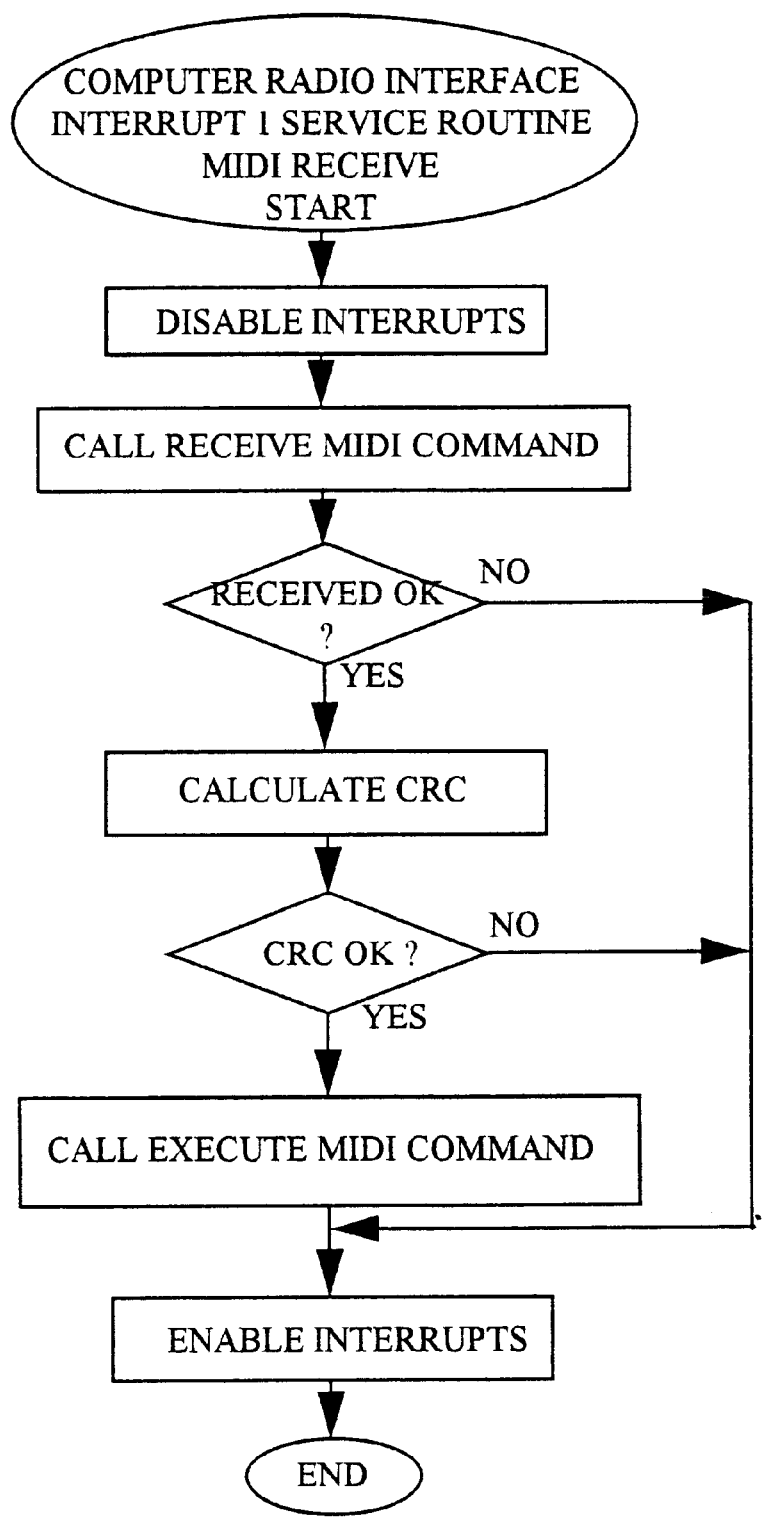
Figure 9E:
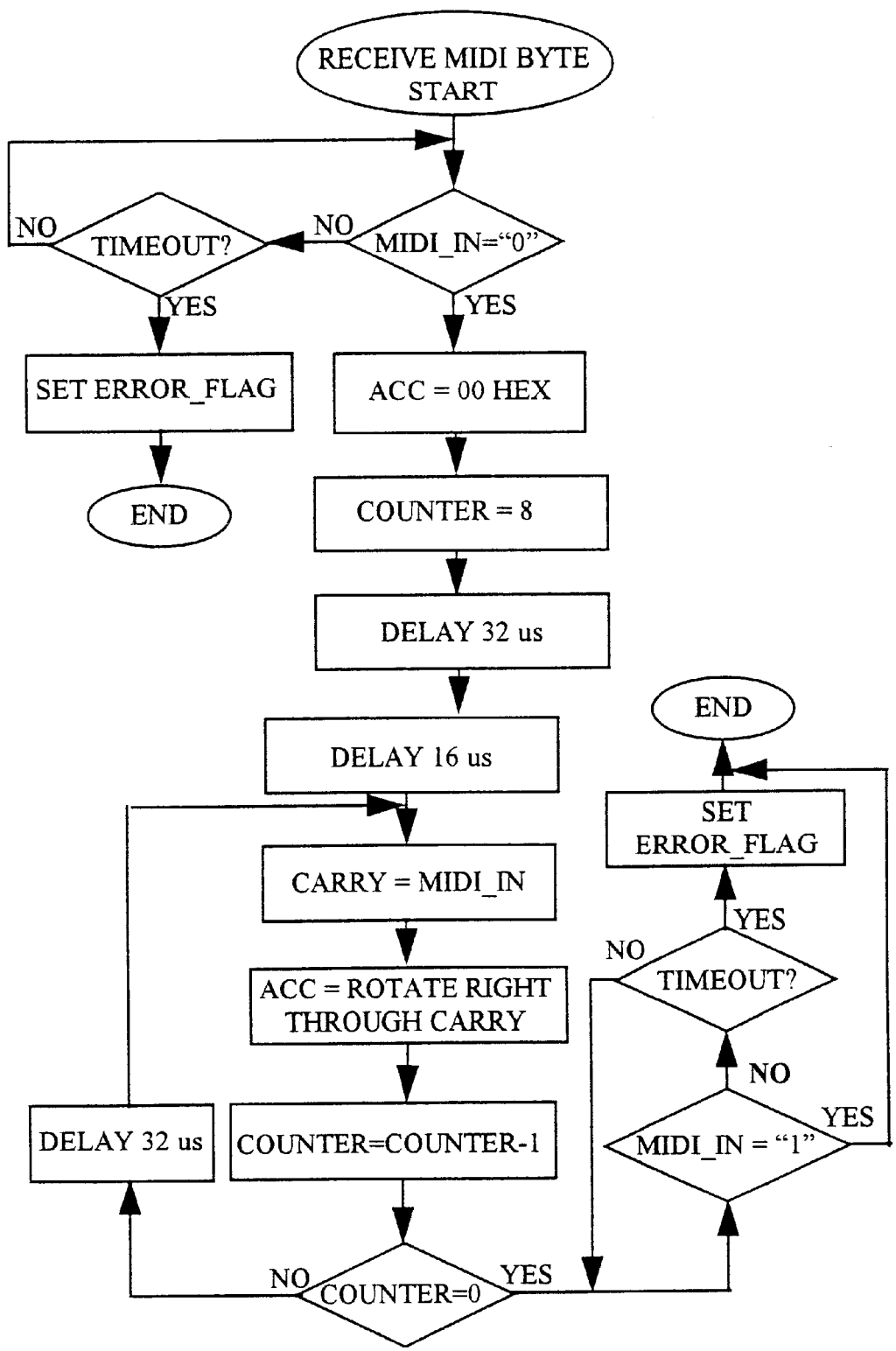
Figure 9F:
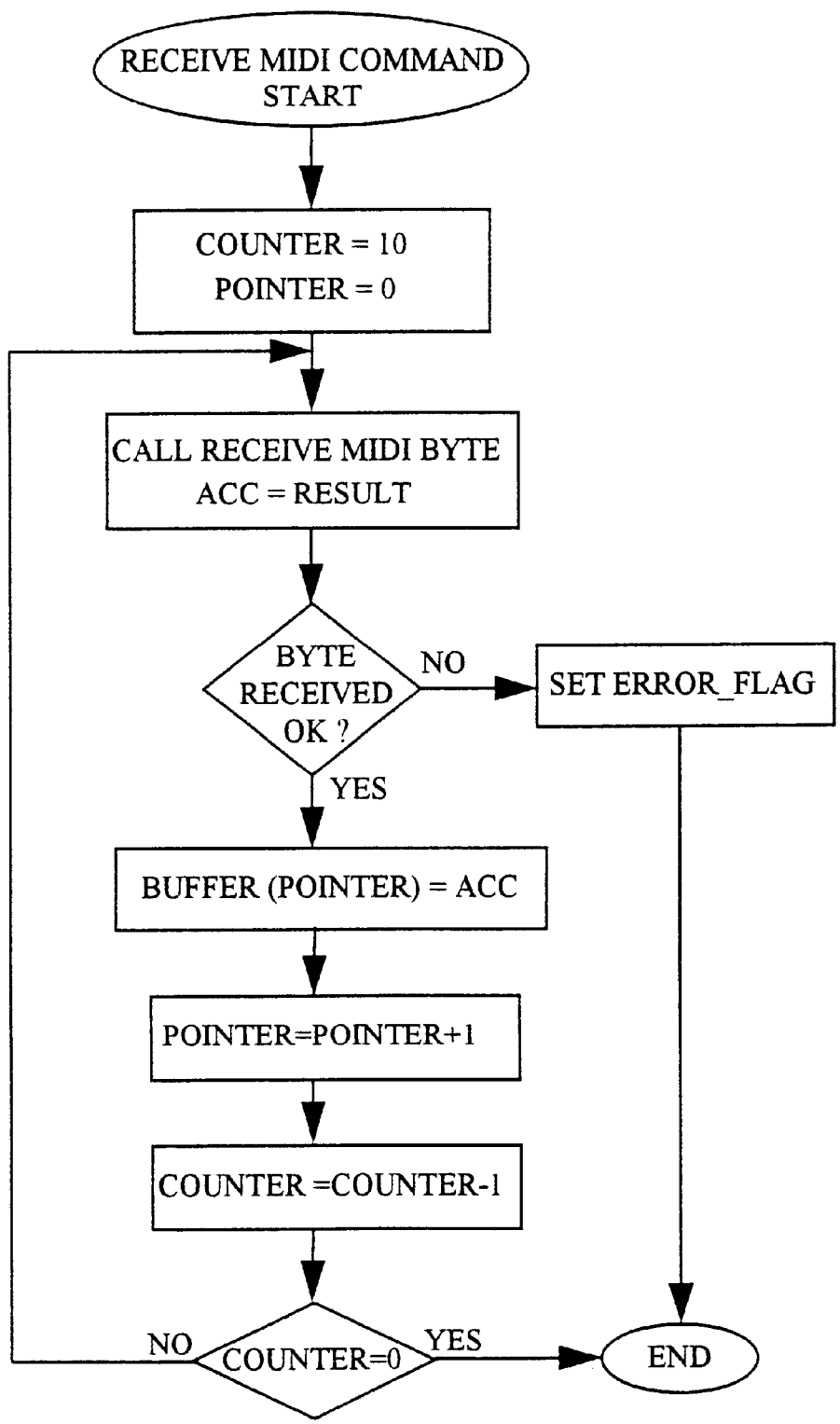
Figure 9G:
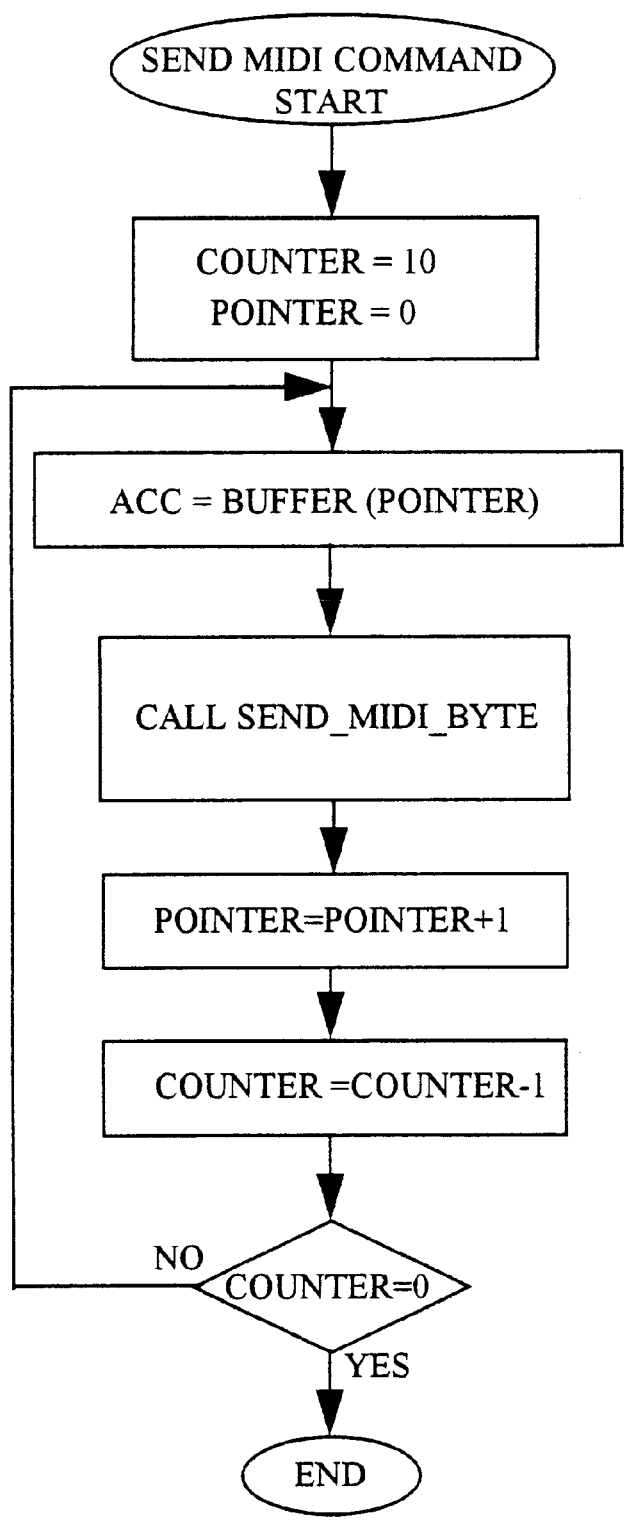
Figure 9H:
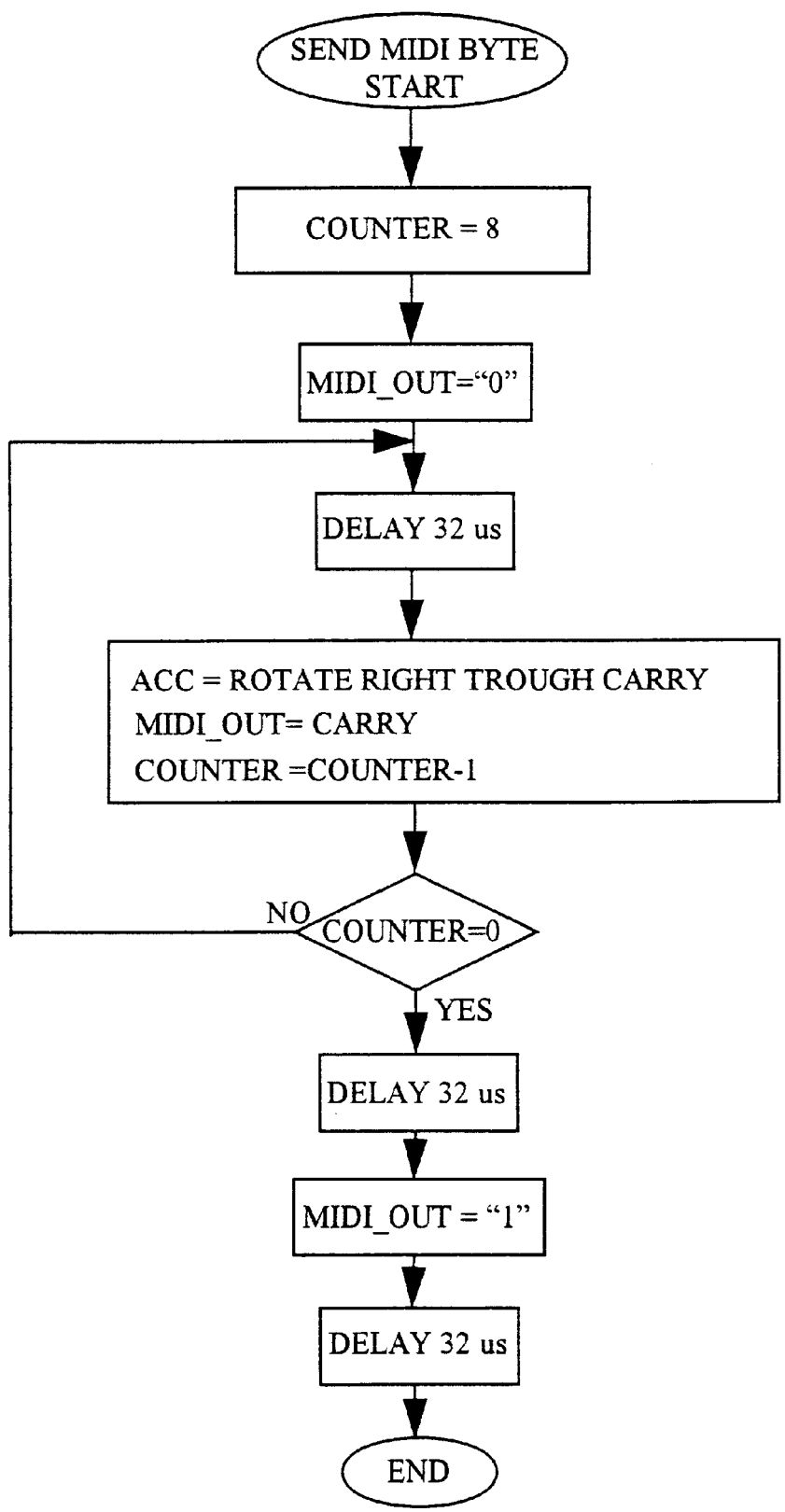
Figure 9I:
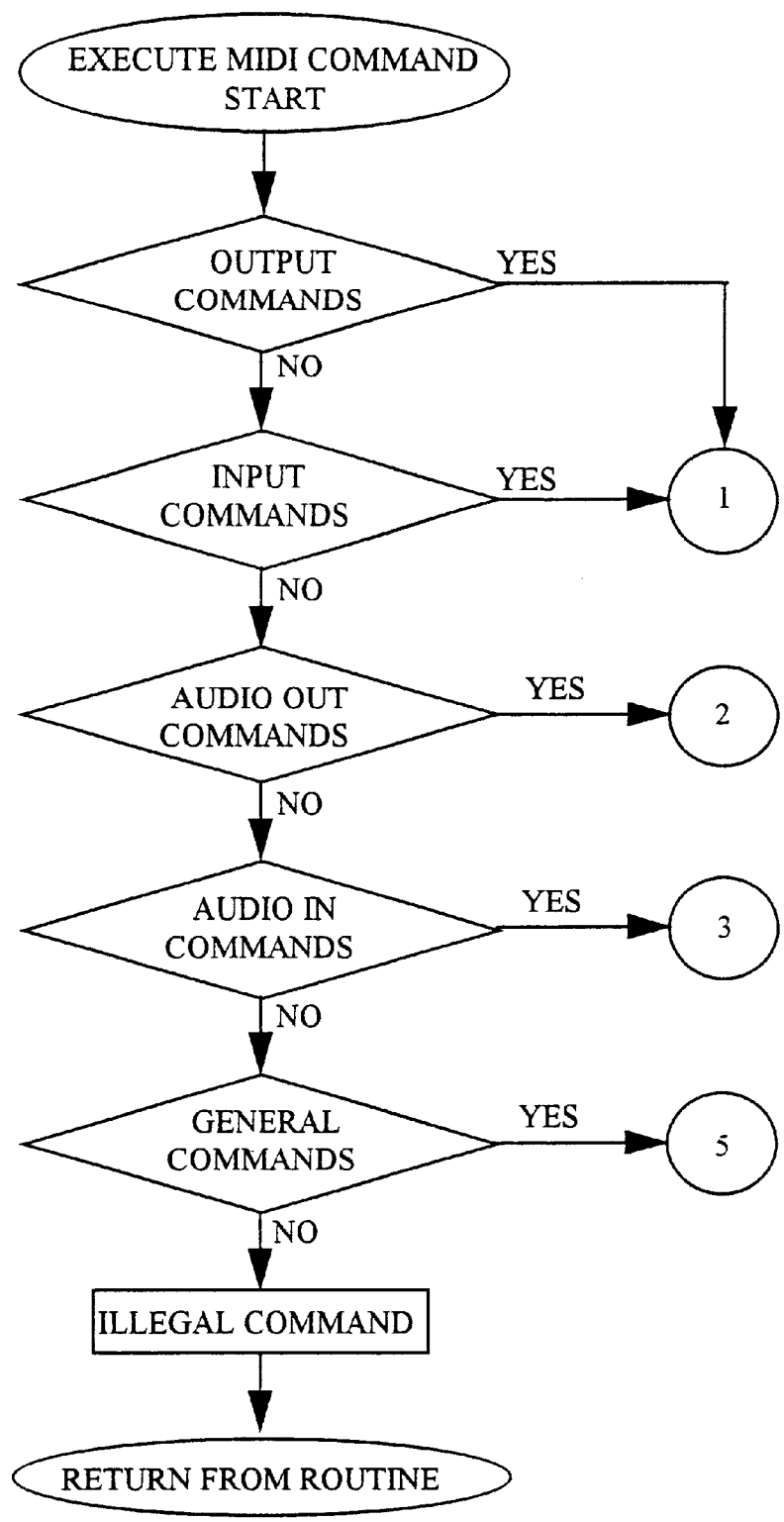
Figure 9J:
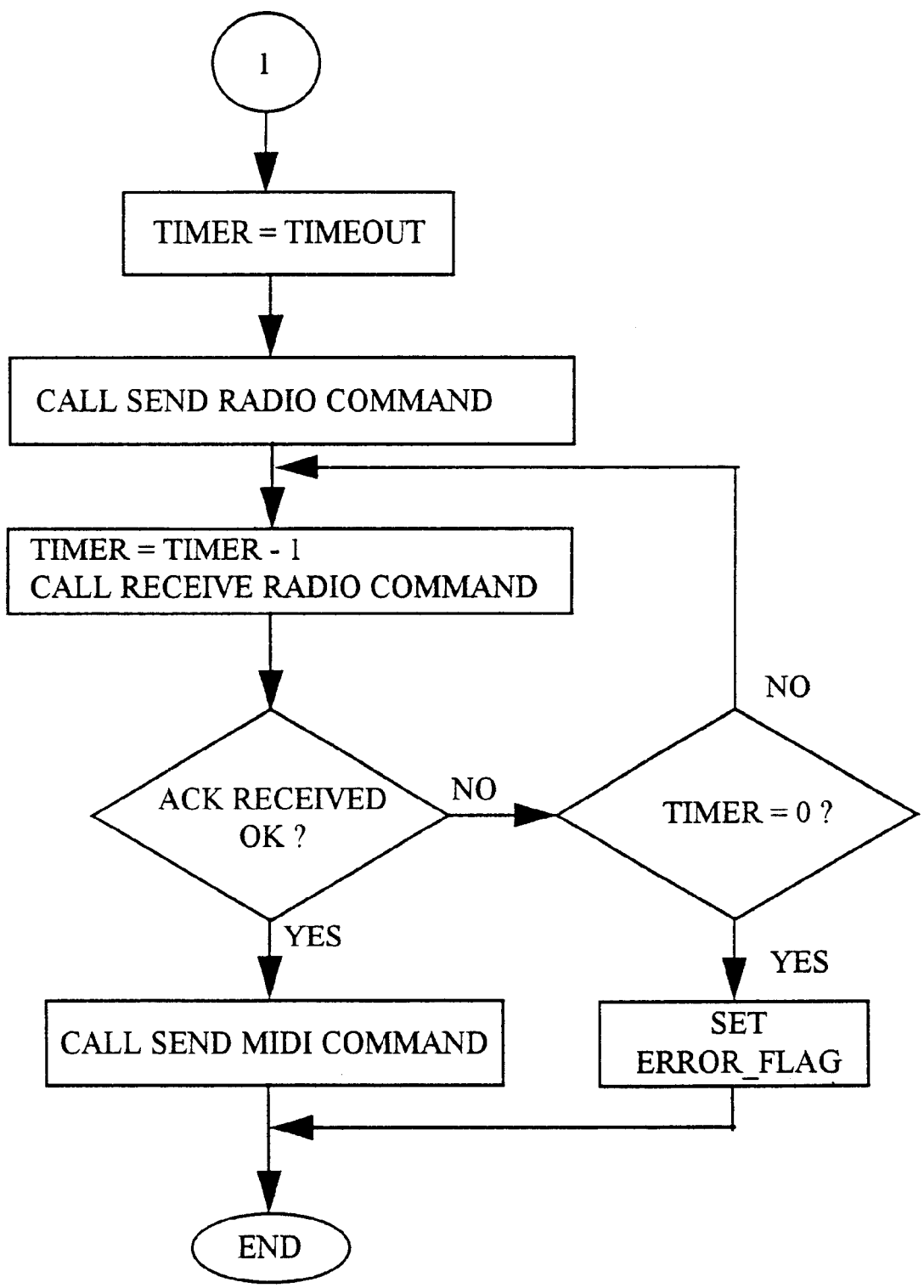
Figure 9K:
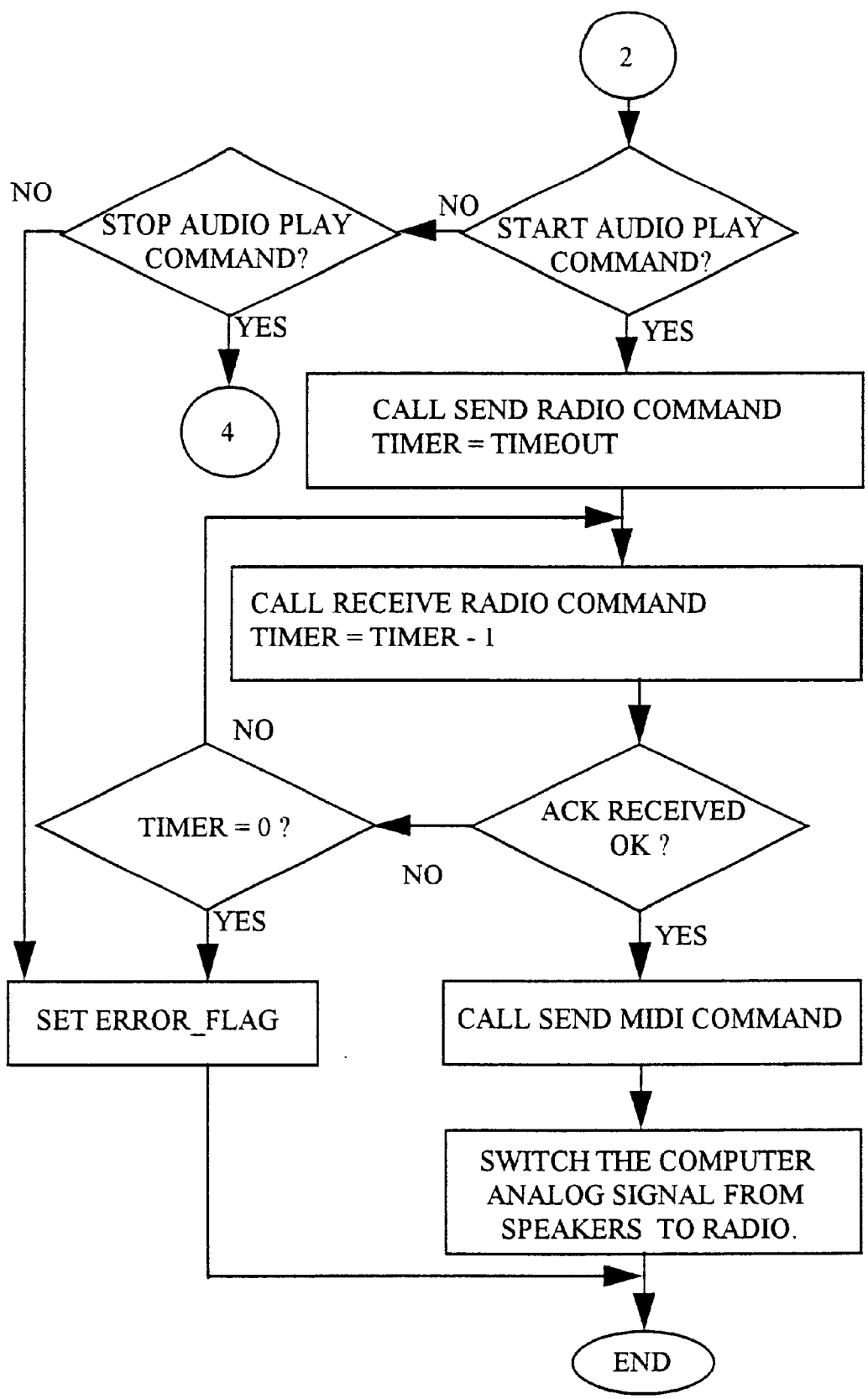
Figure 9L:
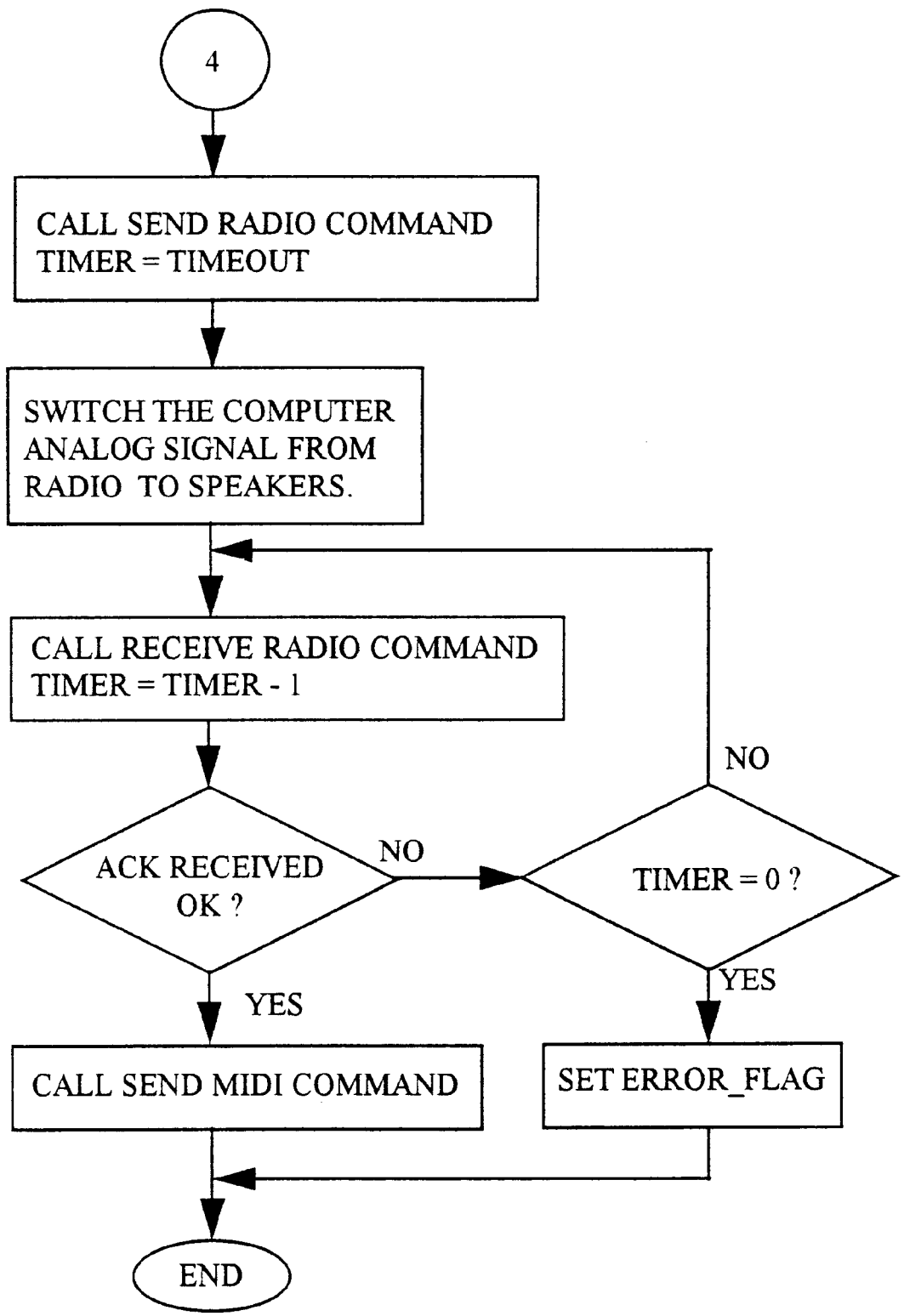
Figure 9M:
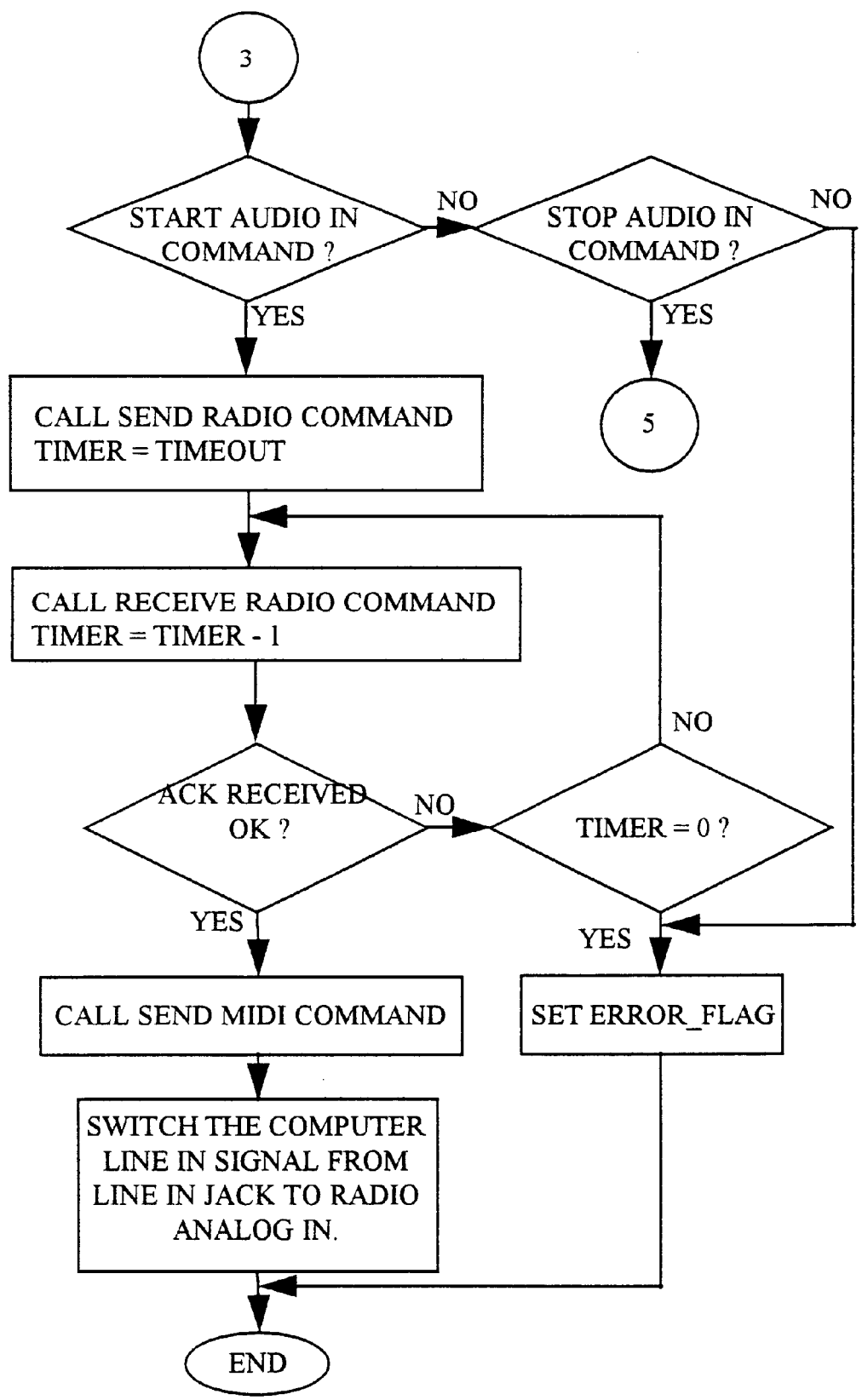
Figure 9N:
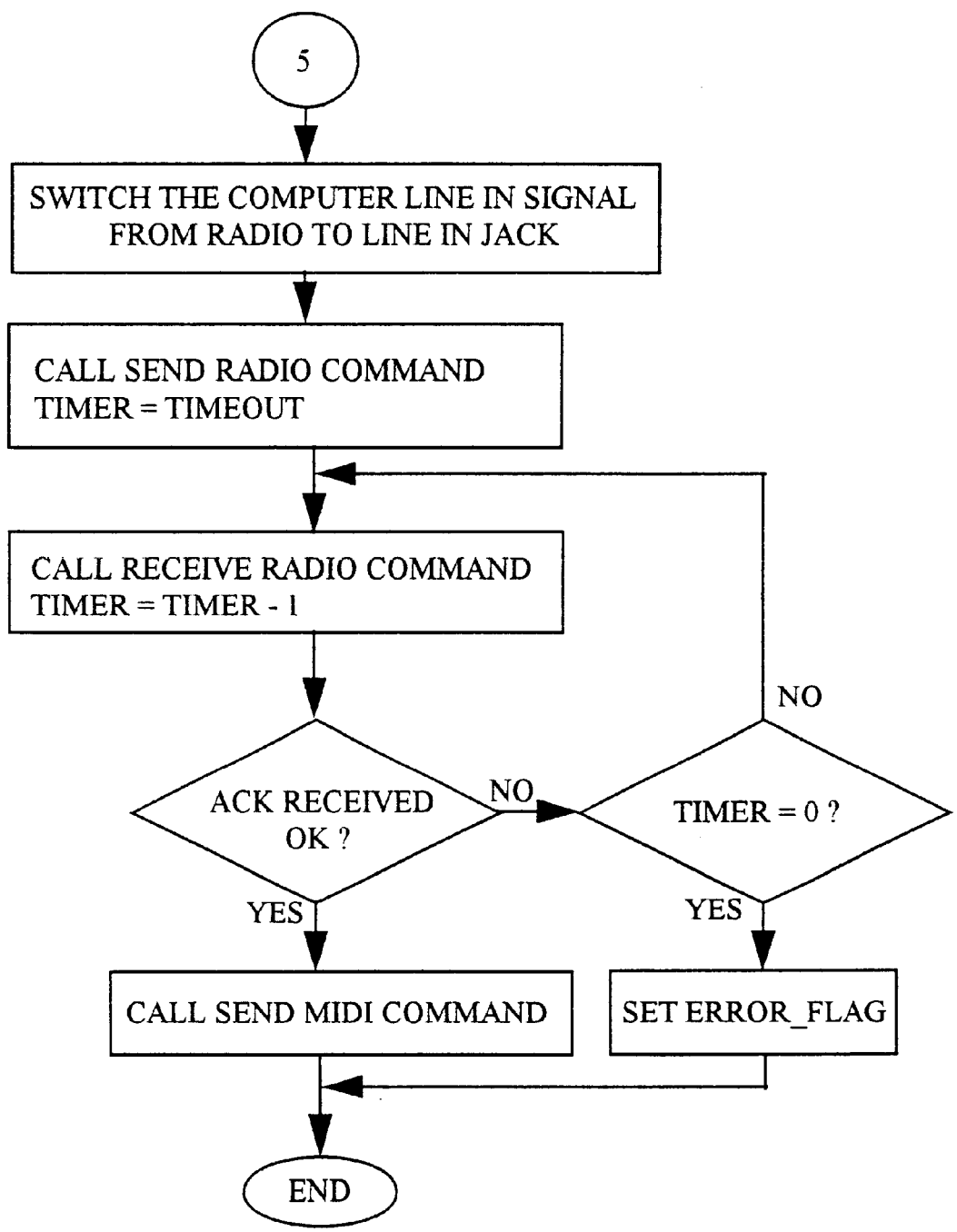

Attached herewith is a microfiche appendix labeled "1 of 2," "2 of 2," "1 of 4," "2 of 4," "3 of 4," and "4 of 4" and comprising appendices A–W wherein:

Appendix A is a computer listing of a preferred software implementation of the method of FIGS. 9A–9N, together with the method of FIGS. 8D–8M;

Appendix B is a computer listing of a preferred software implementation of the method of FIGS. 8A–8T;

Appendix C is a computer listing of a preferred software implementation of an example of a computer game for use in the computer 100 of FIG. 1;

Appendix D is a computer listing of a preferred software implementation of the method of FIG. 11 and FIGS. 12A–12C;

Appendices E–H, taken together, are computer listings from which a first, DLL-compatible, functions library may be constructed;

Appendices I–O, taken together, are computer listings of a second functions library which may be used to generate a variety of games for any of the computer control systems shown and described herein; and Appendices P–W, taken together, are computer listings of another preferred software implementation, alternative to the implementation of Appendices A–O.

DETAILED DESCRIPTION OF PREFERRED EMBODIMENTS

Reference is now made to FIG. 1A which is a partly pictorial, partly block diagram illustration of a computer control system including a toy, constructed and operative in accordance with a preferred embodiment of the present invention. The system of FIG. 1A comprises a computer 100, which may be any suitable computer such as, for example, an IBM-compatible personal computer. The computer 100 is equipped with a screen 105. The computer 100 is preferably equipped with a sound card such as, for example, a Sound Blaster Pro card commercially available from Creative Labs, Inc., 1901 McCarthy Boulevard, Milpitas Calif. 95035 or from Creative Technology Ltd., 67 Ayer Rajah Crescent #03–18, Singapore, 0513; a hard disk; and, optionally, a CD-ROM drive.

The computer 100 is equipped with a computer radio interface 110 operative to transmit signals via wireless transmission based on commands received from the computer 100 and, in a preferred embodiment of the present invention, also to receive signals transmitted elsewhere via wireless transmission and to deliver the signals to the computer 100. Typically, commands transmitted from the computer 100 to the computer radio interface 110 are transmitted via both analog signals and digital signals, with the digital signals typically being transmitted by way of a MIDI port. Transmission of the analog and digital signals is described below with reference to FIG. 3.

The transmitted signal may be an analog signal or a digital signal. The received signal may also be an analog signal or a digital signal. Each signal typically comprises a message. A preferred implementation of the computer radio interface 110 is described below with reference to FIG. 3.

The system of FIG. 1A also comprises one or more toys 120. The system of FIG. 1A comprises a plurality of toys, namely three toys 122, 124, and 126 but it is appreciated that, alternatively, either one toy only or a large plurality of toys may be used.

Figure 1B:
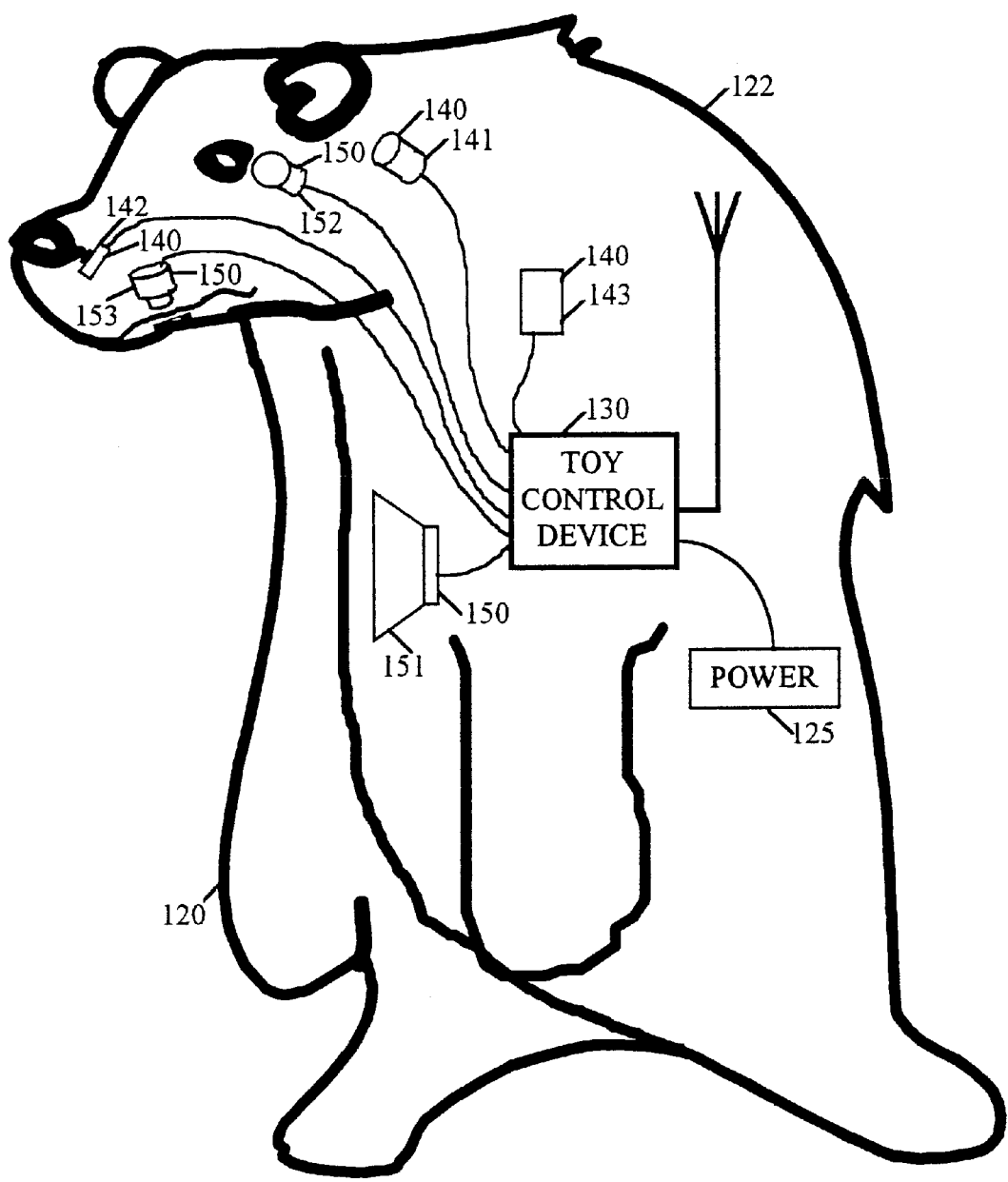
FIG. 1B is a partly pictorial, partly block diagram illustration a preferred implementation of the toy 122 of FIG. 1A.

Reference is now additionally made to FIG. 1B, which is a partly pictorial, partly block diagram illustration of the toy 122 of FIG. 1A.

Each toy 120 comprises a power source 125, such as a battery or a connection to line power. Each toy 120 also comprises a toy control device 130, operative to receive a wireless signal transmitted by the computer 100 and to cause each toy 120 to perform an action based on the received signal. The received signal may be, as explained above, an analog signal or a digital signal. A preferred implementation of the toy control device 130 is described below with reference to FIG. 6.

Each toy 120 preferably comprises a plurality of input devices 140 and output devices 150, as seen in FIG. 1B. The input devices 140 may comprise, for example on or more of the following: a microphone 141; a microswitch sensor 142; a touch sensor (not shown in FIG. 1B); a light sensor (not shown in FIG. 1B); a movement sensor 143, which may be, for example, a tilt sensor or an acceleration sensor. Appropriate commercially available input devices include the following: position sensors available from Hamlin Inc., 612 East Lake Street, Lake Mills, Wis. 53551, USA; motion and vibration sensors available from Comus International, 263 Hillside Avenue, Nutley, N.J. 07110, USA; temperature, shock, and magnetic sensors available from Murata Electronics Ltd., Hampshire, England; and switches available from C & K Components Inc., 15 Riverdale Avenue, Newton, Mass. 02058-1082, USA or from Micro Switch Inc., a division of Honeywell, USA. The output devices 150 may comprise, for example, one or more of the following: a speaker 151; a light 152; a solenoid 153 which may be operative to move a portion of the toy; a motor, such as a stepping motor, operative to move a portion of the toy or all of the toy (not shown in FIG. 1B). Appropriate commercially available output devices include the following: DC motors available from Alkatel (dunkermotoren), Postfach 1240, D-7823, Bonndorf/Schwarzald, Germany; stepping motors and miniature motors available from Haydon Switch and Instruments, Inc: (JISI), 1500 Meriden Road, Waterbury, Conn., USA; and DC solenoids available from Communications Instruments, Inc., P.O. Box 520, Fairview, N.C. 28730, USA.

Examples of actions which the toy may perform include the following: move a portion of the toy; move the entire toy; or produce a sound, which may comprise one or more of the following: a recorded sound, a synthesized sound, music including recorded music or synthesized music, speech including recorded speech or synthesized speech.

The received signal may comprise a condition governing the action as, for example, the duration of the action, or the number of repetitions of the action.

Typically, the portion of the received signal comprising a message comprising a command to perform a specific action as, for example, to produce a sound with a given duration, comprises a digital signal. The portion of the received signal comprising a sound, for example, typically comprises an analog signal. Alternatively, in a preferred embodiment of the present invention, the portion of the received signal comprising a sound, including music, may comprise a digital signal, typically a signal comprising MIDI data.

The action the toy may perform also includes reacting to signals transmitted by another toy, such as, for example, playing sound that the other toy is monitoring and transmitting.

In a preferred embodiment of the present invention, the toy control device 130 is also operative to transmit a signal intended for the computer 100, to be received by the computer radio interface 110. In this embodiment, the computer radio interface 110 is preferably also operative to poll the toy control device 130, that is, transmit a signal comprising a request that the toy control device 130 transmit a signal to the computer radio interface 110. It is appreciated that polling is particularly preferred in the case where there are a plurality of toys having a plurality of toy control devices 130.

The signal transmitted by the toy control device 130 may comprise one or more of the following: sound, typically sound captured by a microphone input device 141; status of sensor input devices 140 as, for example, light sensors or micro switch; an indication of low power in the power source 125; or information identifying the toy.

It is appreciated that a sound signal transmitted by the device 130 may also include speech. The computer system is operative to perform a speech recognition operation on the speech signals.

Appropriate commercially available software for speech recognition is available from companies such as: Stylus Innovation Inc., One Kendall Square, Building 300, Cambridge, Mass. 02139, USA; A&G Graphics Interface, USA, Telephone No. (617) 492-0120, Telefax No. (617) 427-3625; "Dragon Dictate For Windows", available from Dragon Systems Inc., 320 Nevada Street, Mass. 02160, USA, and "SDK" available from Lernout & Hauspie Speech Products, Sint-Krispijnstraat 7, 8900 Leper, Belgium.

The signal from the radio control interface 110 may also comprise, for example, one or more of the following: a request to ignore input from one or more input devices 140; a request to activate one or more input devices 140 or to stop ignoring input from one or more input devices 140; a request to report the status of one or more input devices 140; a request to store data received from one or more input devices 140, typically by latching a transition in the state of one or more input devices 140, until a future time when another signal from the radio control interface 110 requests the toy control device 130 to transmit a signal comprising the stored data received from the one or more input devices 140; or a request to transmit analog data, typically comprising sound, typically for a specified period of time.

Typically, all signals transmitted in both directions between the computer radio interface 110 and the toy control device 130 include information identifying the toy.

Figure 1C:
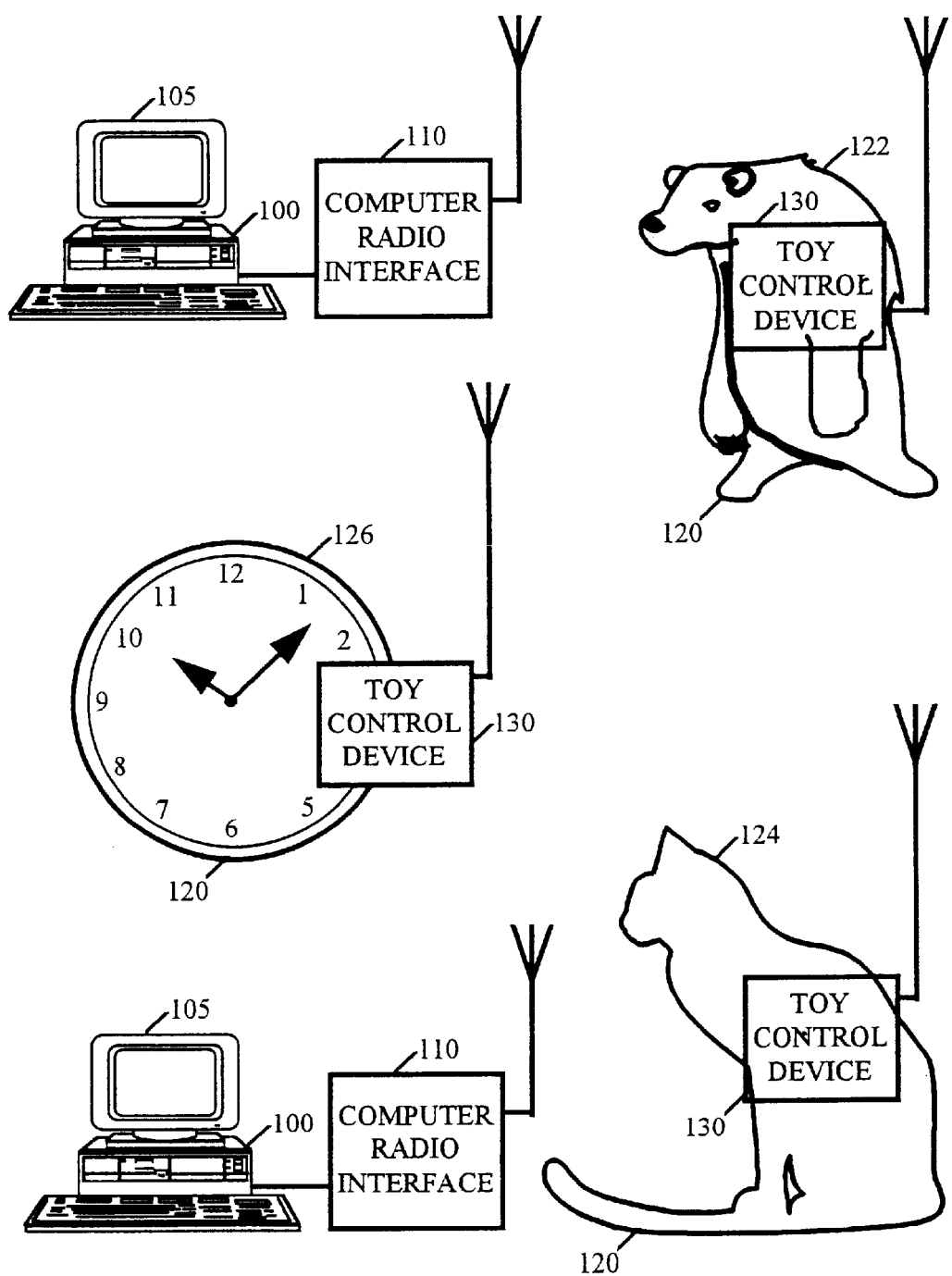
FIG. 1C is a partly pictorial, partly block diagram illustration of a computer control system including a toy, constructed and operative in accordance with an alternative preferred embodiment of the present invention.

Reference is now made to FIG. 1C, which is a partly pictorial, partly block diagram illustration of a computer control system including a toy, constructed and operative in accordance with an alternative preferred embodiment of the present invention. The system of FIG. 1C comprises two computers 100. It is appreciated that, in general, a plurality of computers 100 may be used. In the implementation of FIG. 1C, all signals transmitted in both directions between the computer radio interface 110 and the toy control device 130 typically include information identifying the computer.

The operation of the system of FIG. 1A is now briefly described. Typically, the computer 100 runs software comprising a computer game, typically a game including at least one animated character. Alternatively, the software may comprise educational software or any other interactive software including at least one animated object. As used herein, the term "animated object" includes any object which may be depicted on the computer screen 105 and which interacts with the user of the computer via input to and output from the computer. An animated object may be any object depicted on the screen such as, for example: a doll; an action figure; a toy, such as, for example, an activity toy, a vehicle, or a ride-on vehicle; a drawing board or sketch board; or a household object such as, for example, a clock, a lamp, a chamber pot, or an item of furniture.

Figure 2A:
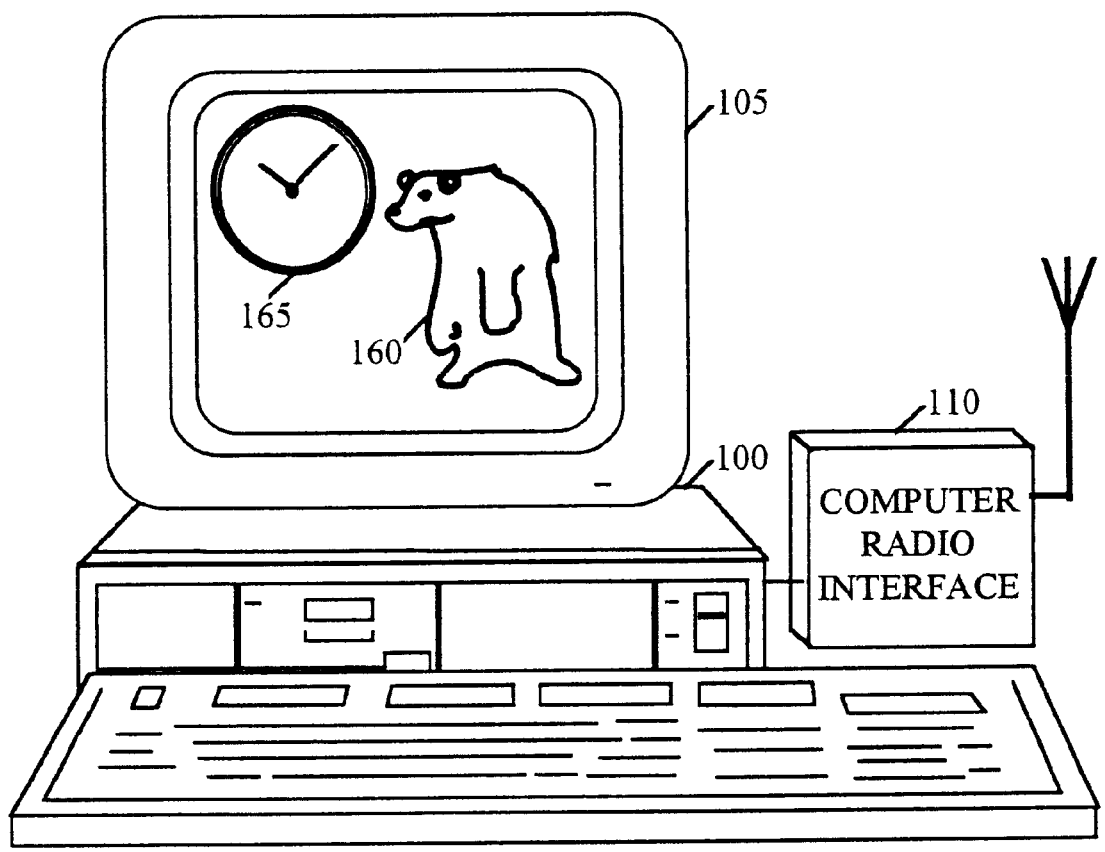

Reference is now additionally made to FIGS. 2A–2C, which depict a portion of the system of FIG. 1A in use. The apparatus of FIG. 2A comprises the computer screen 105 of FIG. 1A. On the computer screen are depicted animated objects 160 and 165.

FIG. 2B depicts the situation after the toy 122 has been brought into range of the computer radio interface 110 of FIG. 1A, typically into the same room therewith. Preferably, the toy 122 corresponds to the animated object 160. For example, in FIG. 2B the toy 122 and the animated object 160, shown in FIG. 2A, are both a teddy bear. The apparatus of FIG. 2B comprises the computer screen 105, on which is depicted the animated object 165. The apparatus of FIG. 2B also comprises the toy 122. The computer 100, having received a message via the computer radio interface 110, from the toy 122, no longer displays the animated object 160 corresponding to the toy 122. The functions of the animated object 160 are now performed through the toy 122, under control of the computer 100 through the computer radio interface 110 and the toy control device 130.

FIG. 2C depicts the situation after the toy 126 has also been brought into range of the computer radio interface 110 of FIG. 1A, typically into the same, room therewith. Preferably, the toy 126 corresponds to the animated object 165. For example, in FIG. 2C the toy 126 and the animated object 165, shown in FIGS. 2A and 2B, are both a clock. The apparatus of FIG. 2C comprises the computer screen 105, on which no animated objects are depicted.

The apparatus of FIG. 2C also comprises the toy 126. The computer 100, having received a message via the computer radio interface 110 from the toy 126, no longer displays the animated object 165 corresponding to the toy 126. The functions of the animated object 165 are now performed through the toy 126, under control of the computer 100 through the computer radio interface 110 and the toy control device 130.

In FIG. 2A, the user interacts with the animated objects 160 and 165 on the computer screen, typically using conventional methods. In FIG. 2B the user also interacts with the toy 122, and in FIG. 2C typically with the toys 122 and 126, instead of interacting with the animated objects 160 and 165 respectively. It is appreciated that the user may interact with the toys 122 and 126 by moving the toys or parts of the toys; by speaking to the toys; by responding to movement of the toys which movement occurs in response to a signal received from the computer 100; by responding to a sound produced by the toys, which sound is produced in response to a signal received from the computer 100 and which may comprise music, speech, or another sound; or otherwise.

Figure 3:
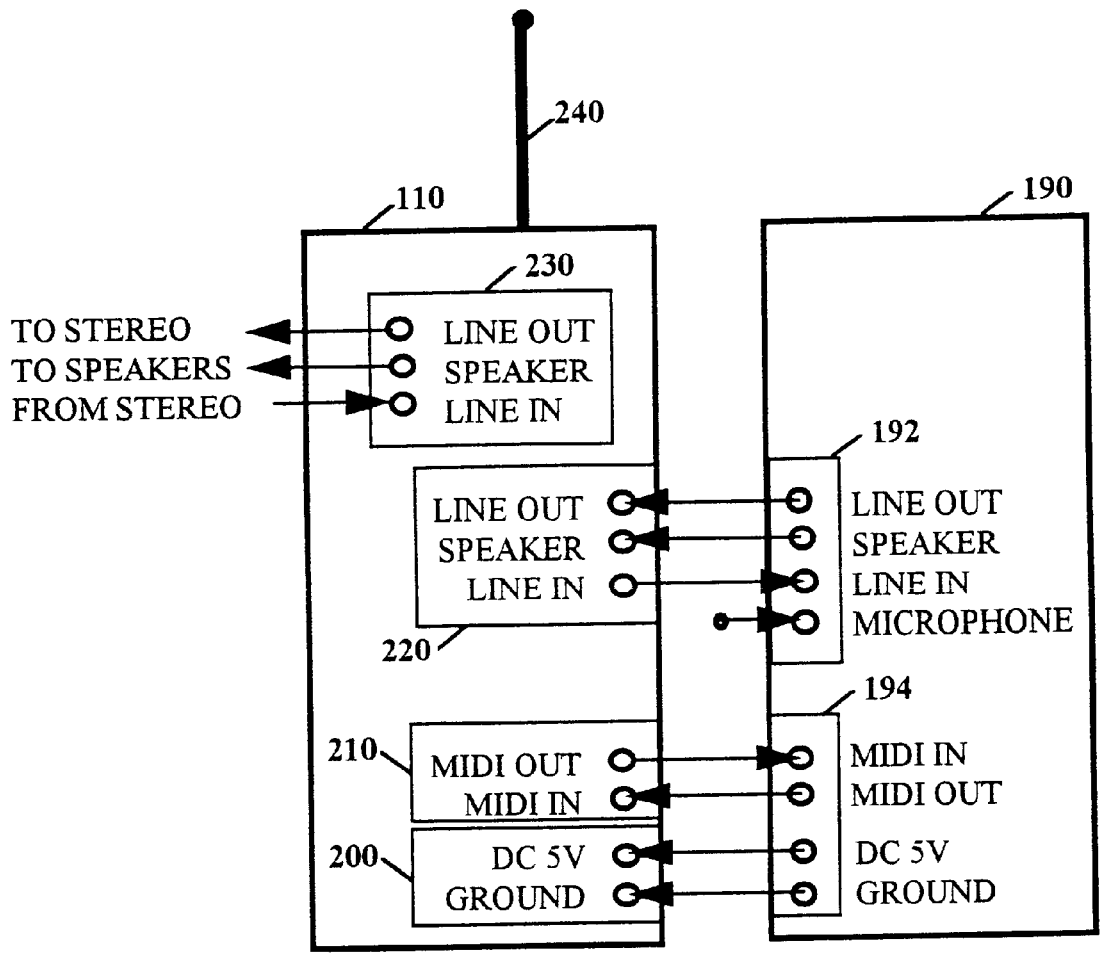

Reference is now made to FIG. 3 which is a simplified block diagram of a preferred embodiment of the computer radio interface 110 of FIG. 1A. The apparatus of FIG. 3 comprises the computer radio interface 110. The apparatus of FIG. 3 also comprises a sound card 190, as described above with reference to FIG. 1A. In FIG. 3, the connections between the computer radio interface 110 and the sound card 190 are shown.

The computer radio interface 110 comprises a DC unit 200 which is fed with power through a MIDI interface 210 from a sound card MIDI interface 194, and the following interfaces: a MIDI interface 210 which connects to the sound card MIDI interface 194; an audio interface 220 which connects to an audio interface 192 of the sound card 190; and a secondary audio interface 230 which preferably connects to a stereo sound system for producing high quality sound under control of software running on the computer 100 (not shown).

The apparatus of FIG. 3 also comprises an antenna 240, which is operative to send and receive signals between the computer radio interface 110 and one or more toy control devices 130.

Figure 4:
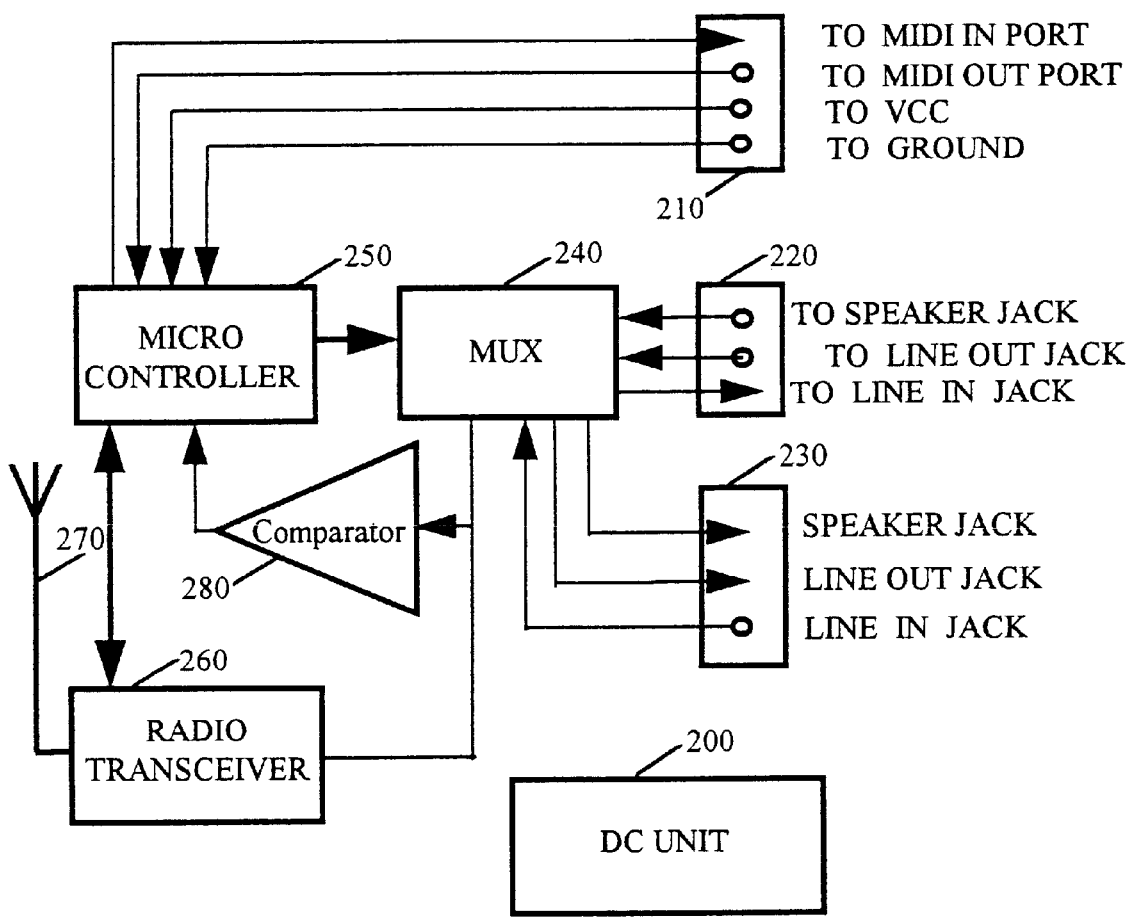

FIG. 4 is a more detailed block diagram of the computer radio interface 110 of FIG. 3. The apparatus of FIG. 4 comprises the DC unit 200, the MIDI interface 210, the audio interface 220, and the secondary audio interface 230. The apparatus of FIG. 4 also comprises a multiplexer 240, a micro controller 250, a radio transceiver 260, a connection unit 270 connecting the radio transceiver 260 to the micro controller 250, and a comparator 280.

Reference is now made to FIGS. 5A–5D, which taken together comprise a schematic diagram of the apparatus of FIG. 4.

Figure 5A:
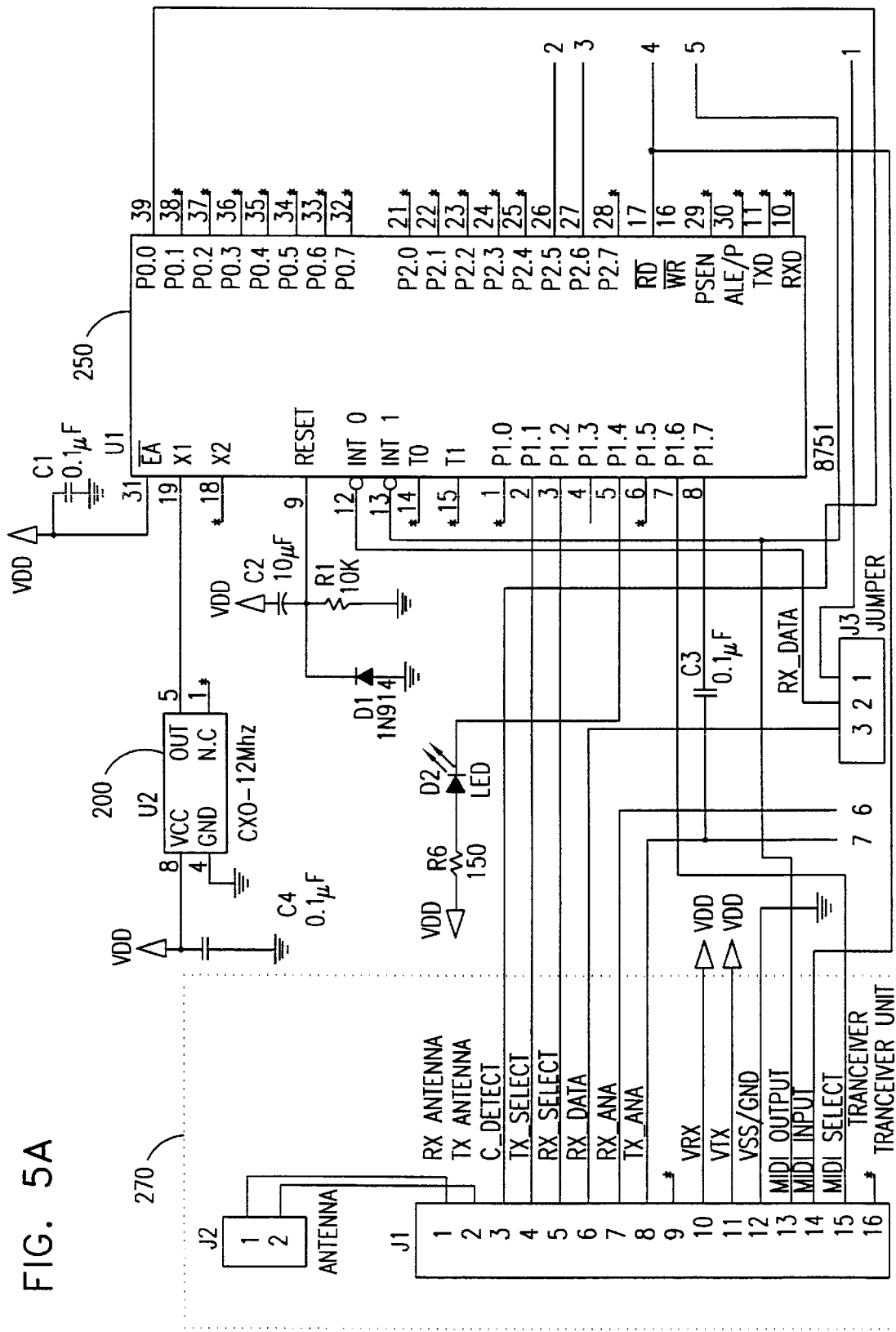
FIGS. 5A–5D taken together comprise a schematic diagram of the apparatus of FIG. 4.
Figure 5B:
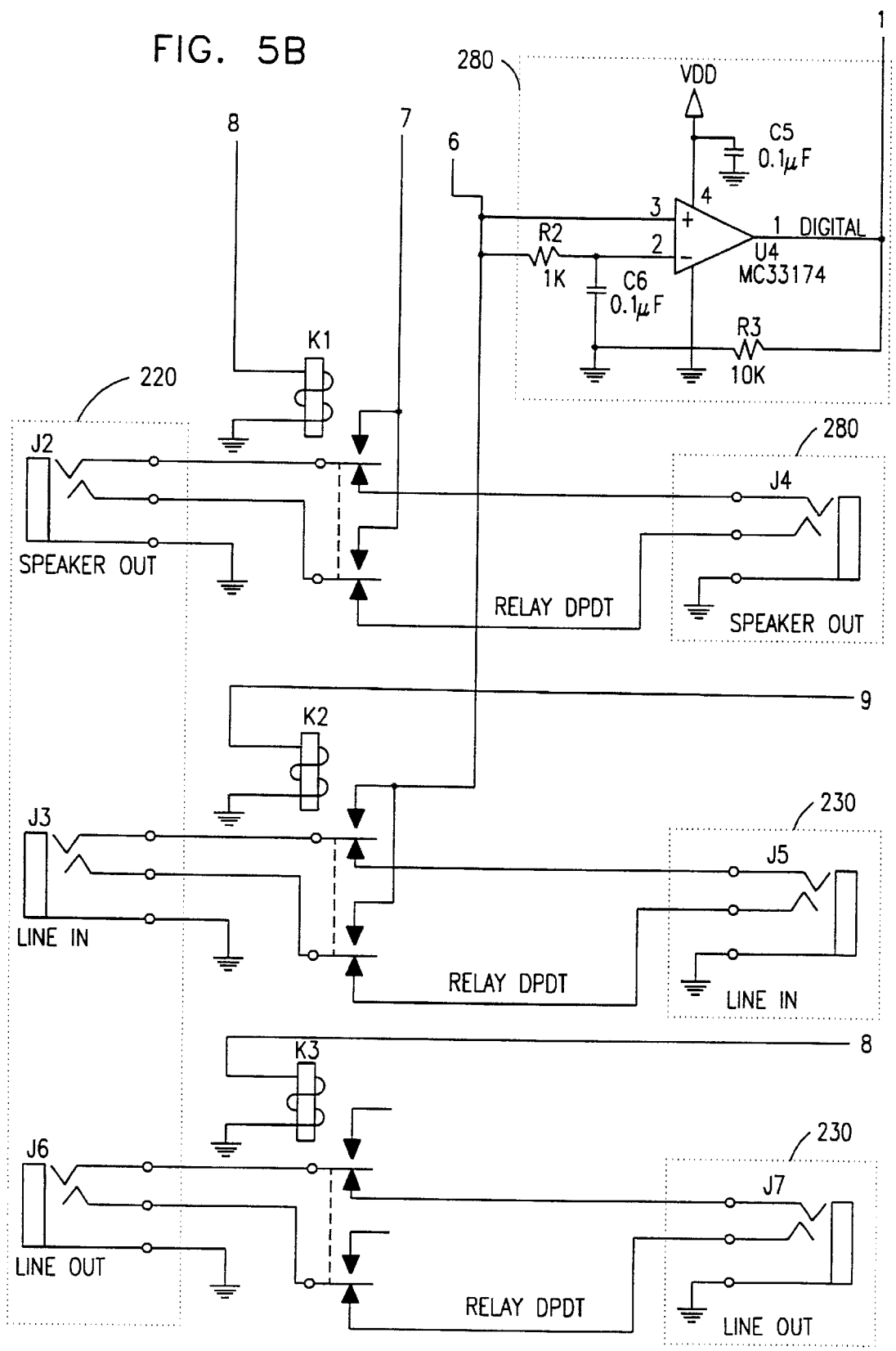
Figure 5C:
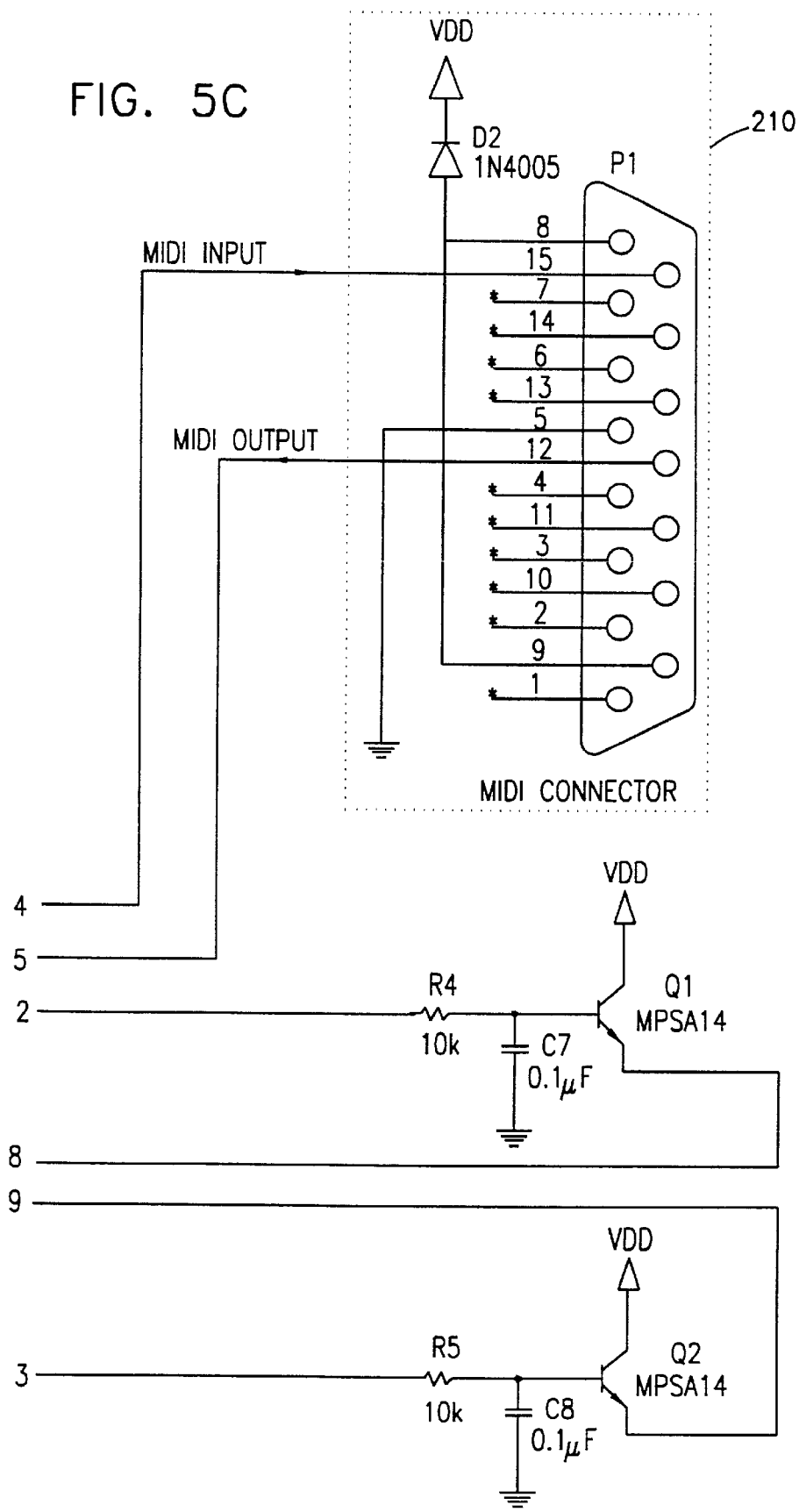

The following is a preferred parts list for the apparatus of FIGS. 5A–5C:

1. K1 Relay Dept, Idec, 1213 Elco Drive, Sunnyvale, Calif 94089-2211, USA.
2. U1 8751 microcontroller, Intel Corporation, San Tomas 4, 2700 San Tomas Expressway, 2nd Floor, Santa Clara, Calif. 95051, USA.
3. U2 CXO - 12MHZ (crystal oscillator),Raltron, 2315 N.W. 107th Avenue, Miami, Fla. 33172, USA.
4. U4 MC33174, Motorola, Phoenix, Ariz., USA., Tel. No. (602) 897-5056.
5. Diodes IN914, Motorola, Phoenix, Ariz., USA. Tel. No. (602)897-5056.
6. Transistors 2N2222 and MPSA14, Motorola, Phoenix, Ariz., USA. Tel. No.(602)897-5056.

Figure 5D:
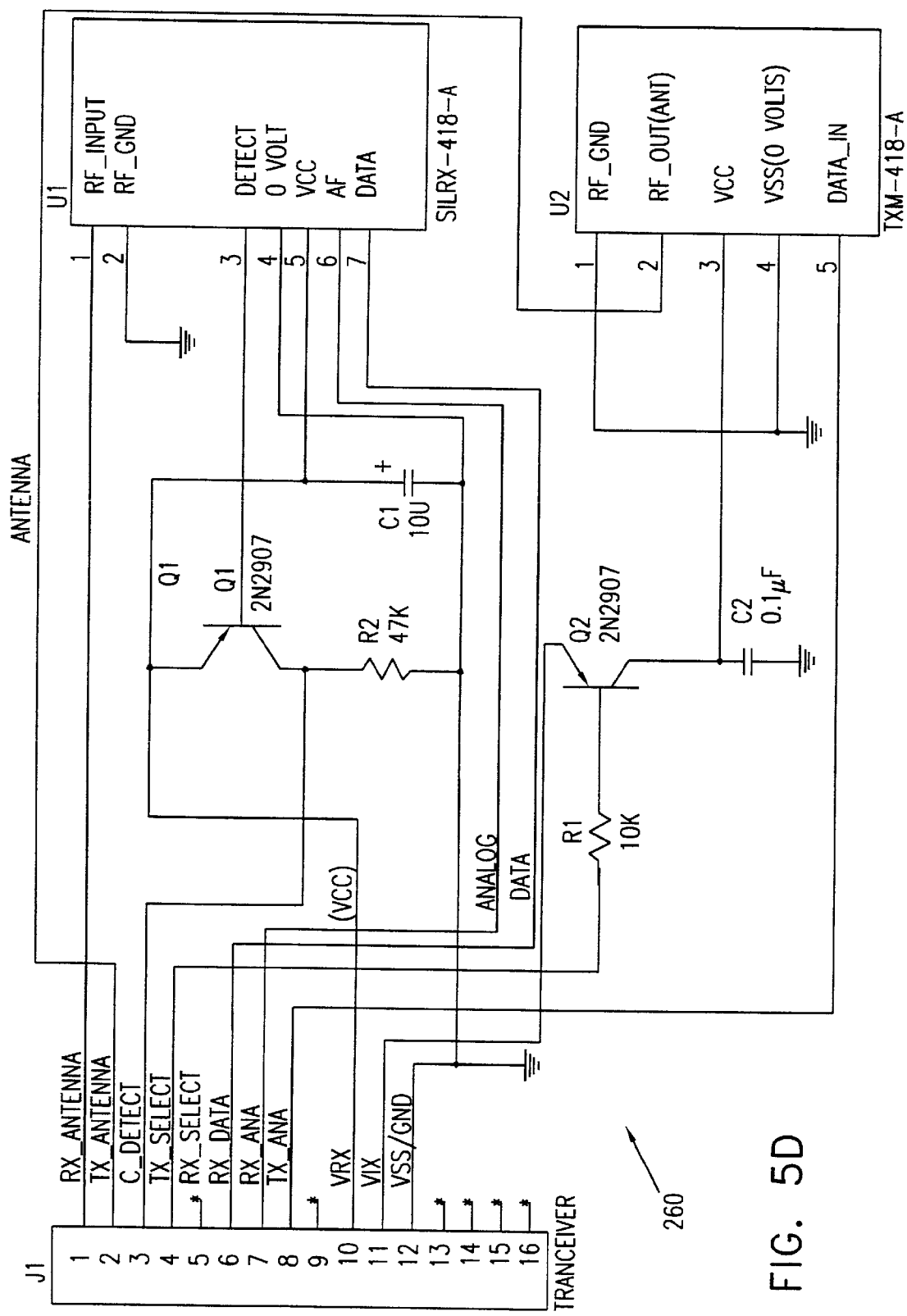

The following is a Preferred parts list for the apparatus of FIG. 5D:

1. U1 SILRAX-418-A UHF radio telemetry receive module, Ginsburg Electronic GmbH, Am Moosfeld 85, D-81829, Munchen, Germany.

Alternatively, U1 of FIG. 5D may be replaced by:

U1 433.92 MHz Receive Module Part No. 0927, available from CEL SALES LTD., Cel House, Unit 2, Block 6, Shenstone Trading Estate, Bromsgrove, Halesowen, West Midlands B36 3XB, UTK.

2. U2 TXM-418-A low power UHF radio telemetry transmit module, Ginsburg Electronic GmbH, Am Moosfeld 85, D-1829, Munchen, Germany.

Alternatively, U2 mof FIG. 5D may be replaced by:

U2 433.92 SIL FM Transmitter Module Part No, 5229, available from CEL SALES LTD., Cel House, Unit 2, Block 6, Shenstone Trading Estate, Bromsgrove, Halesowen, West Midlands B36 3XB UK.

Figure 5E:
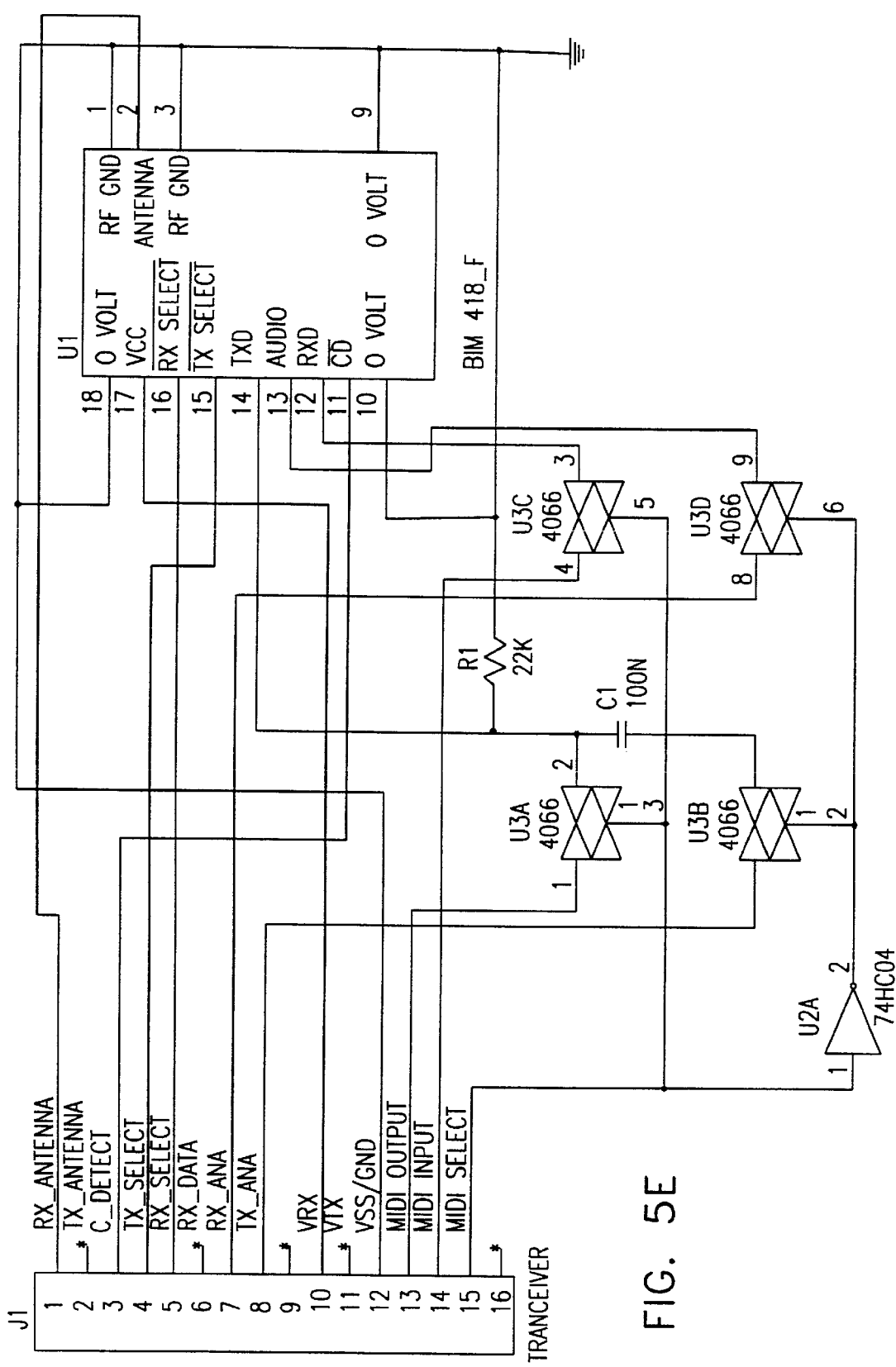
FIG. 5E is an schematic diagram of an alternative implementation of the apparatus of FIG. 5D.

Reference is now additionally made to FIG. 5E, which is a schematic diagram of an alternative implementation of the apparatus of FIG. 5D. The following is a preferred parts list for the apparatus of FIG. 5E:

1. U1 BIM-418-F low power UHBF data transceiver module, Ginsburg Electronic GmbH, Am Moosfeld 85, D-81829, Munchen, Germany.

Alternate 1. U1 S20043 spread spectrum full duplex transceiver, AMI Semiconductors—American Microsystems, Inc., Idaho, USA.

Alternate 1. U1 SDT-300 synthesized transceiver, Circuit Design, Inc., Japan.

Alternatively, U1 may be replaced by:

U1 RY3GB021 RF 900 Mhz units, available from SHARP ELECTRONIC COMPONENTS GROUP, 5700 Northwest, Pacific Rim Boulevard #20, Camas, Wash., USA.

U1 RY3GB100 RF Units For DECT, available from SHARP ELECTRONIC COMPONENTS GROUP 5700 Northwest, Pacific Rim Boulevard #20, Camas, Wash., USA.

In the parts list for FIG. 5E, one of item 1 or either of the alternate items 1 may be used for U1.

It is appreciated that the appropriate changes will have to be made to all the circuit boards for alternate embodiments of the apparatus.

The apparatus of FIG. 5E has similar functionality to the apparatus of FIG. 5D, but has higher bit rate transmission and reception capacity and is, for example, preferred when MIDI data is transmitted and received.

FIGS. 5A–5E are self-explanatory with regard to the above parts lists.

Figure 6:
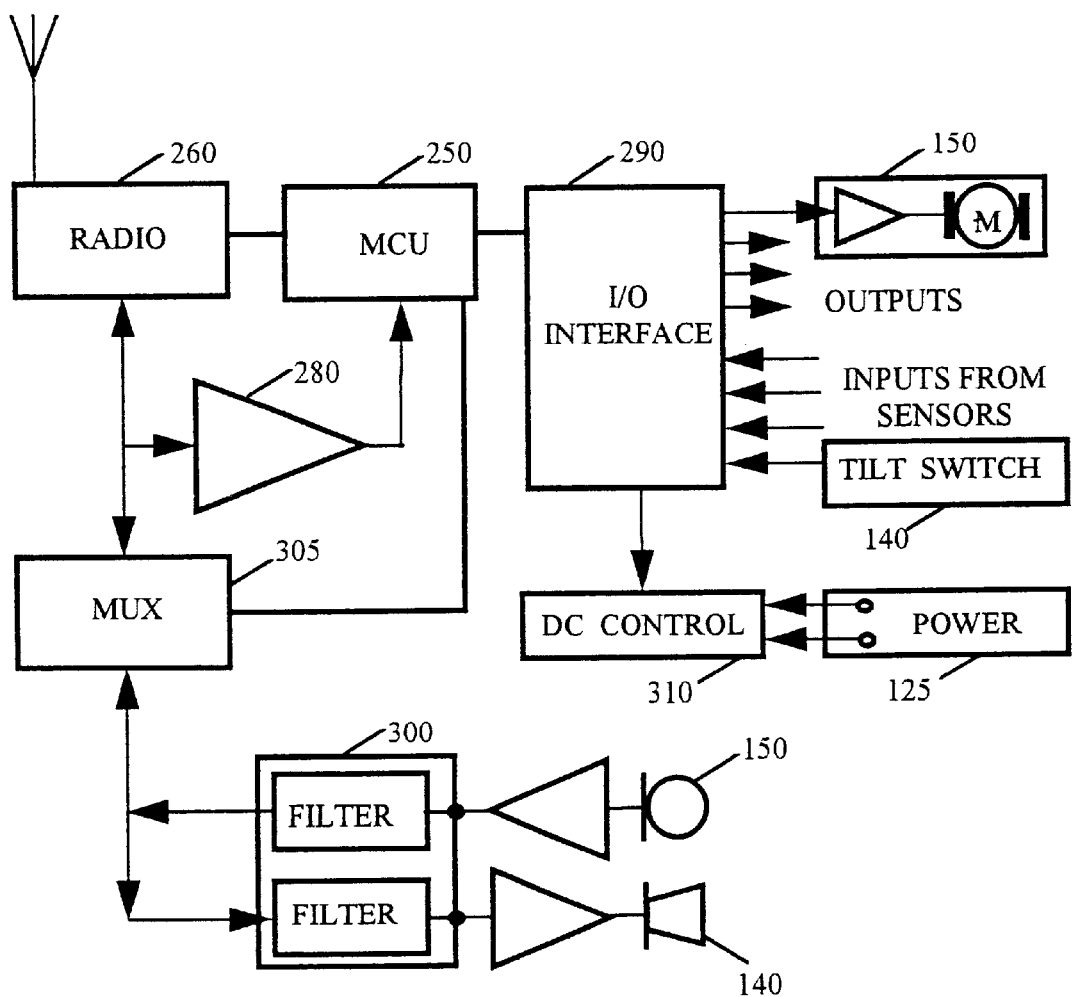
Figure 7A:
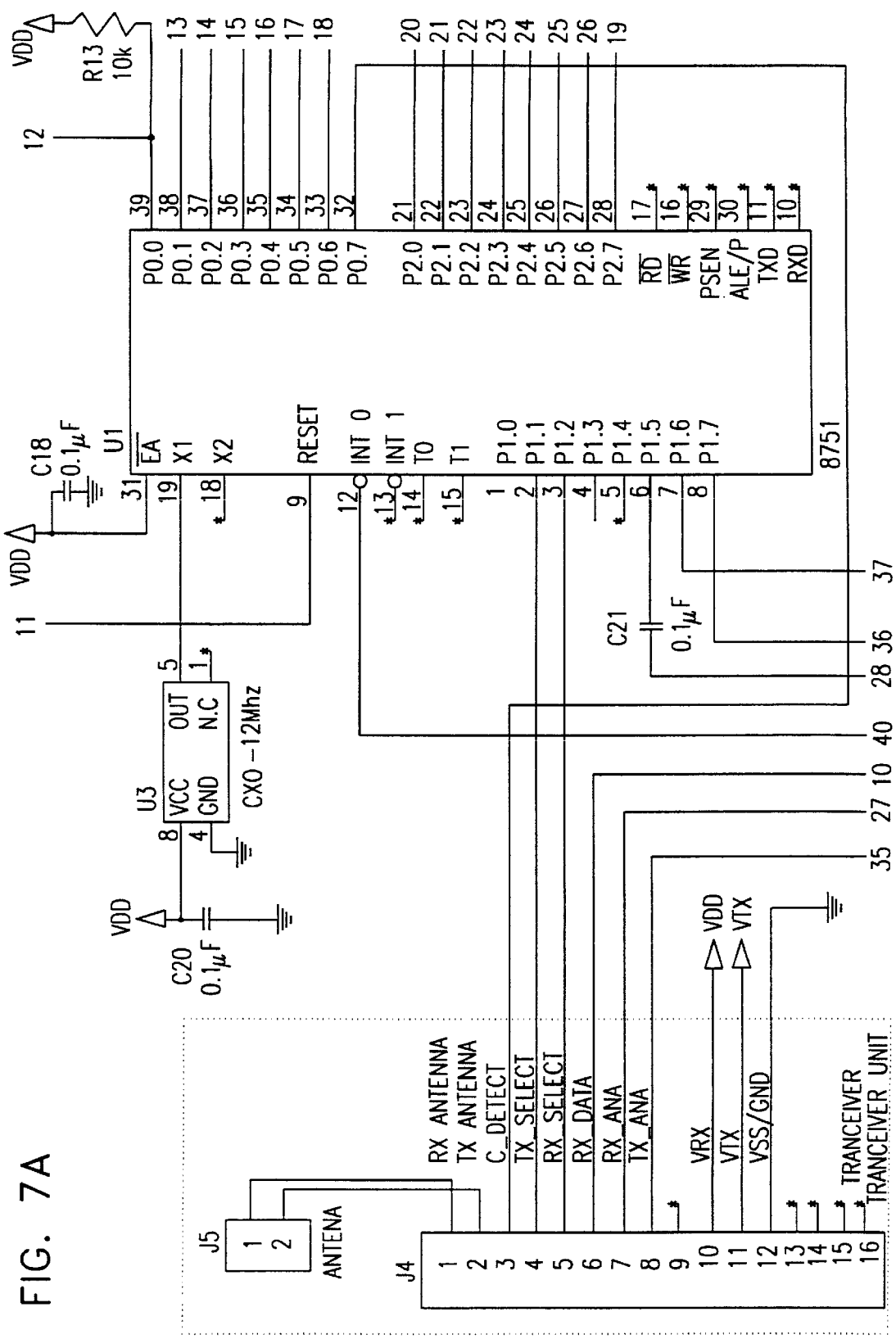
FIGS. 7A–7F, taken together with either FIG. 5D or FIG. 5E, comprise a schematic diagram of the apparatus of FIG. 6.
Figure 7B:
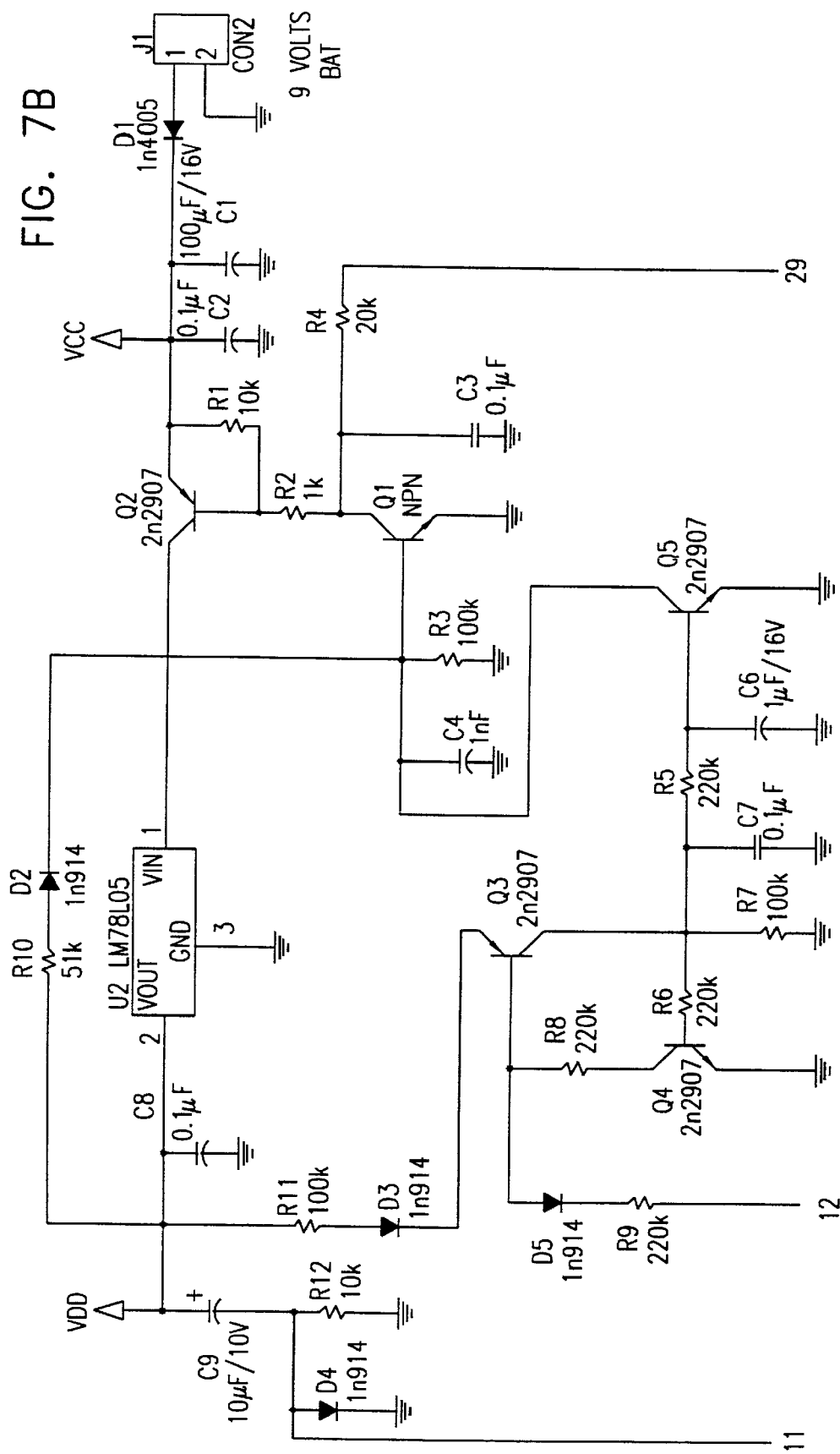
Figure 7C:
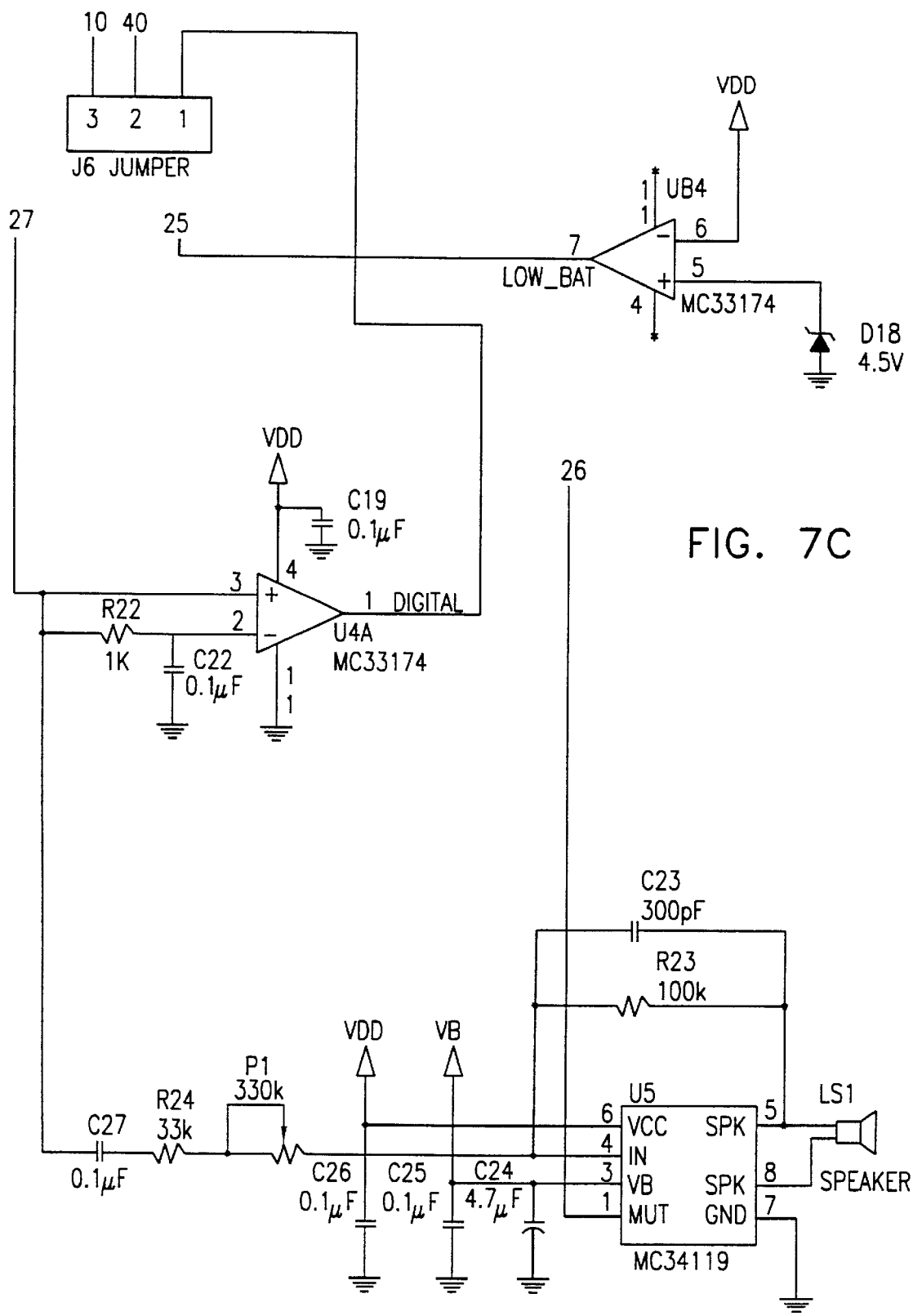
Figure 7D:
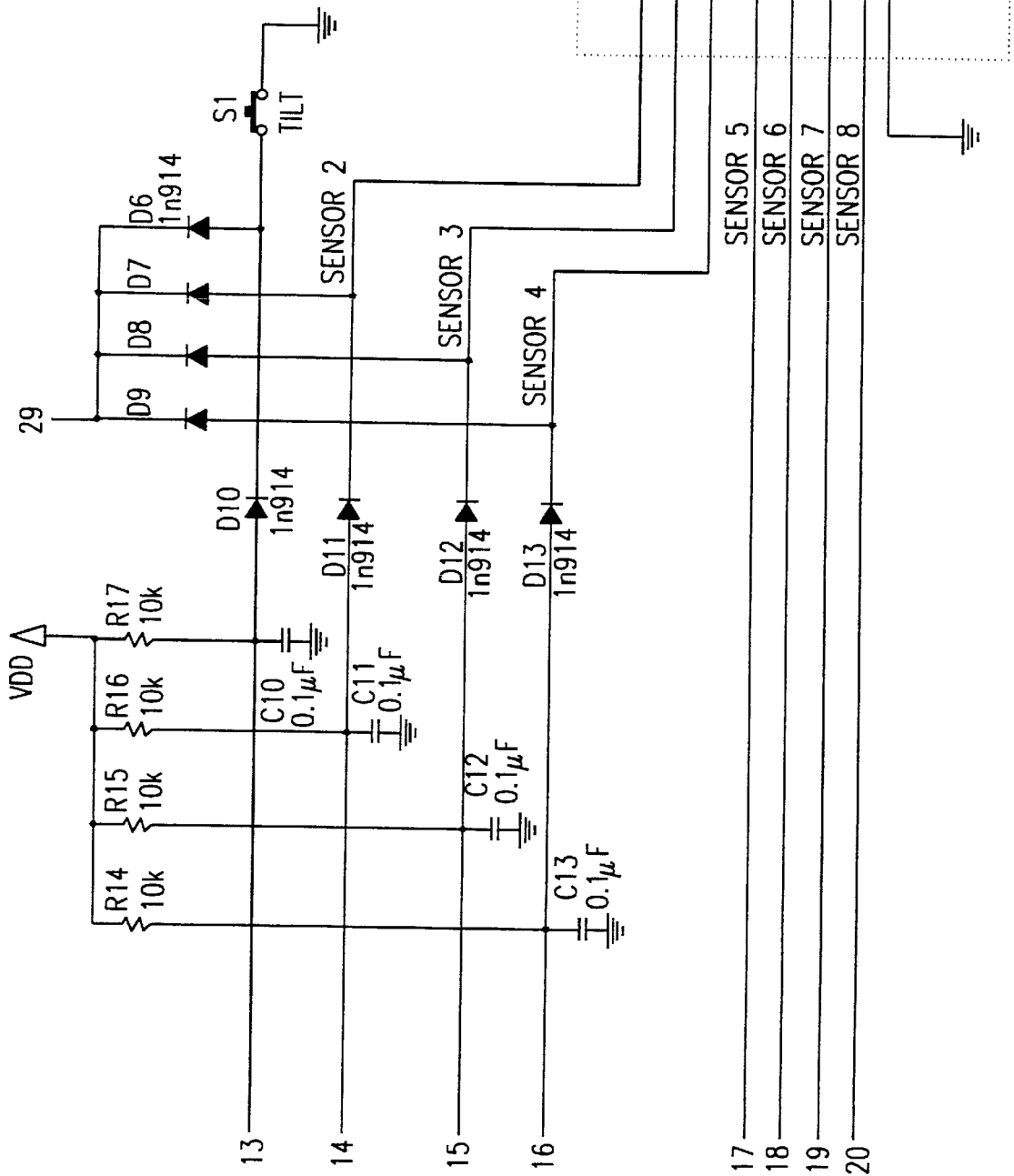
Figure 7E:
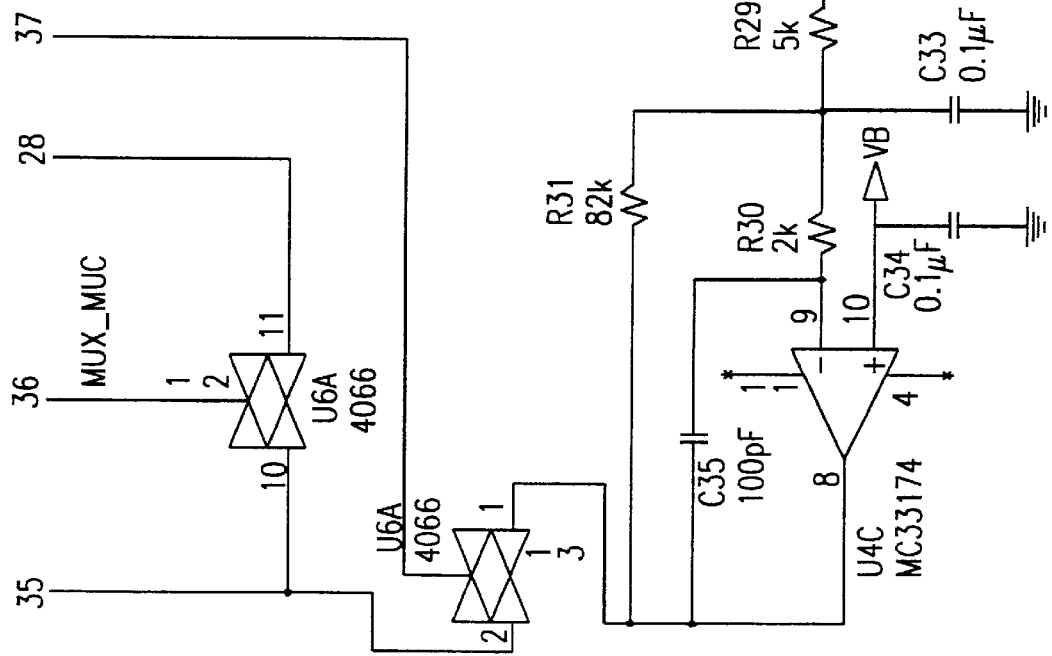
Figure 7F:
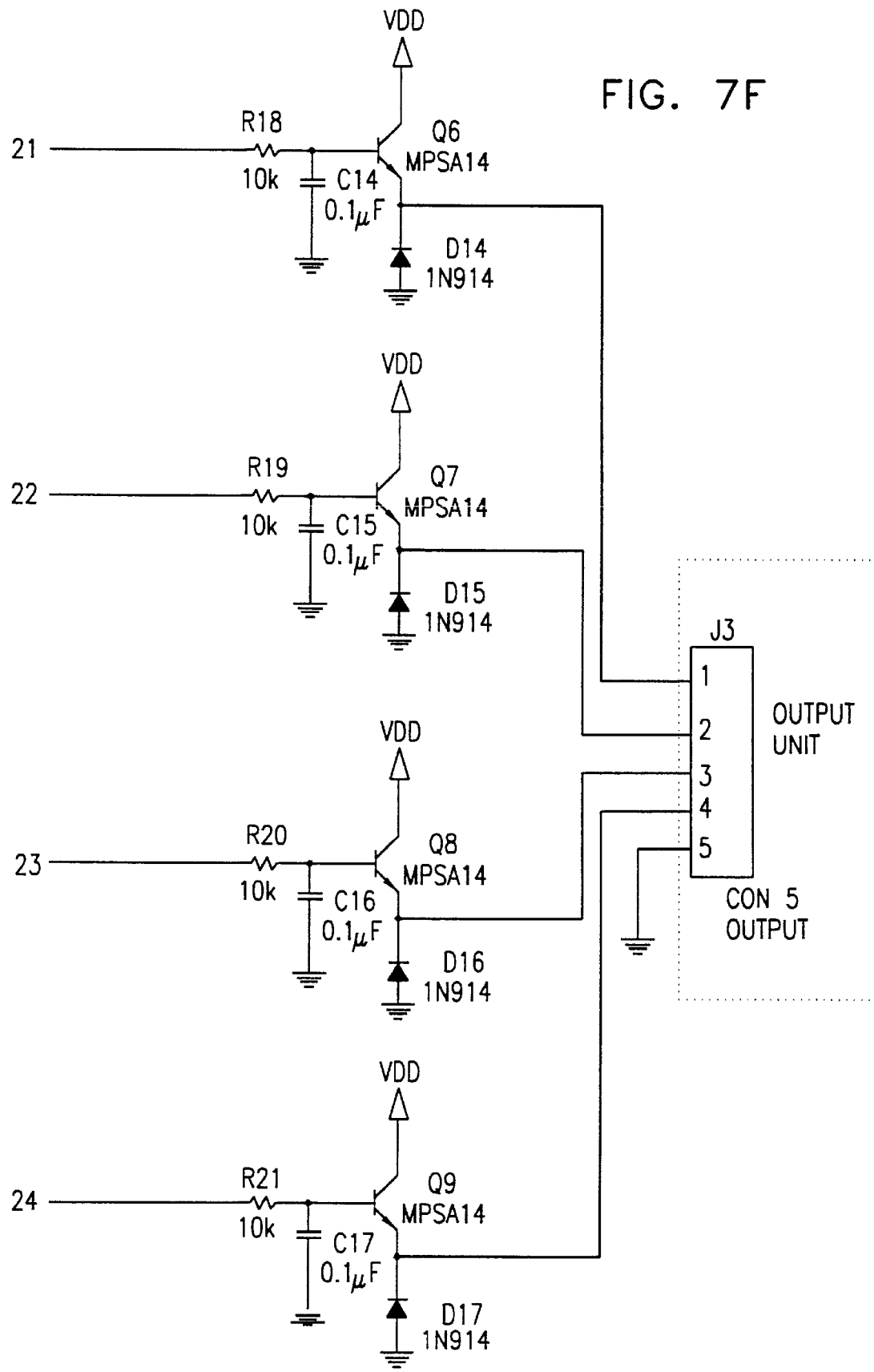

Reference is now made to FIG. 6 which is a simplified block diagram of a preferred embodiment of the toy control device 130 of FIG. 1A. The apparatus of FIG. 6 comprises a radio transceiver 260, similar to the radio transceiver 260 of FIG. 4. The apparatus of FIG. 6 also comprises a microcontroller 250 similar to the microcontroller 250 of FIG. 4.

The apparatus of FIG. 6 also comprises a digital input/output interface (digital I/O interface) 290, which is operative to provide an interface between the microcontroller 250 and a plurality of input and output devices which may be connected thereto such as, for example, four input device and four output devices. A preferred implementation of the digital I/O interface 290 is described in more detail below with reference to FIG. 7A–7F.

The apparatus of FIG. 6 also comprises an analog input/output interface (analog I/O interface) 300 operatively connected to the radio transceiver 260, and operative to receive signals therefrom and to send signals thereto.

The apparatus of FIG. 6 also comprises a multiplexer 305 which is operative, in response to a signal from the microcontroller 250, to provide output to the analog I/O interface 300 only when analog signals are being transmitted by the radio transceiver 260, and to pass input from the analog I/O interface 300 only when such input is desired.

The apparatus of FIG. 6 also comprises input devices 140 and output devices 150. In FIG. 6, the input devices 140 comprise, by way of example, a tilt switch operatively connected to the digital I/O interface 290, and a microphone operatively connected to the analog I/O interface 300. It is appreciated that a wide variety of input devices 140 may be used.

In FIG. 6, the output devices 150 comprise, by way of example, a DC motor operatively connected to the digital I/O interface 290, and a speaker operatively connected to the analog I/O interface 300. It is appreciated that a wide variety of output devices 150 may be used.

The apparatus of FIG. 6 also comprises a DC control 310, a preferred implementation of which is described in more detail below with reference to FIGS. 7A–7F.

The apparatus of FIG. 6 also comprises a comparator 280, similar to the comparator 280 of FIG. 4.

The apparatus of FIG. 6 also comprises a power source 125, shown in FIG. 6 by way of example as batteries, operative to provide electrical power to the apparatus of FIG. 6 via the DC control 310.

Reference is now made to FIGS. 7A–7F which, taken together with either FIG. 5D or 5E, comprise a schematic diagram of the toy control device of FIG. 6. If the schematics of FIG. 5E is employed to implement the computer radio interface of FIG. 4, using RY3GBO21 as U1 of FIG. 5E, then the same schematics of FIG. 5E are preferably employed to implement the toy control device of FIG. 6 except that RY3GH021 is used to implement U1 rather than RY3GB021.

The following is a preferred parts list for the apparatus of FIGS. 7A–7F:

1. U1 8751 microcontroller, Intel Corporation, San Tomas 4, 2700 San Tomas Expressway, 2nd Floor, Santa Clara, Calif. 95051, USA.
2. U2 LM78L05, National Semiconductor, 2900 Semiconductor Drive, Santa Clara, Calif. 95052, USA.
3. U3 CXO - 12MHz (crystal oscillator), Raltron, 2315 N.W. 107th Avenue, Miami, Fla. 33172, USA.
4. U4 MC33174, Motorola, Phoenix, Ariz., USA. Tel. No. (602) 897-5056.
5. U5 MC34119, Motorola, Phoenix, Ariz., USA. Tel. No. (602) 897-5056.

6. U6 4066, Motorola, Phoenix, Ariz., USA. Tel. No. (602) 897-5056.
7. Diode IN914, IN4005, Motorola, Phoenix, Ariz., USA. Tel. No. (602) 897-5056.
8. Transistor 2N2222, 2N3906, Motorola, Phoenix, Ariz., USA. Tel. No. (602) 897-5056.
9. Transistors 2N2907 and MPSA14, Motorola, Phoenix, Ariz., USA. Tel. No. (602) 897-5056.

FIGS. 7A–7F are self-explanatory with reference to the above parts list.

As stated above with reference to FIG. 1A, the signals transmitted between the computer radio interface 110 and the toy control device 130 may be either analog signals or digital signals. It the case of digital signals, the digital signals preferably comprise a plurality of predefined messages, known to both the computer 100 and to the toy control device 130.

Each message sent by the computer radio interface 110 to the toy control device 130 comprises an indication of the intended recipient of the message. Each message sent by the toy control device 130 to the computer radio interface 110 comprises an indication of the sender of the message.

In the embodiment of FIG. 1C described above, messages also comprise the following:

each message sent by the computer radio interface 110 to the toy control device 130 comprises an indication of the sender of the message; and each message sent by the toy control device 130 to the computer radio interface 110 comprises an indication of the intended recipient of the message.

A preferred set of predefined messages is as follows:

COMMAND STRUCTURE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |

COMMANDS LIST

From the Computer to the Toy Control Device

A. Output Commands

SET_IO_TO_DATA

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 00 | 01 | 00 | IO | 00 | D | x | x | |

Set Toy control device output pin to a digital level D.
P:         Computer address    00–03  H
A:         unit address -      00–FF  H
IO:        i/o number -        00–03  H
D:         Data-               00–01  H
Example
1.    01 00 00 05 00 01 03 01 00 00    set io 3 to "1"
2.    01 00 00 05 00 01 03 00 00 00    set io 3 to "0"

CHANGE_IO_FOR_TIME

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 00 | 02 | 00 | IO | 00 | D | T1 | T2 | |

Change Toy control device output pin to D for a period of time and then return to previous state.
P:         Computer address    00–03  H
A:         unit address -      00–FF  H
IO:        i/o number -        00–03  H
T1,T2:     time -              00–FF  H
D:         Data-               00–01  H -continued example:
1. 01 0<u>0</u> <u>00 05</u> 00 02 03 05 00 00   set io 3 to "1" for 5 seconds B. Input Commands

SEND_STATUS_OF_SENSORS

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>00</u> | x | x | x | x | x | x | | send the Toy control device status of all sensors.
P:    Computer address    00–03    H
A:    unit address -      00–FF    H
example:
1. 01 0<u>0</u> <u>00 05</u> 01 00 00 00 00 00   send current status of sensors

SENSORS_SCAN_MODE_ON

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>01</u> | x | x | x | x | x | x | |

Start scanning the Toy control device sensors, and if one of them is closed (pressed to '0'), send back an ack.
P:    Computer address    00–03    H
A:    unit address -      00–FF    H
example:
1. 01 0<u>0</u> <u>00 05</u> 01 01 00 00 00 00   scan mode of sensors ON

SENSORS_SCAN_MODE_ON_ONCE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>02</u> | x | x | x | x | x | x | |

Start scanning the Toy control device sensors, and if one of them is closed (pressed to '0'), send back an ack,
then disable scanning the sensors.
P:    Computer address    00–03    H
A:    unit address -      00–FF    H
1. 01 0<u>0</u> <u>00 05</u> 01 02 00 00 00 00   scan mode of sensors ON once

SENSORS_SCAN_MODE_OFF

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>03</u> | x | x | x | x | x | x | |

Stop scanning the Toy control device sensors.
P:    Computer address    00–03    H
A:    unit address -      00–FF    H
example:
1. 01 0<u>0</u> <u>00 05</u> 01 03 00 00 00 00   scan mode of sensors OFF

C. Audio Out Commands

START_AUDIO_PLAY

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 02 | 00 | x | x | x | x | xx | xx | |

Start playing an audio in a speaker of the Toy control device The Audio is sent to the Toy control device by the computer sound card and the Computer radio interface.
P:   Computer address   00–03  H
A:   unit address -   00–FF  H
1.   01 00 00 05 02 00 00 00 00 00   Start audio-play

STOP_AUDIO_PLAY

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 02 | 01 | x | x | x | x | x | x | |

Stop playing an audio in a speaker of the Toy control device.
P:   Computer address   00–03  H
A:   unit address -   00–FF  H
1.   01 00 00 05 02 01 00 00 00 00   Stop audio-play

START_AUDIO_AND_IO_PLAY_FOR_TIME

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 02 | 04 | T1 | T2 | T0 | td | SC | IO | |

Start playing an audio in a speaker of the Toy control device and set an io pin to '1'. After time T, stop audio and set IO to '0'. start this command after a delay td*100 ms. if SC="1" then after the execution of this command, start the input command SCAN_SENSORS_ON_ONCE (if any sensor is pressed, even during the audio play, send a message to the computer).
P:          Computer address       00–03    H
A:          unit address -         00–FF    H
IO:         i/o number -           0–3      H    (if IO>3 then don't set IO)
T0,T1,T2:   TIME                   000–FFF  H    (*100 ms) (T0=MMSB, T1=MSB T0=LSB)
td:         delay time befor execute 0–F    H    (*100 ms)
1.   01 00 00 05 02 04 80 2A 03 00   Start audio-play and IO # 3 for 6.4 second
                                     640=280H
                                     delay before execution = 10*100 ms=1 sec
2.   01 00 00 05 02 04 80 2A 13 00   Start audio-play and IO # 3 for 6.4 second and
                                     set scan sensors on once mode.
                                     delay before execution = 10*100 ms=1 sec

D. Audio Out Commands

TRANSMIT_MIC_FOR_TIME

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 03 | 00 | T1 | T2 | x | x | x | x | |

-continued

Requests the Toy control device to Transmit microphone audio from the Toy control device to the Computer radio interface and to the sound card of the computer for time T.
P:      Computer address    00–03   H
A:      unit address -      00–FF   H
T1,T2:  TIME                00–FF   H   (SEC)
example:
1.   01 00 00 05 03 00 0A 00 00 00   start mic mode for 10 seconds

E. General Toy Commands

GOTO_SLEEP_MODE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit 01 | 2 bit P | 6 bit 00 | 8 bit 00 | 8 bit A | 8 bit 04 | 8 bit 01 | 4 bit x | 4 bit x | 4 bit x | 4 bit x | 4 bit x | 4 bit x | 8 bits |

Requests the Toy control device to go into power save mode (sleep).
P:      Computer address    00–03   H
A:      unit address -      00–FF   H
1.   01 00 00 05 04 01 00 00 00 00   switch the Toy control device into sleep mode.

GOTO_AWAKE_MODE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit 01 | 2 bit P | 6 bit 00 | 8 bit 00 | 8 bit A | 8 bit 04 | 8 bit 02 | 4 bit x | 4 bit x | 4 bit x | 4 bit x | 4 bit x | 4 bit x | 8 bits |

Requests the Toy control device to go into an awake mode
P:      Computer address    00–03   H
A:      unit address -      00–FF   H
1.   01 00 00 05 04 02 00 00 00 00   switch the Toy control device into awake mode

TOY_RESET

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit 01 | 2 bit P | 6 bit 00 | 8 bit 00 | 8 bit A | 8 bit 04 | 8 bit 0F | 4 bit x | 4 bit x | 4 bit x | 4 bit x | 4 bit x | 4 bit x | 8 bits |

Requests the Toy control device to perform RESET
P:      Computer address    00–03   H
A:      unit address -      00–FF   H
1.   01 00 00 05 04 0F 00 00 00 00   Toy reset

TOY_USE_NEW_RF_CHANNELS

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit 01 | 2 bit P | 6 bit 00 | 8 bit 00 | 8 bit A | 8 bit 04 | 8 bit 0A | 4 bit CH1 | 4 bit CH2 | 4 bit x | 4 bit x | 4 bit x | 4 bit x | 8 bits |

Requests the Toy control device to switch to new RF transmit and receive channels.
P:      Computer address          00–03   H
A:      unit address -            00–FF   H
CH1:    Transmit RF channel number  0–F   H

| | | |
|---|---|---|
| CH2: Receive RF Channel number | 0–F | H |
| 1. 01 00 00 05 04 0A 12 00 00 00 | | Switch to new RX and TX RF channels |

Note: This command is available only with enhanced radio modules (alternate U1 of FIG. 5E) or with the modules described if FIG. 15A–15E and 24A–24E.

F. Telemetry
Information sent by the Toy control device, as an ACK to the 10 command received from the Computer radio interface

OK_ACK

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 0A | 00 | cmd1 | cmd2 | cmd3 | cmd4 | sen1 | sen2 | |

Send back an ACK about the command that was received ok.
P:           Computer address           00–03   H
A:           unit address -             00–FF   H
cmd 1,2:    Received command MSB ok ack.   00–FF   H
cmd 3,4:    Received command LSB ok ack.   00–FF   H
sen 1,2     Sensors 0–7 status             00–FF   H
1.   01 60 00 05 0A 00 01 01 FF 00   OK ack for 0101 command.(sensors scan mode on command) . status: all sensors are not pressed (FF). the computer_radio_interface number is 6.
2.   01 60 00 05 0A 00 01 01 FE 00   OK ack for 0101 command.(sensors scan mode on command) . status: sensor # 8 is pressed (FE) the computer_radio_interface number is 6.

G. Requests
Request sent by the Toy control device, after an event

TOY_IS_AWAKE_REQ

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 0A | 00 | c1 | c2 | x | x | x | x | |

Send a message to the Computer radio interface if the Toy control device goes from sleep mode to awake mode.
P:               Computer address       00–03   H
A:               unit address -           00–FF   H
c1,c2:       status command           AB     H
1.   01 60 00 05 0A 00 AB 00 FF 00   Toy is awake message.

H. CRI (Computer Radio Interface)—commands
    Commands that are sent only to the Computer radio interface

SWITCH_AUDIO_OUT_TO_RADIO_&_TRANSMIT

| byte 0 | byte 1 | byte 2 | byte 3 | byte 4 | byte 5 | | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit 01 | 2 bit P | 6 bit 00 | 8 bit 00 | 8 bit x | 8 bit 0C | 8 bit 00 | 4 bit x | 4 bit x | 4 bit x | 4 bit x | 4 bit x | 4 bit x | 8 bits |

Requests the Computer radio interface to switch audio_out from the computer sound card to the radio wireless transceiver and transmit.
P: Computer address 00–03 H

SWITCH_AUDIO_OUT_TO_JACK_&_STOP_TRANSMIT

| byte 0 | byte 1 | byte 2 | byte 3 | byte 4 | byte 5 | | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit 01 | 2 bit P | 6 bit 00 | 8 bit 00 | 8 bit x | 8 bit 0C | 8 bit 01 | 4 bit x | 4 bit x | 4 bit x | 4 bit x | 4 bit x | 4 bit x | 8 bits |

Requests the Computer radio interface to switch audio_out from the radio RF wireless transceiver to the speakers jack and to stop transmit.
P: Computer address 00–03 H

MUTE_RADIO

| byte 0 | byte 1 | byte 2 | byte 3 | byte 4 | byte 5 | | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit 01 | 2 bit P | 6 bit 00 | 8 bit 00 | 8 bit x | 8 bit 0C | 8 bit 02 | 4 bit x | 4 bit x | 4 bit x | 4 bit x | 4 bit x | 4 bit x | 8 bits |

Mute the radio transmit.
P: Computer address 00–03 H

UN-MUTE_RADIO

| byte 0 | byte 1 | byte 2 | byte 3 | byte 4 | byte 5 | | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit 01 | 2 bit 00 | 6 bit 00 | 8 bit 00 | 8 bit x | 8 bit 0C | 8 bit 03 | 4 bit x | 4 bit x | 4 bit x | 4 bit x | 4 bit x | 4 bit x | 8 bits |

UN-Mute the radio transmit.

CRI_RESET

| byte 0 | byte 1 | byte 2 | byte 3 | byte 4 | byte 5 | | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | | CRC |
| | | | | | | | Dat1 msb | Dat1 lsb | Dat2 msb | Dat2 lsb | Dat3 msb | Dat3 lsb | |
| 8 bit 01 | 2 bit P | 6 bit 00 | 8 bit 00 | 8 bit x | 8 bit 0C | 8 bit 0F | 4 bit x | 4 bit x | 4 bit x | 4 bit x | 4 bit x | 4 bit x | 8 bits |

Perform sottware reset on the Computer radio interface unit.
P: Computer address 00–03 H I. CRI—ACK
ACK sent only to the Computer by the Computer radio interface, only after CRI commands

| CRI_COMMAND_ACK | | | | | | | | | |
|---|---|---|---|---|---|---|---|---|---|
| byte 0 | byte 1 | byte 2 | byte 3 | byte 4 | byte 5 | byte 6 | byte 7 | byte 8 | byte 9 |
| Head | PC add | Unit # A-sb | Unit # B-sb | Unit # C-sb | CMD msb | CMD lsb | - 8 bits - | - 8 bits - | - 8 bits - | CRC |
| | | | | | | | Dat1 msb  Dat1 lsb | Dat2 msb  Dat2 lsb | Dat3 msb  Dat3 lsb | |
| 8 bit 01 | 2 bit P | 6 bit 00 | 8 bit 00 | 8 bit x | 8 bit 0D | 8 bit 00 | 4 bit cmd1  4 bit cmd2 | 4 bit cmd3  4 bit cmd4 | 4 bit x  4 bit x | 8 bits |

This is an ACK for a CRI command. this ACK is sent to the computer by the computer-radio-interface, after executing a command successfully.
P:        Computer address        00–03   H
cmd 1,2:   Received CRI command MSB ok ack.   00–FF   H
cmd 3,4:   Received CRI command LSB ok ack.   00–FF   H
1.   01 6<u>0 00 00</u> 0D 00 0C 01 00 00   OK ack for 0C01 CRI command (SWITCH AUDIO OUT TO JACK)
      the computer radio interface number is 6.
2.   01 6<u>0 00 00</u> 0D 00 0C 0F 00 00   OK ack for 0C0F CRI command (CRI reset)
      the computer_radio_interface number is 6.
      This ack is also sent on POWER UP RESET Reference is made to FIG. 8A, which is a simplified flowchart illustration of a preferred method for receiving radio signals, executing commands comprised therein, and sending radio signals, within the toy control device 130 of FIG. 1A. Typically, each message as described above comprises a command, which may include a command to process information also comprised in the message. The method of FIG. 8A preferably comprises the following steps:

A synchronization signal or preamble is detected (step 400). A header is detected (step 403).

A command contained in the signal is received (step 405).

The command contained in the signal is executed (step 410). Executing the command may be as described above with reference to FIG. 1A.

A signal comprising a command intended for the computer radio interface 110 is sent (step 420).

Reference is now made to FIGS. 8B–8T which, taken together, comprise a simplified flowchart illustration of a preferred implementation of the method of FIG. 8A. The method of FIGS. 8B–8T is self-explanatory.

Reference is now made to FIG. 9A, which is a simplified flowchart illustration of a preferred method for receiving MIDI signals, receiving radio signals, executing commands comprised therein, sending radio signals, and sending MIDI signals, within the computer radio interface 110 of FIG. 1A. Some of the steps of FIG. 9A are identical to steps of FIG. 8A, described above. FIG. 9A also preferably comprises the following steps:

A MIDI command is received from the computer 100 (step 430). The MIDI command may comprise a command intended to be transmitted to the toy control device 130, may comprise an audio in or audio out command, or may comprise a general command.

A MIDI command is sent to the computer 100 (step 440). The MIDI command may comprise a signal received from the toy control device 130, may comprise a response to a MIDI command previously receive by the computer radio interface 110 from the computer 100, or may comprise a general command.

The command contained in the MIDI command or in the received signal is executed (step 450). Executing the command may comprise, in the case of a received signal, reporting the command to the computer 100, whereupon the computer 100 may typically carry out any appropriate action under program control as, for example, changing a screen display or taking any other appropriate action in response to the received command. In the case of a MIDI command received from the computer 100, executing the command may comprise transmitting the command to the toy control device 130. Executing a MIDI command may also comprise switching audio output of the computer control device 110 between the secondary audio interface 230 and the radio transceiver 260. Normally the secondary audio interface 230 is directly connected to the audio interface 220 preserving the connection between the computer sound board and the peripheral audio devices such as speakers, microphone and stereo system.

Reference is now made to FIGS. 9B–9N, and additionally reference is made back to FIGS. 8D–8M, all of which, taken together, comprise a simplified flowchart illustration of a preferred implementation of the method of FIG. 9A. The method of FIGS. 9B–9M, taken together with FIGS. 8D–8M, is self-explanatory.

Figure 10A:
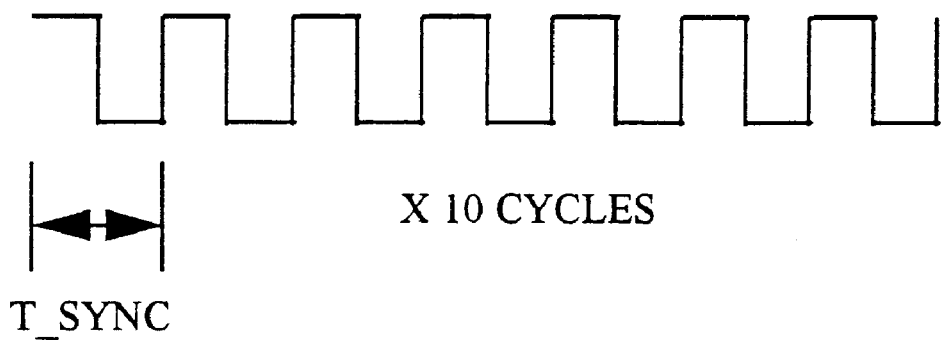
FIGS. 10A–10C are simplified pictorial illustrations of a signal transmitted between the computer radio interface 110 and the toy control device 130 of FIG. 1A.
Figure 10B:
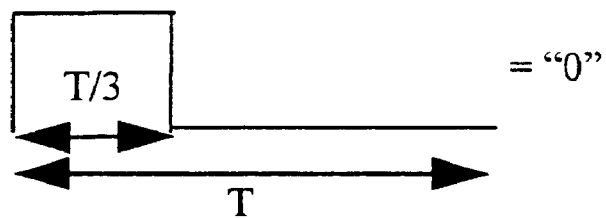
Figure 10C:
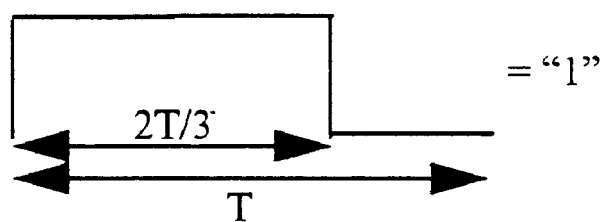

Reference is now additionally made to FIGS. 10A–10C, which are simplified pictorial illustrations of a signal transmitted between the computer radio interface 110 and the toy control device 130 of FIG. 1A. FIG. 10A comprises a synchronization preamble. The duration T_SYNC of the synchronization preamble is preferably 0.500 millisecond, being preferably substantially equally divided into on and off components.

FIG. 10B comprises a signal representing a bit with value 0, while FIG. 10C comprises a signal representing a bit with value 1.

It is appreciated that FIGS. 10B and 10C refer to the case where the apparatus of FIG. 5D is used. In the case of the apparatus of FIG. 5E, functionality corresponding to that depicted in FIGS. 10B and 10C is provided within the apparatus of FIG. 5E.

Preferably, each bit is assigned a predetermined duration T, which is the same for every bit. A frequency modulated carrier is transmitted, using the method of frequency modulation keying as is well known in the art. An "off" signal (typically less than 0.7 Volts) presented at termination 5 of U2 in FIG. 5D causes a transmission at a frequency below the median channel frequency. An "on" signal (typically over 2.3 Volts) presented at pin 5 of U2 in FIG. 5D causes a transmission at a frequency above the median frequency. These signals are received by the corresponding receiver U1.

Output signal from pin 6 of U1 is fed to the comparator 280 of FIGS. 4 and 6 that is operative to determine whether the received signal is "off" or "on", respectively.

It is also possible to use the comparator that is contained within U1 by connecting pin 7 of U1 of FIG. 5D, through pin 6 of the connector J1 of FIG. 5D, pin 6 of connector J1 of FIG. 5A, through the jumper to pin 12 of U1 of FIG. 5A.

Preferably, receipt of an on signal or spike of duration less than 0.01 * T is ignored. Receipt of an on signal as shown in FIG. 10B, of duration between 0.01 * T and 0.40 * T is preferably taken to be a bit with value 0. Receipt of an on signal as shown in FIG. 10C, of duration greater than 0.40 * T is preferably taken to be a bit with value 1. Typically, T has a value of 1.0 millisecond.

Furthermore, after receipt of an on signal, the duration of the subsequent off signal is measured. The sum of the durations of the on signal and the off signal must be between 0.90 T and 1.10 T for the bit to be considered valid. Otherwise, the bit is considered invalid and is ignored.

Figure 11:
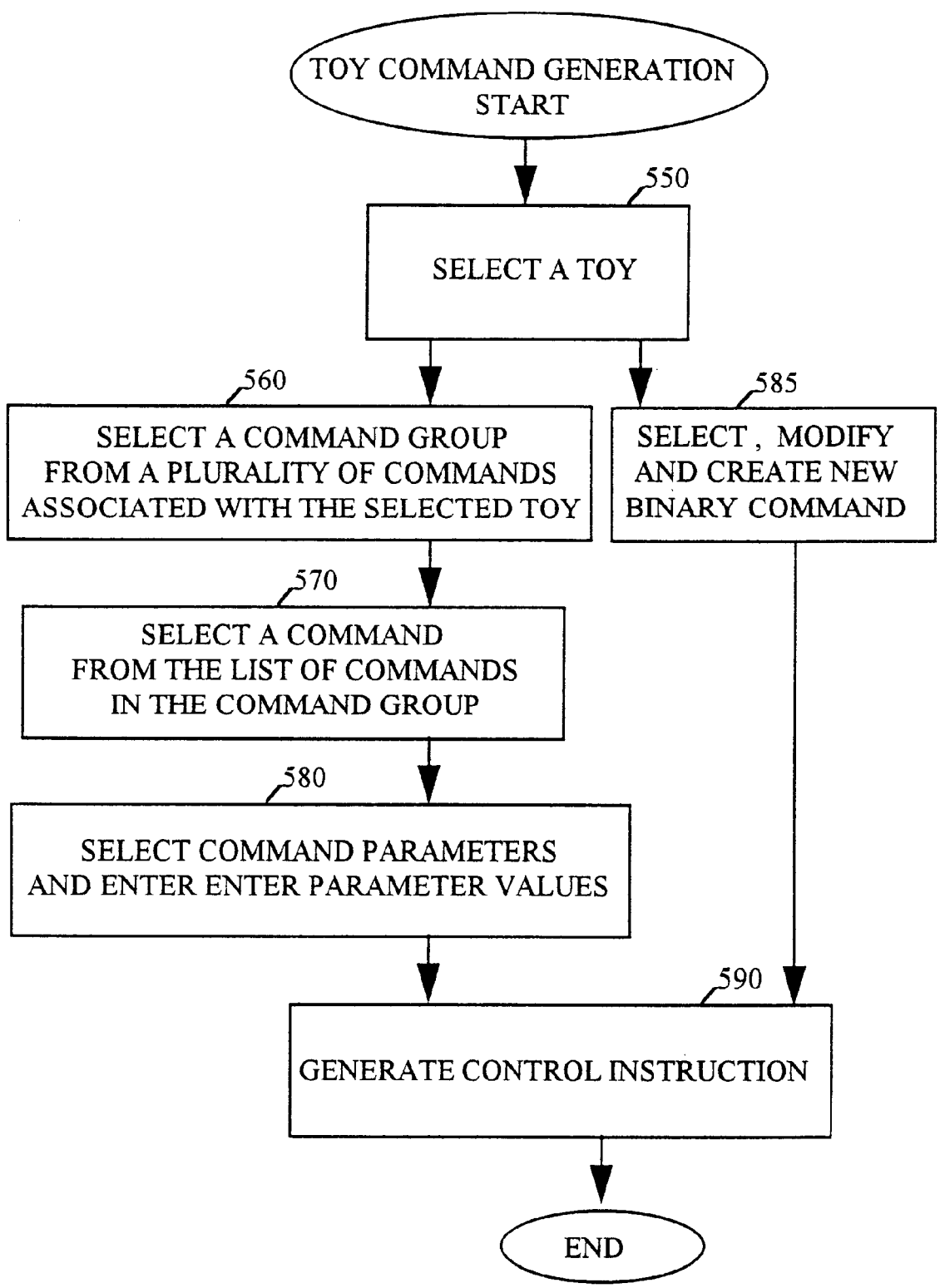

Reference is now made to FIG. 11, which is a simplified flowchart illustration of a method for generating control instructions for the apparatus of FIG. 1A. The method of FIG. 11 preferably includes the following steps:

A toy is selected (step 550). At least one command is selected, preferably from a plurality of commands associated with the selected toy (steps 560–580). Alternatively, a command may be entered by selecting, modifying, and creating a new binary command (step 585).

Typically, selecting a command in steps 560–580 may include choosing a command and specifying one or more control parameters associated with the command. A control parameter may include, for example, a condition depending on a result of a previous command, the previous command being associated either with the selected toy or with another toy. A control parameter may also include an execution condition governing execution of a command such as, for example: a condition stating that a specified output is to occur based on a status of the toy, that is, if and only if a specified input is received; a condition stating that the command is to be performed at a specified time; a condition stating that performance of the command is to cease at a specified time; a condition comprising a command modifier modifying execution of the command, such as, for example, to terminate execution of the command in a case where execution of the command continues over a period of time; a condition dependent on the occurrence of a future event; or another condition.

The command may comprise a command to cancel a previous command.

The output of the method of FIG. 11 typically comprises one or more control instructions implementing the specified command, generated in step 590. Typically, the one or more control instructions are comprised in a command file. Typically, the command file is called from a driver program which typically determines which command is to be executed at a given point in time and then calls the command file associated with the given command.

Figure 12A:
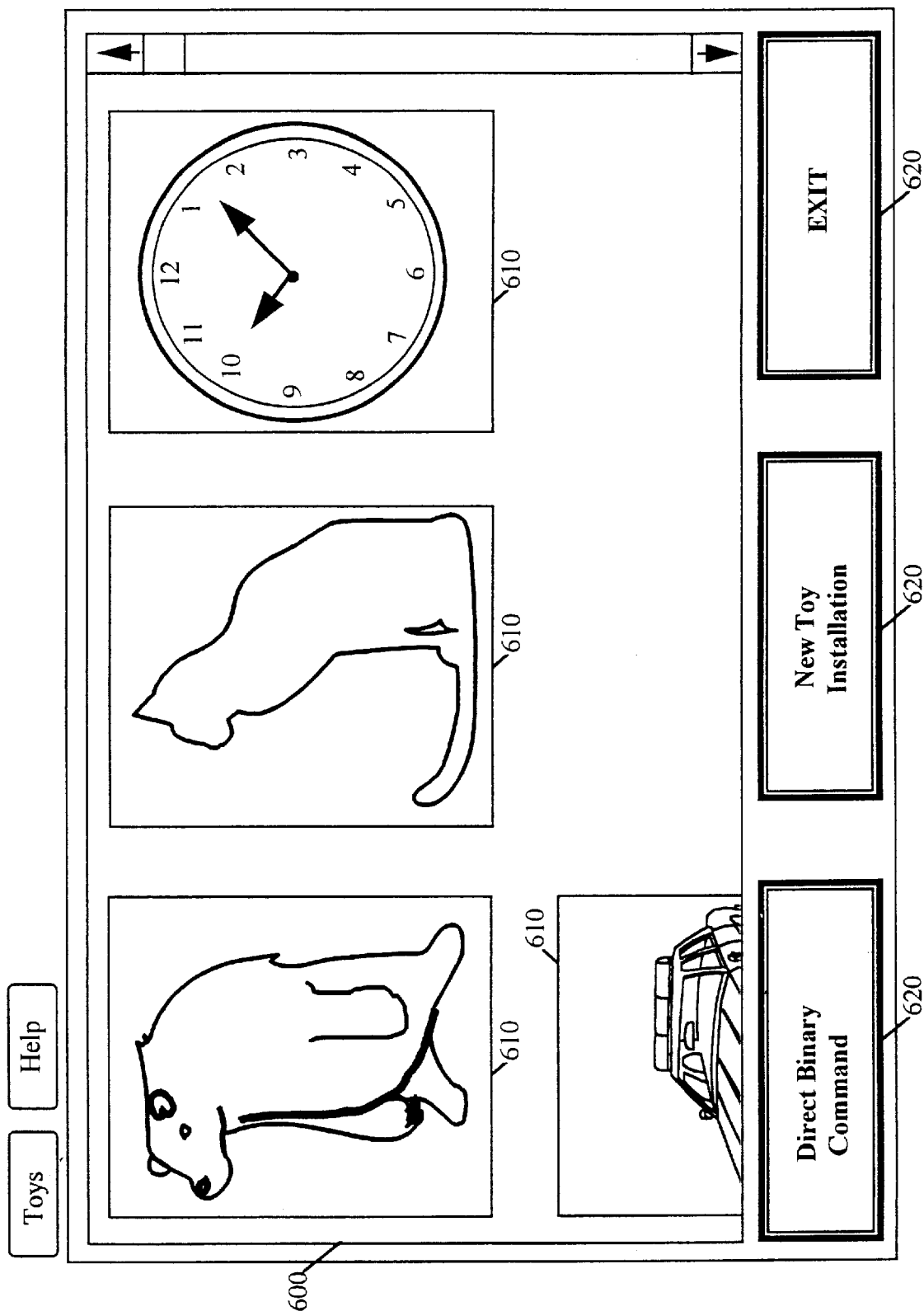
FIGS. 12A–12C are pictorial illustrations of a preferred implementation of a graphical user interface implementation of the method of FIG. 11.
Figure 12B:
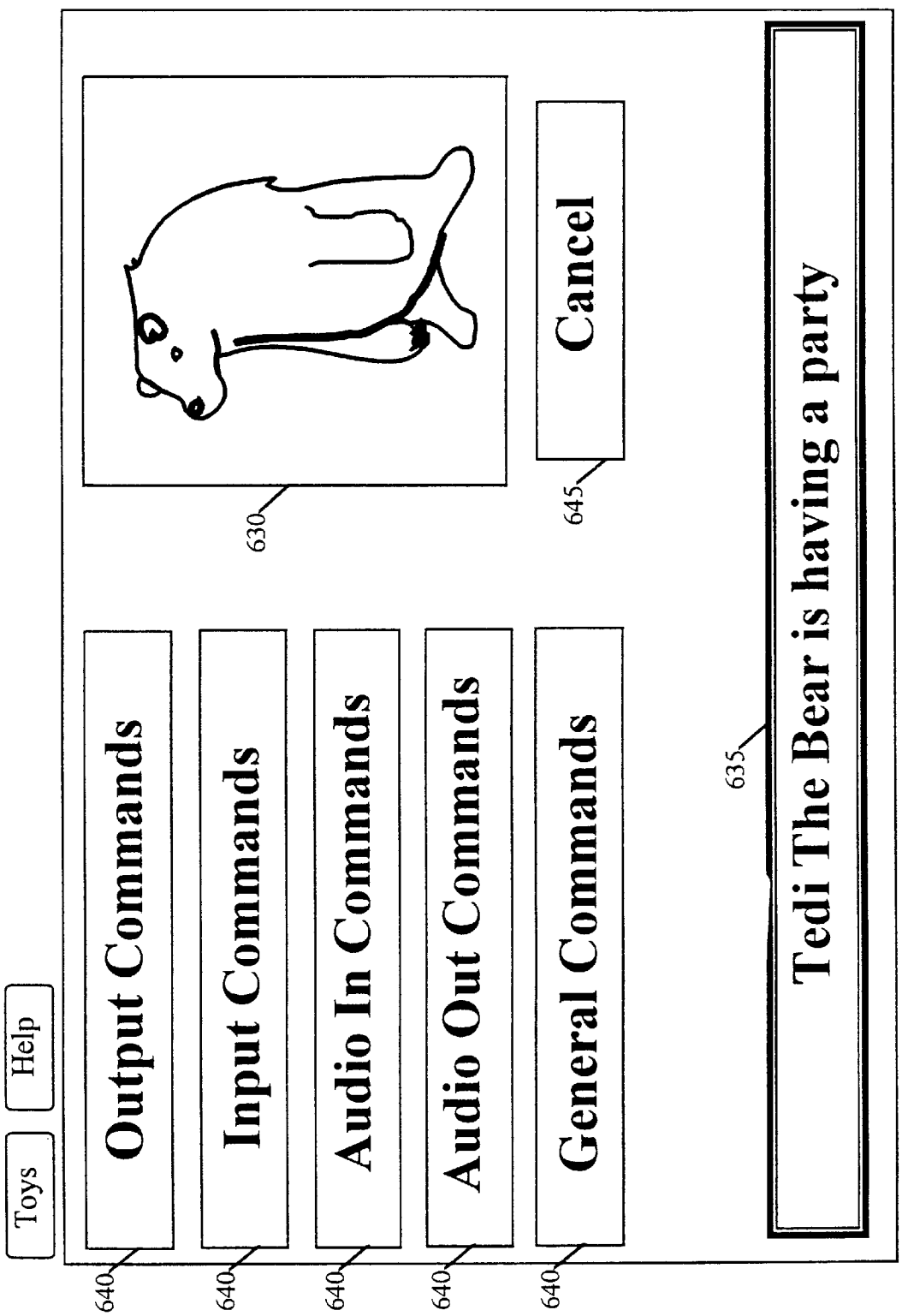
Figure 12C:
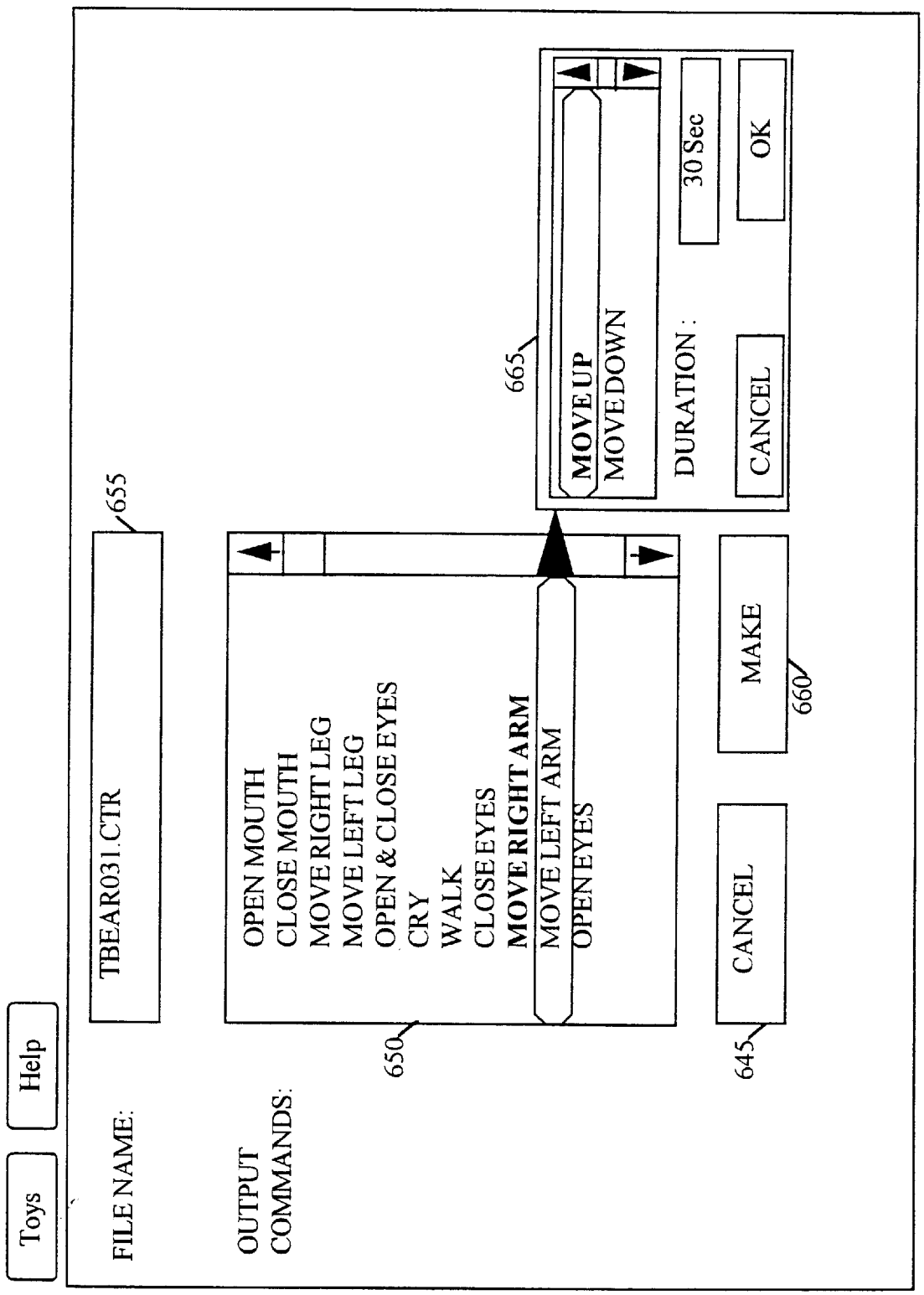

Preferably, a user of the method of FIG. 11 performs steps 550 and 560 using a computer having a graphical user interface. Reference: is now made to FIGS. 12A–12C, which are pictorial illustrations of a preferred embodiment of a graphical user interface implementation of the method of FIG. 11.

FIG. 12A comprises a toy selection area 600, comprising a plurality of toy selection icons 610, each depicting a toy. The user of the graphical user interface of FIGS. 12A–12C typically selects one of the toy selection icons 610, indicating that a command is to be specified for the selected toy.

FIG. 12A also typically comprises action buttons 620, typically comprising one or more of the following:

a button allowing the user, typically an expert user, to enter a direct binary command implementing an advanced or particularly complex command not otherwise available through the graphical user interface of FIGS. 12A–12C;

a button allowing the user to install a new toy, thus adding a new toy selection icon 610; and a button allowing the user to exit the graphical user interface of FIGS. 12A–12C.

FIG. 12B depicts a command generator screen typically displayed after the user has selected one of the toy selection icons 610 of FIG. 12A. FIG. 12B comprises an animation area 630, preferably comprising a depiction of the selected toy selection icon 610, and a text area 635 comprising text describing the selected toy.

FIG. 12B also comprises a plurality of command category buttons 640, each of which allow the user to select a category of commands such as, for example: output commands; input commands; audio in commands; audio out commands; and general commands.

FIG. 12B also comprises a cancel button 645 to cancel command selection and return to the screen of FIG. 12A.

FIG. 12C comprises a command selection area 650, allowing the user to specify a specific command. A wide variety of commands may be specified, and the commands shown in FIG. 12C are shown by way of example only.

FIG. 12C also comprises a file name area 655, in which the user may specify the name of the file which is to receive the generated control instructions. FIG. 12C also comprises a cancel button 645, similar to the cancel button 645 of FIG. 12B. FIG. 12C also comprises a make button 660. When the user actuates the make button 660, the control instruction generator of FIG. 11 generates control instructions implementing the chosen command for the chosen toy, and writes the control instructions to the specified file.

FIG. 12C also comprises a parameter selection area 665, in which the user may specify a parameter associated with the chosen command.

Reference is now made to Appendix A, which is a computer listing of a preferred software implementation of the method of FIGS. 8A–8T.

Appendix A is an INTEL hex format file. The data bytes start from character number 9 in each line. Each byte is represented by 2 characters. The last byte (2 characters) in each line, should be ignored.

For example, for a sample line:
The original line reads: 070000000020100020320329F
The data bytes: 02010002032032 (02,01,00,02,03,20,32)
Starting address of the data bytes: 0000 (00,00)
Appendix A may be programmed into the memory of microcontroller 250 of FIG. 6.

Appendix B is a computer listing of a preferred software implementation of the method of FIGS. 9A–9N, together with the method of FIGS. SD–8M.

Appendix B is an INTEL hex format file. The data bytes start from character number 9 in each line. Each byte is represented by 2 characters. The last byte (2 characters) in each line, should be ignored.

For example, for a sample line:
The original line reads: 070000000201000205A73216
The data bytes: 0201000205A732(02,01,00,02,05,A7,32)
Starting address of the data bytes: 0000 (00,00)
Appendix B may be programmed into the memory of microcontroller 250 of FIG. 4.

Appendix C is a computer listing of a preferred software implementation of an example of a computer game for use in the computer 100 of FIG. 1.

Appendix D is a computer listing of a preferred ware implementation of the method of FIGS. 11 and FIGS. 12A–12C.

For Appendices C and D, these programs were developed using VISUAL BASIC. To run the programs you need to install the VISUAL BASIC environment first. The application needs a Visual Basic custom control for performing MIDI I/O similar to the one called MIDIVBX. VBX. VISUAL BASIC is manufactured by Microsoft Corporation, One Microsoft Way, Redmond, Wash. 98052-6399, USA. MIDIVBX.VBX is available from Wayne Radinsky, electronic mail address a-wayner@microsoft.com.

The steps for programming the microcontrollers of the present invention include the use of a universal programmer, such as the Universal Programmer, type EXPRO 60/80, manufactured by Sunshine Electronics Co. Ltd., Taipei, Japan.

The method for programming the microcontrollers with the data of Appendices A and B, includes the following steps:
1. Run the program EXPRO.EXE, which is provided with the EXPRO 60/80".
2. Choose from the main menu the EDIT/VIEW option.
3. Choose the EDIT BUFFER option.
4. Enter the string E 0000.
5. Enter the relevant data (given in Appendices A or 13), byte after byte, starting from the address 0000. In each line there is a new starting address for each data byte which appears in this line.
6. Press ESC.
7. Enter the letter Q.
8. Choose from the main menu the DEVICE option.
9. Choose the MPU/MCU option.
10. Choose the INTEL option.
11. Choose the 87C51.
12. Choose from the mainmenu the RUNFUNC option.
13. Choose the PROGRAM option. 14. Place the 87C51 chip in the programmer's socket.
15. Enter Y and wait until the OK message.
16. The chip is now ready to be installed in the board.

The method for creating the relevant files for the computer 100, with the data of Appendices C and D, includes using a HEX EDITOR which is able to edit DOS formatted files. A typical HEX and ASCII editor is manufactured by Martin Doppelbauer, Am Spoerkel 17, 44227 Dortmund, Germany, UET401 at electronic mail address hrz.unidozr.uni-dortmund.de.

The steps necessary for creating the files by means of a HEX editor, such as by the Martin Doppelbauer editor include the following:
1. Copy any DOS file to a new file with the desired name and with the extension .EXE. (For example, write COPY AUTOEXEC.BAT TOY1.EXE).
2. Run the program ME.EXE.
3. From the main menu press the letter L (load file).
4. Write the main menu of the new file (for example TOY1.EXE).
5. From the main menu, press the letter (insert).
6. Enter the relevant data (written in Appendices C or D), byte after byte, starting from the address 0000.
7. Press ESC.
8. From the main menu, enter the letter W(write file).
9. Press the RETURN key and exit from the editor by pressing the letter Q.

The above-described embodiment of FIG. 1C includes a description of a preferred set of predefined messages including a category termed "General commands". Other General Commands are defined by the following description:

MULTIPORT COMMANDS

AVAILABILITY_INTERROGATION_COMMAND

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 05 | 00 | 00 | 00 | 00 | x | x | |

A computer transmits this command to verify that the radio channel is vacant. If another computer is already using this channel it will respond with the Availability Response Command. If no response is received within 250 msec the channel is deemed vacant.
P: Computer address 00–03 H
A: unit address - 00–FF H

AVAILABILITY_RESPONSE_COMMAND

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 06 | 00 | 00 | 00 | 00 | x | x | |

A computer transmits this command in response to an Availability Interrogation Command to announce that the radio channel is in use.
P: Computer address 00–03 H
A: unit address - 00–FF H -continued

TOY_AVAILABILITY_COMMAND

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
|  |  |  |  |  |  |  | Dat1 msb | Dat1 lsb | Dat2 msb | Dat2 lsb | Dat3 msb | Dat3 lsb |  |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 07 | 00 | 00 | 00 | 00 | x | x |  |

A Toy transmits this command to declare its existence and receive in response a Channel Pair Selection Command designating the computer that will control it and the radio channels to use.
P: Computer address 00–03 H
A: unit address - 00–FF H

CHANNEL_PAIR_SELECTION_COMMAND

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | - 8 bits - | | - 8 bits - | | - 8 bits - | CRC |
|  |  |  |  |  |  |  | Dat1 msb | Dat1 lsb | Dat2 msb | Dat2 lsb | Dat3 msb | Dat3 lsb |  |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 08 | CH1 | CH2 | 00 | 00 | x | x |  |

Figure 13:
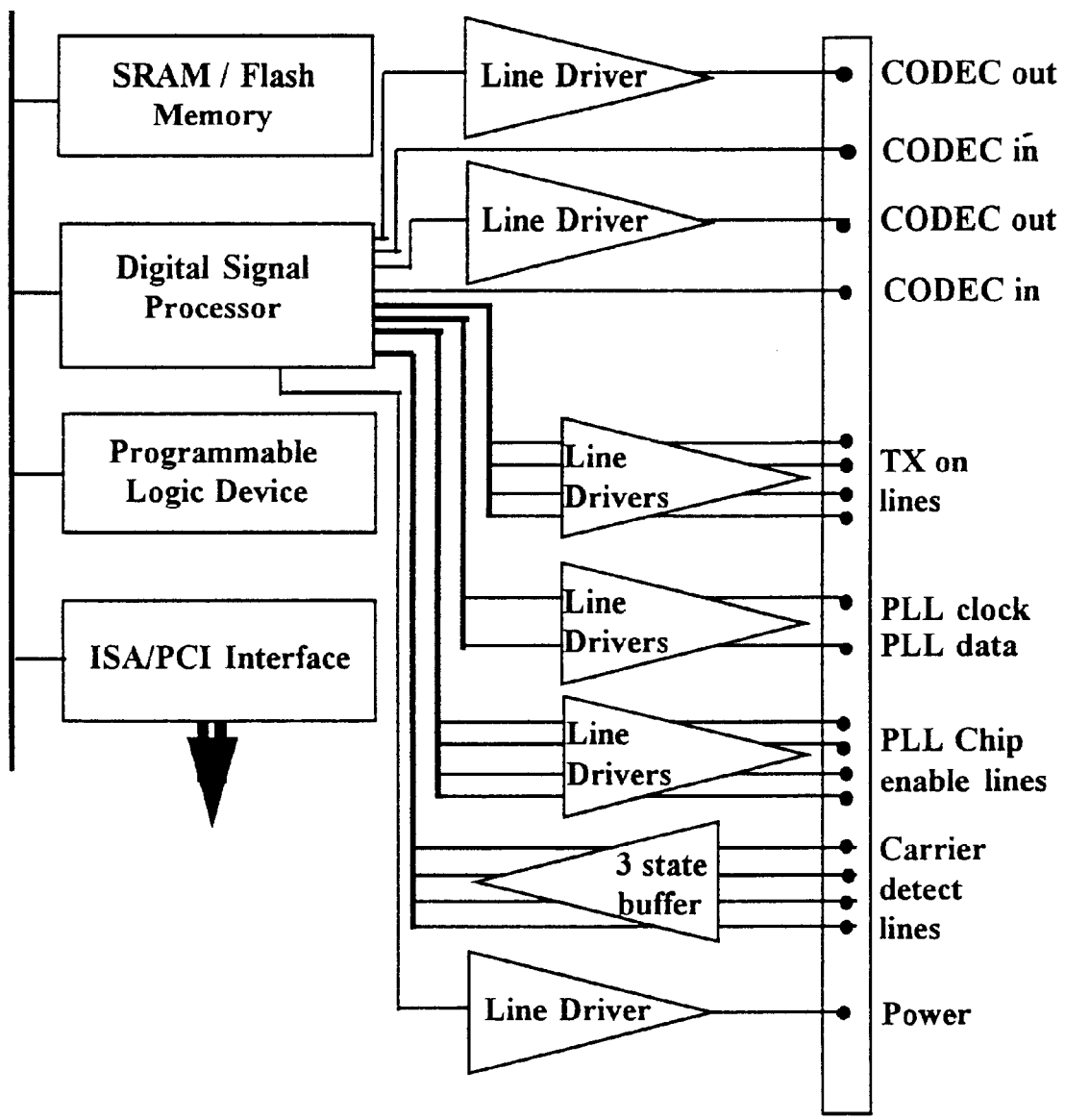
Figure 14:
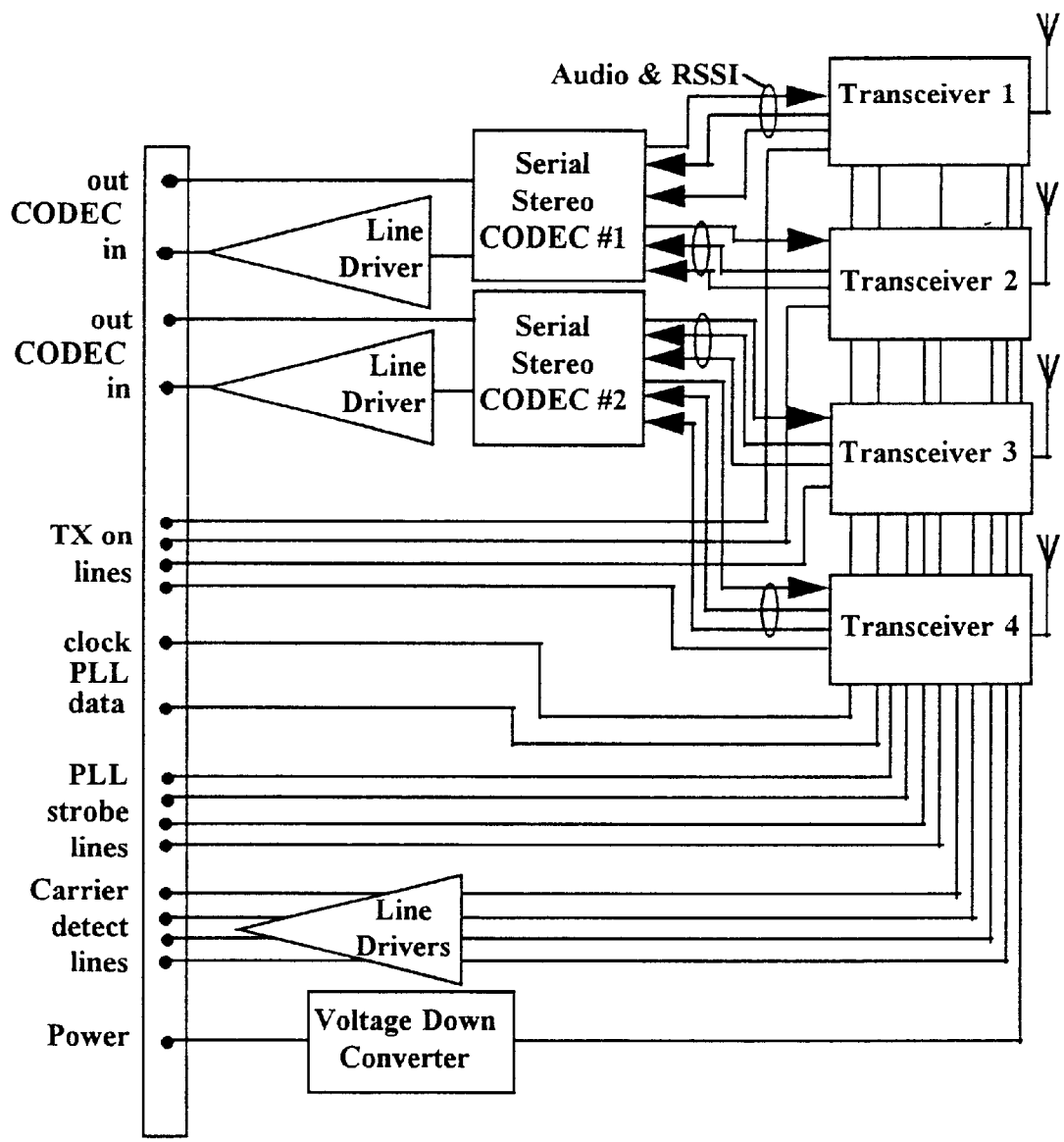
Figure 15A:
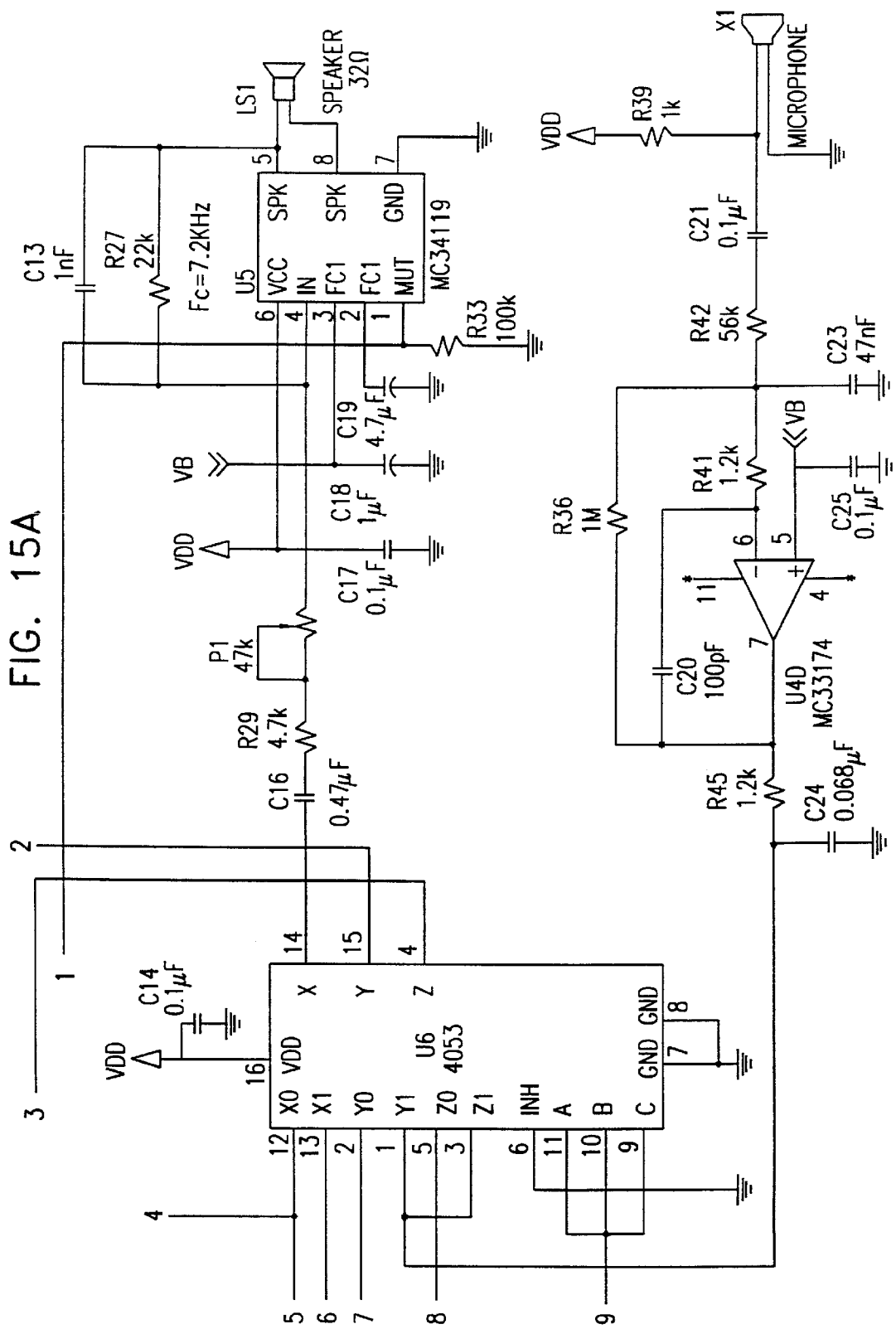
FIGS. 15A–15E, taken together, form a detailed electronic schematic diagram of the toy control device of FIG. 6, suitable for the multi-channel implementation of FIGS. 13 and 14.
Figure 15B:
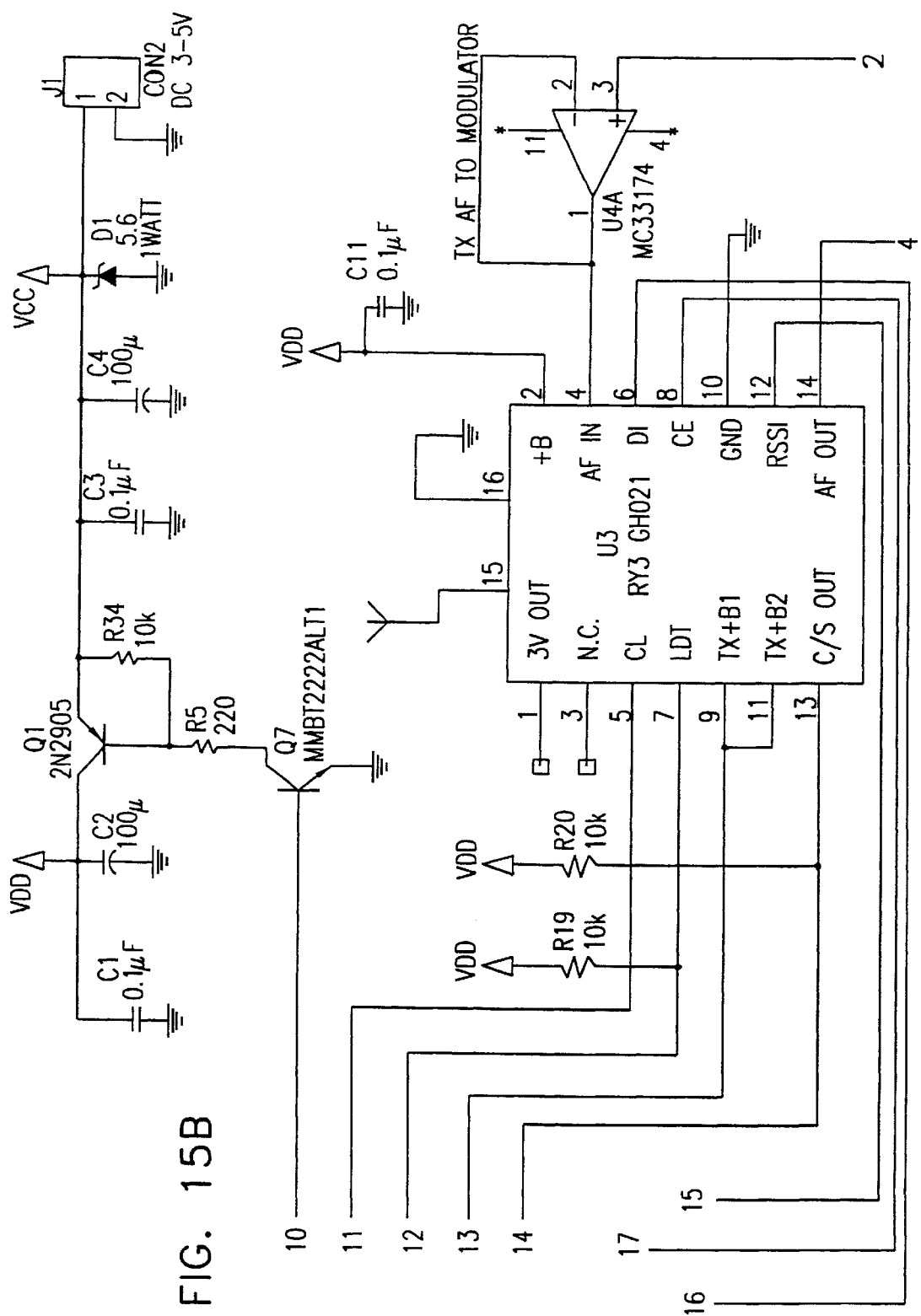
Figure 15C:
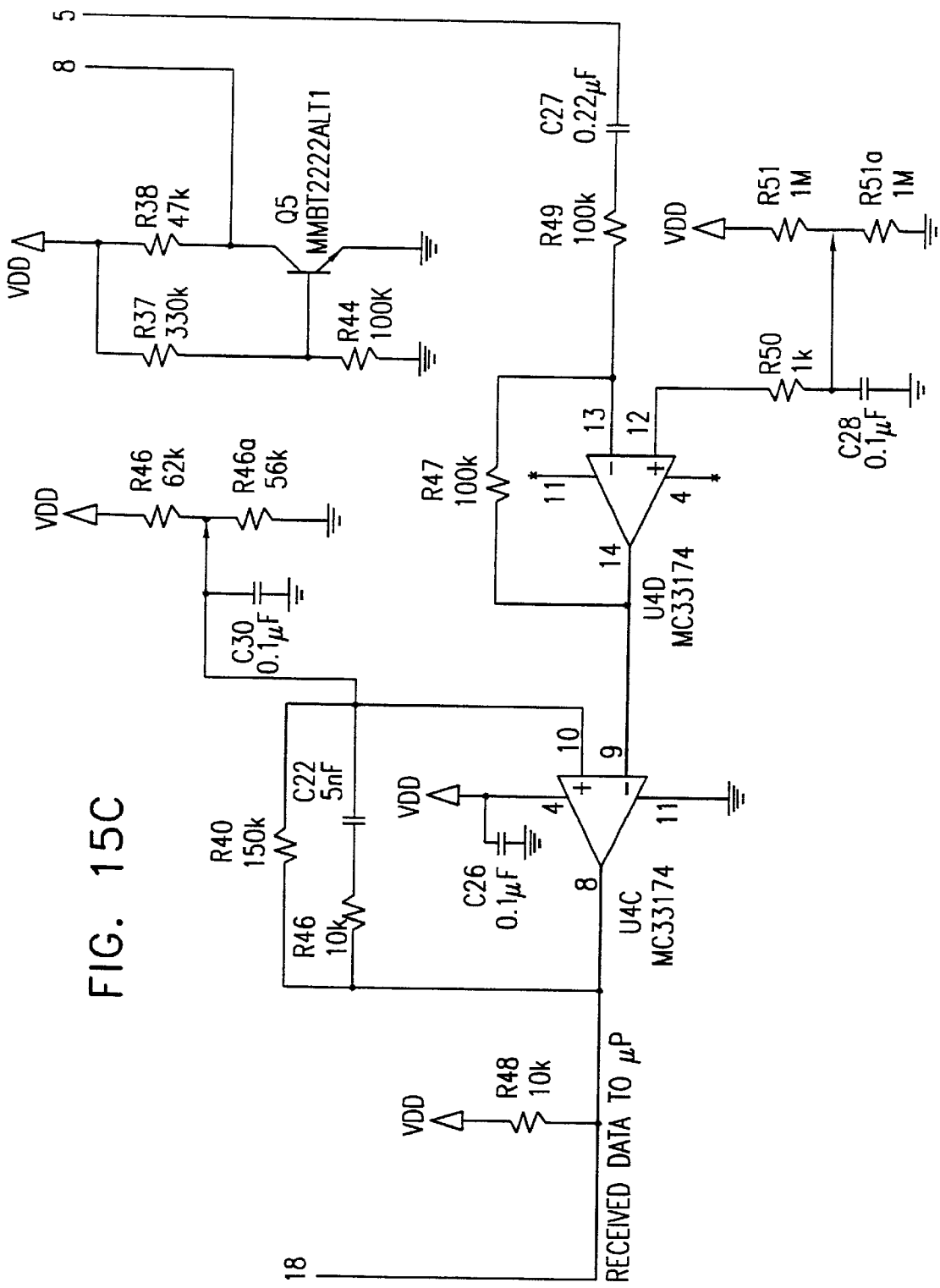
Figure 15D:
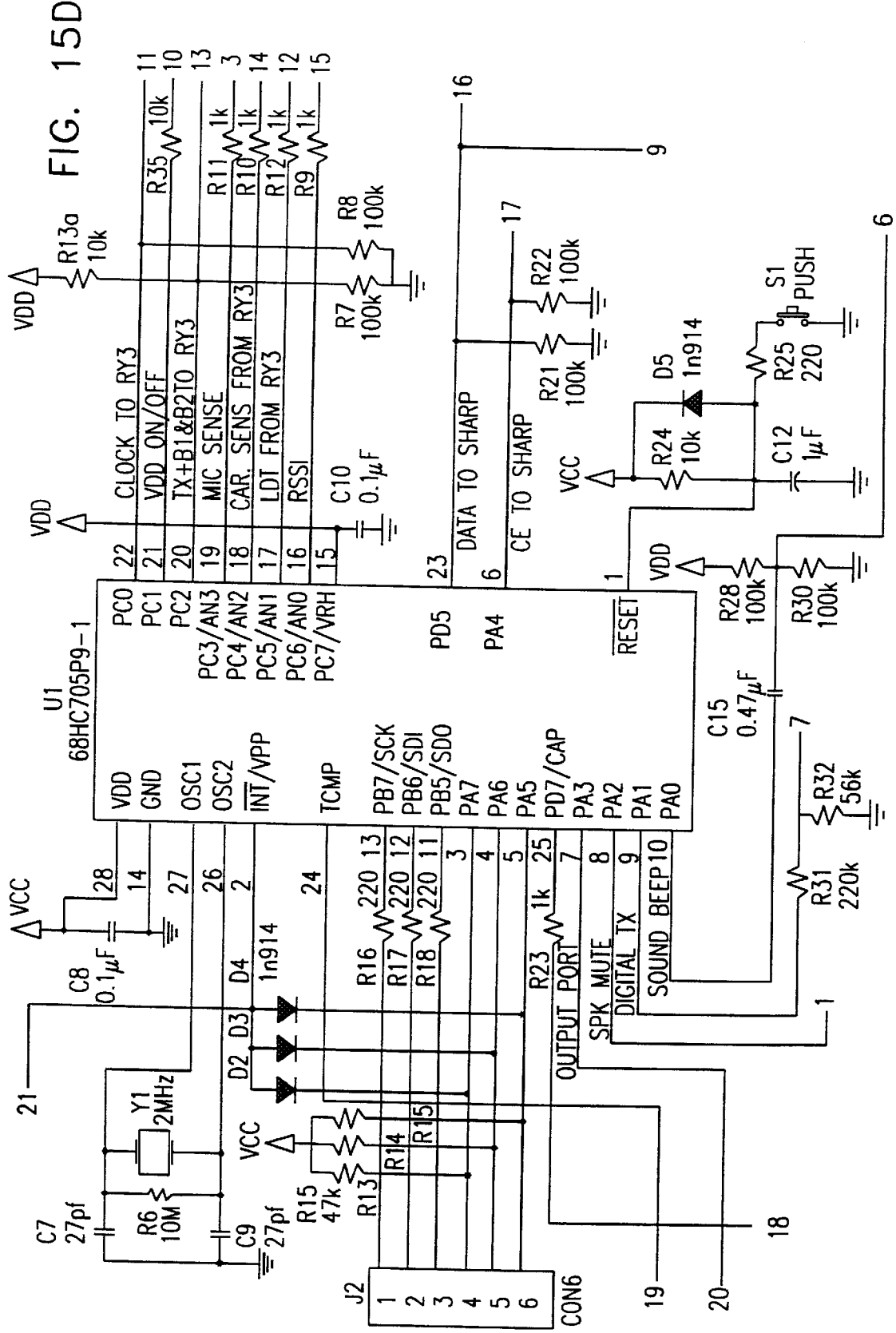
Figure 15E:
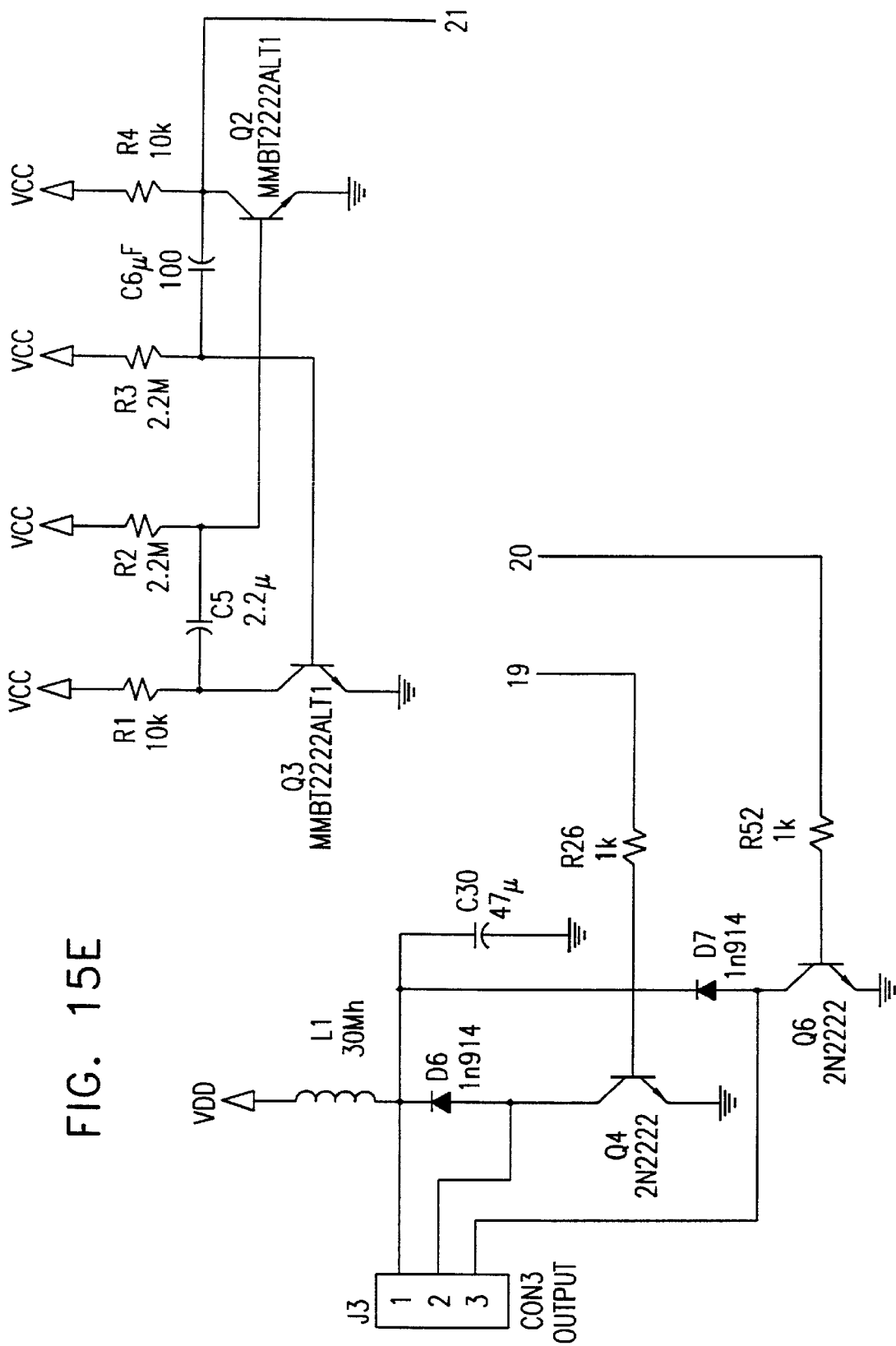

A computer transmits this command in response to a Toy Availability Command to inform the toy the radio channels to be used.
P: Computer address 00–03 H
A: unit address - 00–FF H
CH1: Toy transmit channel 0– F H
CH1: Toy receive channel 0– F H In FIGS. 13 and 14 there are illustrated block diagrams of multiport multi-channel implementation of the computer radio interface 110 of FIG. 1A. FIG. 13 illustrates the processing sub-unit of the computer interface that is implemented as an add-in board installed inside a PC. FIG. 14 is the RF transceiver which is a device external to the computer and connects to the processing subunit by means of a cable. In the present application of the RF unit there are 4 transceivers each capable of utilizing two radio channels simultaneously.

Referring briefly to FIG. 3, it is appreciated that, optionally, both sound and control commands may be transmitted via the MIDI connector 210 rather than transmitting sound commands via the analog connector 220. It is additionally appreciated that the functions of the interfaces 210 and 220 between the computer radio interface 110 and the sound card 190 may, alternatively, be implemented as connections between the computer radio interface 110 to the serial and/or parallel ports of the computer 100, as shown in FIGS. 25A–25F.

If it is desired to provide full duplex communication, each transceiver 260 which forms part of the computer radio interface 110 of FIG. 1A preferably is operative to transmit on a first channel pair and to receive on a different, second channel pair. The transceiver 260 (FIG. 4) which forms part of the toy control device 130 of FIG. 1A preferably is operative to transmit on the second channel and to receive on the first channel.

Any suitable technology may be employed to define at least two channel pairs such as narrow band technology or spread spectrum technologies such as frequency hopping technology or direct sequence technology, as illustrated in FIGS. 15A–15E, showing a Multi-Channel Computer Radio Interface, and in FIGS. 24A–24E showing a Mullti-Channel Toy Control Device.

Appendices E–H, taken together, are computer listings from which a first, DLL-compatible, functions library may be constructed. The DLL-compatible functions library may be subsequently used by a suitable computer system such as an IBM PC to generate a variety of games for any of the computer control systems shown and described herein. Alternatively, games may be generated using the applications generator of FIGS. 11–12C.

To generate DLL (dynamic loading and linking) function library based on Appendices E–H, the following operations are performed:
1) Open Visual C++4.0
2) Go to File Menu
3) Choose New from File Menu
4) Choose Project Workspace
5) Choose Dynamic-Link Library
6) The Project Name is: DLL32.MDP
7) Press Create button
8) Go to File Menu
9) Choose New from File Menu
10) Choose Text File
11) Now write the Source
12) Write on the current page a file containing the contents of Appendix E
13) Press the mouse right button and choose: Insert File Into Project
14) Click on DLL32 project
15) On the save dialog write CREATOR.C
16) Press the OK button
17) Go to File Menu
18) Choose New from File Menu
19) Choose Text File
20) Write on this page a file containing the contents of Appendix F;
21) Go to File Menu
22) Press Save 23) On the save dialog write CRMDI.H
24) Press the OK button
25) Go to File Menu
26) Choose New from File Menu
27) Choose Text File
28) Write on this page a file containing the contents of Appendix G;
29) Go to File Menu
30) Press Save
31) On the save dialog write a file CREATOR.H
32) Press the OK button
33) Go to File Menu
34) Choose New from File Menu
35) Choose Text File
36) Write on this page a file containing the contents of Appendix H;
37) Press the mouse right button and choose: Insert File: Into Project
38) Click on DLL32 project
39) On the save dialog write CREATOR.DEF
40) Press the OK button
41) Go to Insert Menu
42) Press File Into Project . . .
43) On the List Files of Type: Choose Library Files (*.lib)
44) Go to the Visual C++ library directory and choose WINMM.LIB
45) Press the OK button
46) Go to the Build menu
47) Press Rebuild ALL A description of the commands included in the DLL function library based on Appendices E–H now follows:

A. MIDI input functions 1–2:
1. Open MIDI input device
Syntax: long MIDIInOpen(long Device)
This function opens the MIDI device for input.
Return 0 for success, -1 otherwise.
Delphi Example:
Device:=0;
if MIDIInOpen(Device) <>0 Then
MessageDlg('Error opening MIDI input device', mtError, mbOk, 0);
2. Reset MIDI input device
Syntax: long MIDIInReset(void)
this function resets MIDI input device.
Return 0 for success, -1 otherwise.
Delphi Example:
if MIDIInReset <>0 Then
MessageDlg('Error resetting MIDI input device', mtError, mbOk, 0);

B. MIDI output functions 3–6:
3. Close MIDI input device
Syntax: long MIDIInClose(void)
This function close MIDI input device.
Return 0 for success, -1 otherwise.
Delphi Example:
if MIDIInClose <>0 Then MessageDlg('Error closing MIDI input device', mtError, mbOk, 0);
4. Open MIDI output device
Syntax: long MIDIOutOpen(long Device)
This function opens MIDI output device.
Return 0 if success, -1 otherwise.
Delphi Example:
Device:=0;
if MIDIOutOpen(Device) <>0 Then
MessageDlg('Error opening MIDI output device', mtError, mbOk, 0);

5. Reset MIDI Output device
Syntax: long MIDIOutReset(void)
This function resets MIDI output device.
Return 0 if success, -1 otherwise.
Delphi Example:
if MIDIOutReset <>0 Then
MessageDlg('Error resetting MIDI output device', mtError, mbOk, 0);
6. Close MIDI output device
Syntax: long MIDIOutClose(void)
This function close MIDI output device.
Return 0 if success, -1 otherwise.
Delphi Example:
Device:=0;
if MIDIOutClose <>0 Then
MessageDlg('Error opening MIDI output device', mtError, mbOk, 0);

C. General functions 7–10:
7. Send Data
Syntax: long SendData(long Data)
This function sends 4 byte to toy card.
Currently used to send 144 for init toy card.
Return 0 if successful, -1 otherwise.
Delphi Example:
If SendData(144) <>0 Then
MessageDlg('Error sending data to toy', mtError, mbOk, 0);
8. Send Message
Syntax: long SendMessage(char *Mess)
This function sends string to toy card.
Return 1 if successful, or errorcode otherwise.
Delphi Example:
Mess:='00 01 00 00 00 00 00 05 00 0000 01 00 03 00 01 00 00 00';
If SendMessage(Mess) <>1 Then
MessageDlg('Error opening MIDI output device', mtError, mbOk, 0);
9. Check message
Syntax: long CheckMessage(void)
This function returns 0 if no message found from toy card.
Delphi Example:
If CheckMessage Then
Mess:=GetMessage;
10. Get Message
Syntax: char * GetMessage(char *Mess)
This function returns 20 chars toy message if present, or "Time Out" otherwise.
Delphi Example:
If GetMessage="Time Out" Then
MessageDlg('No message received', mtError, mbOk, 0);

D. Toy control functions 11–16:
11. Get Toy Number
Syntax: char * GetToyNumber(void)
This function returns Toy Number of last receiving message, or "00 00 00 00" if no message was received.
12. Get Sensor Number
Syntax: long GetSensorNumber(void)
This function returns Sensor Number of last receiving message, or 255 if no message was received.
13. Toy Reset
Syntax: long ToyReset(char *ToyNumber)
This function sends a reset string to toy.
Return 0 if successful, or -1 otherwise.
14. Toy Transceive
Syntax: char *ToyTranceive(char *ToyNumber,char *Mess)
This function sends message to toy and waits 3 sec to acknowledge.
Return "Ack. Ok" if received, or "Time Out" if not.

15. Prepare Toy Talk
Syntax: char *PrepareToyTalk(char *ToyNumber, char *WaveFile)
This function prepares toy card to generate sound using; toy speaker.
After calling this function, WaveFile may be played and heard at toy speaker.
Return "Ack. Ok" if successful, or "Time Out" otherwise.
16. Go To Sleep Mode
Syntax: char *GoSleep(char *ToyNumber)
This function sends to toy the sleep command. Return "Ack. Ok" if successful, or "Time Out" otherwise.

Appendices I–O, taken together, are computer listings of a second functions library which may be used to generate a variety of games for any of the computer control systems shown and described herein in conjunction with a Director 5.0 software package, marketed by Macromedia Inc., 600 Townsend St., San Francisco, Calif., 94103.

To generate an XObject function library based on Appendices I–O, the following operations are performed:
1) Create a new directory: C:\XOBJECT\by writing (MD C:\XOBJECT\)
2) Open Visual C++1.5
3) On the File menu choose NEW
4) Generate a file which contains the contents of Appendix I;
5) Choose Save As from the File Menu
6) Give the file generated in step (4) a name by punching C:\XOBJECT\CREATOR.MAK
7) Press the OK button
8) On the File menu choose NEW
9) Generate a file which contains the contents of Appendix J;
10) On the File menu choose Save As.
11) In the File Name: dialog, write C:\XOBJECT\CREATOR.C
12) Press the OK button
13) On the File menu choose NEW
14) Generate a file which contains the contents of Appendix K;
15) On the File menu choose Save As.
16) In the File Name: dialog write C:\XOBJECT\CREATOR.H
17) Press the OK button
18) On the File menu choose NEW
19) Generate a file which contains the contents of Appendix L;
20) On the File menu choose Save As.
21) In the File Name: dialog write C:\OBJECT\CRMIDI.H
22) Press the OK button
23) On the File menu choose NEW
24) Generate a file which contains the contents of Appendix M;
25) On the File menu choose Save As.
26) In the File Name: dialog write C:\OBJECT\XOBJECT.H
27) Press the OK button
28) On the File menu choose NEW
29) Generate a file which contains the contents of Appendix N;
30) On the File menu choose Save As.
31) In the File Name: dialog write C:\OBJECT\CREATOR.DEF
32) Press the OK button
33) On the File menu choose NEW
34) Generate a file which contains the contents of Appendix O;
35) On the File menu choose Save As.
36) In the File Name: dialog write C:\OBJECT\CREATOR.RC
37) Press the OK button
38) On the Project Menu choose Open
39) In the File Name dialog write C:\OBJECT\CREATOR.MAK
40) Press Rebuild All from the Project Menu A description of the commands included in the XObject function library based on Appendices I–O now follows:
A. MIDI input functions 1–3:
1. Open MIDIinput device
Syntax: long MIDIInOpen(long Device)
This function opens the MIDI device for input.
Return 0 for success, −1 otherwise.
Delphi Example:
Device:=0;
if MIDIInOpen(Device) <>0 Then
MessageDlg('Error opening MIDI input device', mtError, mbOk, 0);
2. Reset MIDI input device
Syntax: long MIDIInReset(void)
This function resets MIDI input device.
Return 0 for success, −1 otherwise.
Delphi Example:
if MIDIInRest <>0 Then
MessageDlg('Error resetting MIDI input device', mtError, mbOk, 0);
3. Close MIDI input device
Syntax: long MIDIInClose(void)
This function turns off MIDI input device.
Return 0 for success, −1 otherwise.
Delphi Example:
if MIDIInClose <>0 Then
MessageDlg('Error closing MIDI input device', mtError, mbOk, 0);
B. MIDI output functions 4–6:
4. Open MIDI output device
Syntax: long MIDIOutOpen(long Device)
This function opens MIDI output device.
Return 0 if success, −1 otherwise.
Delphi Example:
Device:=0;
if MIDIOutOpen(Device) <>0 Then
MessageDlg('Error opening MIDI output device', mtErTor, mbOk, 0);
5. Reset MIDI Output device
Syntax: long MIDOutReset(void)
This function resets MIDI output device.
Return 0 if success, −1 otherwise.
Delphi Example:
if MIDIOutReset <>0 Then
MessageDlg('Error resetting MIDI output device', mtError, mbOk, 0);
6. Close MIDI output device
Syntax: long MIDIOutClose(void)
This function close MIDI output device.
Return 0 if success, −1 otherwise.
Delphi Example:
Device:=0;
if MIDIOutClose <>0 Then
MessageDlg('Error opening MIDI output device', mtError, mbOk, 0);
C. General functions 7–11:
7. New
Syntax: Creator(mNew)
This function creates a new instance of the XObject The result is 1 if successful, or error code otherwise.
Example:
openxlib "Creator.Dll"
Creator(mNew)
. . .
Creator(mDispose)
See also: Dispose
8. Dispose
Syntax: Creator(mNew)
This function disposes of XObject instance.
The result is 1 if successful, or error code otherwise.
Example:
openxlib "Creator.Dll"
Creator(mNew)
. . .
Creator(mDispose)
See also: New
9. Send Message
Syntax: long SendMessage(char *Mess)
This function sends string to toy card.
Return 1 if successful, or error code otherwise.
Delphi Example:
Mess:='00 01 00 00 00 00 00 05 00 00 00 01 00 03 00 01 00 00 00';
If SendMessage(Mess) <>1 Then
MessageDlg('Error opening MIDI output device', mtErnor, mbOk, 0)
10. Check message
Syntax: long CheckMessage(void)
This function returns 0 if no message found from toy card.
Delphi Example:
If CheckMessage Then
Mess:=GetMessage;
11. Get Toy Message
Syntax: GetToyMessage
This function receives message from toy.
The result is a message.
If during 3 sec there is no message, the result is "Time Out".
Example:
set message GetToyMessage
If message="Time Out" Then
put "No message receiving"
End If
See also: Check for Message
D. Toy control functions 12–17:
12. Get Toy Number
Syntax: char * GetToyNumber(void)
This function returns Toy Number of last receiving message, or "00 00 00 00" if no message was received.
13. Get Sensor Number
Syntax: long GetSensorNumber(void)
This function returns Sensor number of last receiving message, or 255 if no message was received.
14. Toy Reset
Syntax: long ToyReset(char *ToyNumber)
This function sends a reset string to toy.
Return 0 if successful, or −1 otherwise.
15. Toy Tranceive
Syntax: char *ToyTranceive(char *ToyNumber,char *Mess)
This function sends to toy message and waits 3 sec to acknowledge.
Return "Ack. Ok" if received, or "Time Out" if not.
16. Prepare Toy Talk
Syntax: char *PrepareToyTalk(char *ToyNumber, char *WaveFile)
This function prepares toy card to generate sound using from toy speaker.

After calling this function, WaveFile may be played and heard at toy speaker.
Return "Ack. Ok" if successful, or "Time Out" otherwise.
17. Go To Sleep Mode
Syntax: char *GoSleep(char *ToyNumber)
This function sends to toy the sleep command.
Return "Ack. Ok" if successful, or "Time Out" otherwise.

To use the XObject function library in conjunction with the Director, the following method may be employed:
1) Open Director Version 5.0 program
2) From File Menu, choose New
3) Press the Movie Option
4) Go to Windows menu and press Cast
5) Go to the first Script on the cast
6) On the Window menu case Script
7) Write the script of the desired game.
8) Repeat from step 5 until all desired script(s) have been written. Press (Ctrl+Alt+P) to run the Application.

Appendices P–W, taken together, are computer listings of another preferred software implementation, alternative to the implementation of Appendices A–O.

To construct and operate the implementation of Appendices P–W, the following operations are performed:
1) Provide a computer capable of running the WINDOWS 95 operating system;
2) Prepare computer files for each of the files contained in Appendix P and place the computer files in a directory named "ocx";
3) Prepare a computer file for the file contained in Appendix Q, extract the compressed contents of the file using Winzip version 6.2 available from Nico Mak Computing, Inc. of Bristol, Conn. 06011 USA, and place the extracted computer files in the directory named "ocx";
4) Prepare computer files for each of the files contained in Appendix R and place the computer files in a directory named "player";
5) Prepare a computer file for the file contained in Appendix S, extract the compressed contents of the file using Winzip version 6.2, and place the extracted computer files in a subdirectory named "res" contained in the directory named "player";
6) Prepare computer files for each of the files contained in Appendices T and U and place the computer files in a directory named "xmidi5";
7) Prepare a computer file for the file contained in Appendix V, extract the compressed contents of the file using Winzip version 6.2, and place the extracted computer files in the directory named "xmidi5";
8) Prepare a computer file named NEWDEMO.CS the file contained in Appendix W and place the files in the directory named "player";
9) Install the Microsoft Development Studio Version 5.0 available from Microsoft Corporation, One Microsoft Way, Redmond, Wash. USA;
10) Run the Microsoft Development Studio, select FILE/OPEN WORKSPACE from the menu, select the file \OCX\NEWSR.DSW, select BUILD from the menu, select BUILD NEWDEMO.OCX, select FILE/OPEN WORKSPACE from the menu, select the file \PLAYER\PLAYER.DSW, select BUILD from the menu, select BUILD PLAYER.EXE;
11) Compile \XMIDI5\XMIDI.DSW using Visual C++ Version 5.0 and run the OCX registration program REGSVR32.EXE with XMIDI5.OCX on the command line;
12) Install the "American English Text To Speech Software Development Kit" for WINDOWS 95/WINDOWS NT from Lernout & Hauspie Speech Products, Sint-Krispisnstraat 7, 8900 Leper, Belgium;

13) Run PLAYER.EXE in DOS mode from the \PLAYER directory by invoking "player newdemo.cs".

Reference is now made to FIG. 16 which is a simplified flowchart illustration of a preferred method of operation of a computer radio interface (CRI) 110 operative to service an individual computer 100 of FIG. 1A without interfering with other computers or being interfered with by the other computers, each of which is similarly serviced by a similar CRI. Typically, the method of FIG. 16 is implemented in software on the computer 100 of FIG. 1A.

The CRI includes a conventional radio transceiver (260 of FIG. 4) which may, for example, comprise an RY3 GB021 having 40 channels which are divided into 20 pairs of channels. Typically, 16 of the channel pairs are assigned to information communication and the remaining 4 channel pairs are designated as control channels.

In the method of FIG. 16, one of the 4 control channel pairs is selected by the radio interface (step 810) as described in detail below in FIG. 17. The selected control channel pair i is monitored by a first transceiver (step 820) to detect the appearance of a new toy which is signaled by arrival of a toy availability command from the new toy (step 816). When the new toy is detected, an information communication channel pair is selected (step 830) from among the 16 such channel pairs provided over which game program information will be transmitted to the new toy. A preferred method for implementing step 830 is illustrated in self-explanatory flowchart FIG. 18A. The "Locate Computer" command in FIG. 18A (step 1004) is illustrated in the flowchart of FIG. 18B.

The identity of the selected information communication channel pair, also termed herein a "channel pair selection command", is sent over the control channel pair to the new toy (step 840). A game program is then begun (step 850), using the selected information communication channel pair. The control channel pair is then free to receive and act upon a toy availability command received from another toy. Therefore, it is desirable to assign another transceiver to that control channel pair since the current transceiver is now being used to provide communication between the game and the toy.

To assign a further transceiver to the now un-monitored control channel, the transceiver which was formerly monitoring that control channel is marked as busy in a transceiver availability table (step 852). The transceiver availability table is then scanned until an available transceiver, i.e. a transceiver which is not marked as busy, is identified (step 854). This transceiver is then assigned to the control channel i (step 858).

Figure 17:
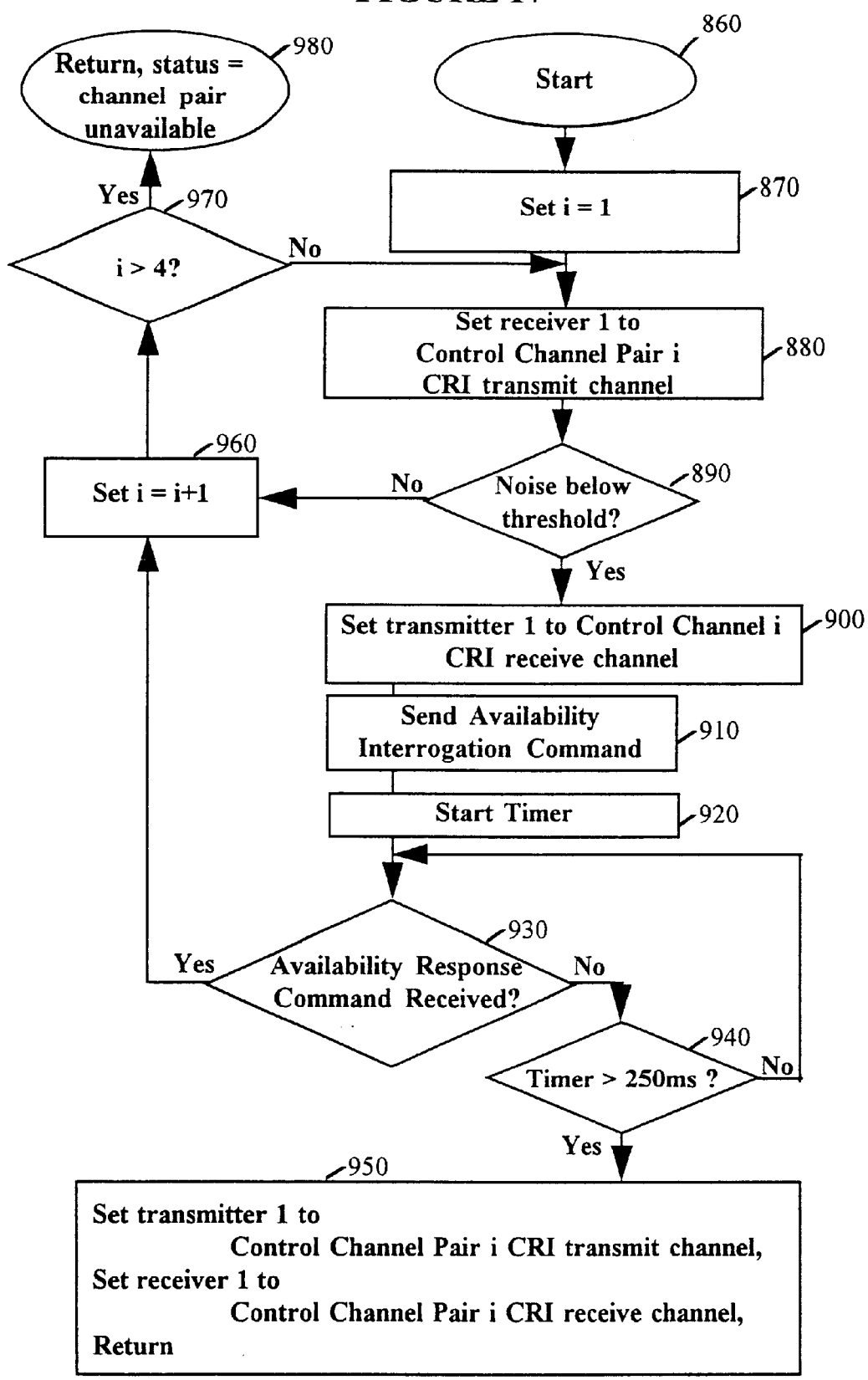
Figure 18A:
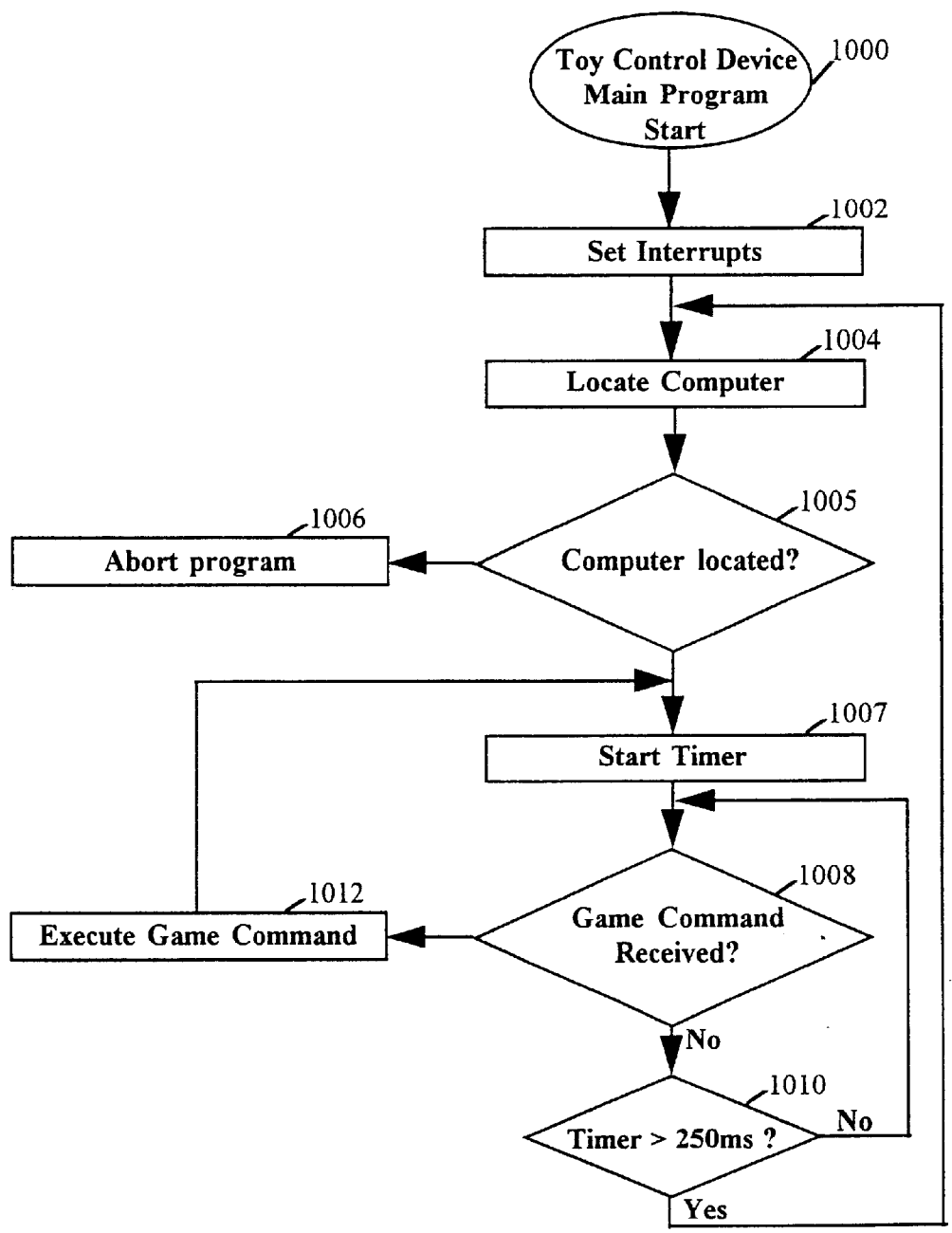
FIG. 18A is a simplified flowchart illustration of a preferred method for implementing the "select information communication channel pair" step of FIG. 16.
Figure 18B:
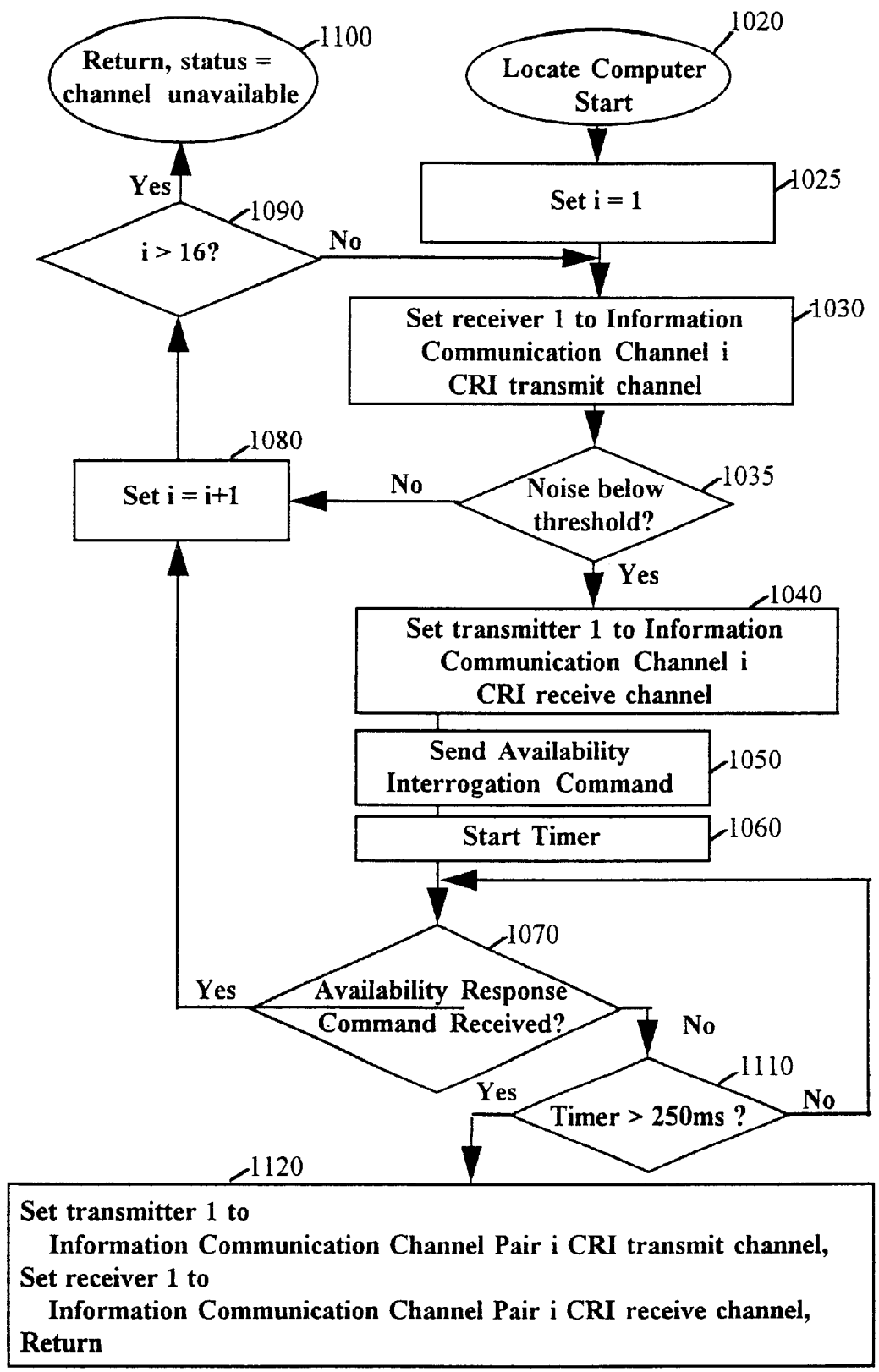
FIG. 18B is a simplified flowchart illustration of a preferred method for performing the "locate computer" step of FIG. 18A.

FIG. 17 is a simplified flowchart illustration of a preferred method for implementing "select control channel pair" step 810 of FIG. 16. In FIG. 17, the four control channels are scanned. For each channel pair in which the noise level falls below a certain threshold (step 895), the computer sends an availability interrogation command (step 910) and waits for a predetermined time period, such as 250 ms, for a response (steps 930 and 940). If no other computer responds, i.e. sends back an "availability response command", then the channel pair is deemed vacant. If the channel pair is found to be occupied the next channel is scanned. If none of the four channel pairs are found to be vacant, a "no control channel available" message is returned.

Figure 19:
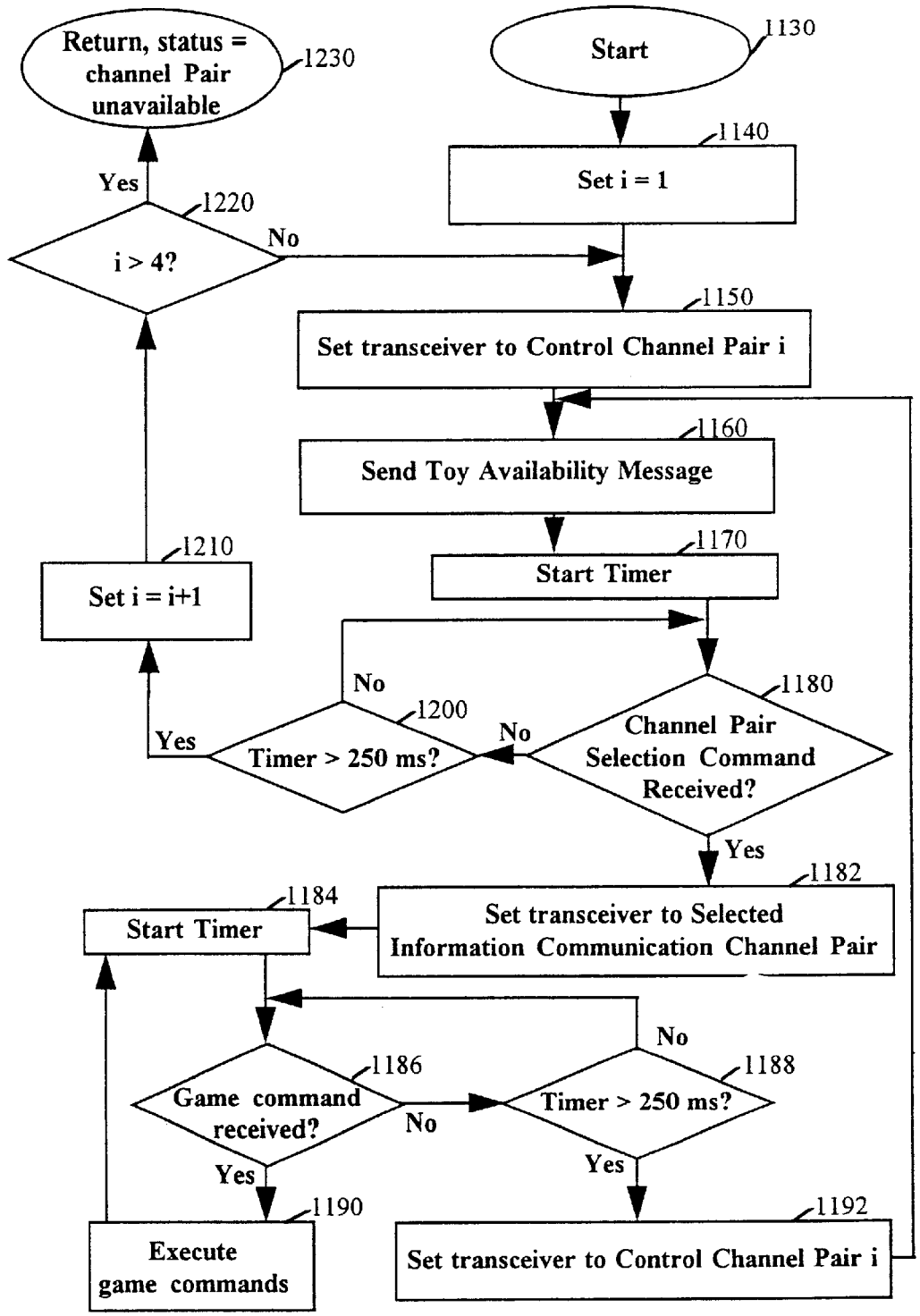

FIG. 19 is a self-explanatory flowchart illustration of a preferred method of operation of the toy control device 130 which is useful in conjunction with the "multi-channel" embodiment of FIGS. 16–18B. i=1, . . . , 4 is an index of the control channels of the system. The toy control device sends a "toy availability command" (step 1160) which is a message advertising the toy's availability, on each control channel i in turn (steps 1140, 1150, 1210), until a control channel is reached which is being monitored by a computer. This becomes apparent when the computer responds (step 1180) by transmitting a "channel pair selection command" which is a message designating the information channel pair over which the toy control device may communicate with the game running on the computer. At this point (step 1190), the toy control device may begin receiving and executing game commands which the computer transmits over the information channel pair designated in the control channel i.

Figure 20:
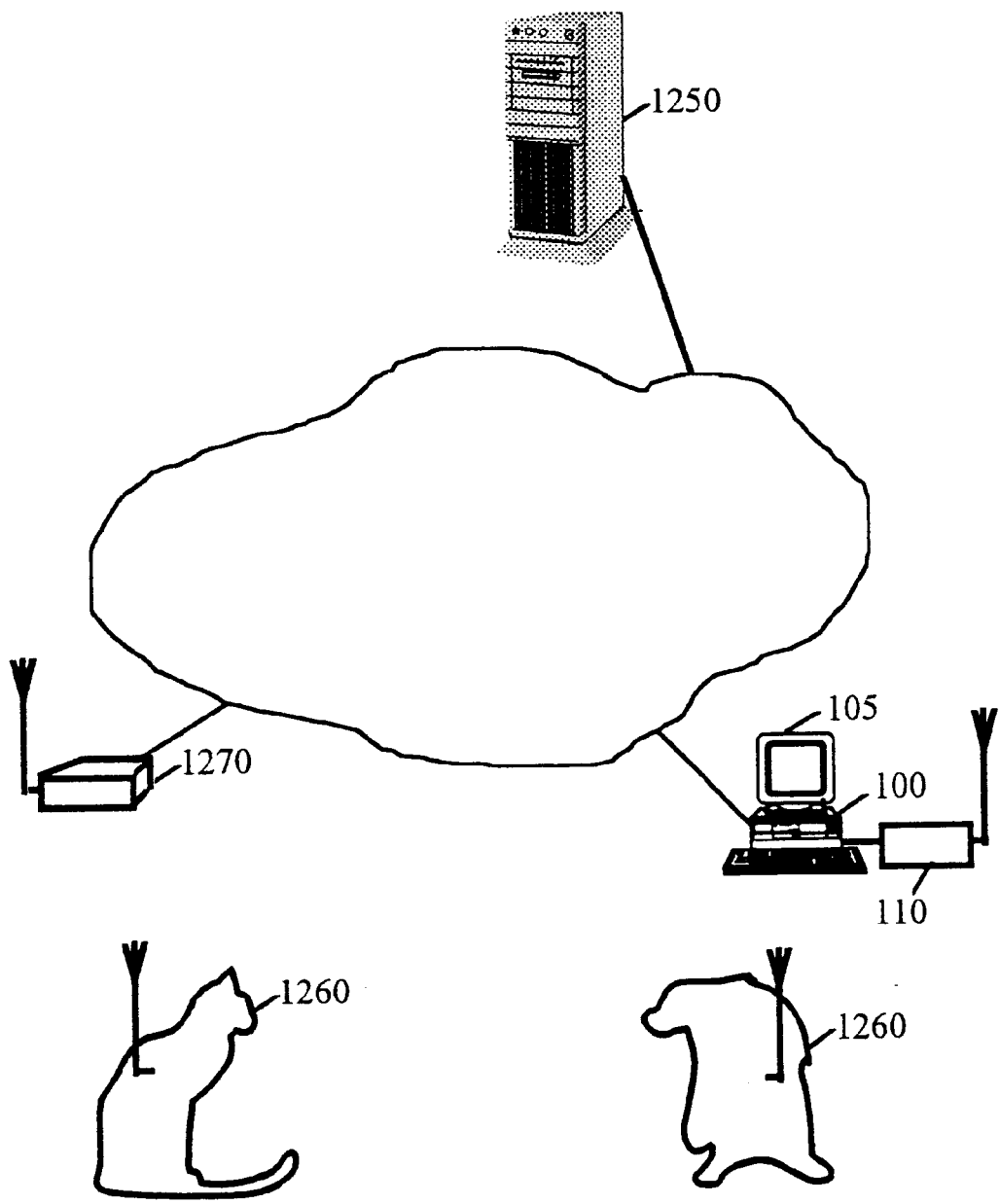

According to a preferred embodiment of the present invention, a computer system is provided, in communication with a remote game server, as shown in FIG. 20. The remote game server 1250 is operative to serve to the computer 100 at least a portion of at least one toy-operating game, which operates one or more toys 1260. Optionally, an entire game may be downloaded from the remote game server 1250. However, alternatively, a new toy action script or new text files may be downloaded from the remote game server 1250 whereas the remaining components of a particular game may already be present in the memory of computer 100.

Downloading from the remote game server 1250 to the computer 100 may take place either off-line, before the game begins, or on-line, in the course of the game. Alternatively, a first portion of the game may be received off-line whereas an additional portion of the game is received on-line.

The communication between the remote game server 1250 and the computer 100 may be based on any suitable technology such as but not limited to ISDN; X.25; Frame-Relay; and Internet.

An advantage of the embodiment of FIG. 20 is that a very simple computerized device may be provided locally, i.e. adjacent to the toy, because all "intelligence" may be provided from a remote source. In particular, the computerized device may be less sophisticated than a personal computer, may lack a display monitor of its own, and may, for example, comprise a network computer 1270.

Figure 21:
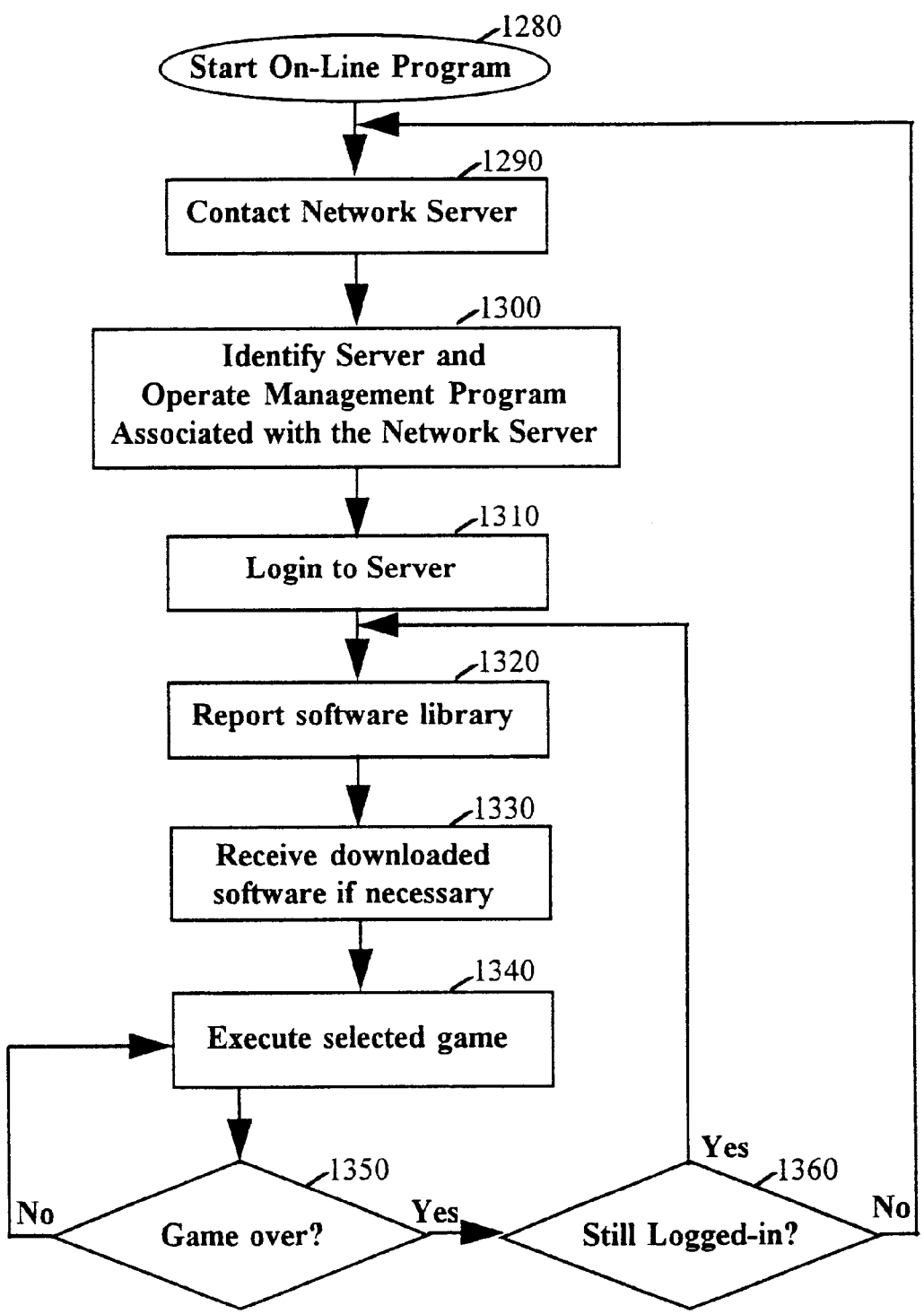

FIG. 21 is a simplified flowchart illustration of the operation of the computer 100 or of the network computer 1260 of FIG. 20, when operating in conjunction with the remote server 1250.

Figure 22:
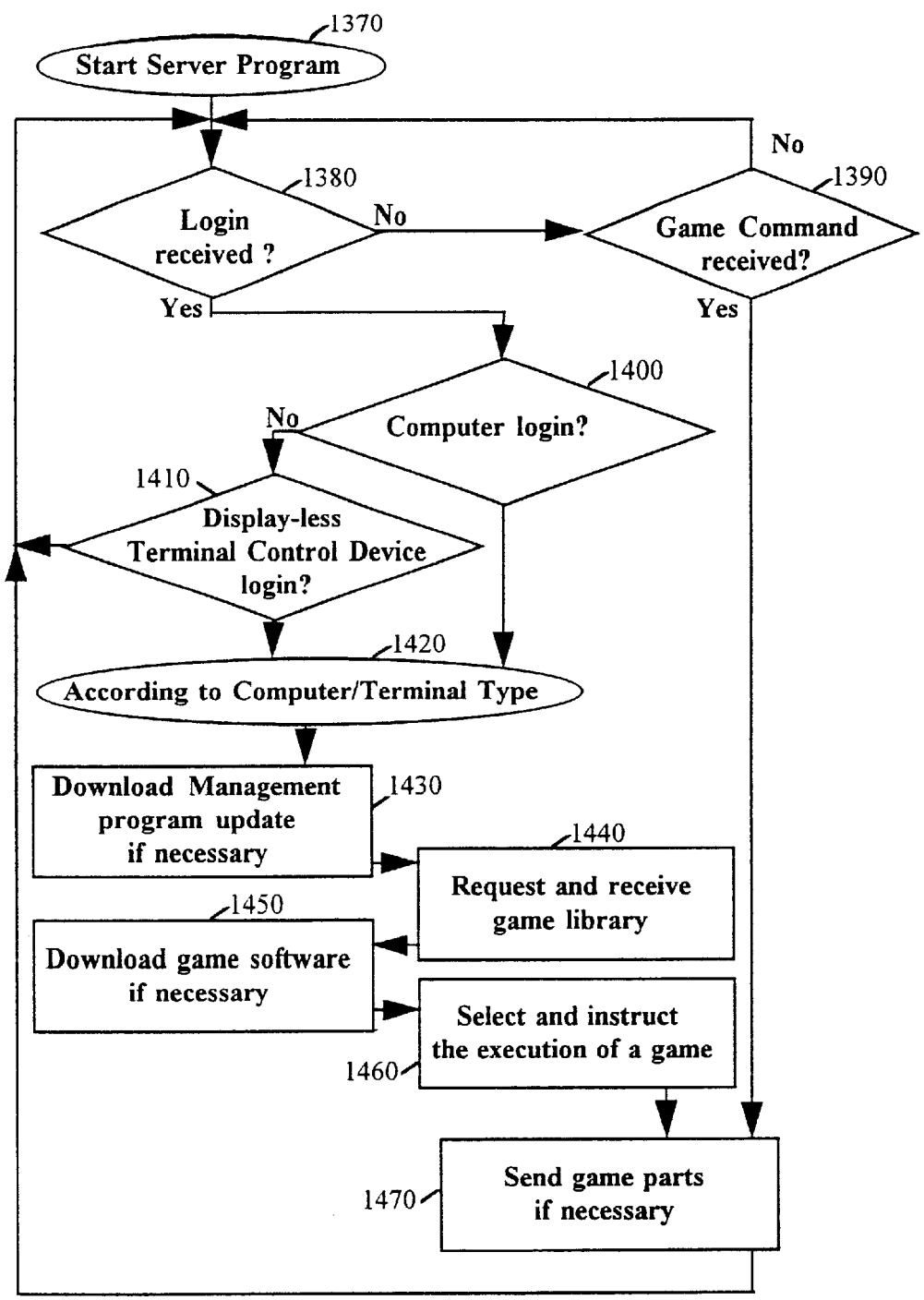

FIG. 22 is a simplified flowchart illustration of the operation of the remote game server 1250 of FIG. 20.

Figure 23:
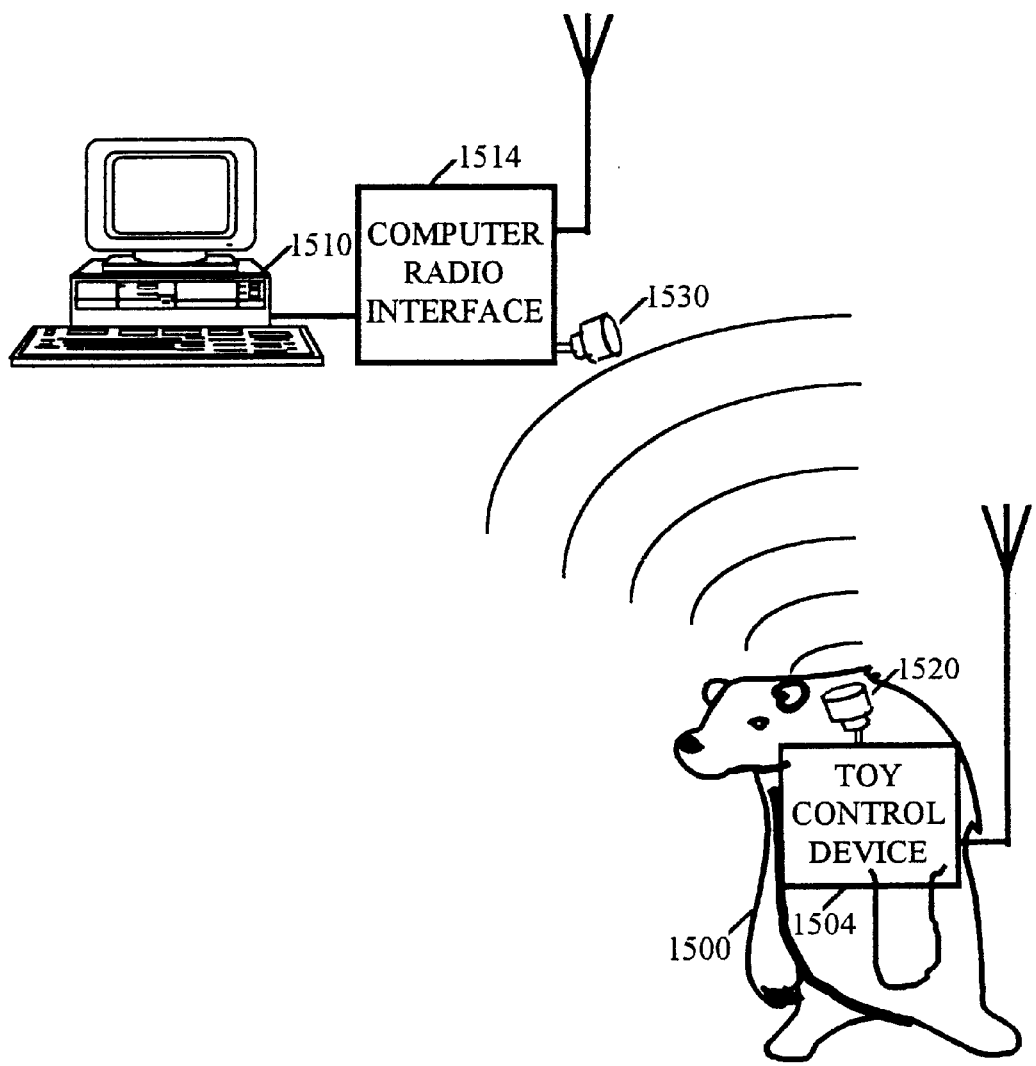
Figure 24A:
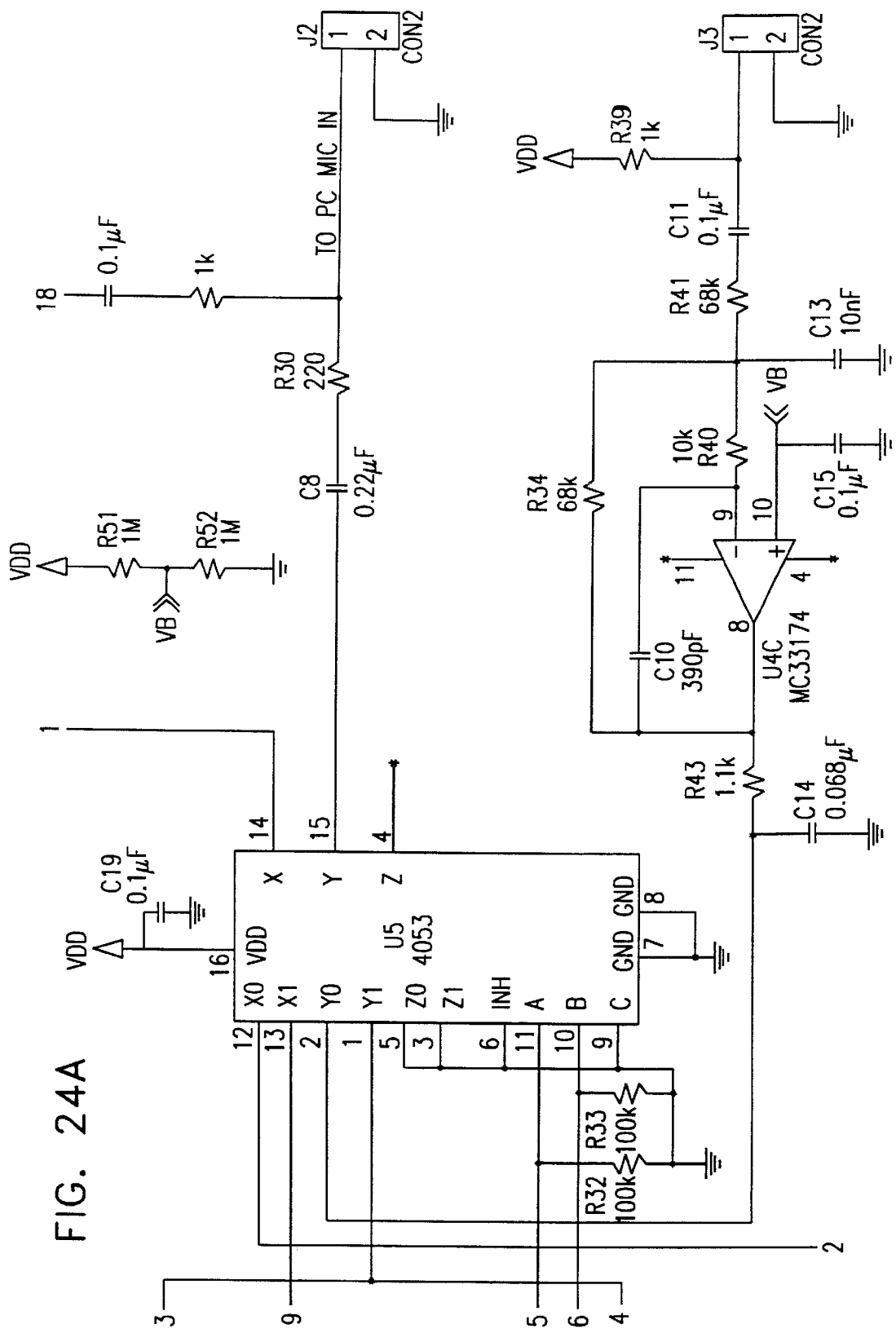
FIGS. 24A–24E, taken together, form a detailed electronic schematic diagram of a multi-channel implementation of the computer radio interface 110 of FIG. 3 which is similar to the detailed electronic schematic diagrams of FIGS. 5A–5D except for being multi-channel, therefore capable of supporting full duplex applications, rather than single-channel.
Figure 24B:
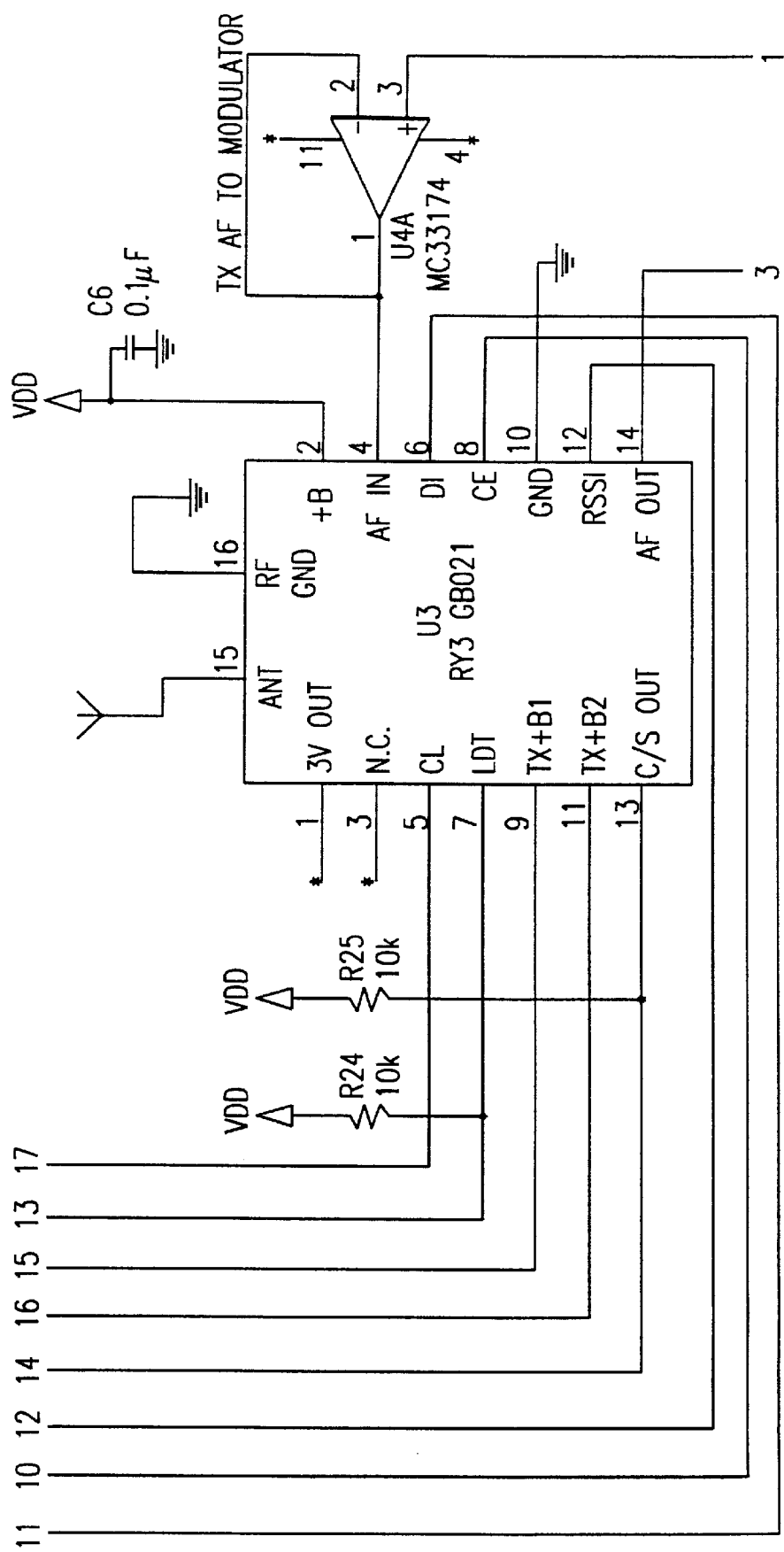
Figure 24C:
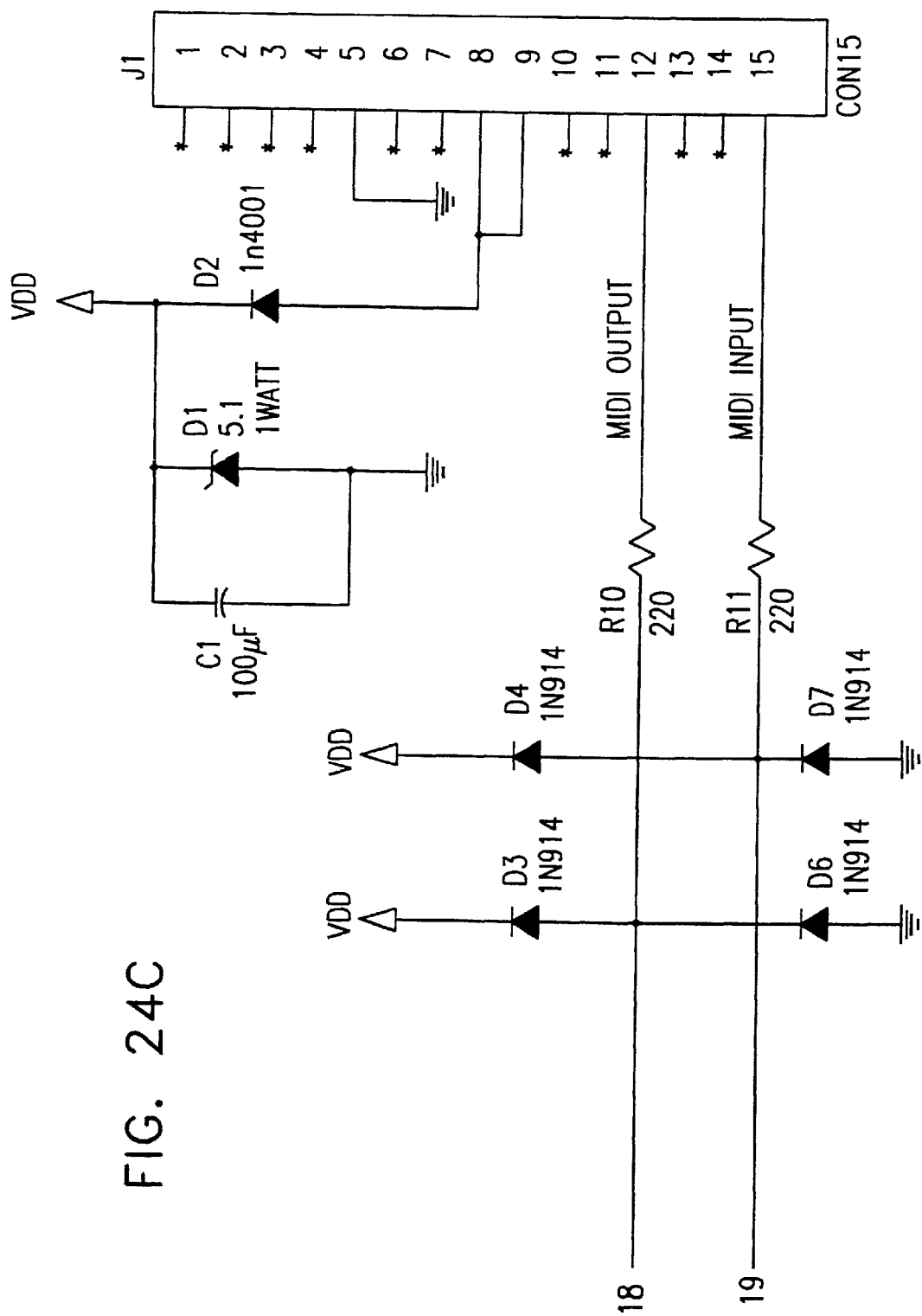
Figure 24D:
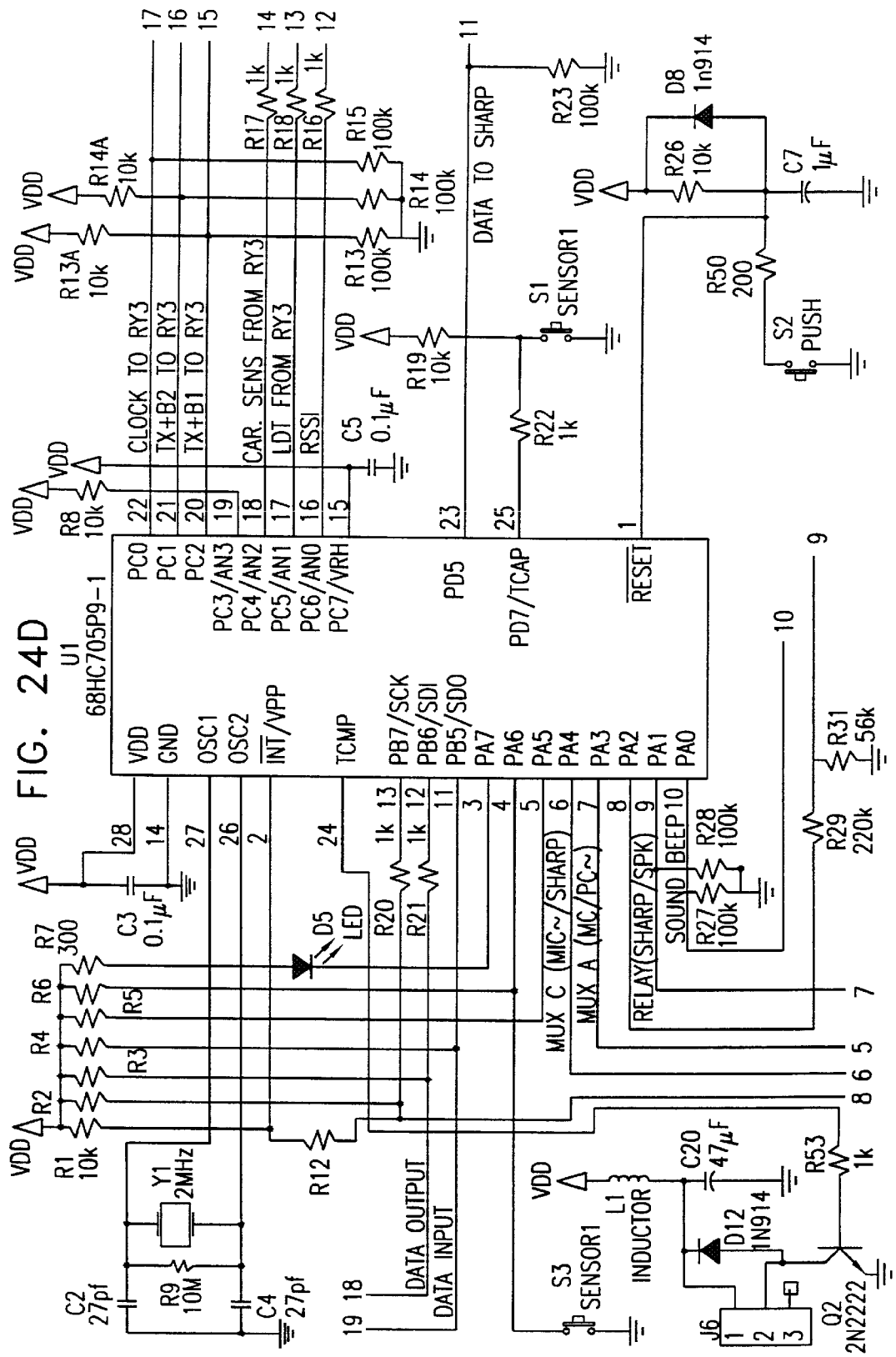
Figure 24E:
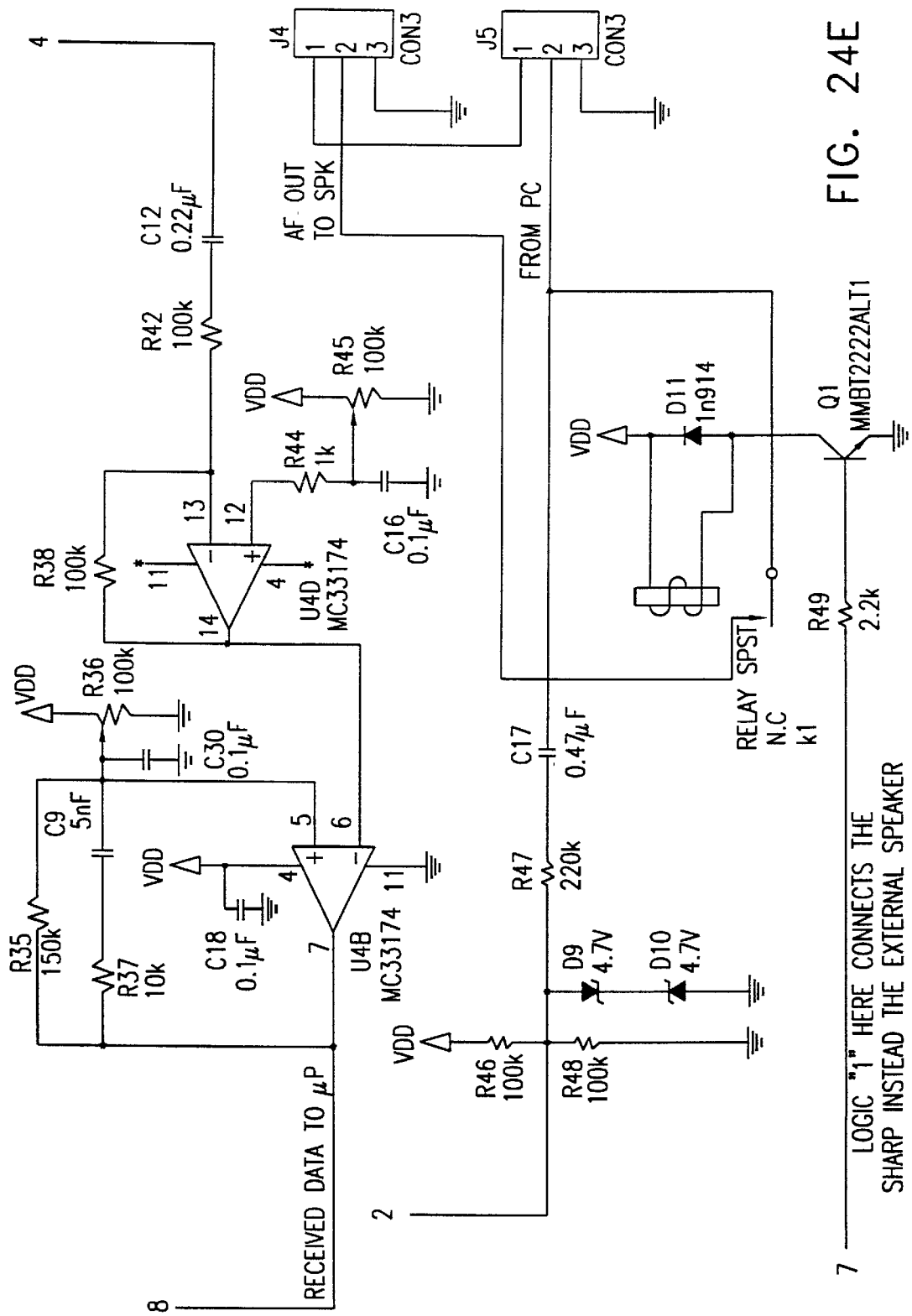
Figure 25A:
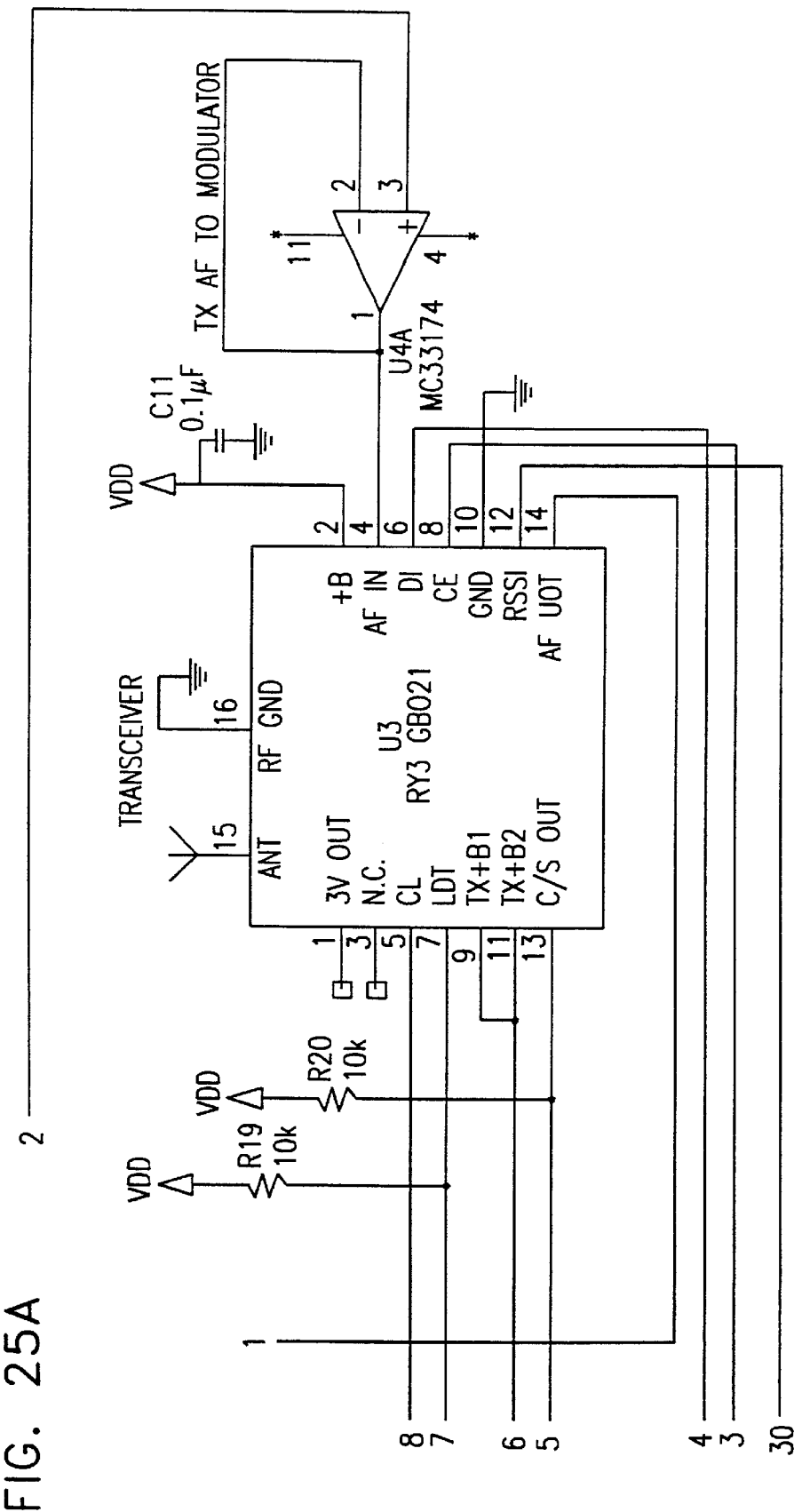
FIGS. 25A–25E, taken together, form a detailed schematic illustration of a computer radio interface which connects to a serial port of a computer rather than to the sound board of the computer.
Figure 25B:
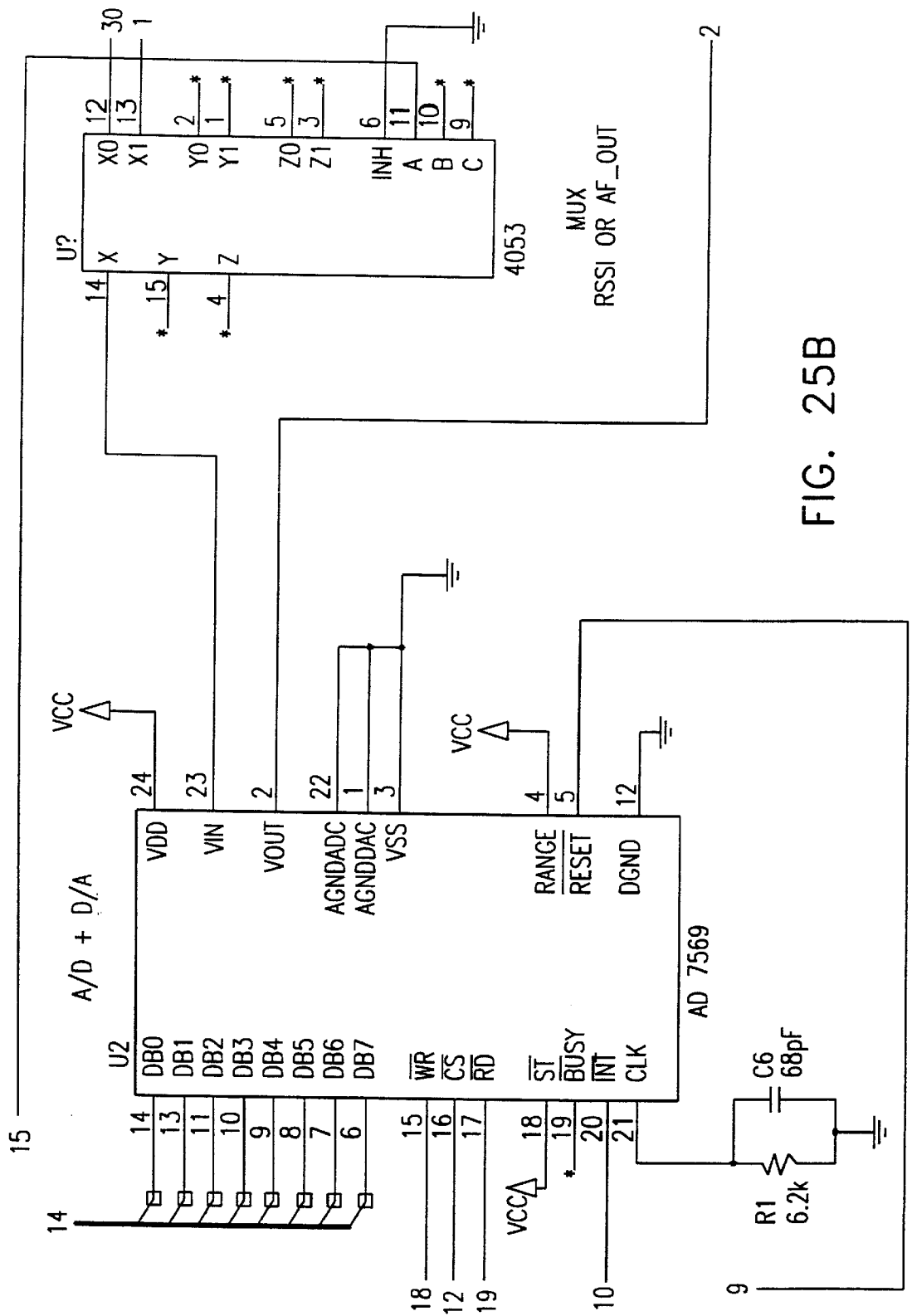
Figure 25C:
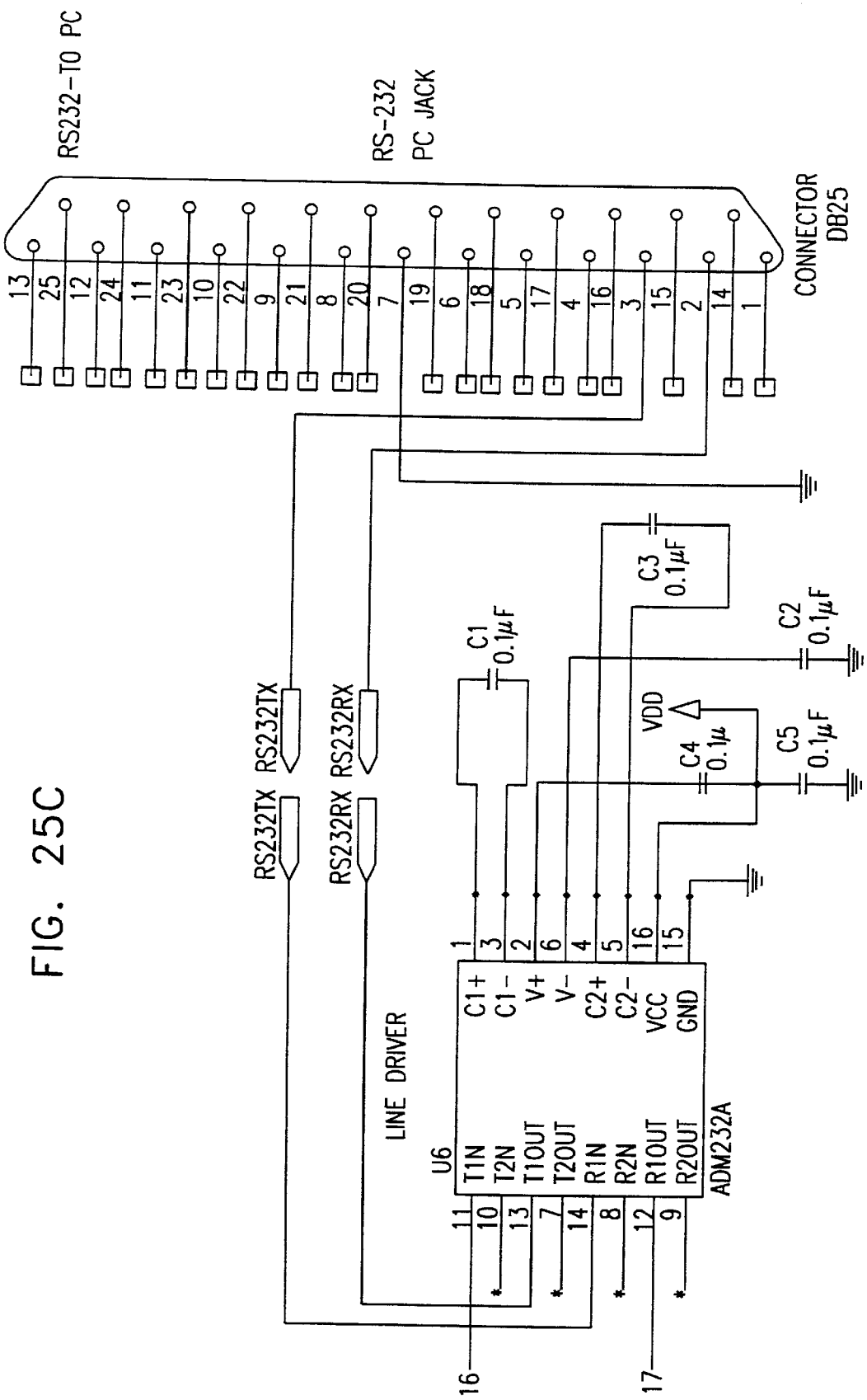
Figure 25D:
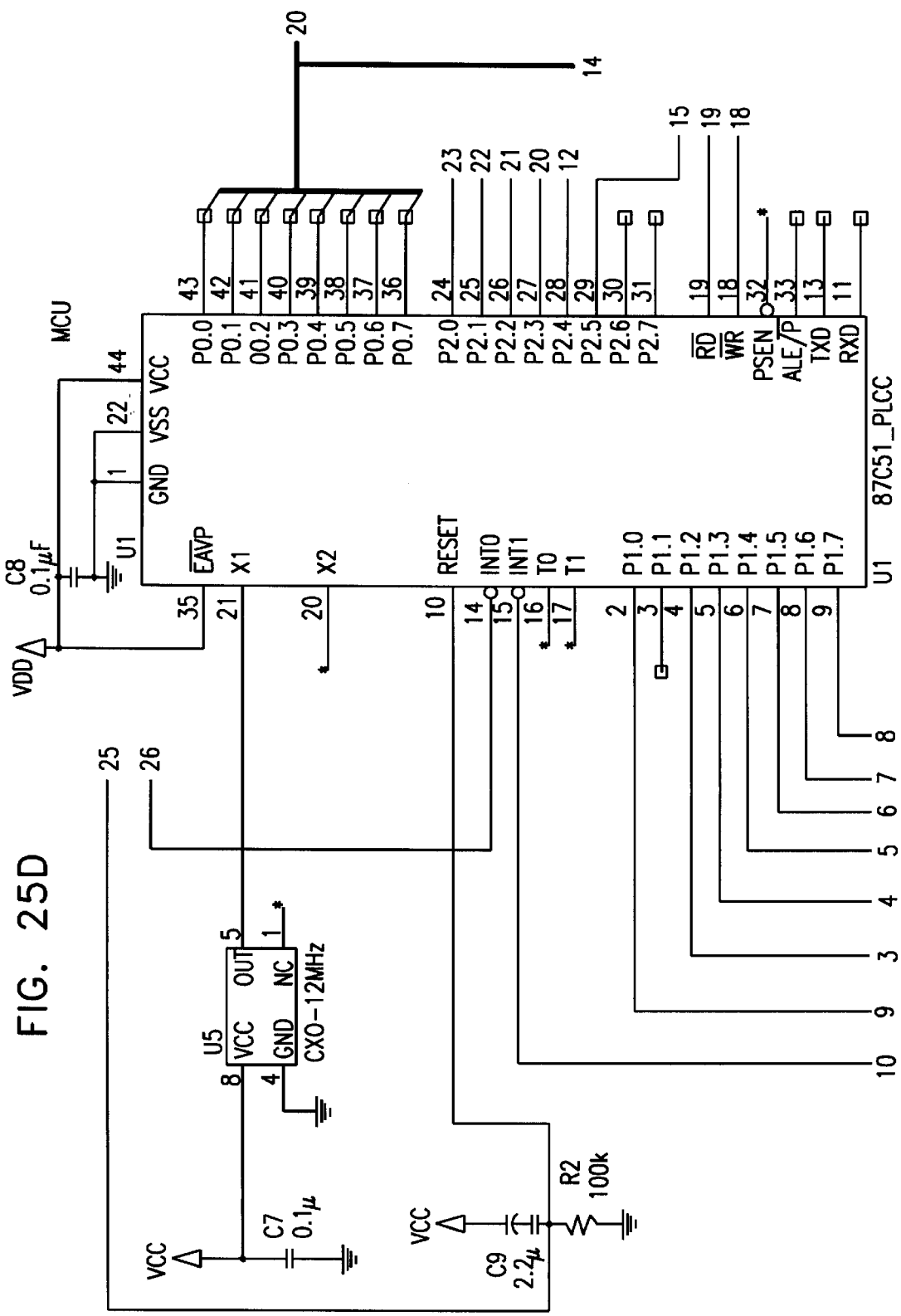
Figure 25E:
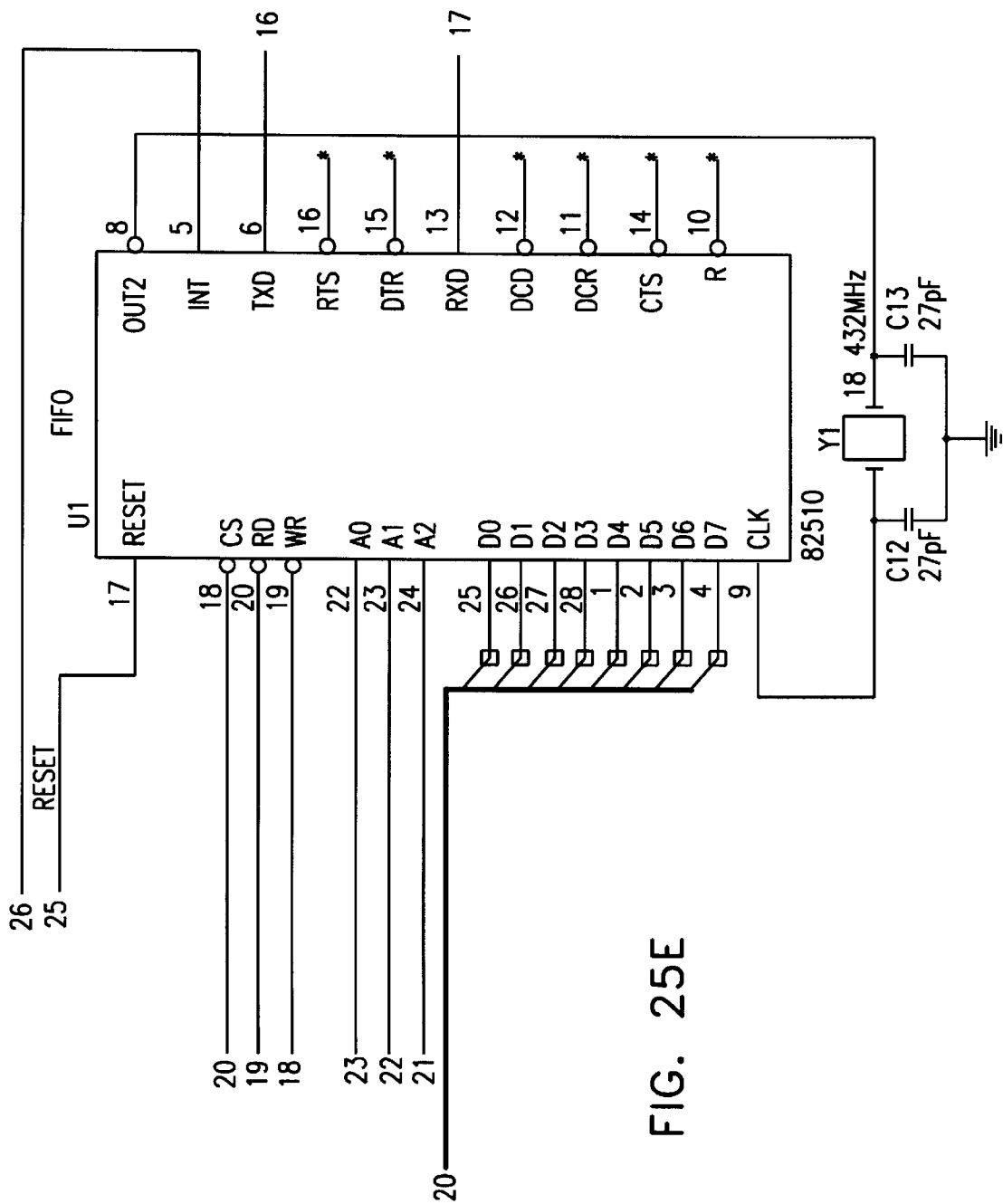
Figure 26A:
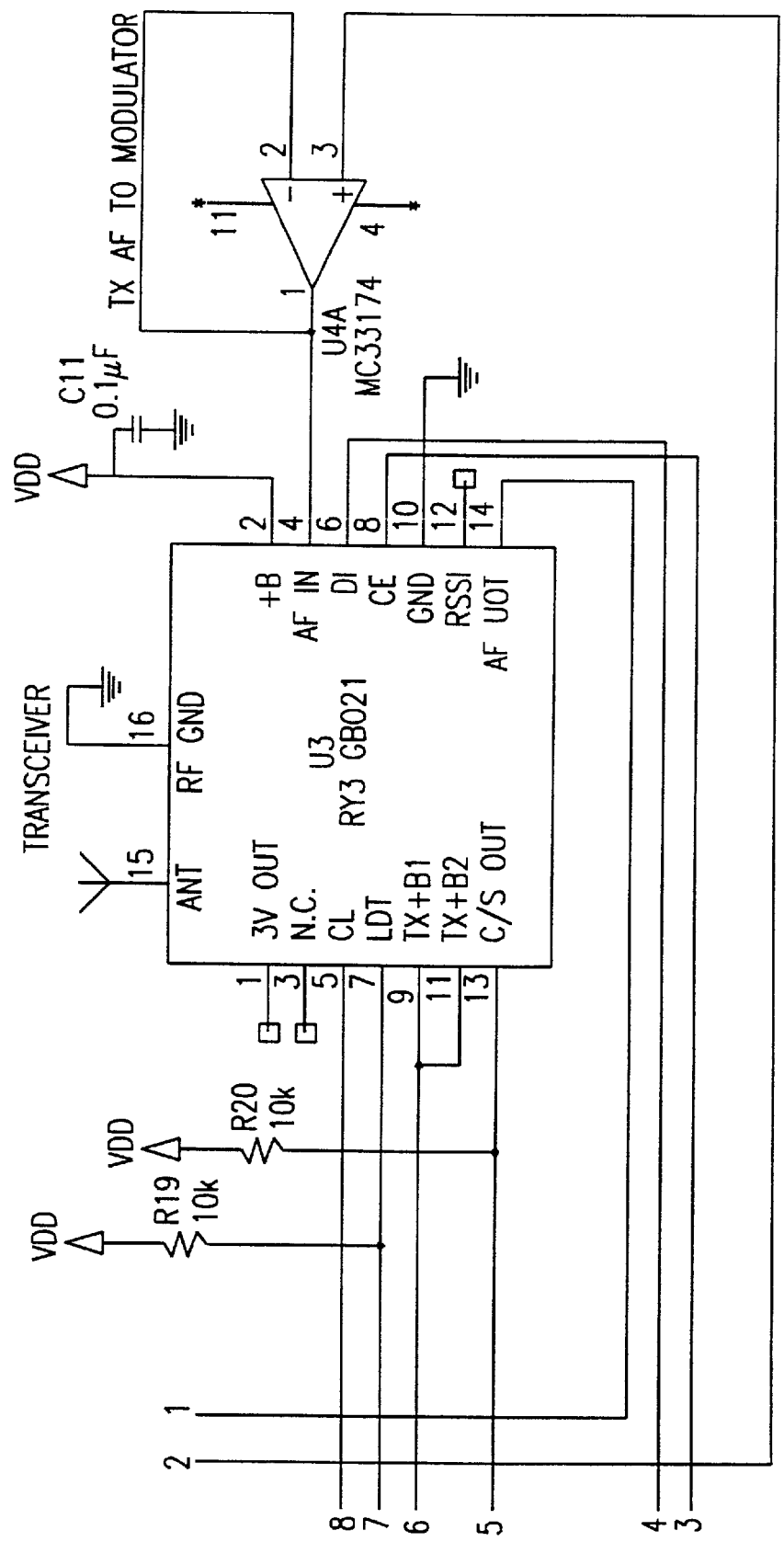
FIGS. 26A–26D, taken together, form a detailed schematic illustration of a computer radio interface which connects to a parallel port of a computer rather than to the sound board of the computer.
Figure 26B:
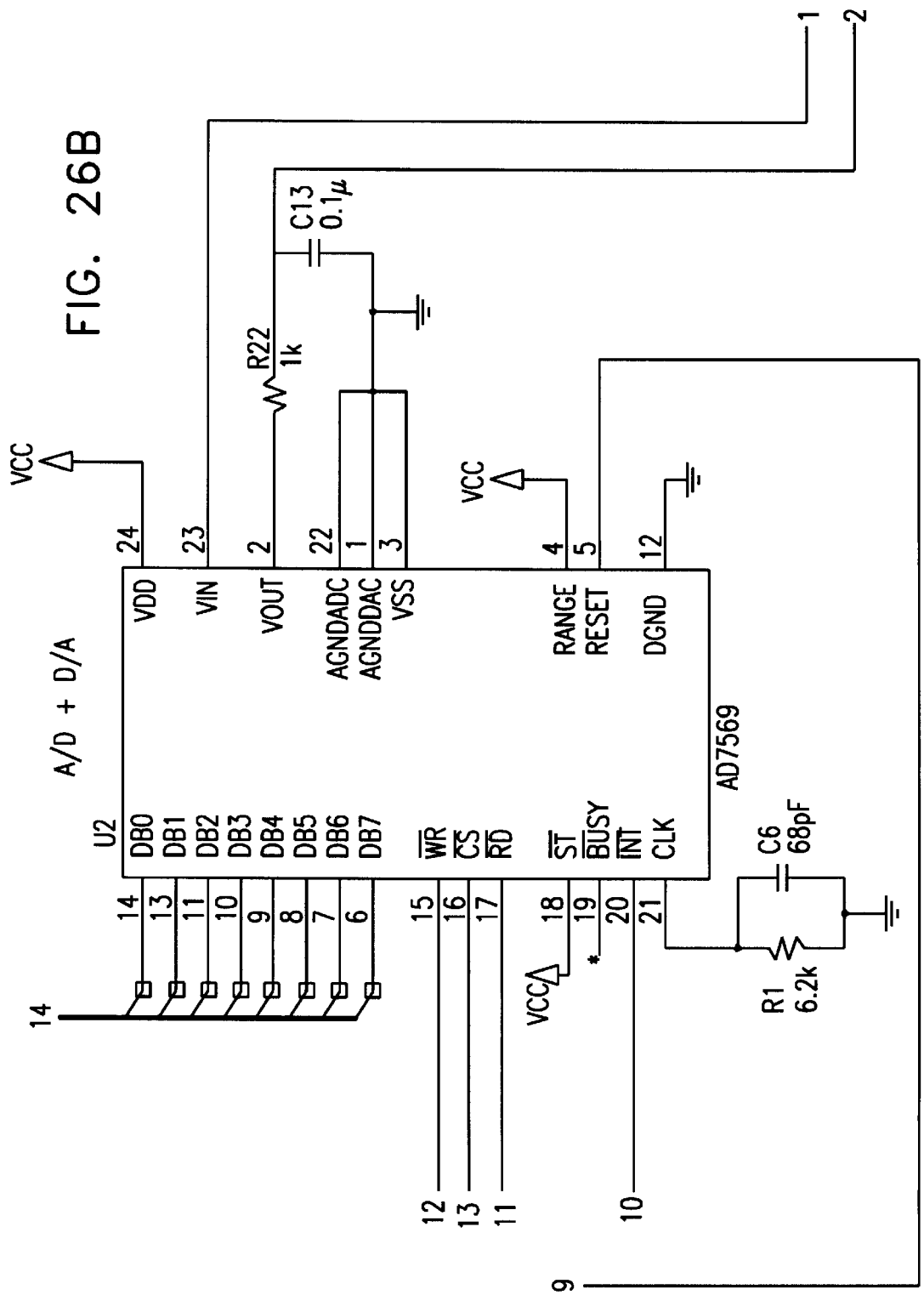
Figure 26C:
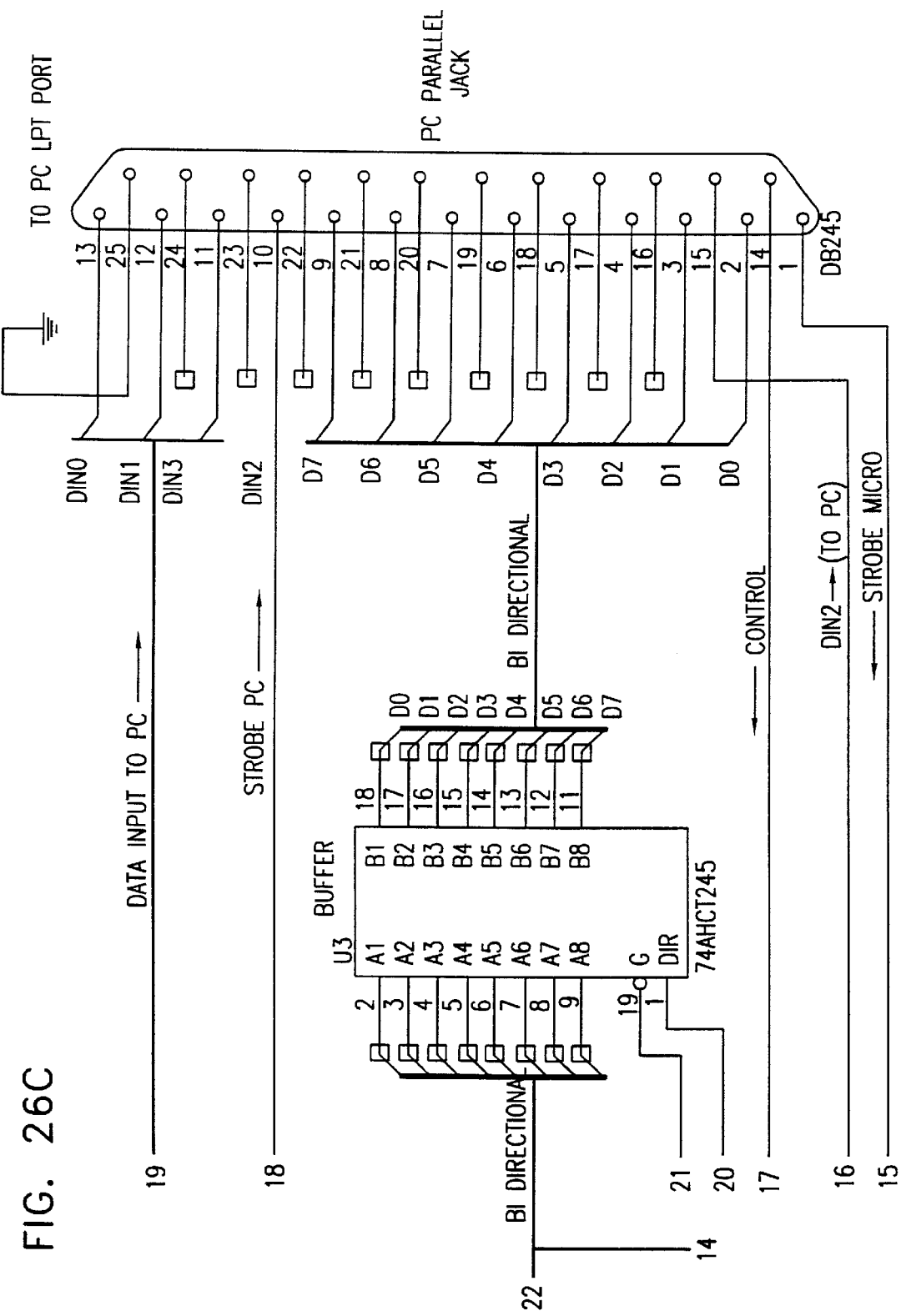
Figure 26D:
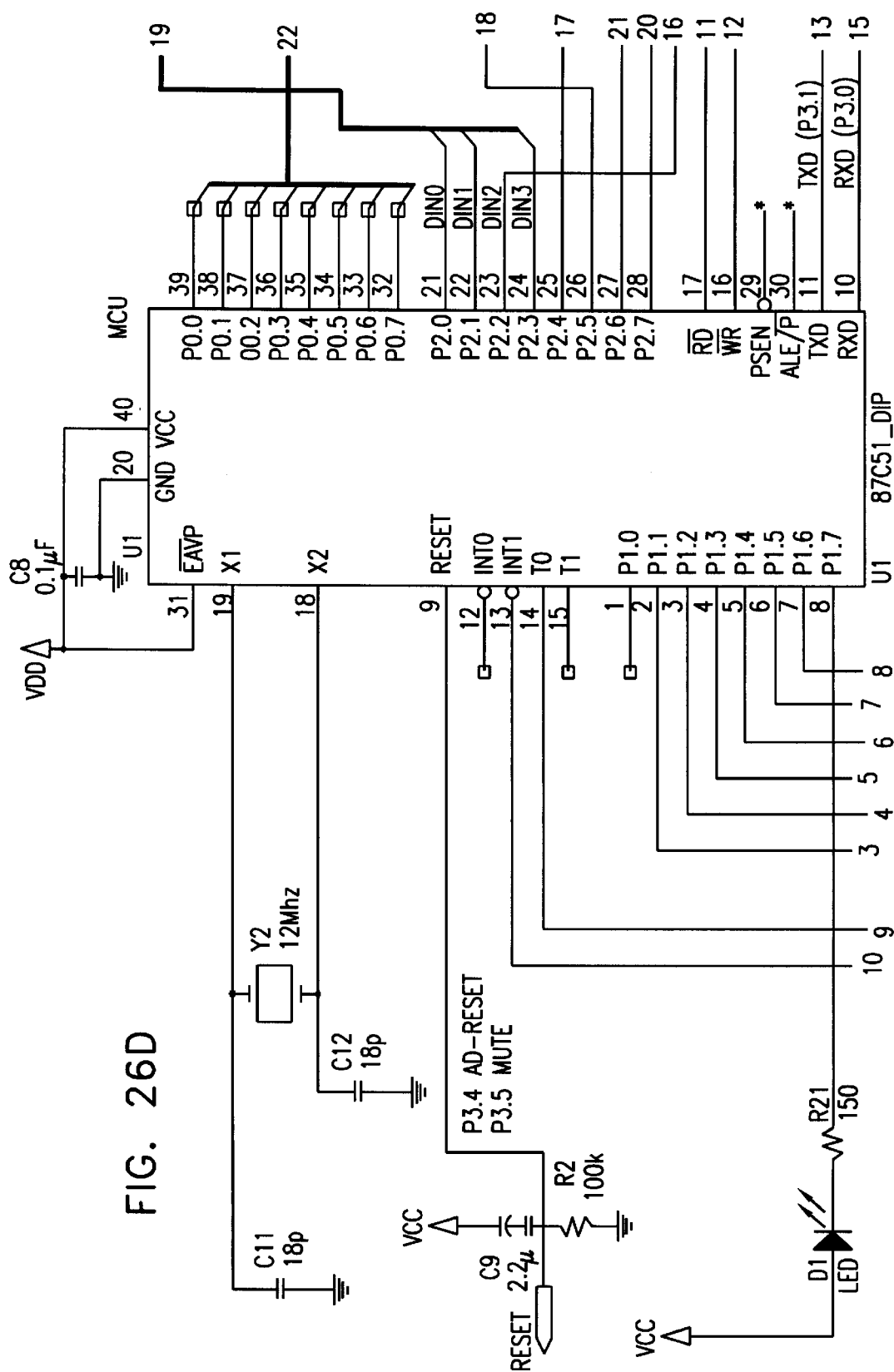
Figure 27A:
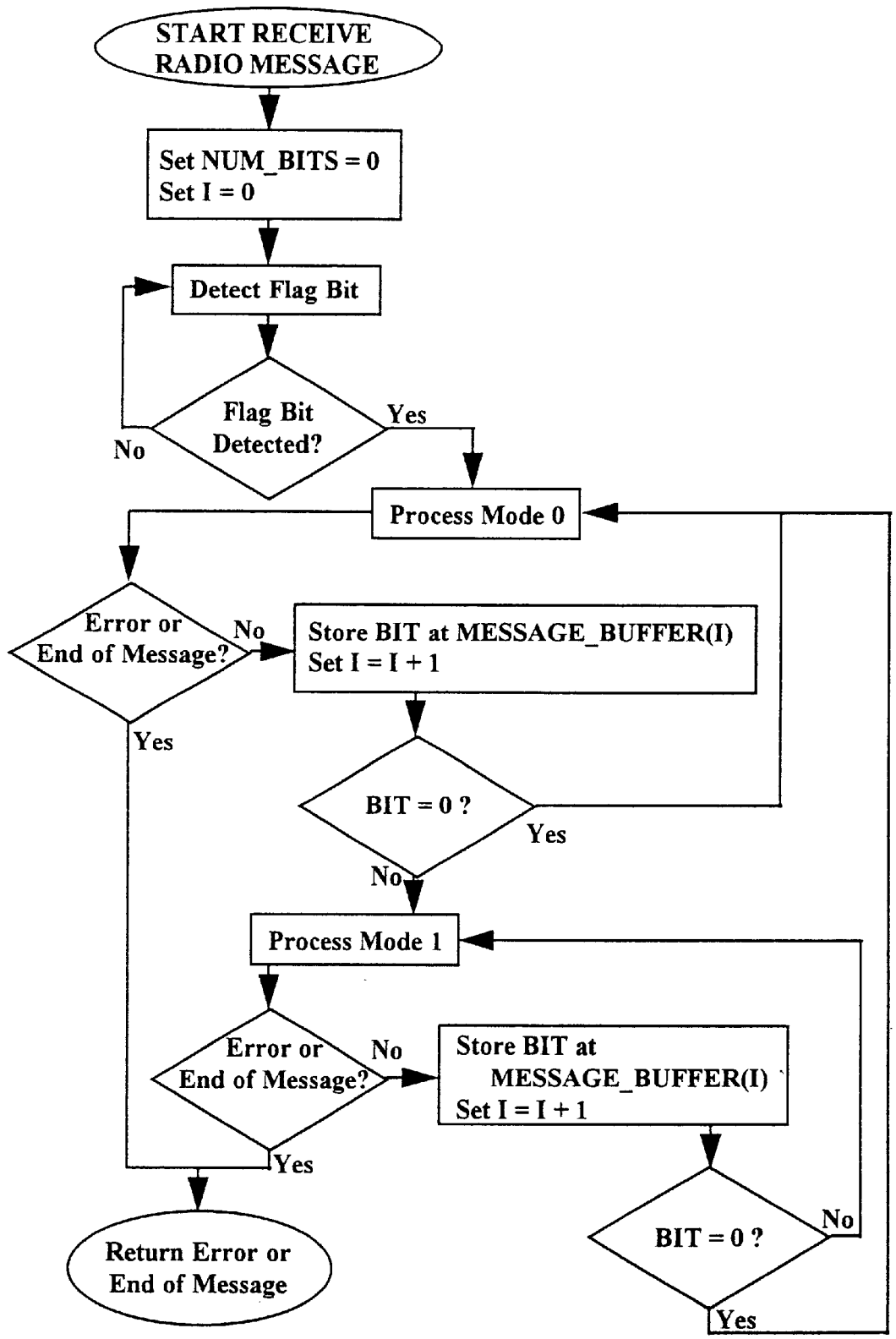
FIGS. 27A–27J are preferred flowchart illustrations of a preferred radio coding technique which is an alternative to the radio coding technique described above with reference to FIGS. 8E, 8G–8M and 10A–C.
Figure 27B:
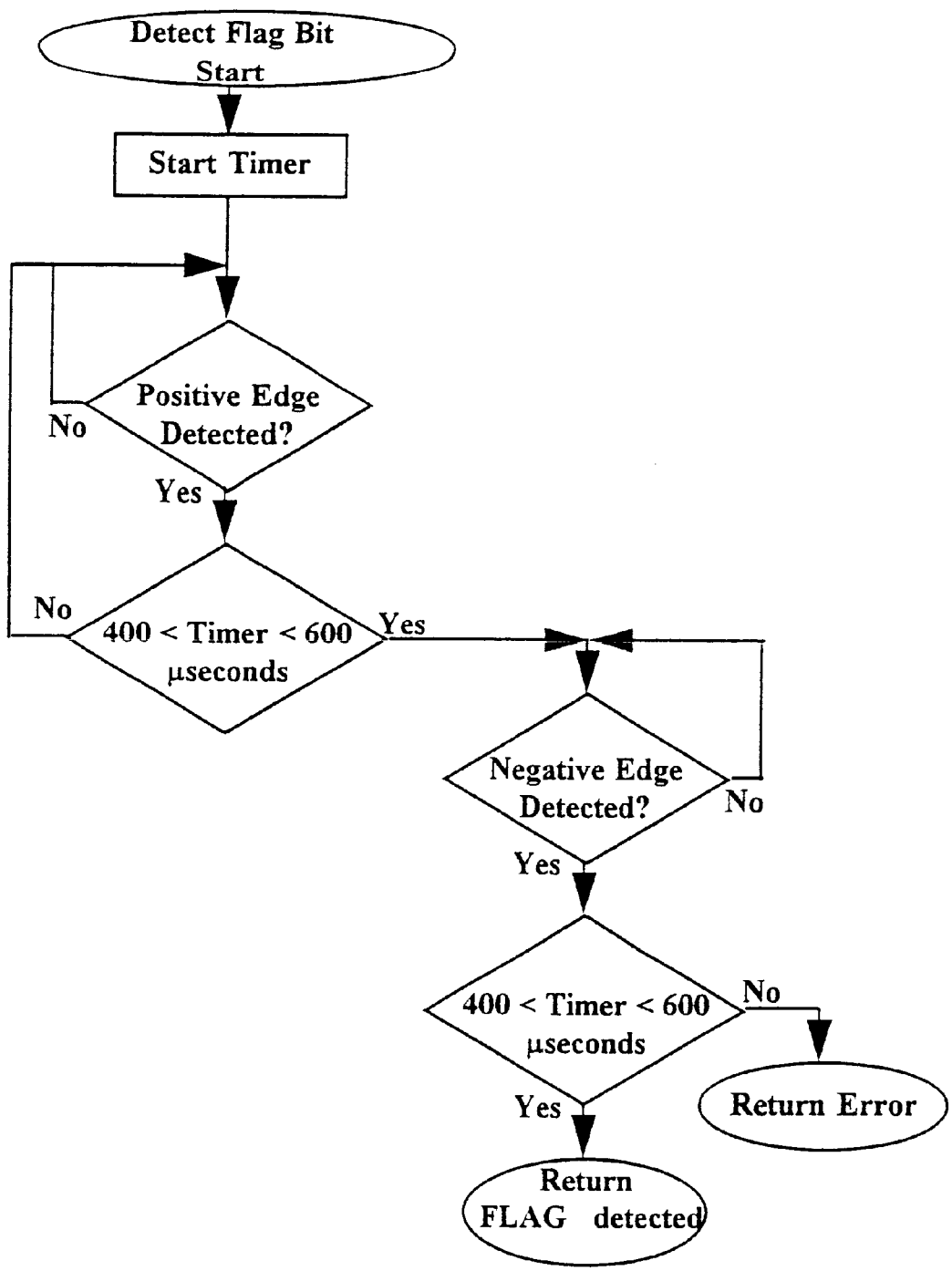
Figure 27C:
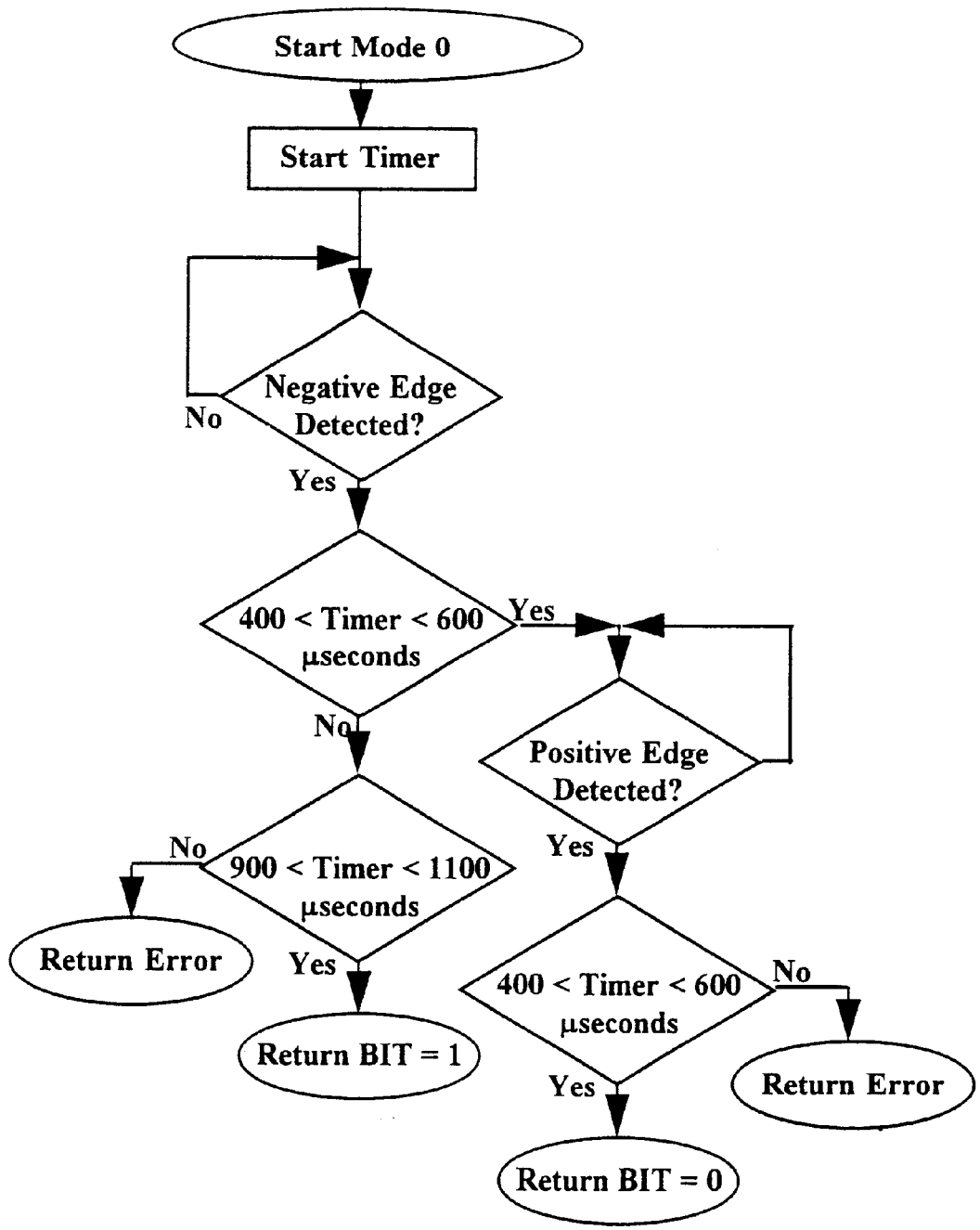
Figure 27D:
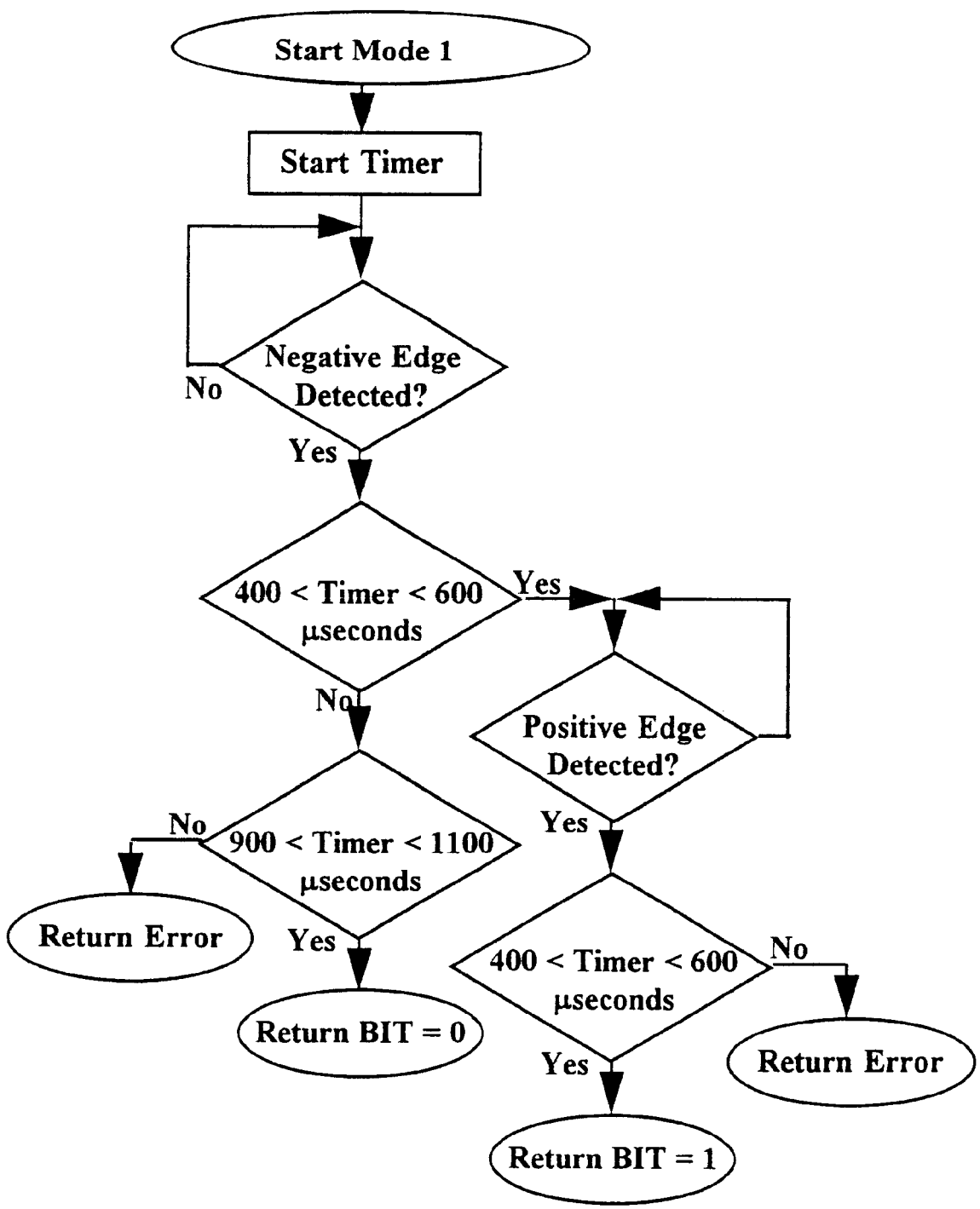
Figure 27E:
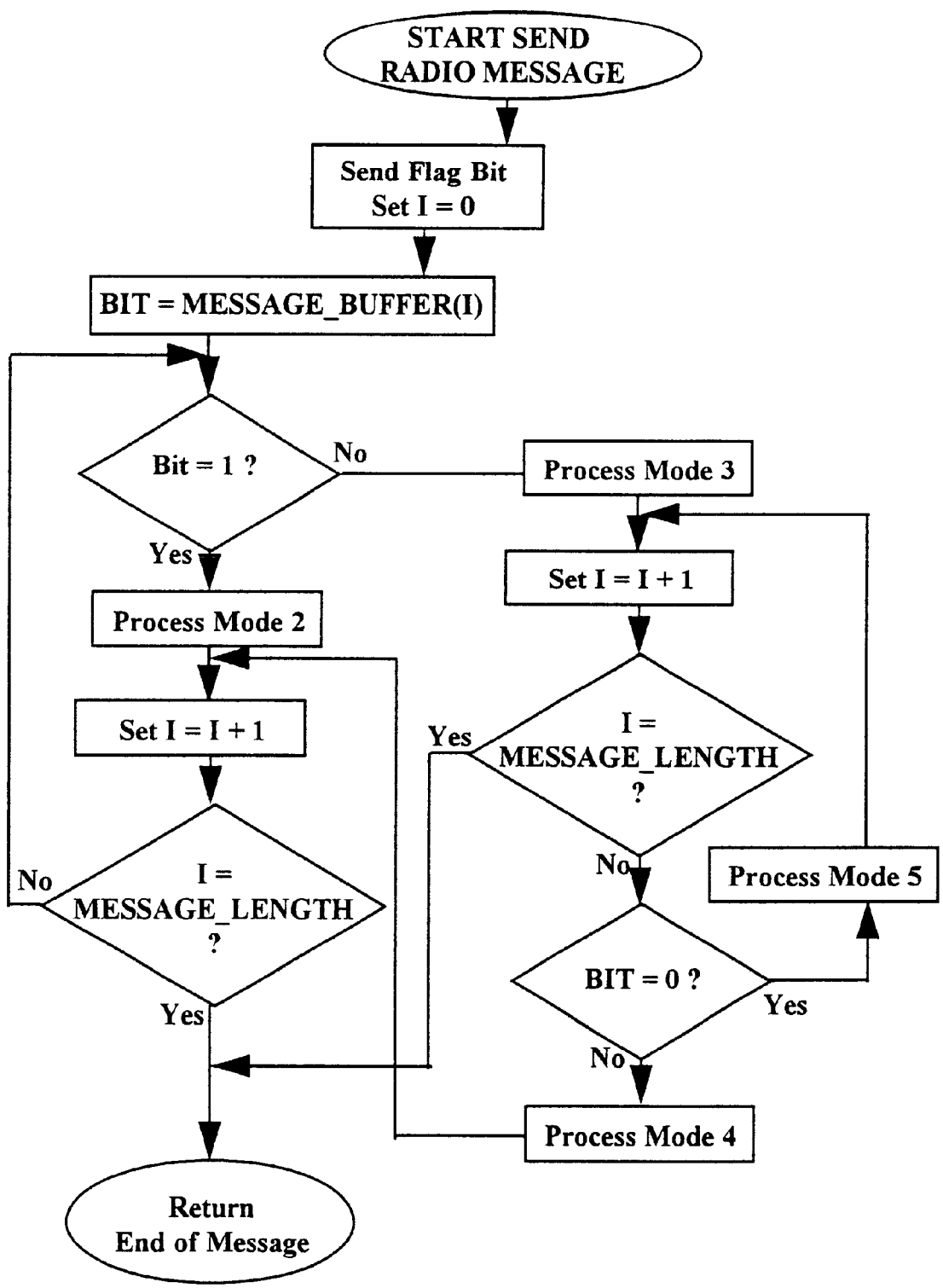
Figure 27F:
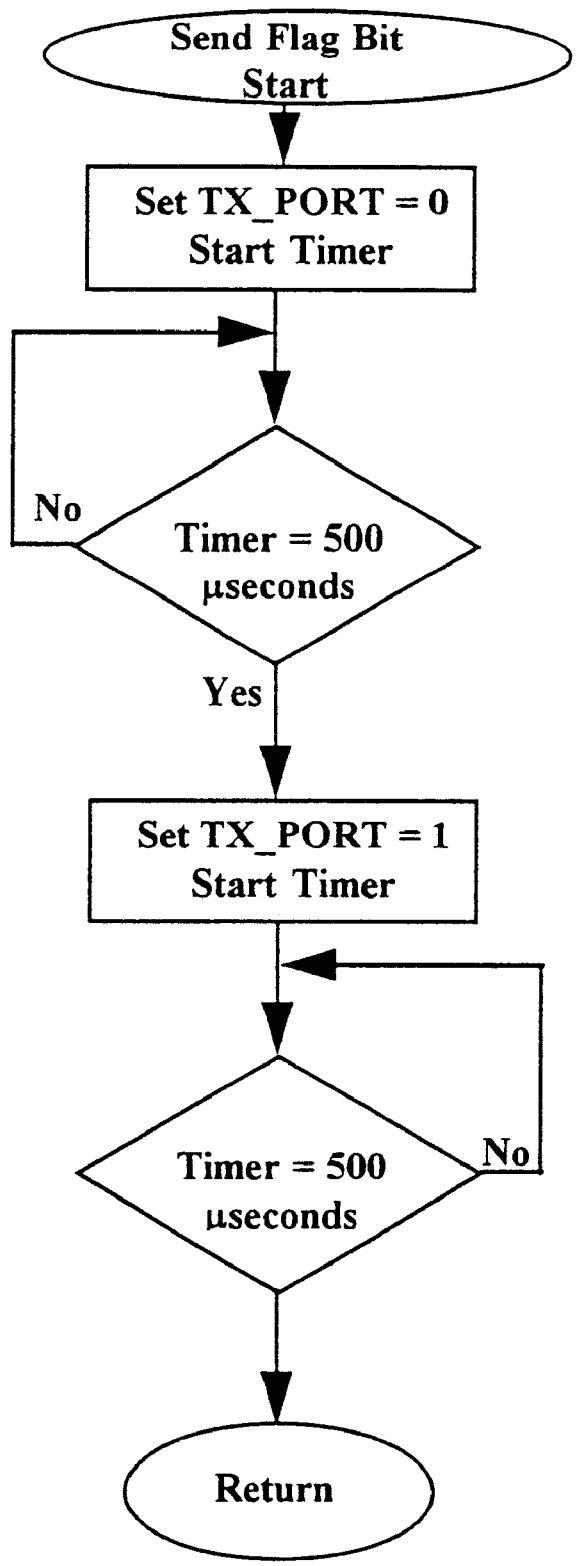
Figure 27G:
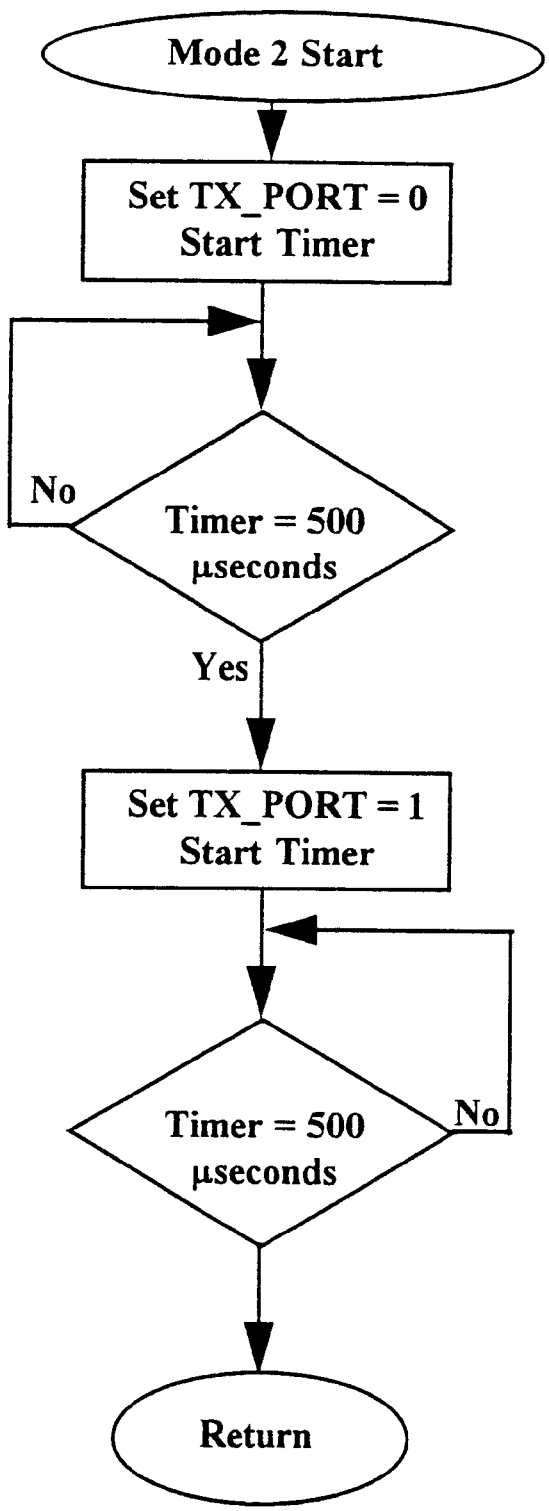
Figure 27H:
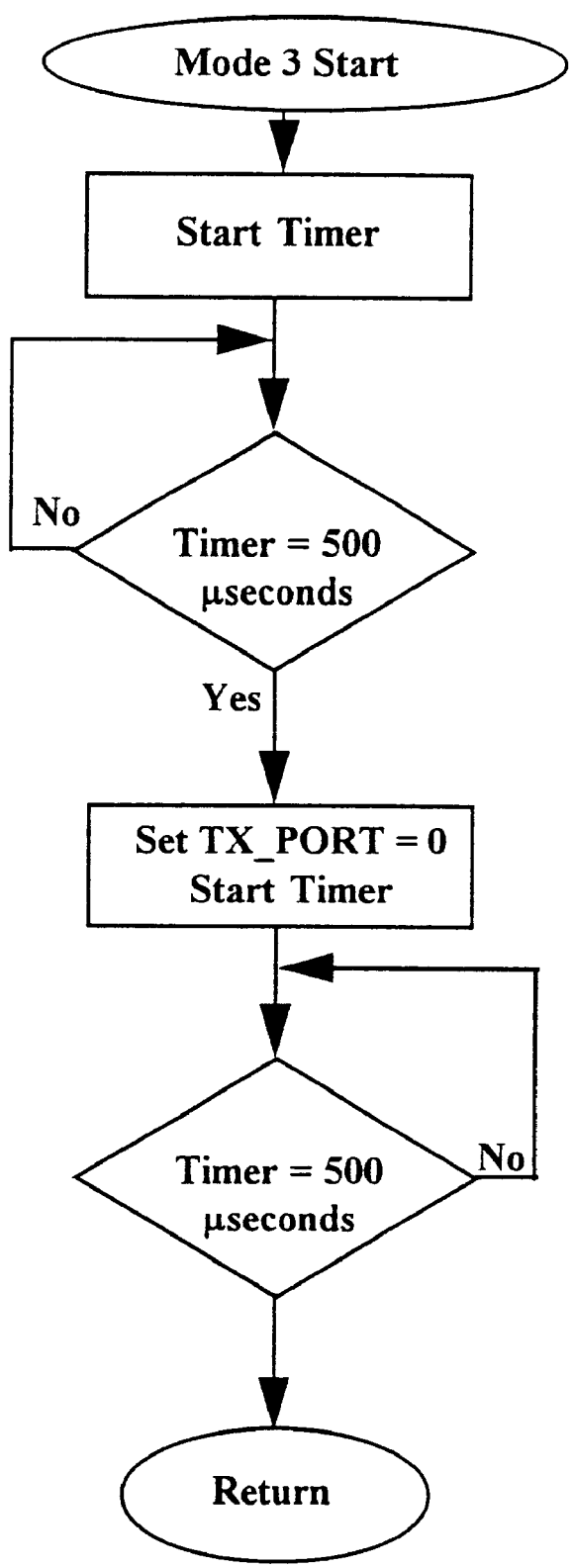
Figure 27I:
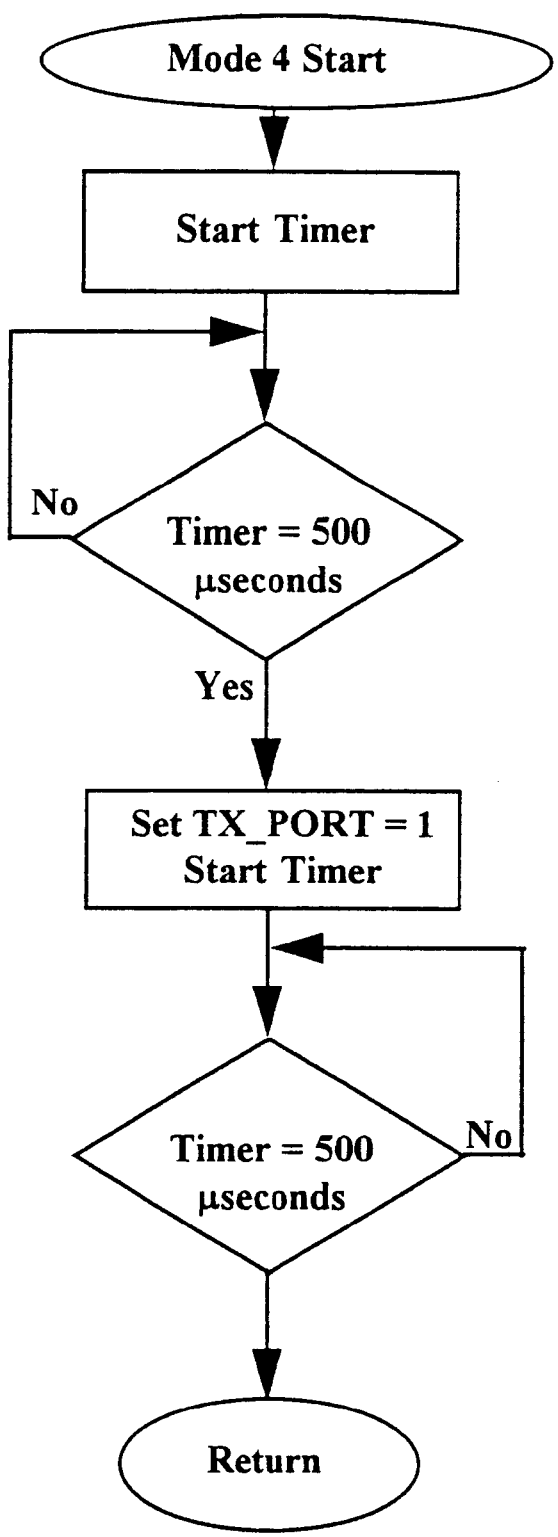
Figure 27J:
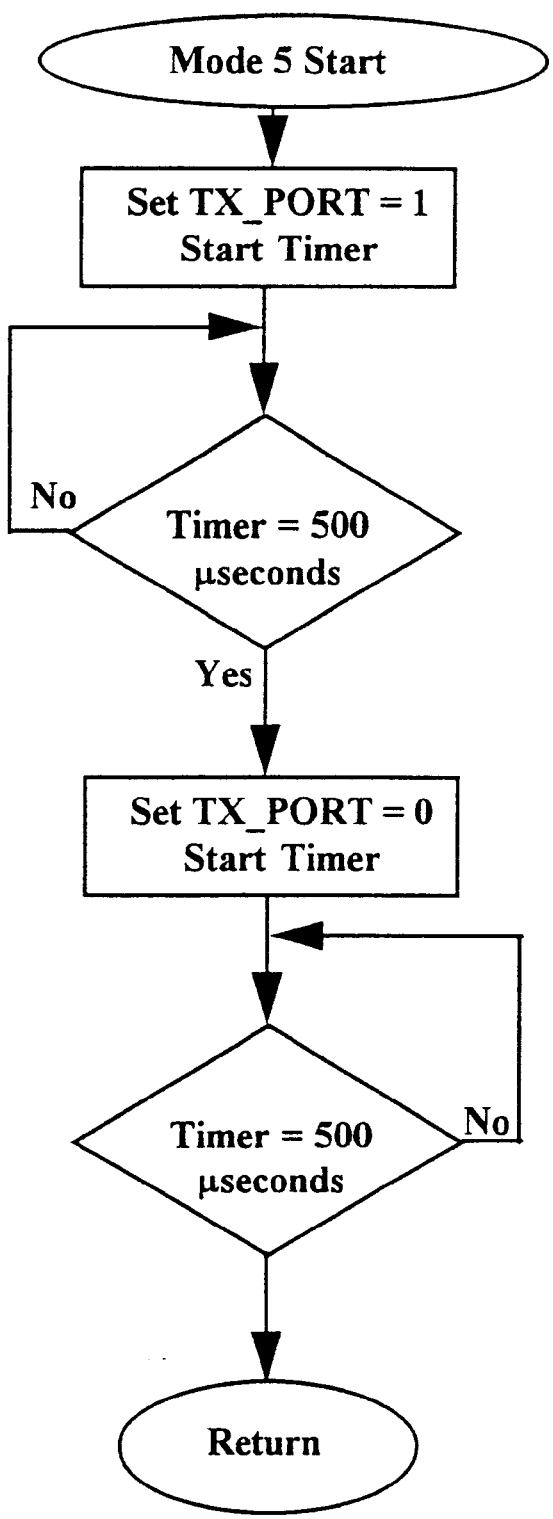

FIG. 23 is a semi-pictorial semi-block diagram illustration of a wireless computer controlled toy system including a toy 1500 having a toy control device 1504, a computer 1510 communicating with the toy control device 1504 by means of a computer-radio interface 1514 and a proximity detection subsystem operative to detect proximity between the toy and the computer. The proximity detection subsystem may for example include a pair of ultrasound transducers 1520 and 1530 associated with the toy and computer respectively. The toy's ultrasound transducer 1520 typically broadcasts ultrasonic signals which the computer's ultrasound transducer 1530 detects if the computer and toy are within ultrasonic communication range, e.g. are in the same room.

FIGS. 24A–24E, taken together, form a detailed electronic schematic diagram of a multi-channel implementation of the computer radio interface 110 of FIG. 3 which is similar to the detailed electronic schematic diagrams of FIGS. 5A–5D except for being multi-channel, therefore capable of supporting full duplex applications, rather than single-channel.

FIGS. 25A–25F, taken together, form a detailed schematic illustration of a computer radio interface which connects to a serial port of a computer rather than to the sound board of the computer.

FIGS. 26A–26D, taken together, form a detailed schematic illustration of a computer radio interface which connects to a parallel port of a computer rather than to the sound board of the computer.

FIGS. 27A–27J are preferred self-explanatory flowchart illustrations of a preferred radio coding technique, based on the Manchester coding, which is an alternative to the radio coding technique described above with reference to FIGS. 8E, 8G–8M and 10A–C.

FIGS. 28A–28K, taken together, form a detailed electronic schematic diagram of the multi-port multi-channel computer radio interface sub-unit of FIG. 13.

FIGS. 29A–29I, taken together, form a detailed electronic schematic diagram of the multi-port multi-channel computer radio interface sub-unit of FIG. 14.

Figure 30:
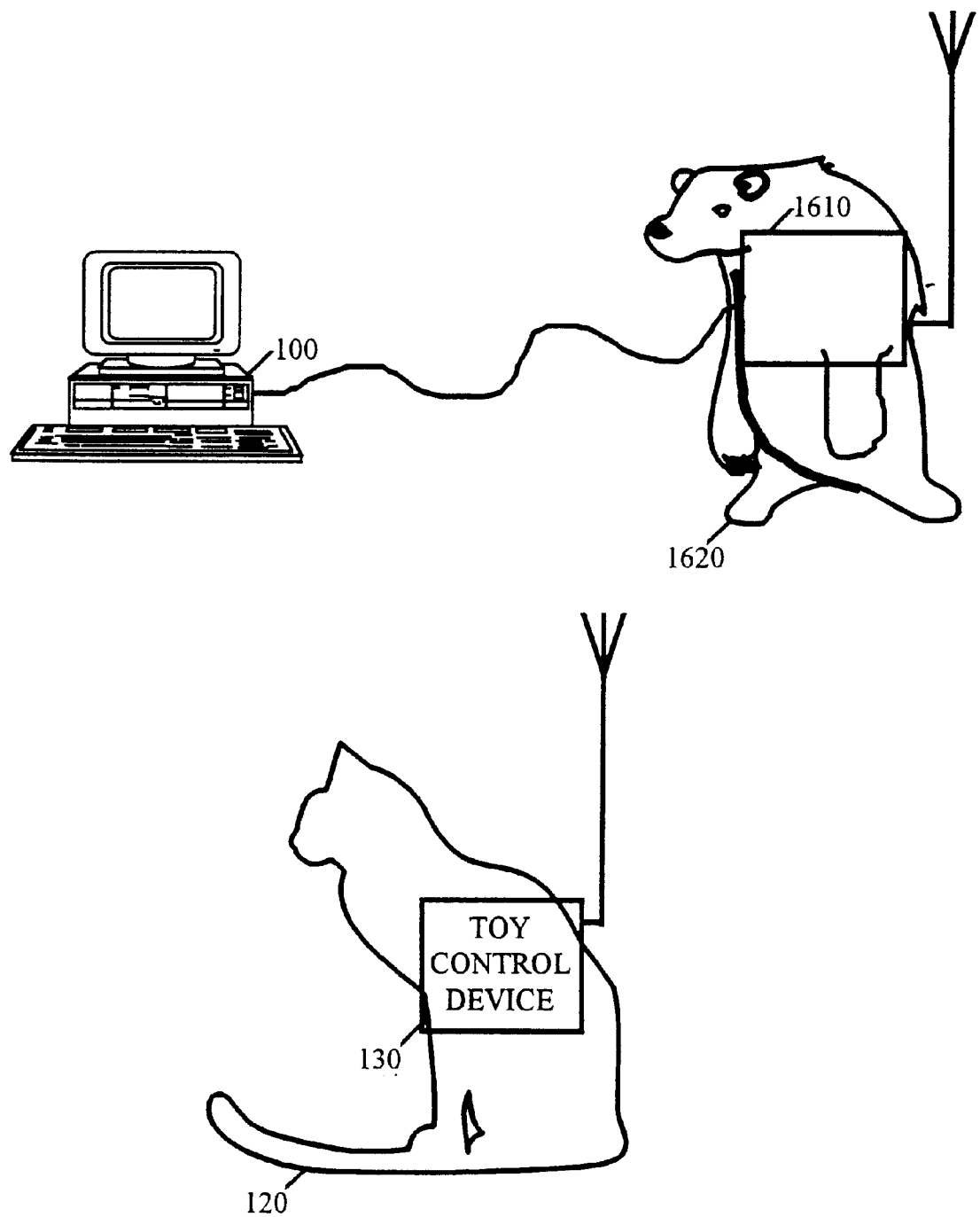

FIG. 30 illustrates a further embodiment of the present invention which includes a combination of a Computer Radio Interface (CRI) and a Toy Control Device (TCD), 1610.

The combined unit 1610 controls a toy 1620 which is connected to the computer 100 by a device, such as a cable, and communicates with other toys, 120, by means such as radio communication, using the computer radio interface 110. The toy 1620 is operated in a similar manner as the toy device 120.

Figure 31:
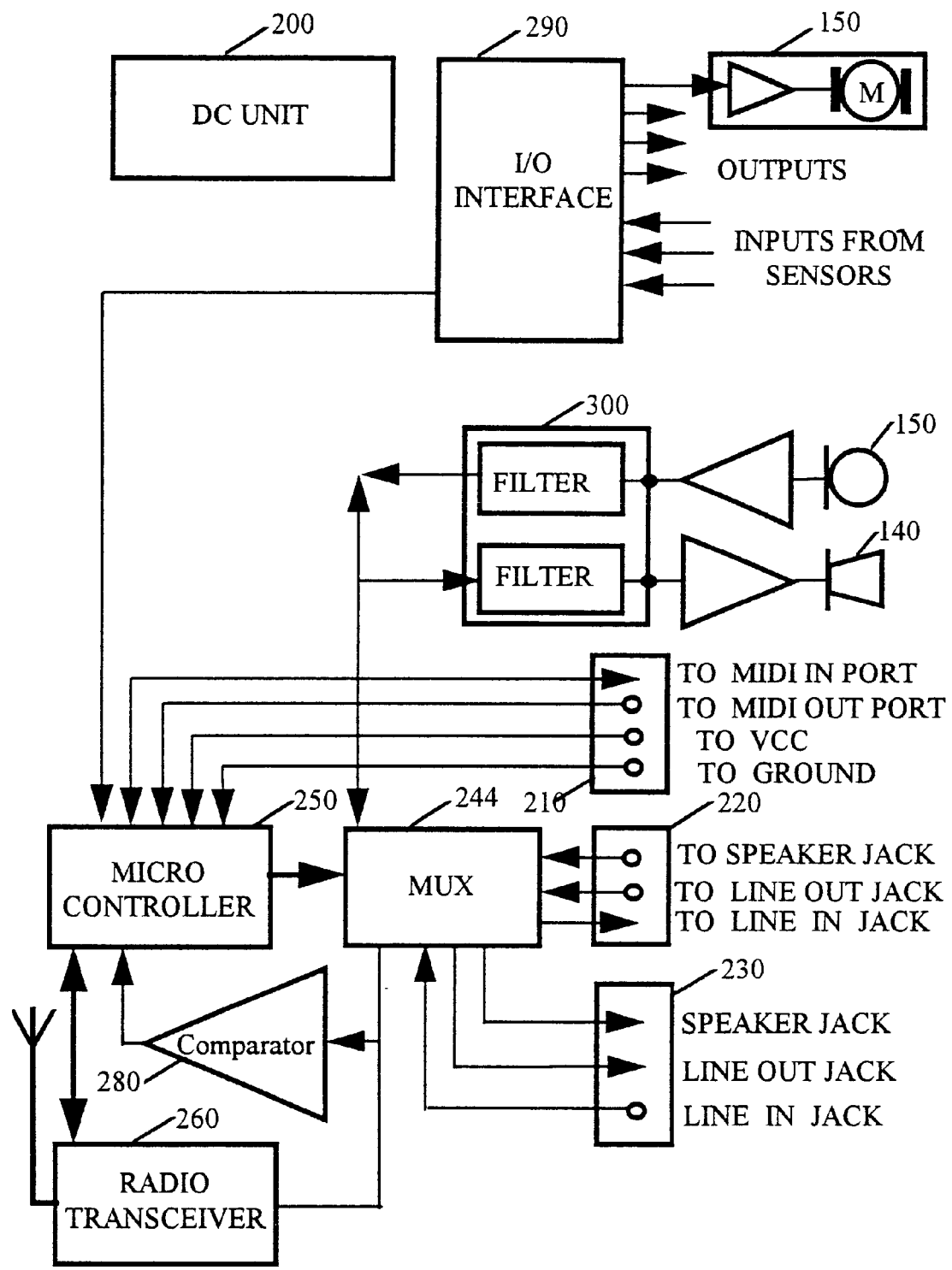

FIG. 31 illustrates a simplified block diagram of the combined unit 1610.

Figure 28A:
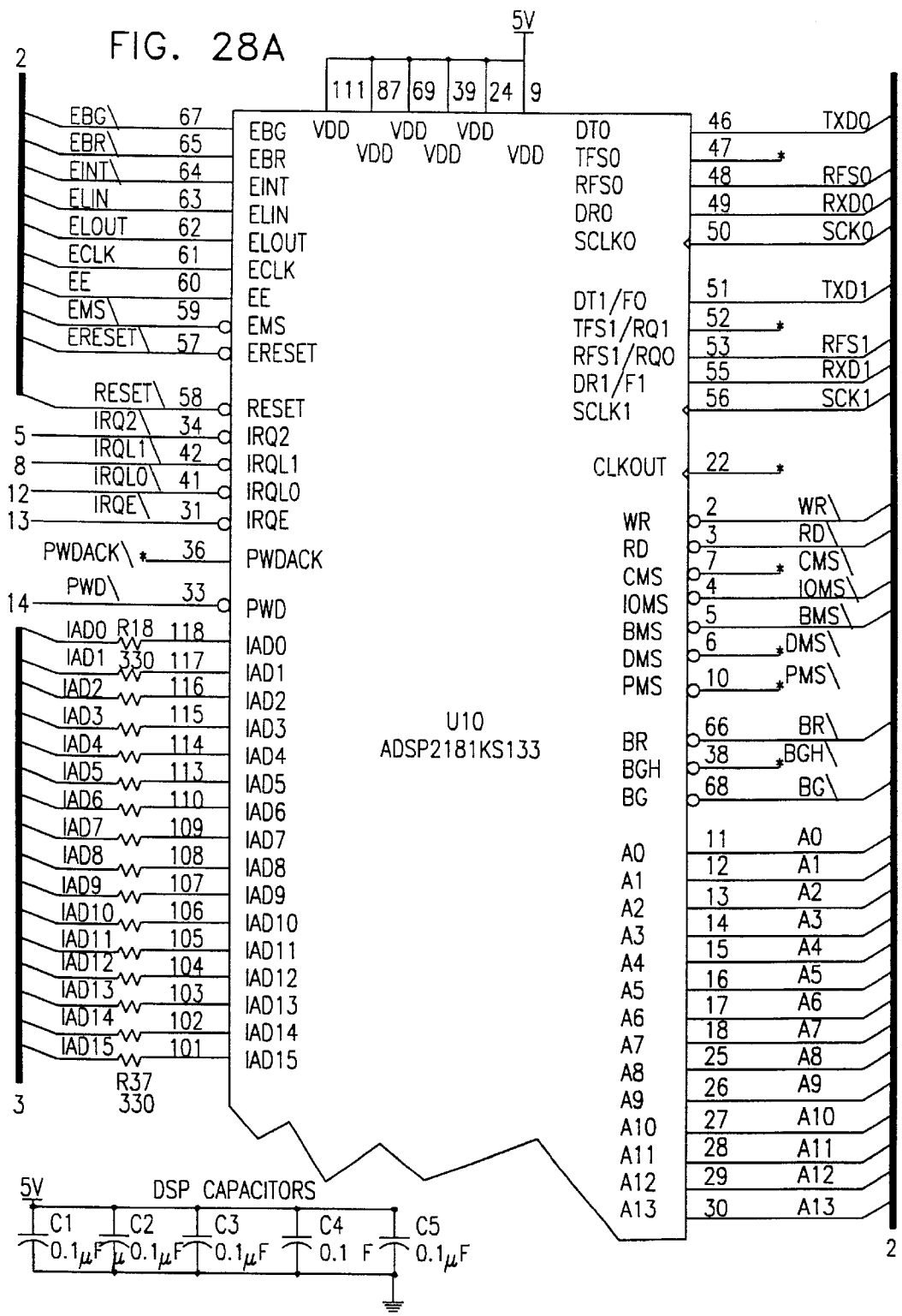
Figure 28B:
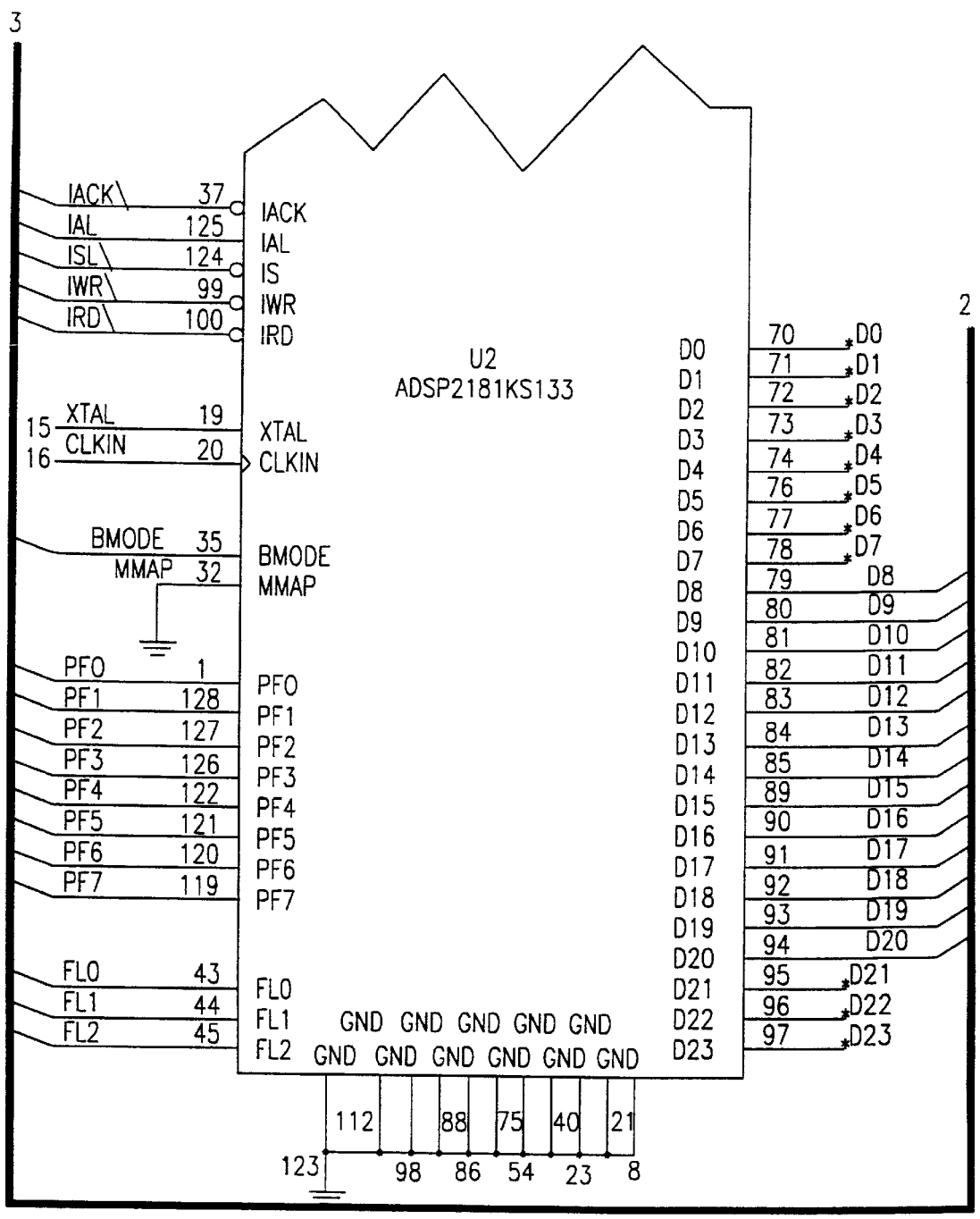
Figure 28C:
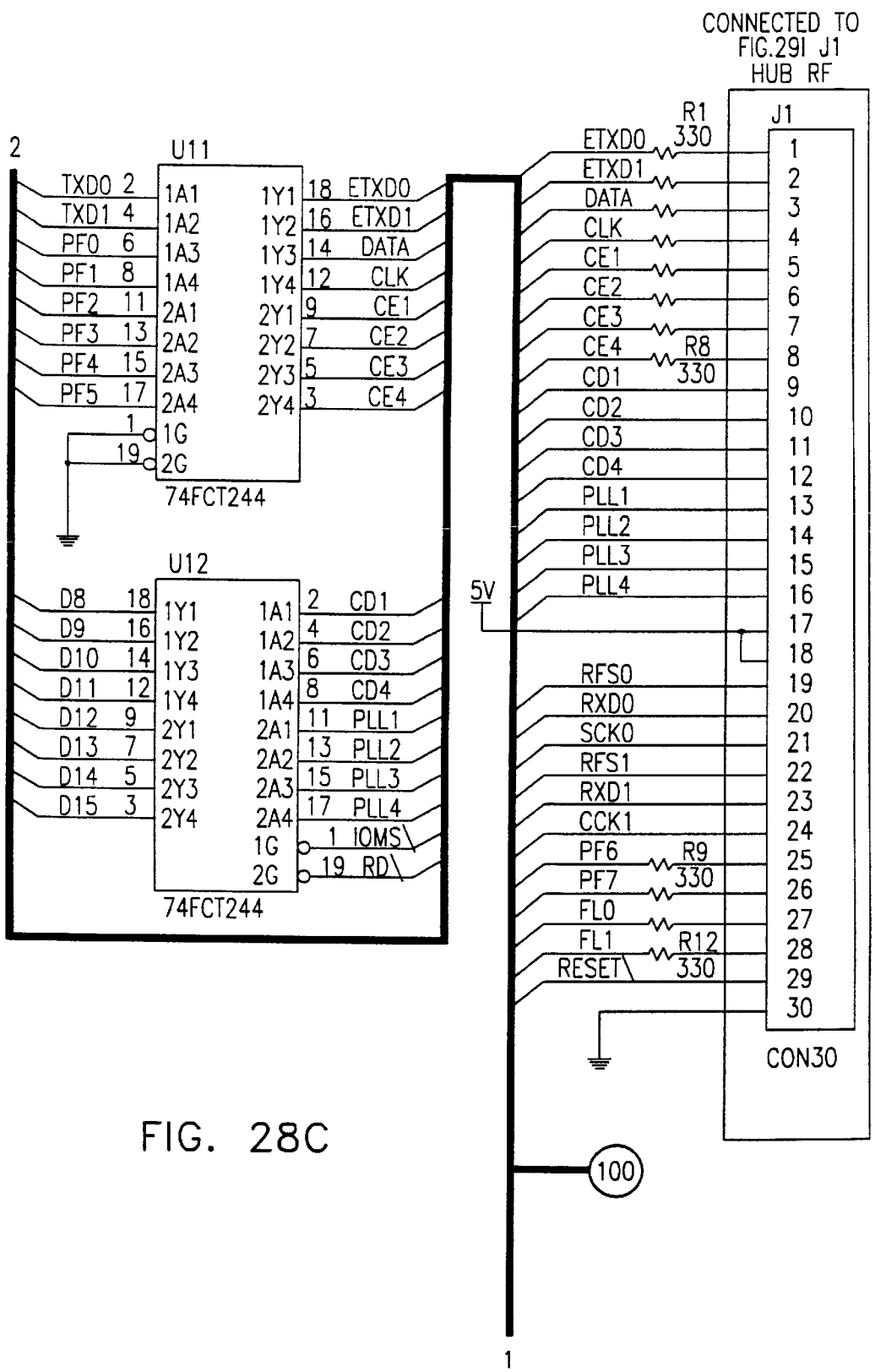
Figure 28D:
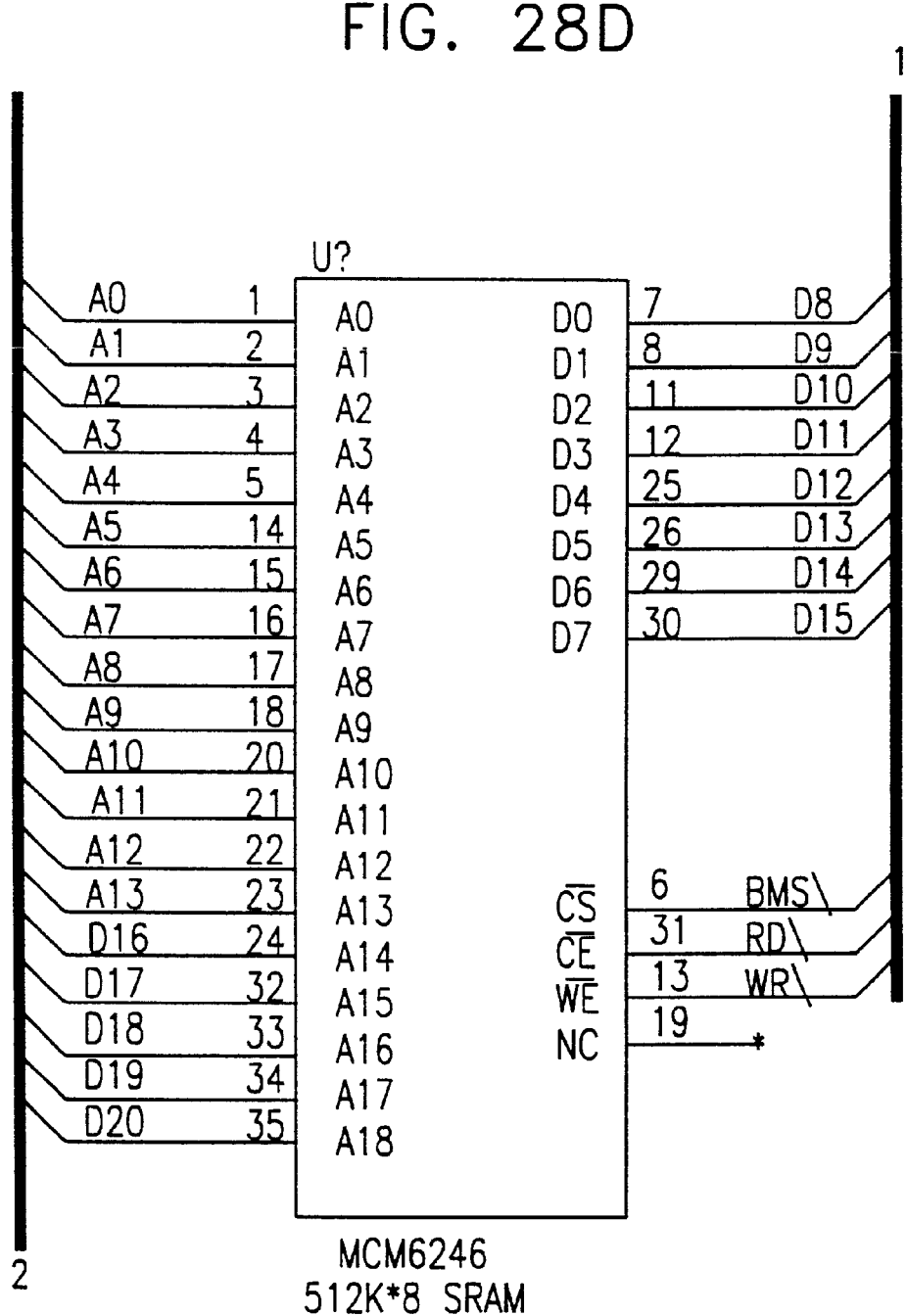
Figure 28E:
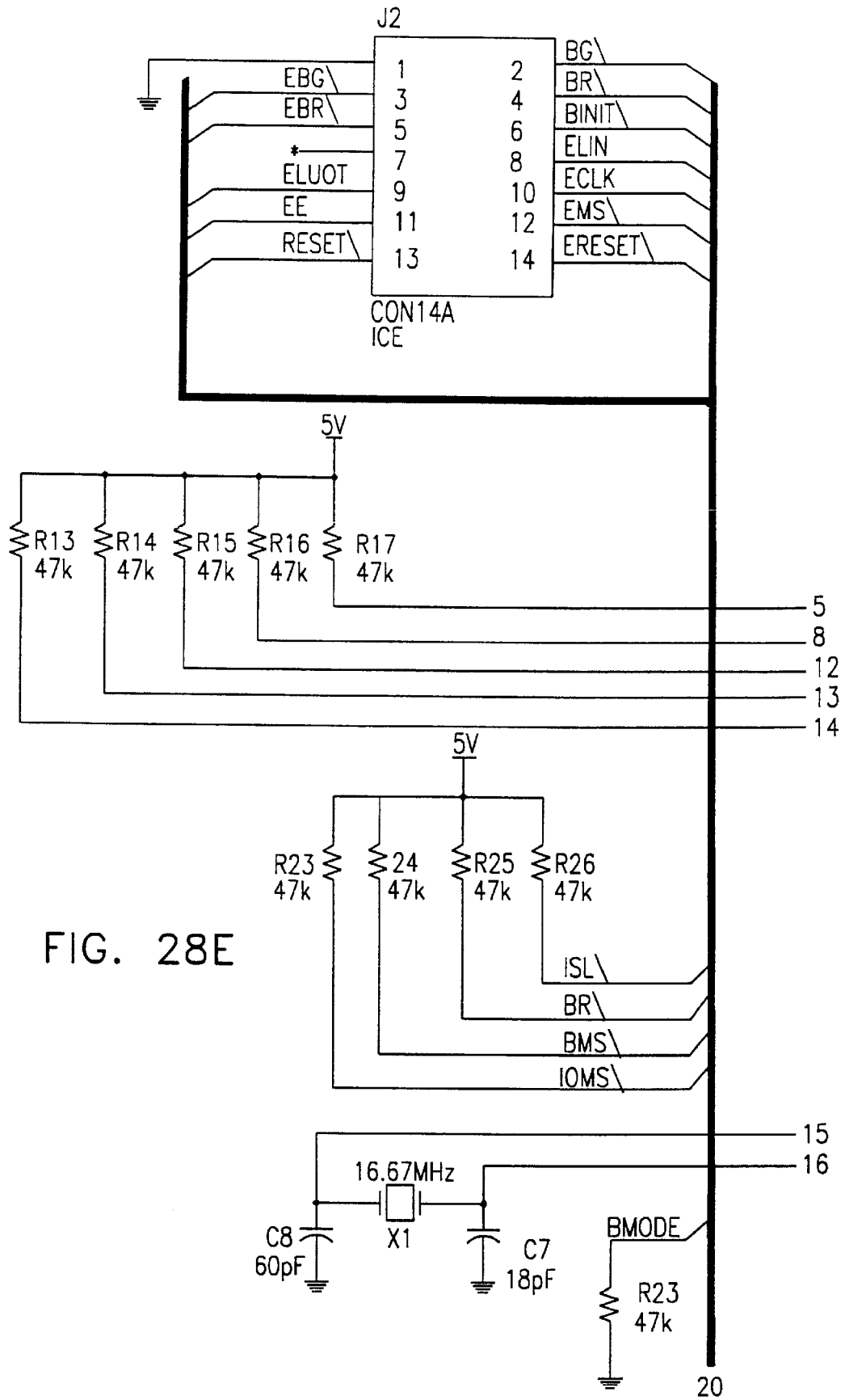
Figure 28F:
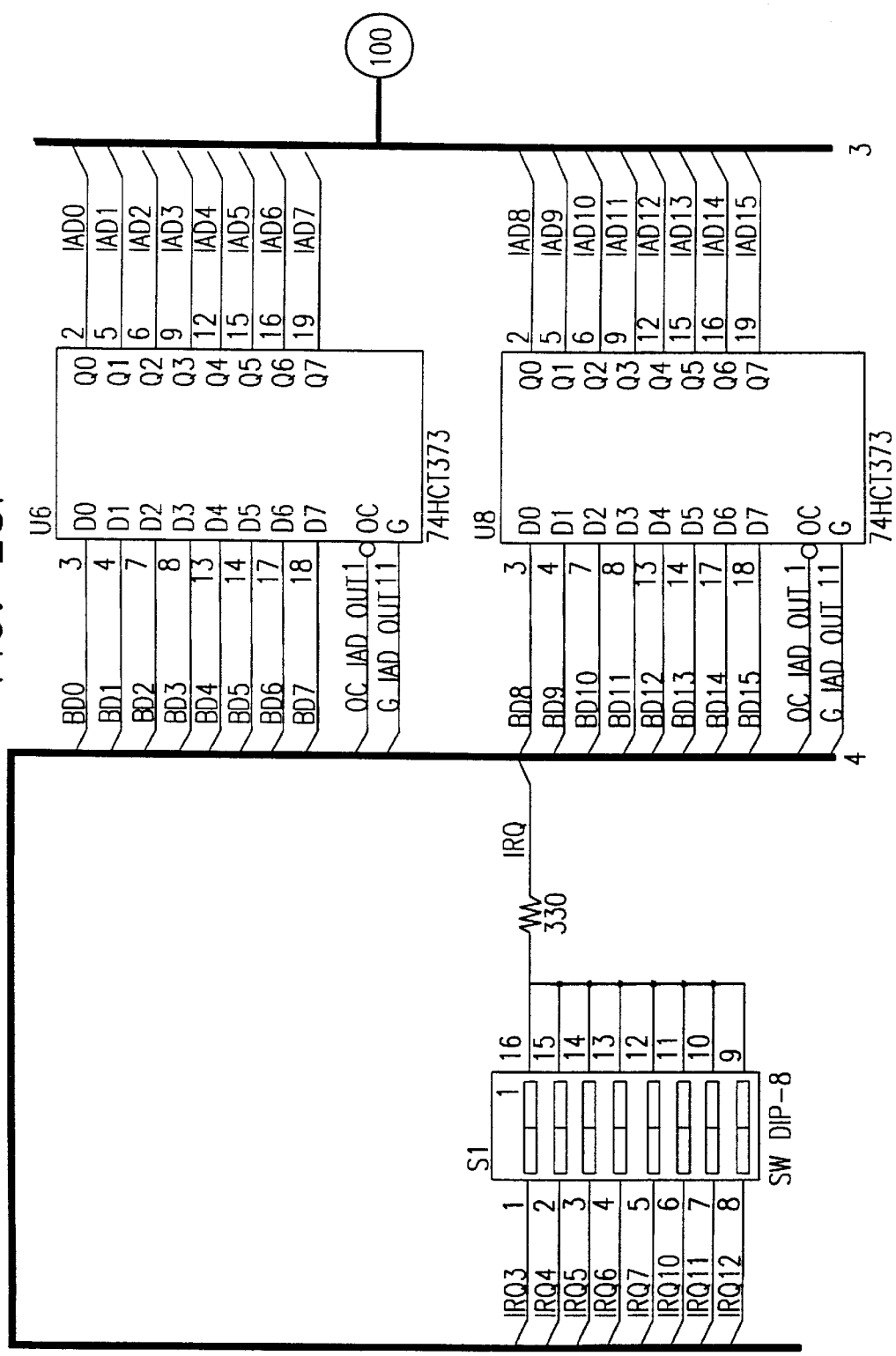
Figure 28G:
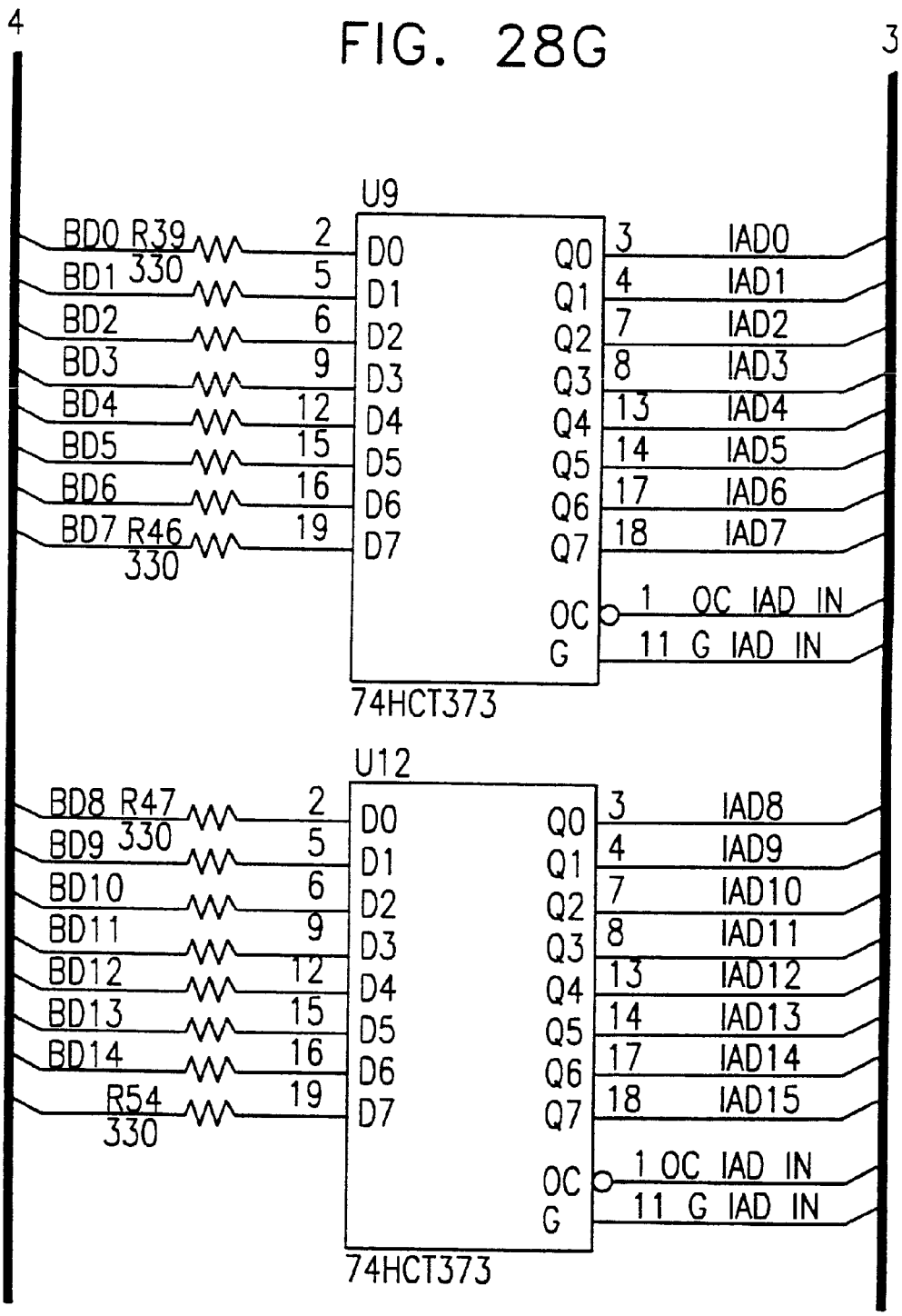
Figure 28H:
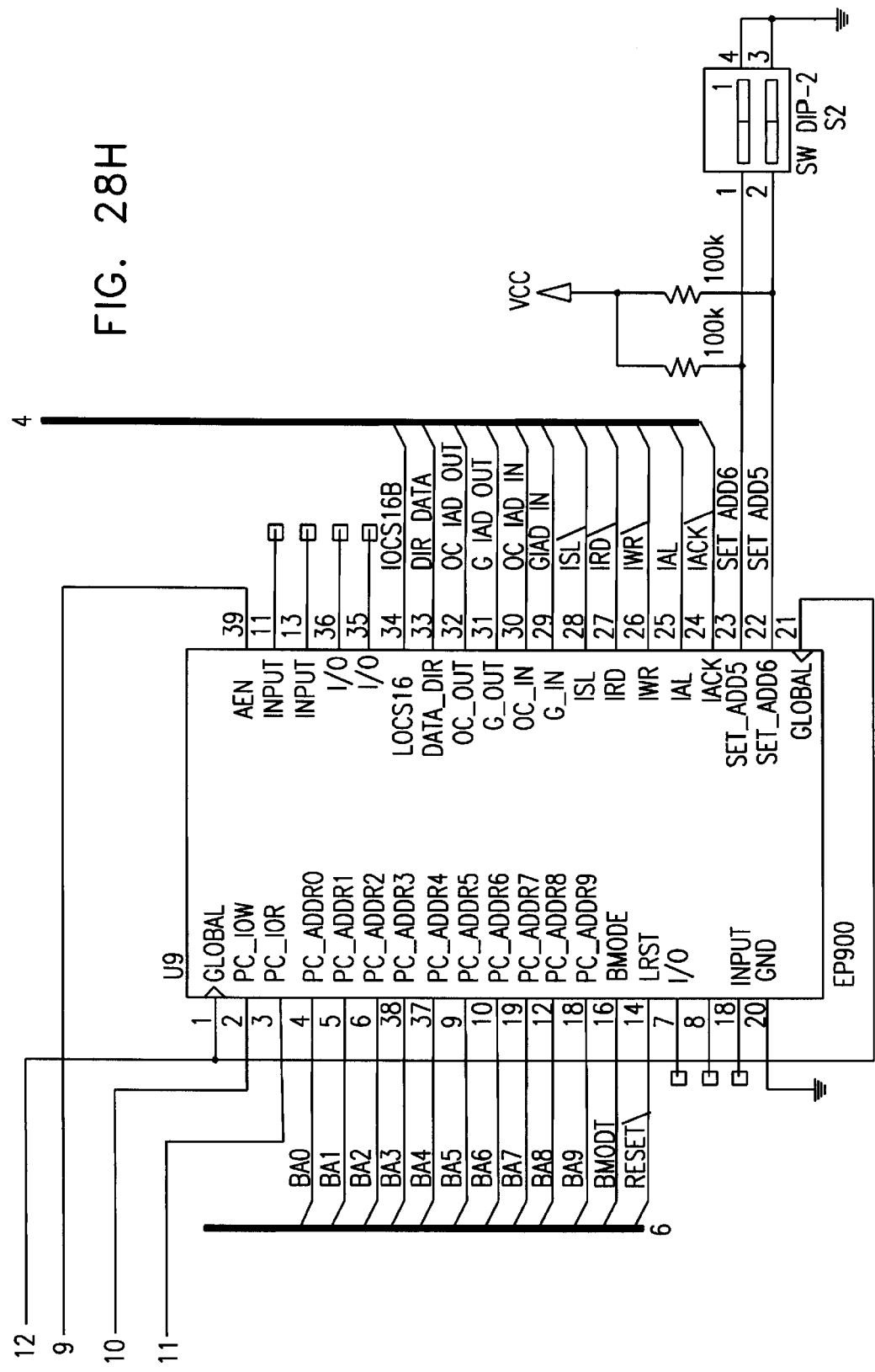
Figure 281:
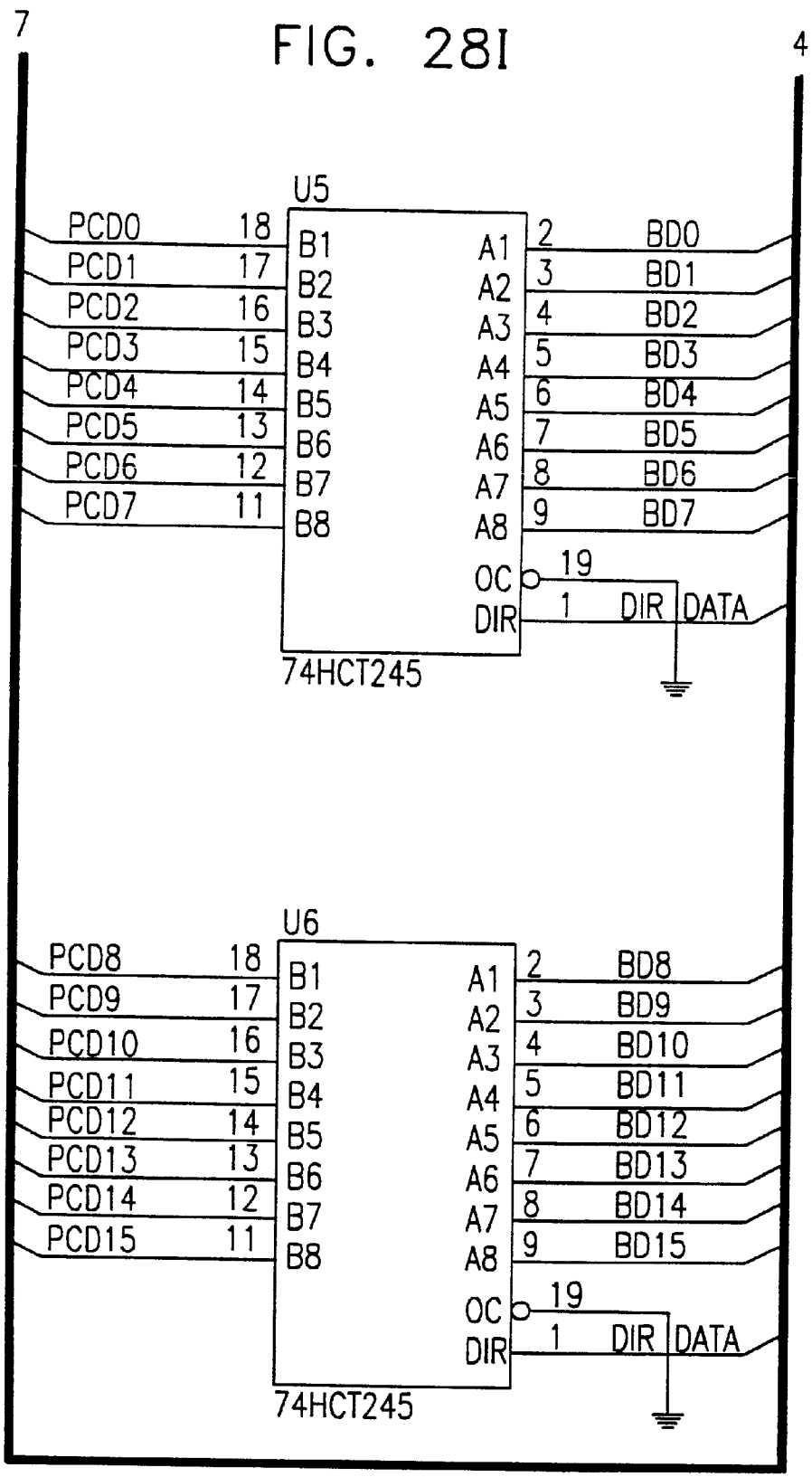
Figure 28J:
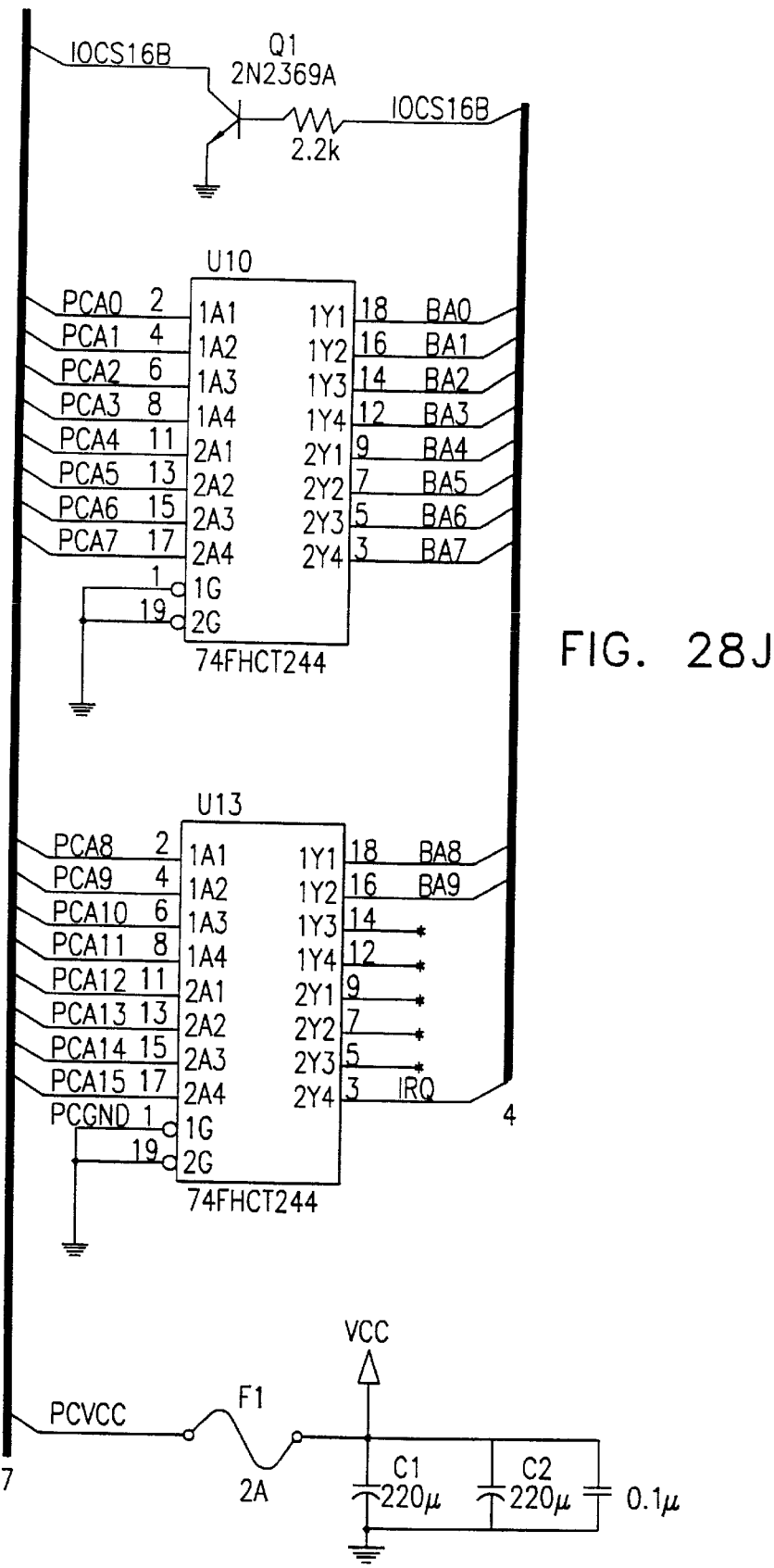
Figure 28K:
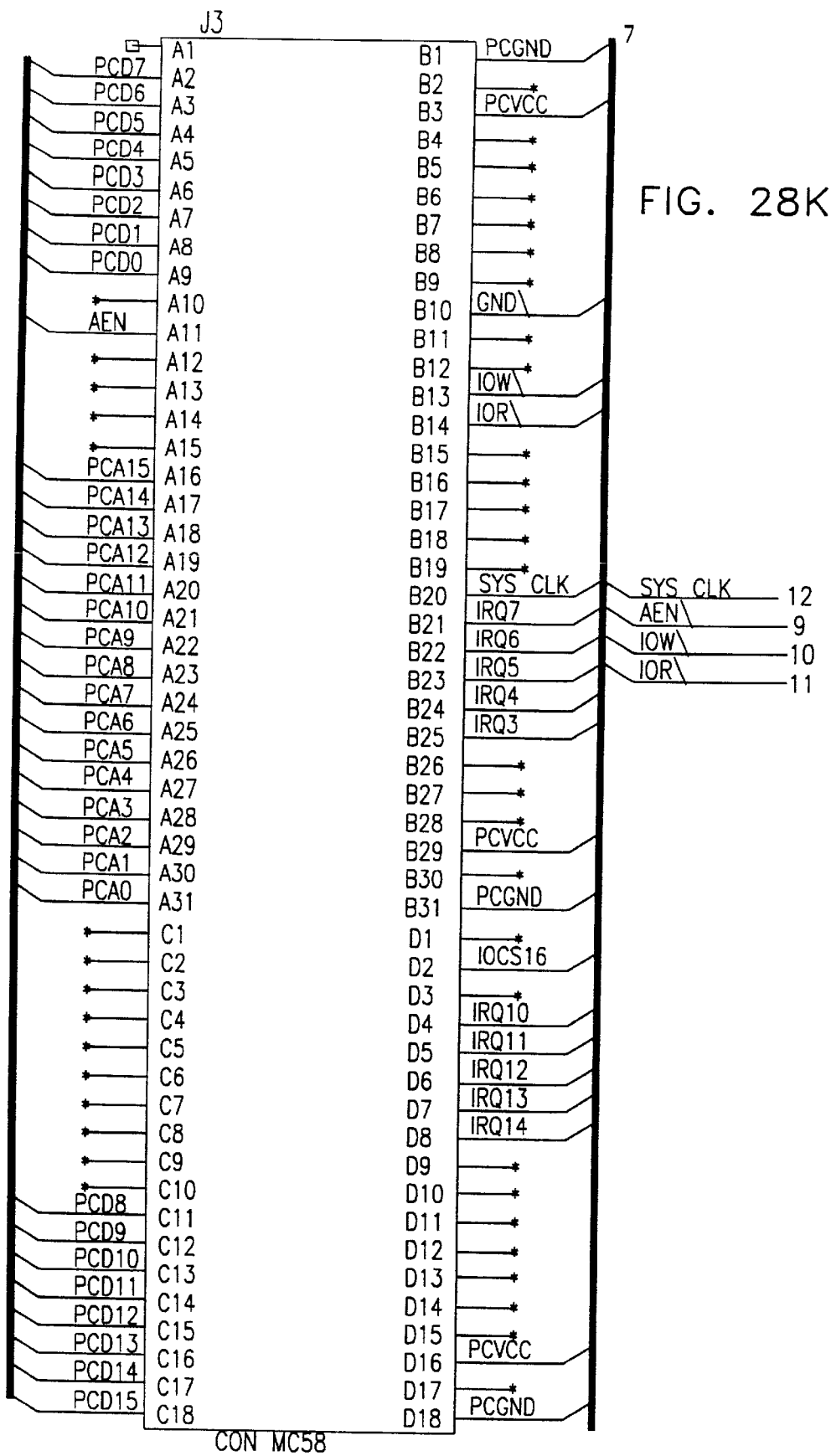
Figure 29A:
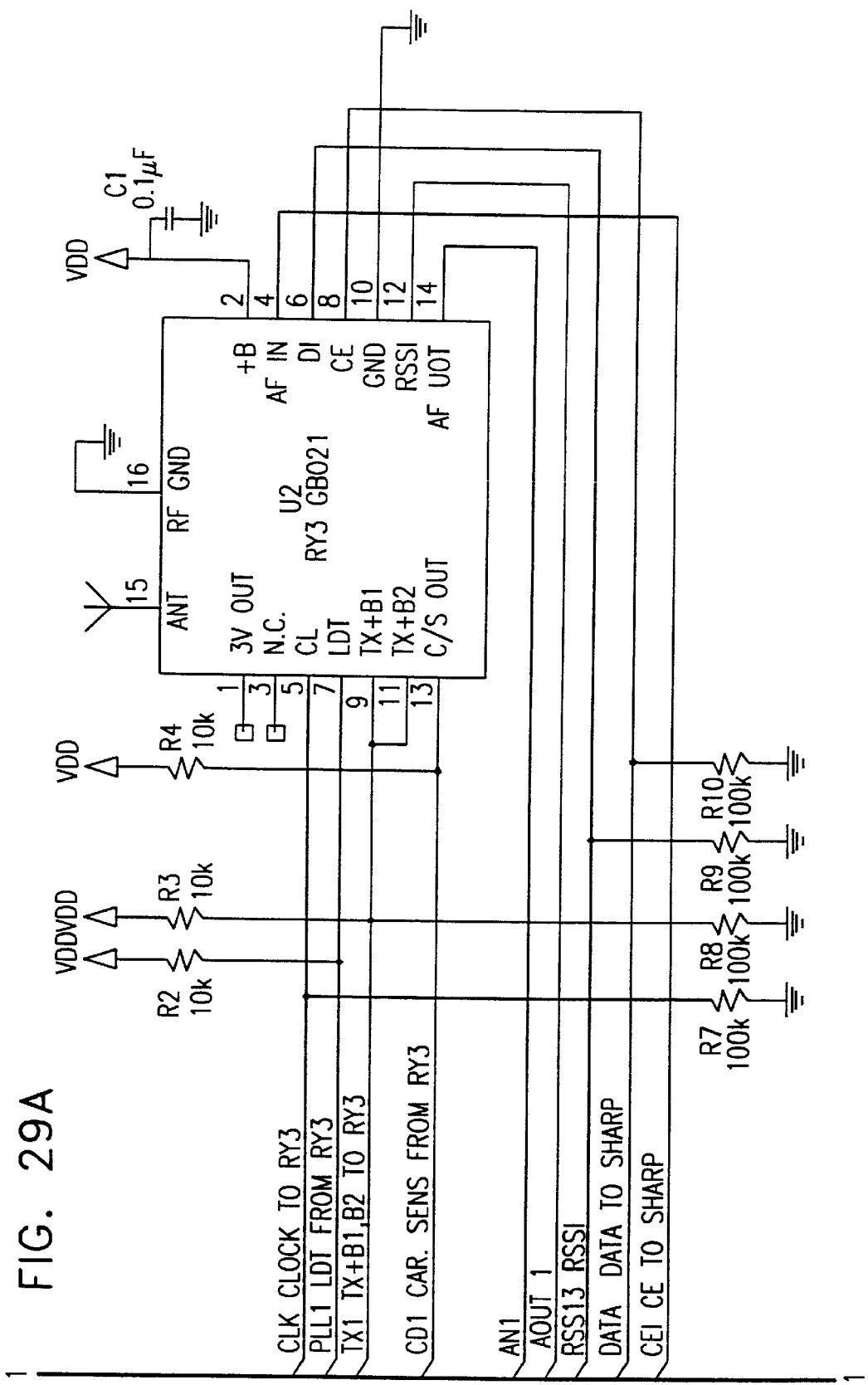
FIGS. 29A–29I, taken together, form a detailed electronic schematic diagram of the multi-port multi-channel computer radio interface sub-unit of FIG. 14.
Figure 29B:
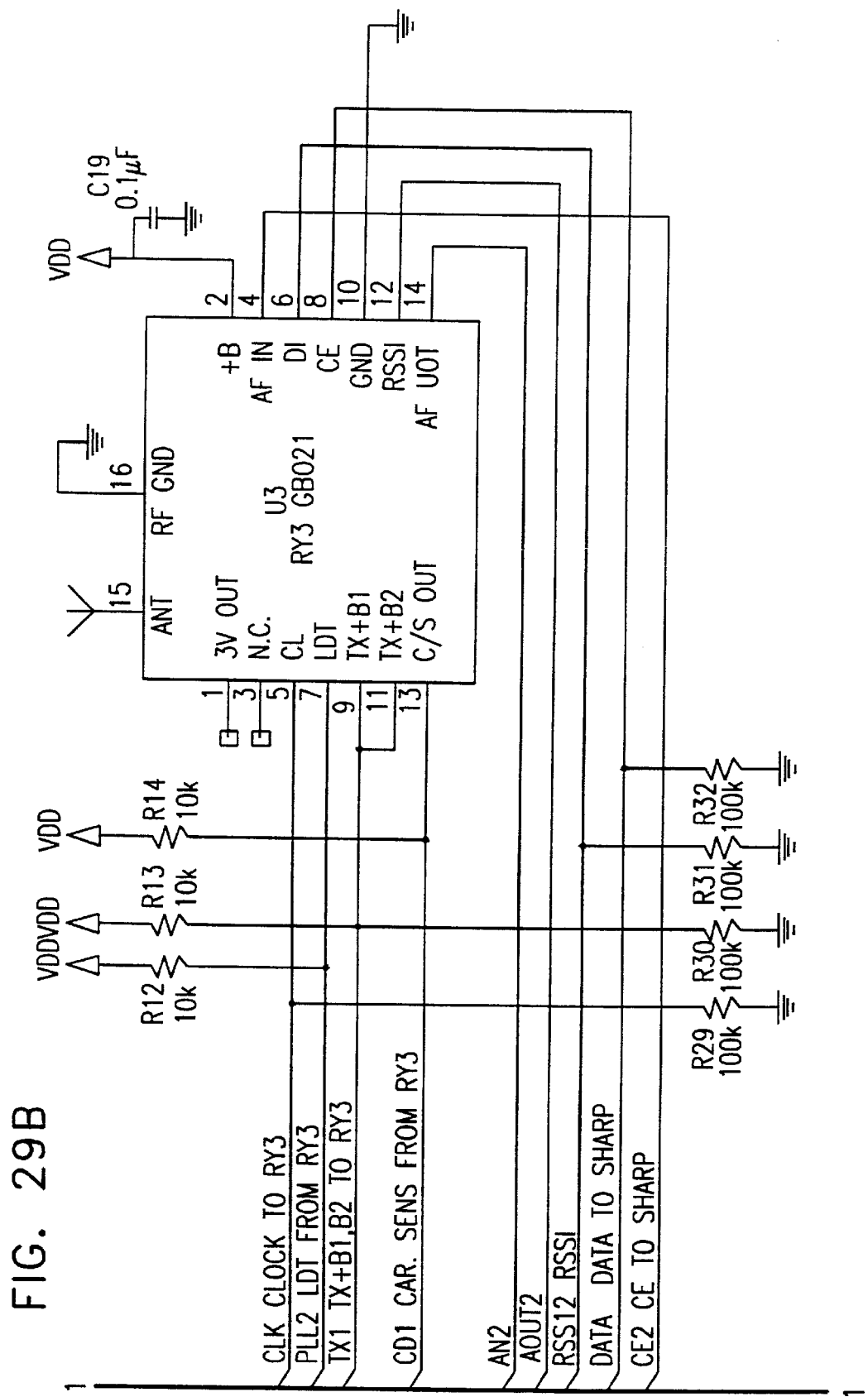
Figure 29C:
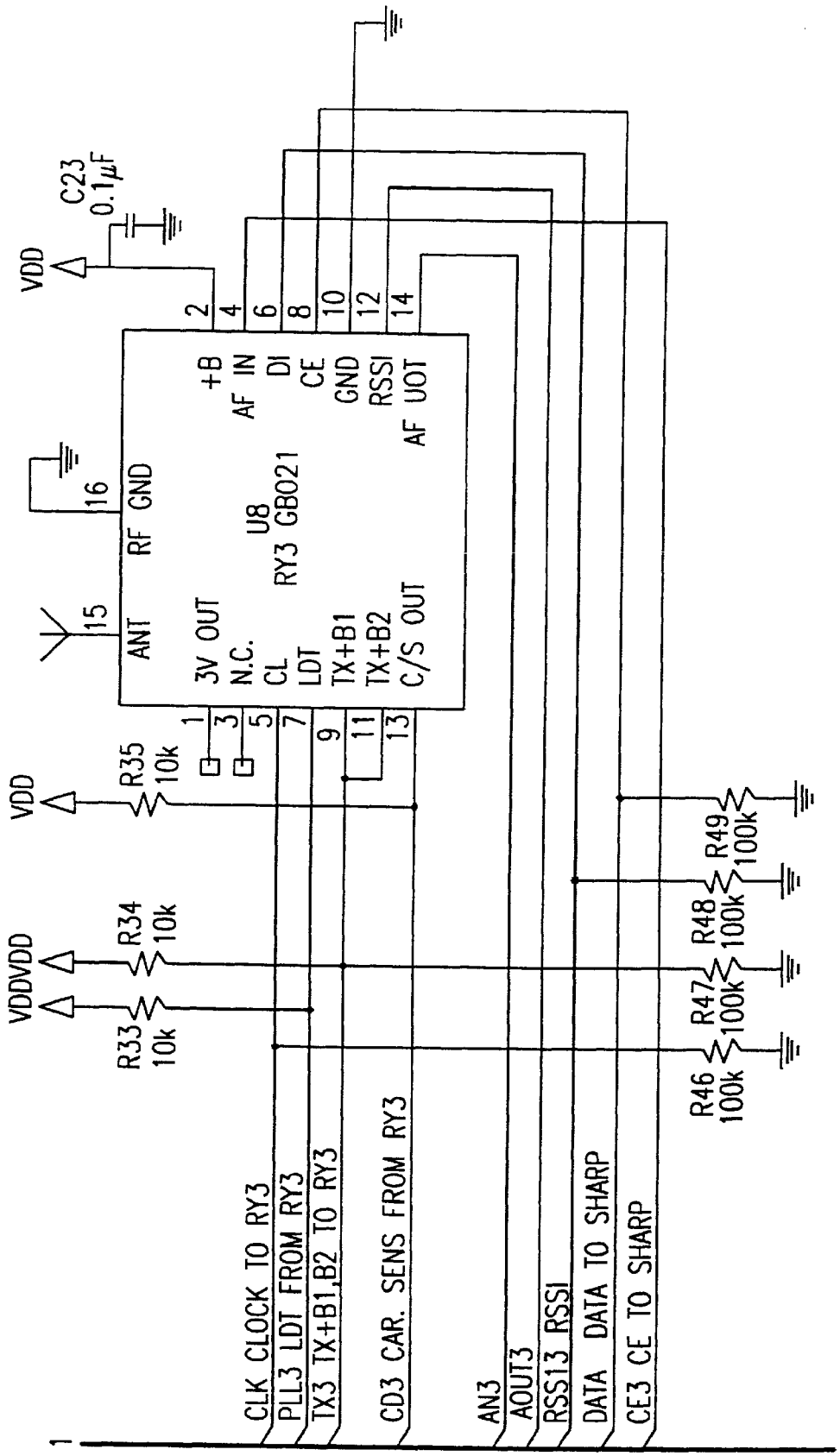
Figure 29D:
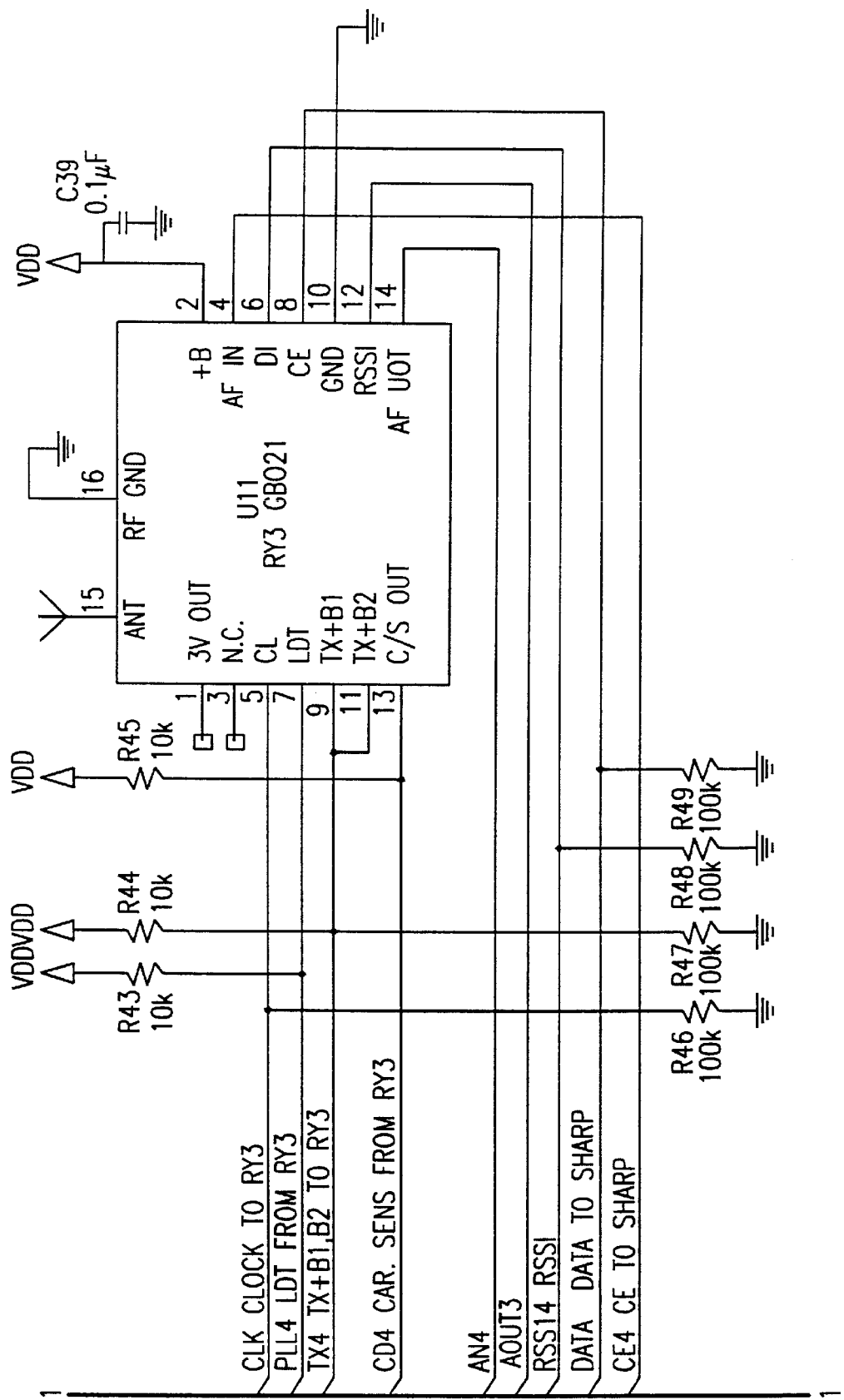
Figure 29E:
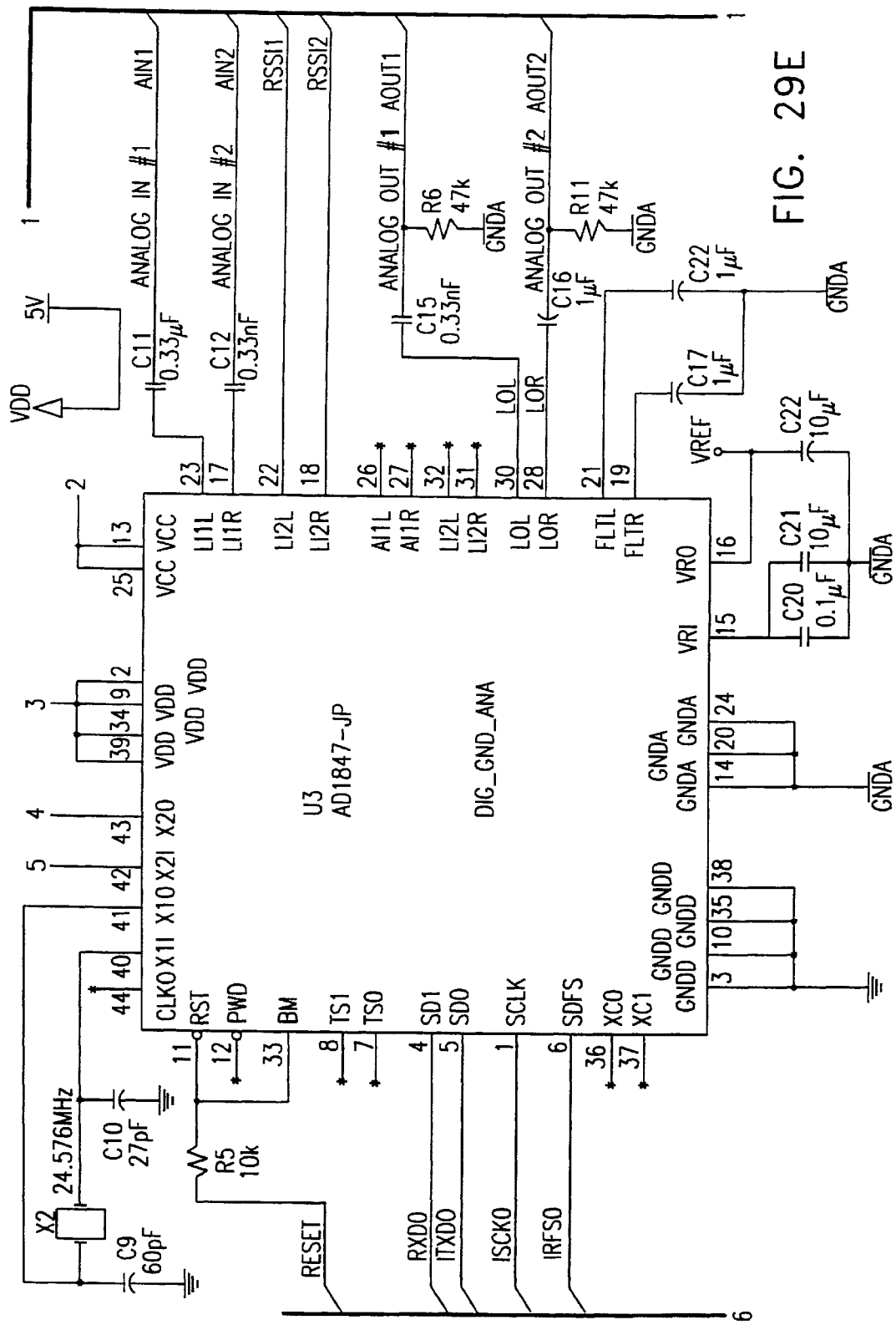
Figure 29F:
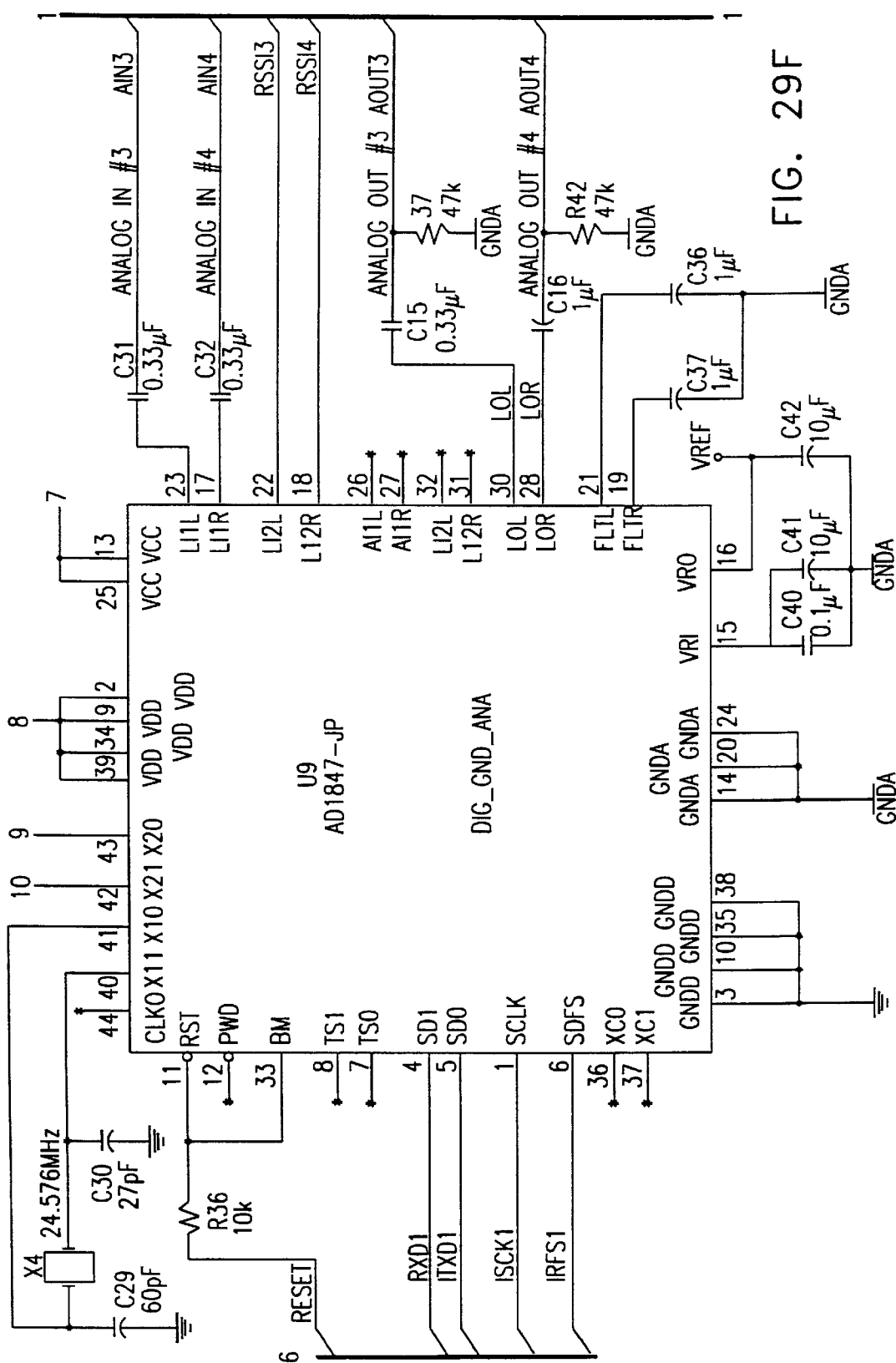
Figure 29G:
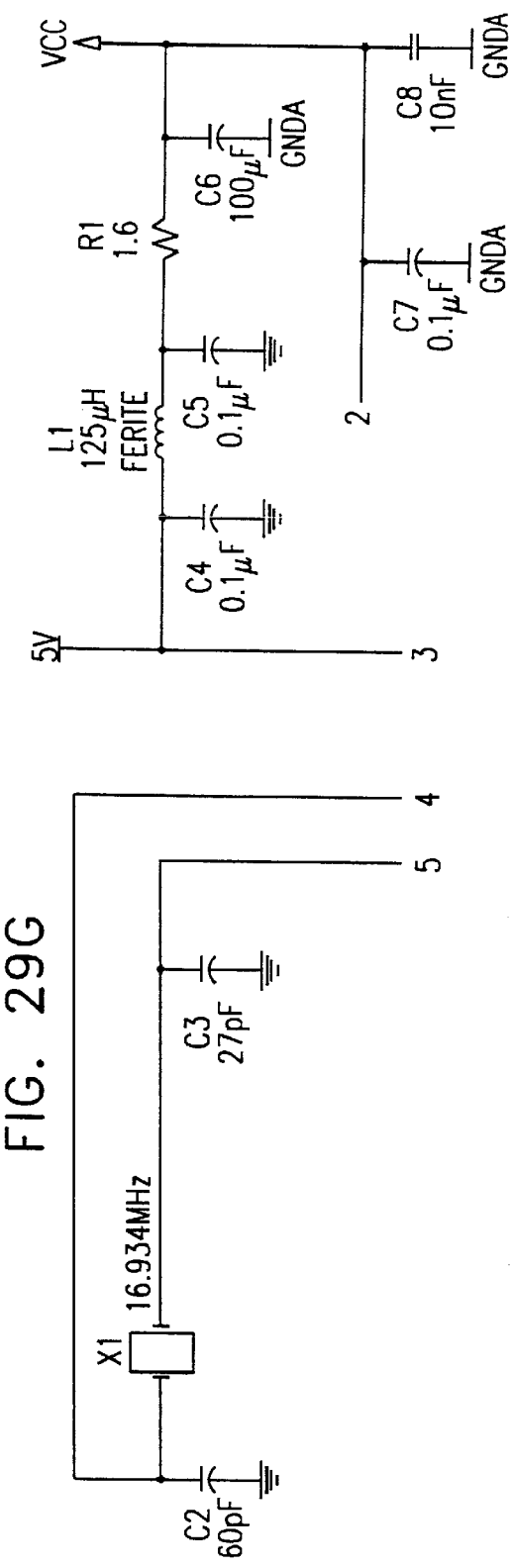
Figure 29H:
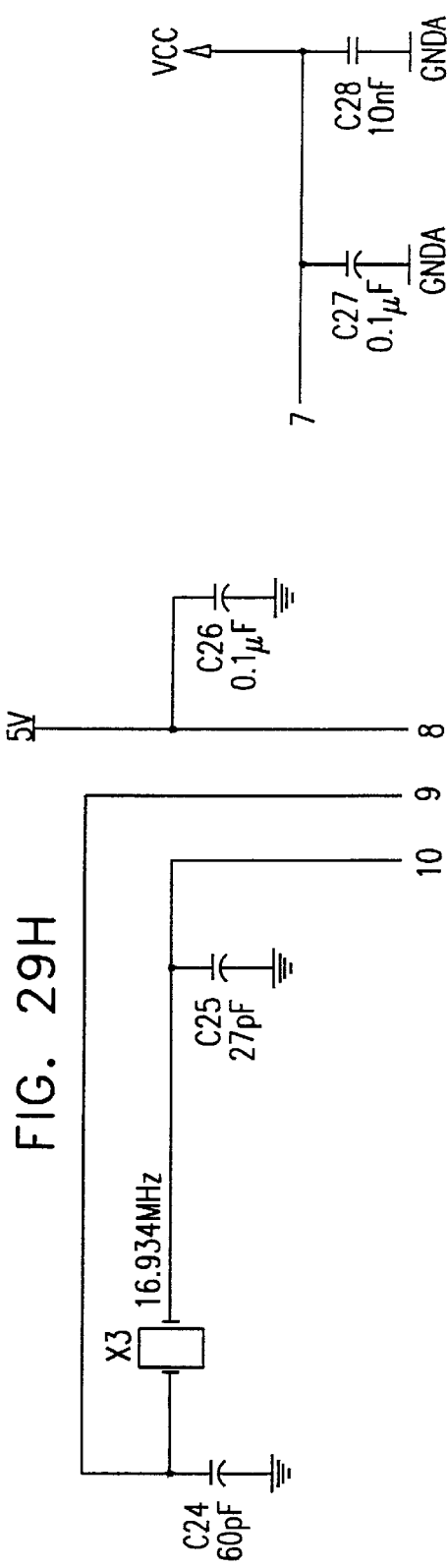
Figure 29I:
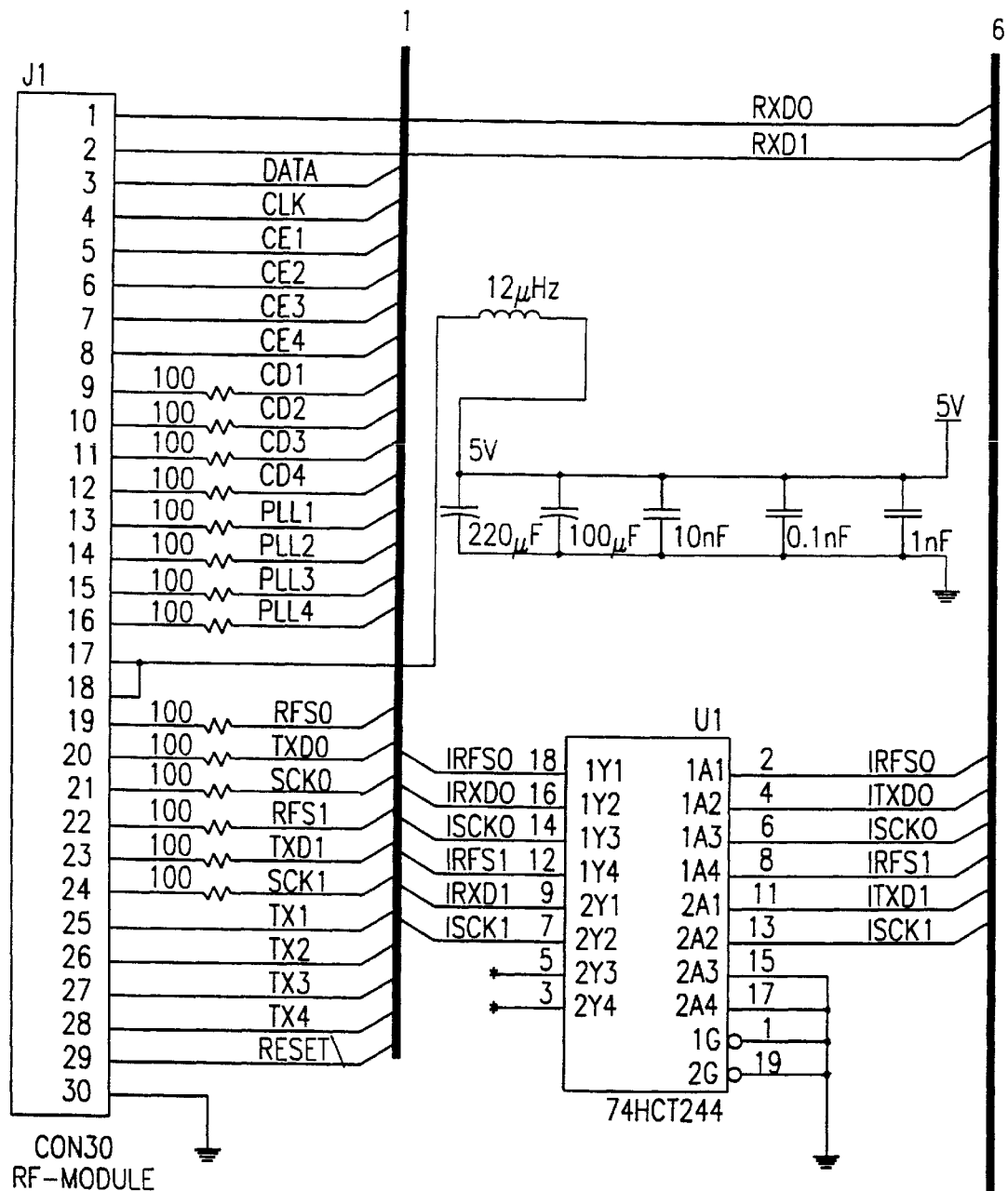
Figure 32A:
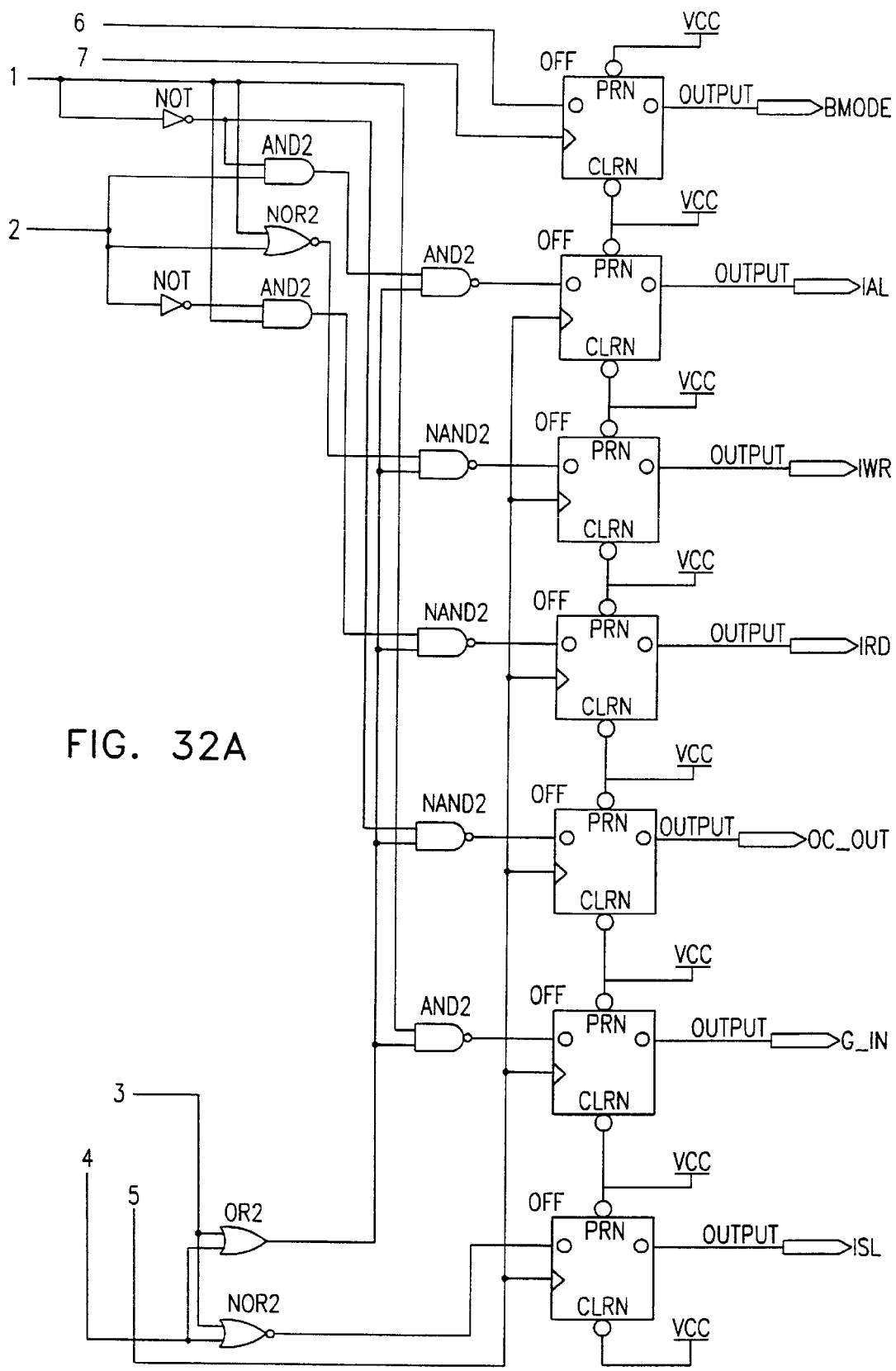
Figure 32B:
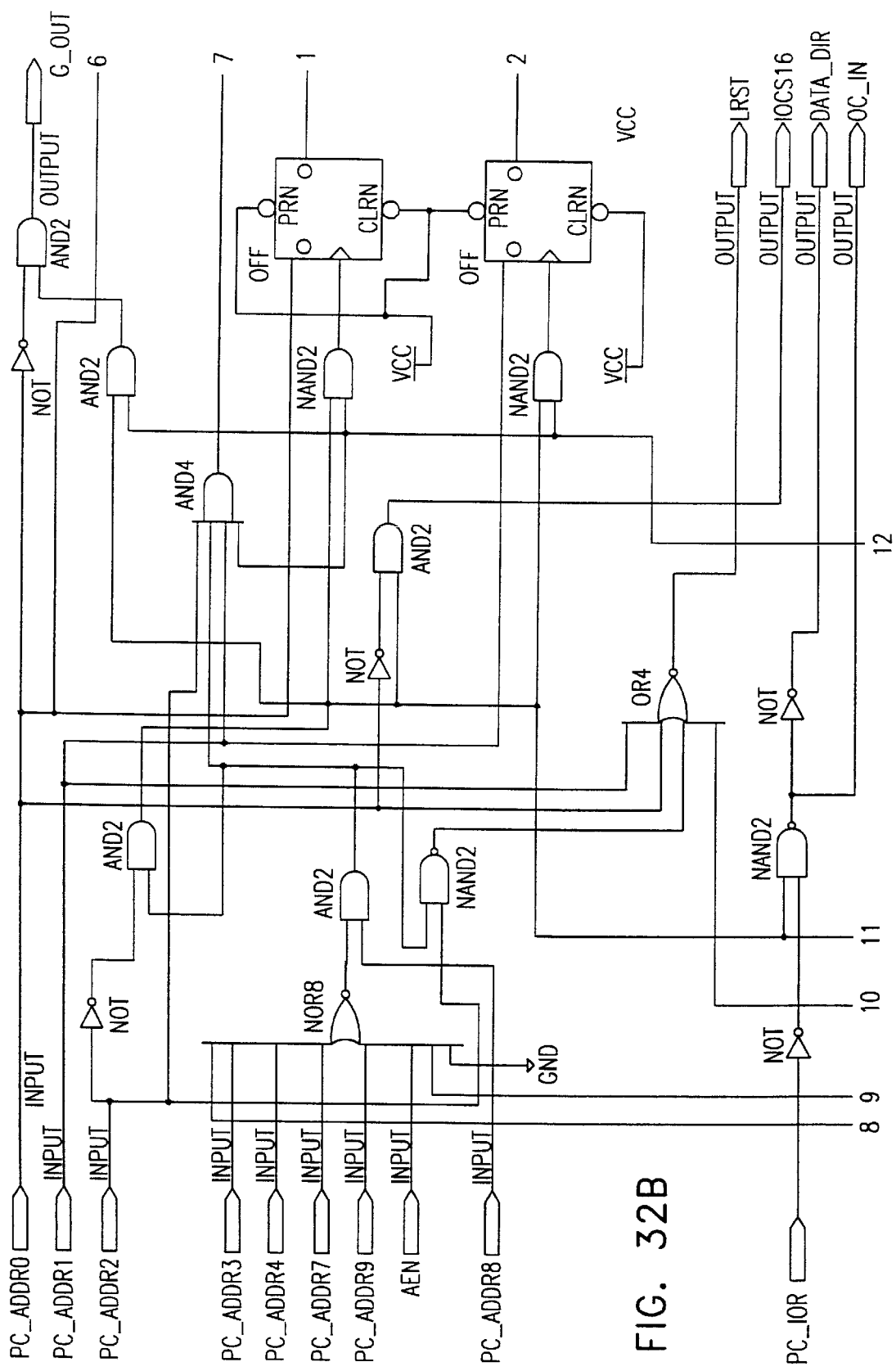
Figure 32C:
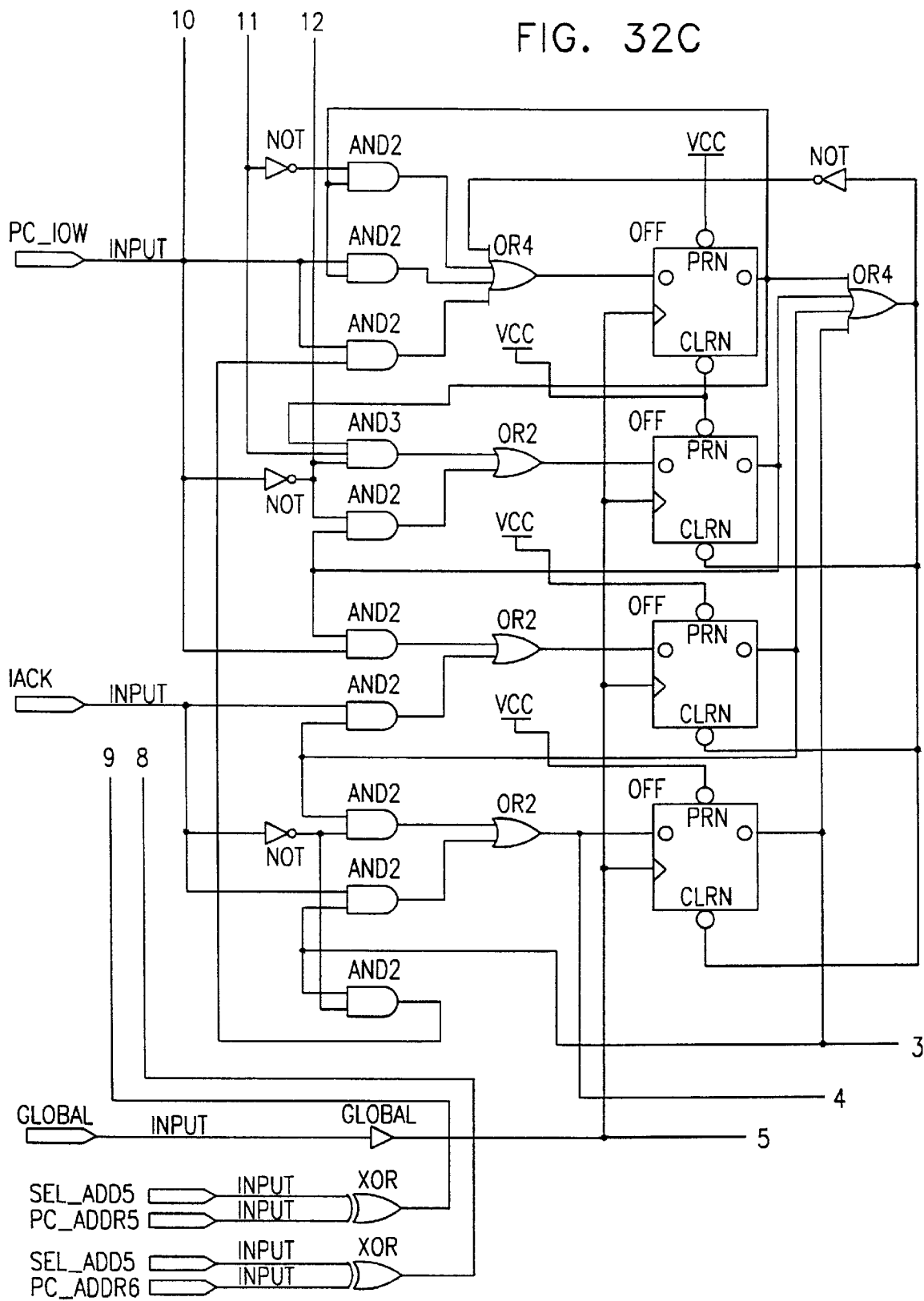

FIGS. 32A, 32B and 32C taken together form a simplified schematic diagram of the EP900 EPLD chip (U9) of FIG. 28H. The code to program the EPLD chip for this schematic diagram preferably uses the programming package "Max Plus II Ver. 6.2" available from Altera Corporation, 3525 Monroe Street, Santa Clara, Calif. 5051, USA.

FIGS. 33–43, described hereinbelow, illustrate embodiments of the toy system of FIGS. 1–32C in which a computer-controlled toy system has a capacity for modifying a known language and/or speaking in a previously unknown or whimsical language.

Figure 33:
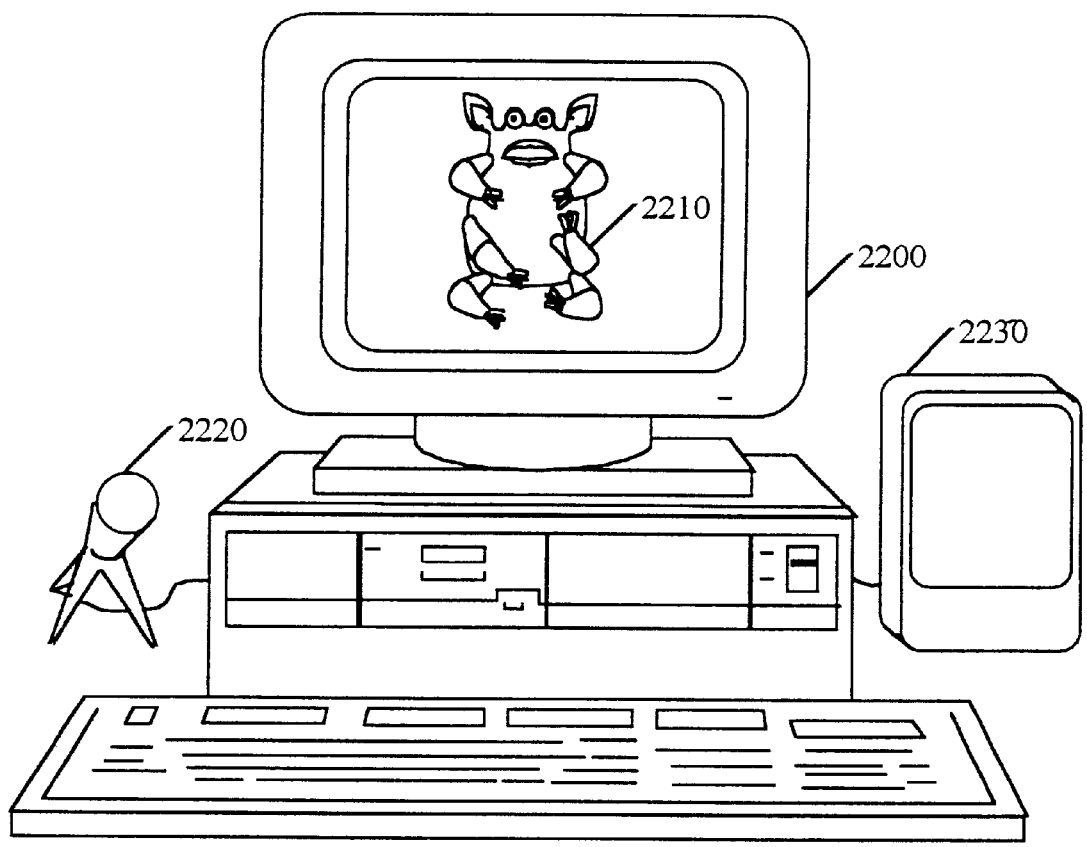

Reference is now made to FIG. 33 which is a simplified pictorial illustration of a display-based fanciful figure interaction system constructed and operative in accordance with a preferred embodiment of the present invention. Shown is a computer 2200 on which a fanciful FIG. 2210 is displayed. Computer 2200 is preferably configured with an audio input device 2220, typically a microphone, through which computer 2200 may receive audio input, and an audio output device 2230, typically a speaker, through which computer 2200 may provide audio output, as is well known in the art.

Figure 34A:
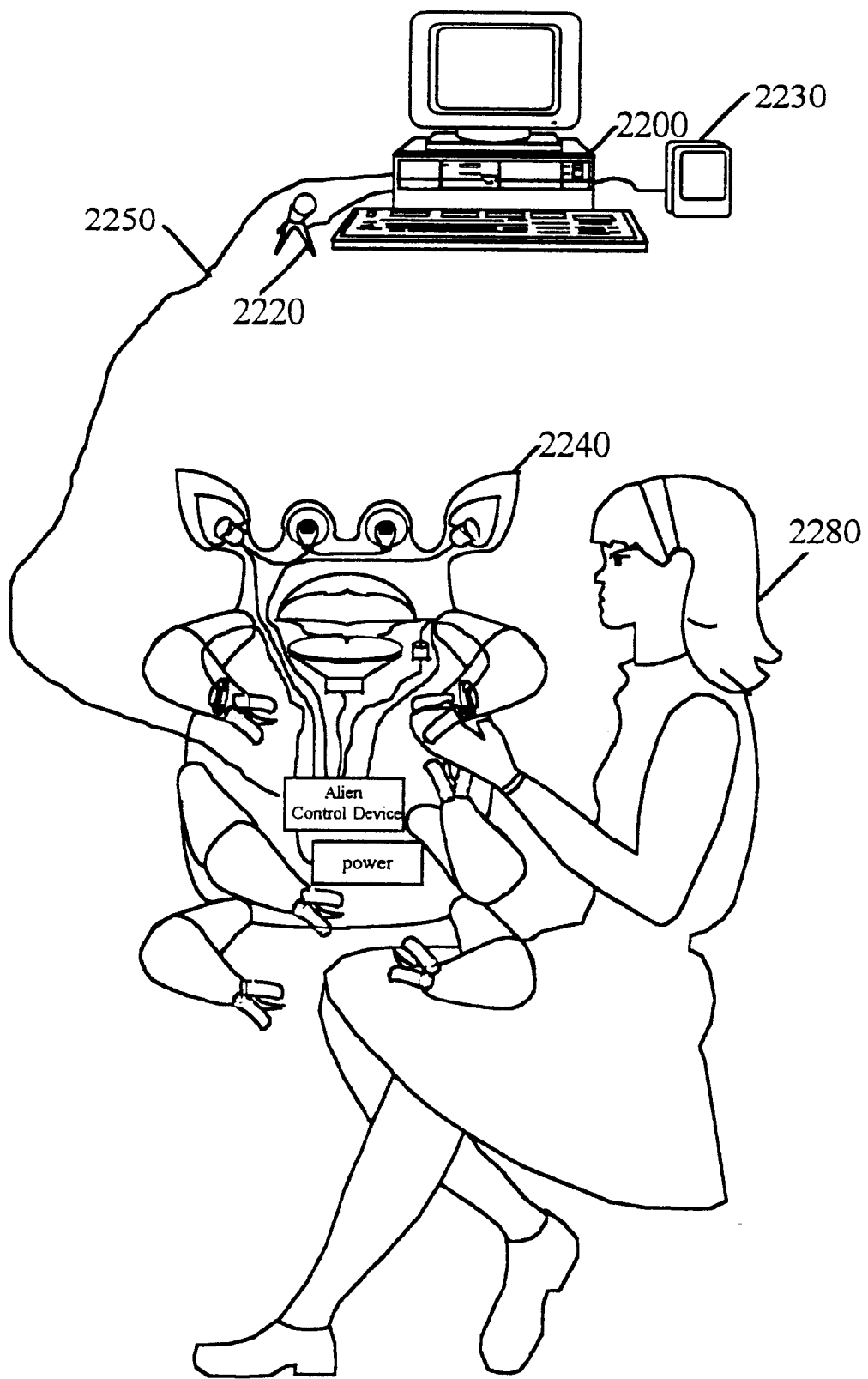
FIGS. 34A and 34B, taken together, are simplified pictorial illustrations of a toy-based fanciful figure interaction system constructed and operative in accordance with another preferred embodiment of the present invention.
Figure 34B:
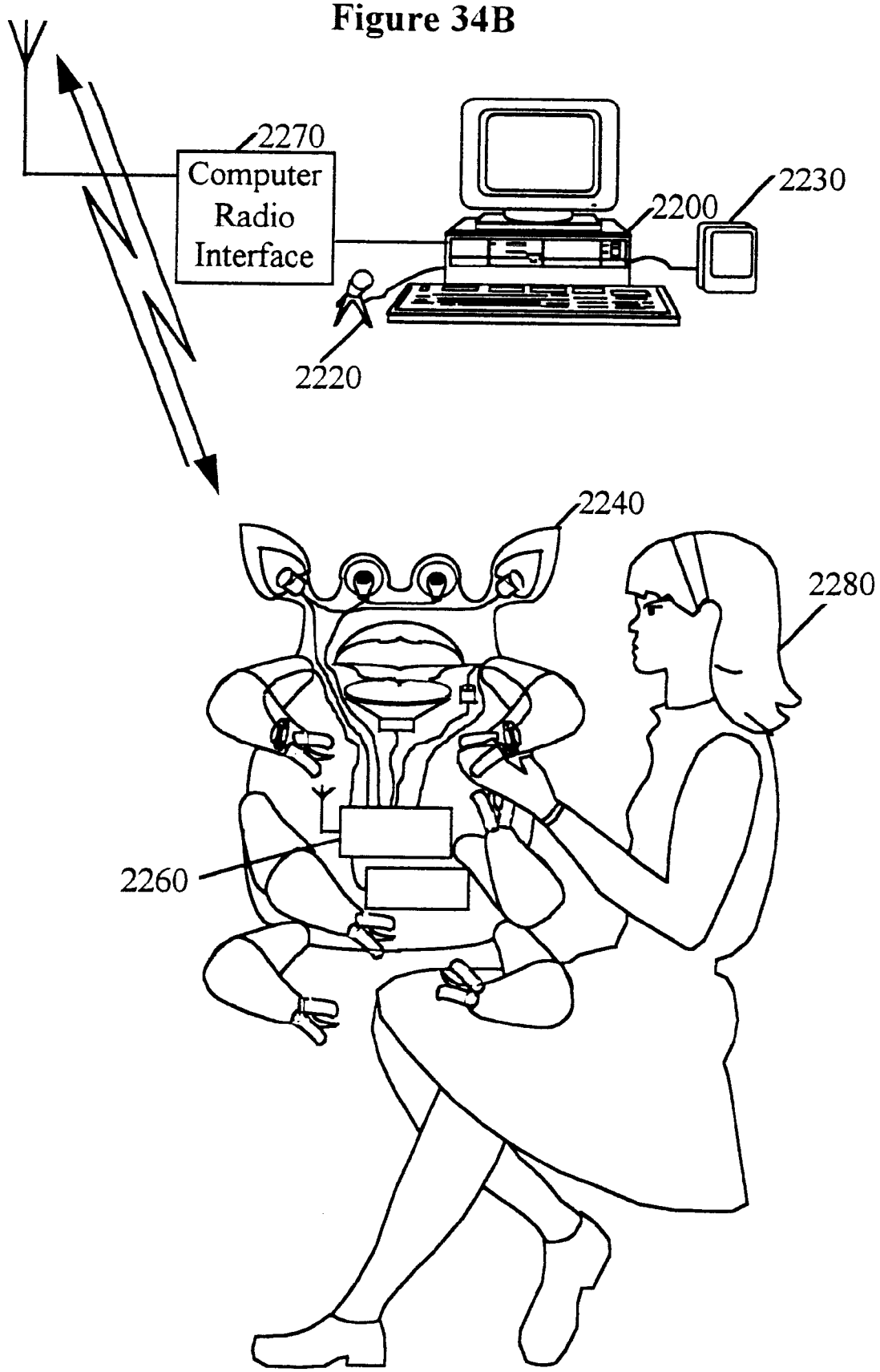
Figure 34C:
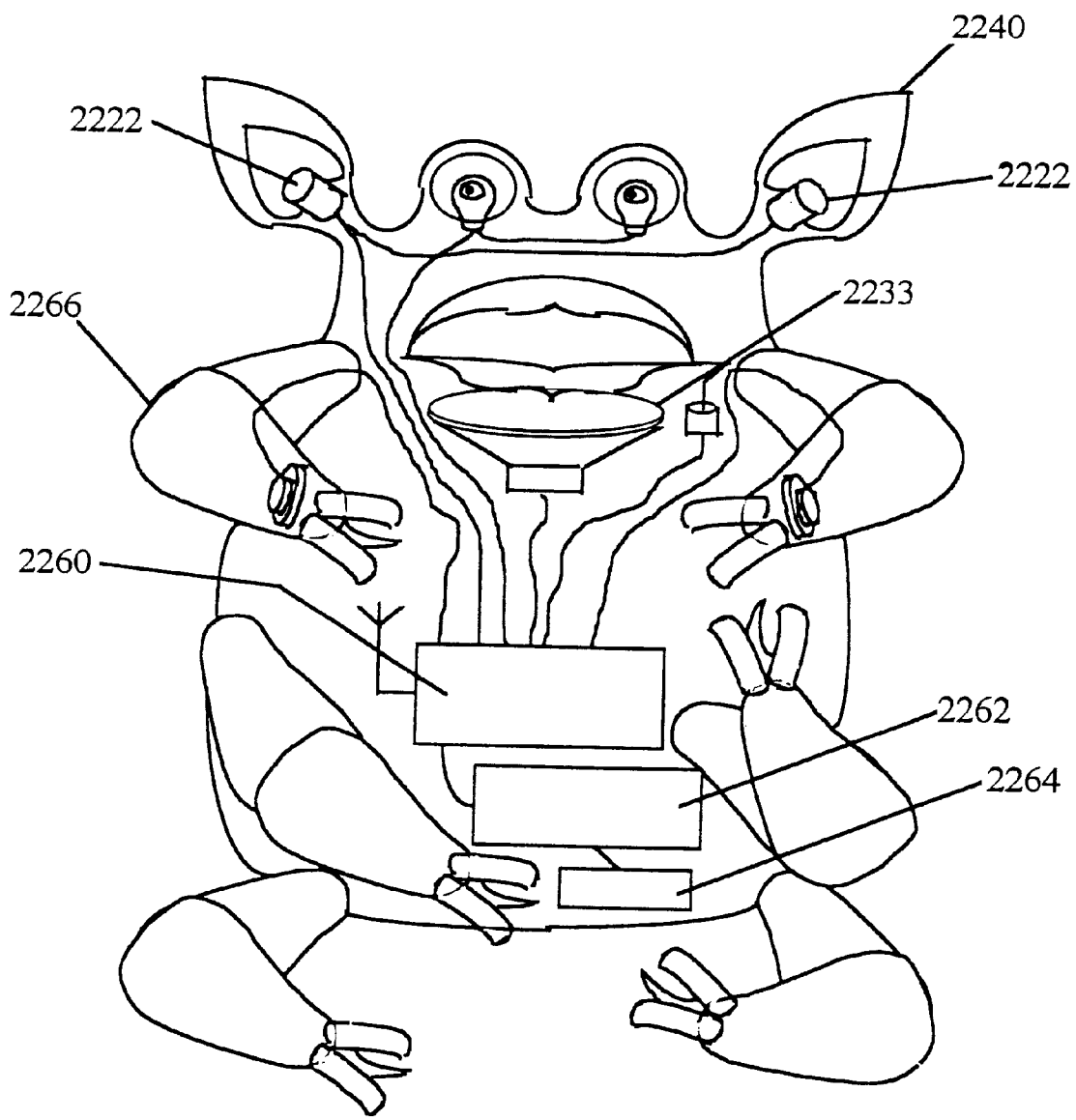
FIG. 34C is a simplified pictorial illustration of the toy-based fanciful figure of FIGS. 34A and 34B.

Reference is additionally made to FIGS. 34A and 34B which are simplified pictorial illustrations of a toy-based fanciful figure interaction system, and FIG. 34C which is a simplified pictorial illustration of a toy-based fanciful figure constructed and operative in accordance with another preferred embodiment of the present invention. Shown in FIGS. 34A and 34B is computer 2200 preferably configured with audio input device 2220 and audio output device 2230. In FIG. 34A a toy 2240 is shown in wired communication with computer 2200 along wired connection 2250, while in FIG. 34B toy 2240 is shown to be in wireless communication with computer 2200 via toy transceiver 2260 and computer radio interface 2270. It is appreciated that more than one toy may be in communication with computer 2200 at any given time. Audio input device 2220 and/or audio output device 2230 may be replaced with or augmented by audio input device 2222 and/or audio output device 2233 (FIG. 34C) assembled with toy 2240 for input and/or output communication with computer 2200. Shown more clearly in FIG. 34C, toy 2240 is preferably configured with a control unit 2262, a power unit 2264, and one or more articulating appendages 2266. A user 2280 is also shown interacting with toy 2240. It is appreciated that any or all of the functionality of computer 2200 may be assembled with or otherwise incorporated in toy 2240. A preferred configuration of the toy-based fanciful figure interaction system of FIGS. 34A, 34B, and 34C are described in greater detail hereinabove with reference to FIGS. 1–32C.

Figure 35:
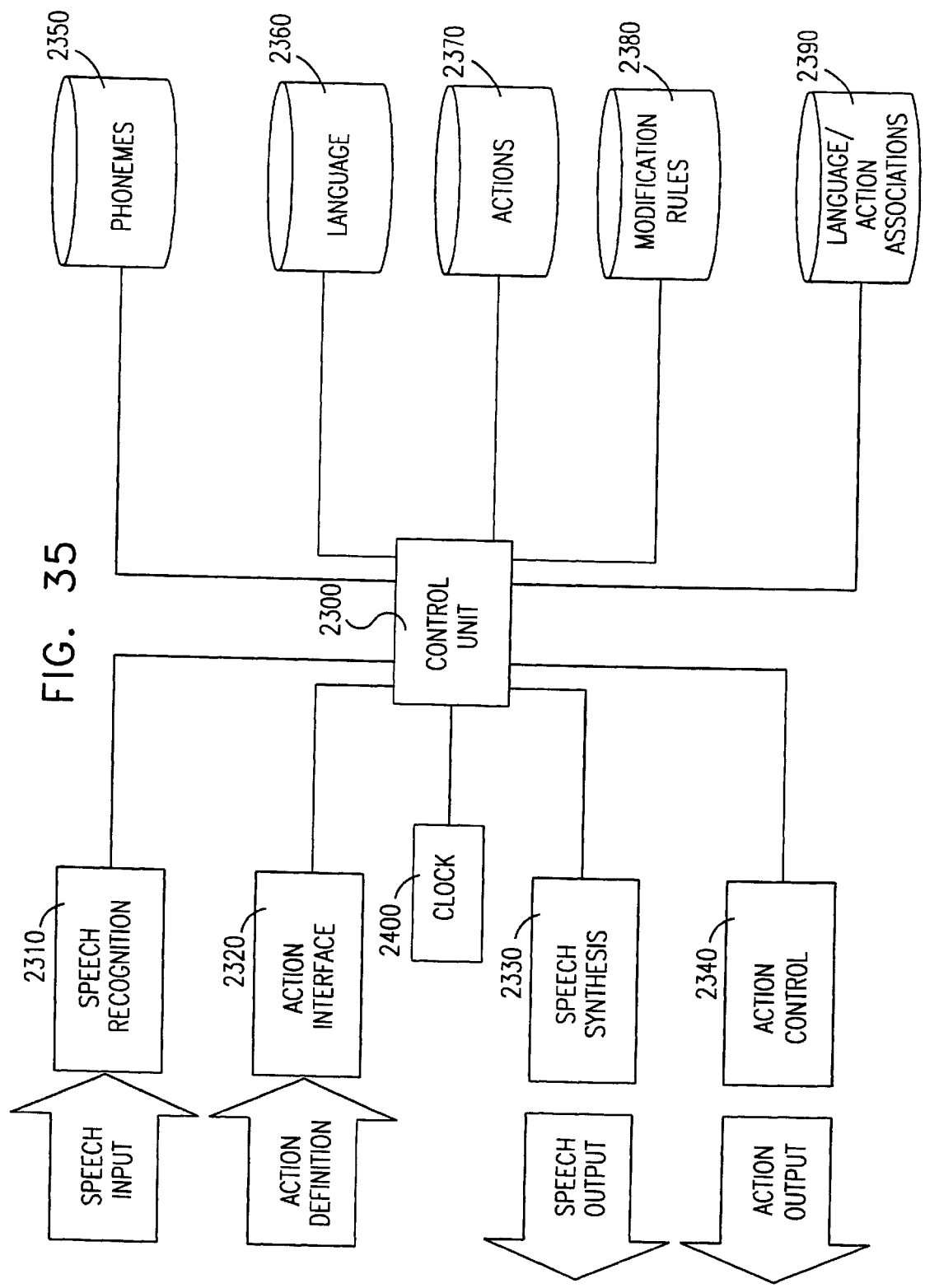

Reference is now made to FIG. 35 which is a simplified block diagram of a fanciful figure interaction system useful in the systems of FIGS. 33, 34A, 34B, and 34C, constructed and operative in accordance with a preferred embodiment of the present invention. It is appreciated that the system of FIG. 35 may be implemented in computer hardware, computer software, or in any combination of computer hardware and software. The system of FIG. 35 preferably comprises a control unit 2300, a speech input and recognition unit 2310 capable of receiving a speech input and identifying the words comprising the speech input, an action interface 2320 capable of receiving action instructions from users, a speech synthesis unit 2330 capable of producing audio speech output, and an action control unit 2340 capable of controlling an external action. Speech unit 2310 may receive input from audio input device 2220 (FIG. 33). Action interface 2320 may be implemented via computer 2200 (FIGS. 33, 34A, 34B, and 34C) using known computer menu interfaces or other known interfaces. Speech synthesis unit 2330 may provide output via audio output device 2230 (FIG. 33). Action control unit 2340 may control an action associated with fanciful FIG. 2210 (FIG. 33) or toy 2240 (FIGS. 34A, 34B, and 34C). The system of FIG. 35 also preferably comprises one or more sets of phonemes 2350, one or more language sets 2360, each typically comprising one or more words in a known language such as English or fanciful words, a set 2370 of actions, terms, feelings, or other concepts, one or more modification rule sets 2380, and an association set 2390 for maintaining associations between language set 2360 and action set 2370. Any of the sets described with reference to FIG. 35 may be maintained in volatile or non-volatile computer storage as is well known. The system of FIG. 35 also preferably comprises a clock 2400. A logical implementation of the various sets shown in FIG. 35 is described in greater detail hereinbelow with reference to FIG. 41.

Figure 36:
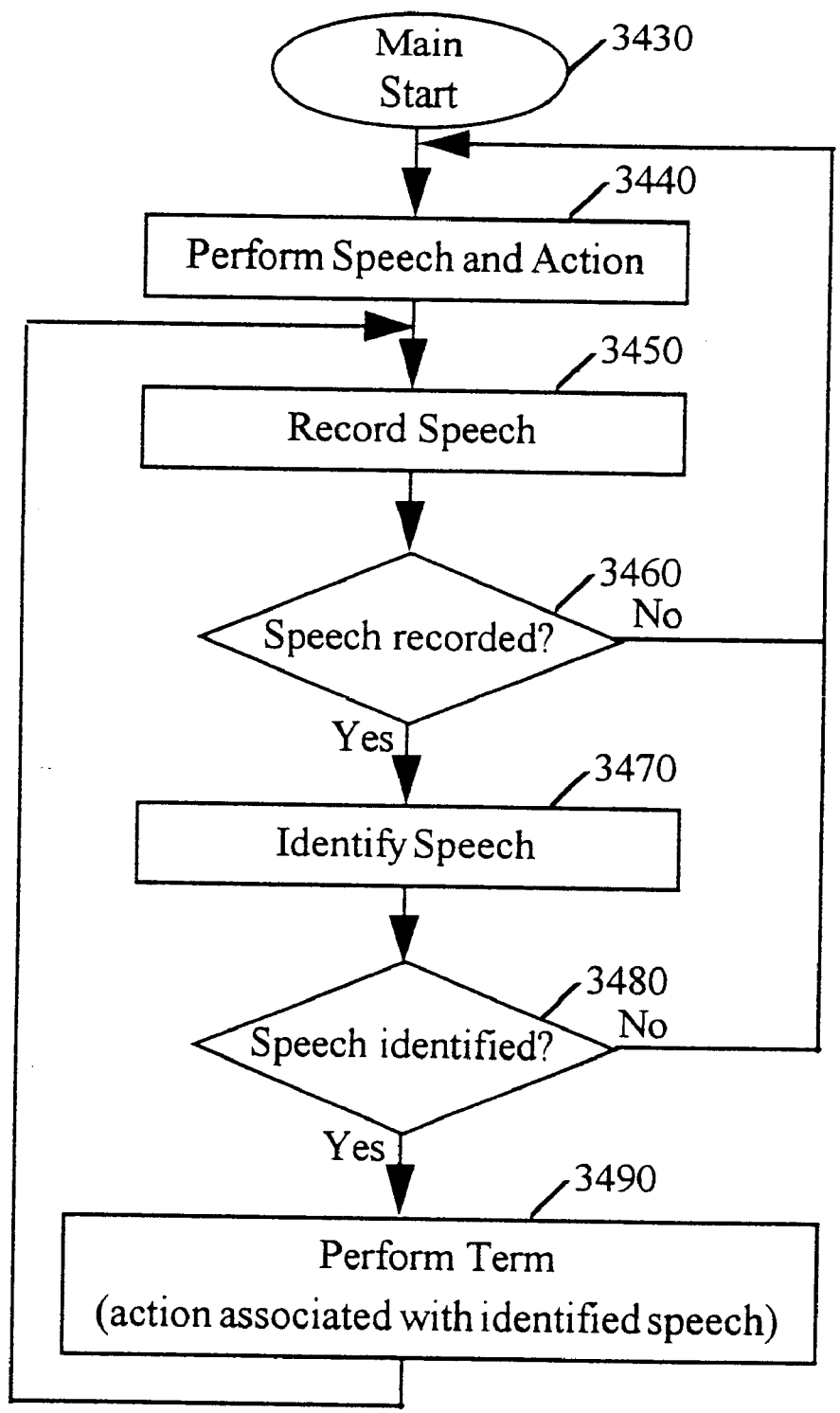

Reference is now made to FIG. 36 which is a simplified operational flow chart of a fanciful figure interaction system useful in describing the systems of FIGS. 33, 34A, 34B, 34C, and 35 constructed and operative in accordance with a preferred embodiment of the present invention. Typical operation begins (step 3430) with the fanciful FIG. 2210 (FIG. 33) or toy 2240 (FIGS. 34A, 34B, and 34C) performing an action and verbalizing associated speech. A preferred method of performing step 3430 is described in greater detail hereinbelow with reference to FIG. 37. In step 3450 speech input is accepted. A preferred method of performing step 3450 is described in greater detail hereinbelow with reference to FIG. 38. Should the speech not be successfully recorded (step 3460) operation continues with step 3440. Successfully recorded speech is then identified, typically using known speech-recognition software (step 3470). A preferred method of performing step 3470 is described in greater detail hereinbelow with reference to FIG. 39. Should the speech not be successfully identified (step 480) operation continues with step 3. Successfully identified speech is then checked for an association with a known action which is then performed (step 3470). A preferred method of performing step 3490 is described in greater detail hereinbelow with reference to FIG. 40.

Figure 37:
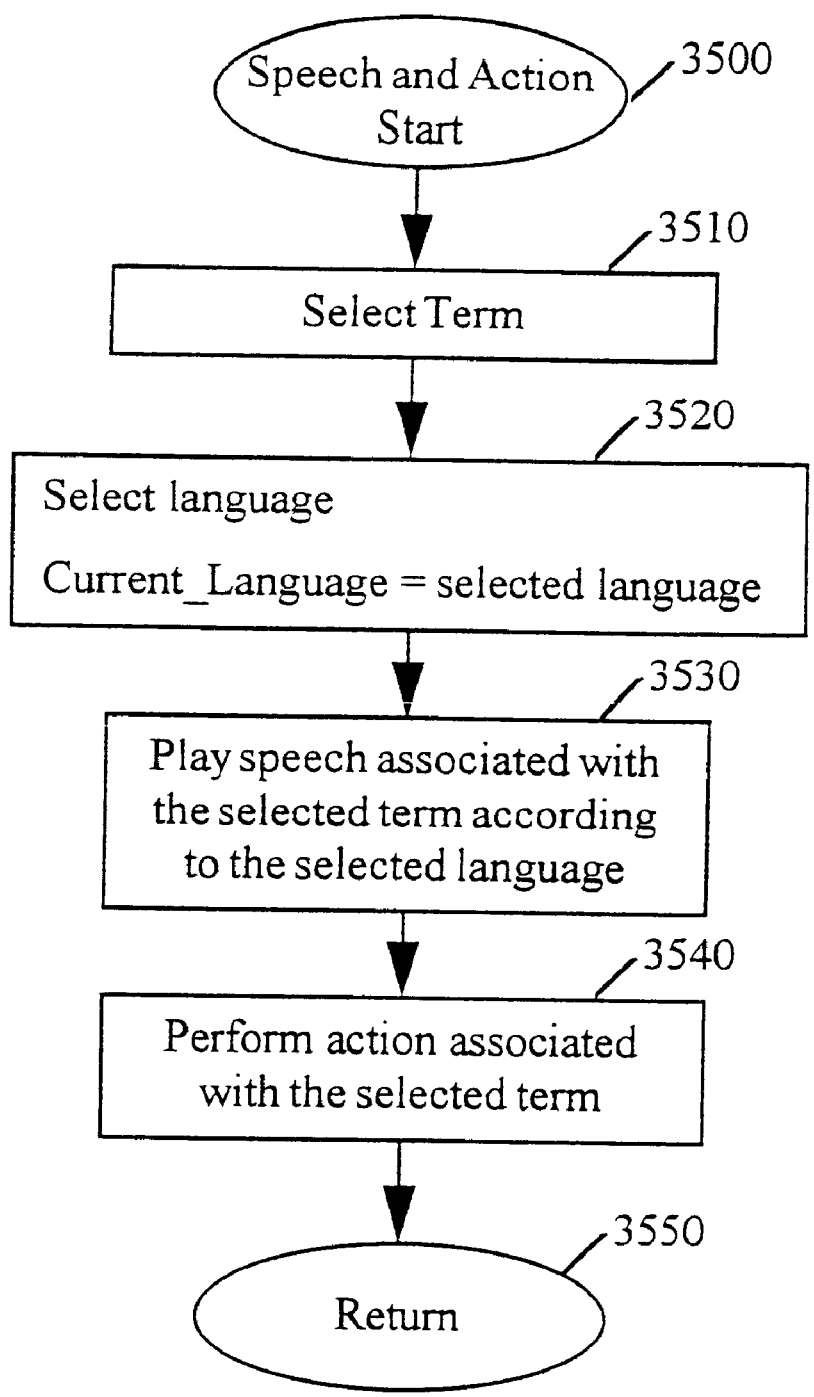

Reference is now made to FIG. 37 which is a simplified operational flow chart of a preferred implementation of step 3440 of FIG. 36 in greater detail, constructed and operative in accordance with a preferred embodiment of the present invention. Typical operation begins (step 3500) with selecting a term or action from action set 2390 (FIG. 35) in accordance with selection criteria (step 3510). The selection may be random or in accordance with a level of complexity or history of usage associated with an action. Clock 2400 (FIG. 35) may be used to advance the level of complexity over time. A language is then selected to be the current language, similarly at random or in accordance with selection criteria (step 3520). Association set 2390 (FIG. 35) is then searched for an association between language in language set 2360 (FIG. 35) and the selected term or action (step 3530). The associated action is then performed (step 3540) with or without verbalizing the associated language, and operation continues with step 3450 (FIG. 36) (step 3550).

Figure 38:
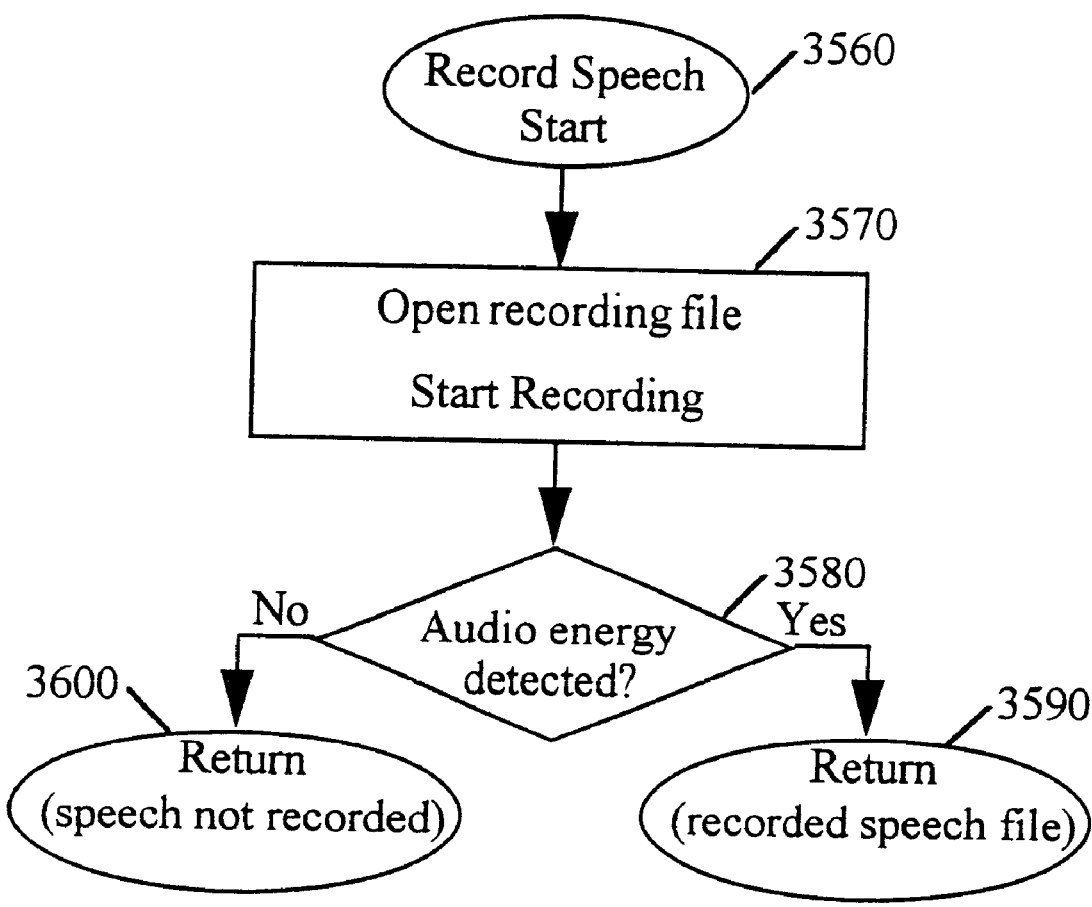

Reference is now made to FIG. 38 which is a simplified operational flow chart of a preferred implementation of step 3450 of FIG. 36 in greater detail, constructed and operative in accordance with a preferred embodiment of the present invention. Typical operation begins (step 3560) with recording audio input typically comprising speech (step 3570). The audio input in typically received via audio input device 2220 (FIGS. 33, 34A, 34B, and 34C). A data file in a volatile or non-volatile storage medium is typically used for recording the audio input as is well known. The presence or absence of audio input is detected (step 3580) with operation continuing with step 3460 (FIG. 36) when either a file is constructed given the presence of audio input (step 3590) or no file is created in the absence of audio input (step 3600).

Figure 39:
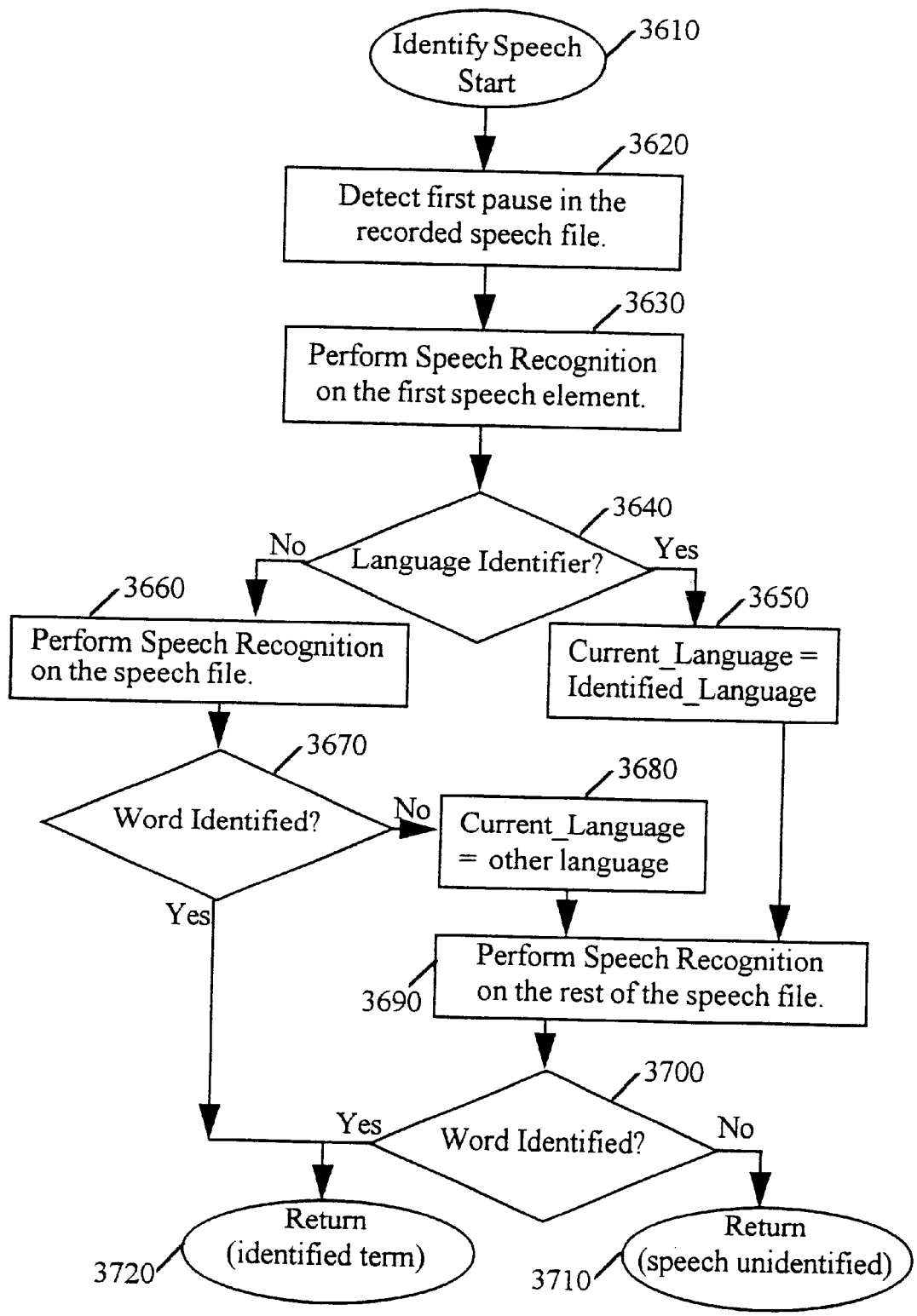

Reference is now made to FIG. 39 which is a simplified operational flow chart of a preferred implementation of step 3470 of FIG. 36 in greater detail, constructed and operative in accordance with a preferred embodiment of the present invention. Typical operation begins (step 3610) with analyzing the file constructed in step 3590 of FIG. 38 for a first pause between speech elements, yielding a first speech element (step 3620). Speech recognition is then performed on the first speech element (step 3630). If the first speech element is a language identifier (step 3640) then the current language is set to the language indicated by the identifier (step 3650) and operation continues with step 3690. If the first speech element is not a language identifier, speech recognition is performed on the rest of the file using the language last used as the current language (step 3660). The speech is then identified for known words in the current language (step 3670). If no known words are found, another language is set to the current language (step 3680) and speech recognition is again performed on the rest of the file (step 3690). The speech is then identified for known words in the current language (step 3700). If no known words are found, an indicator is returned indicating that the speech has not been identified (step 3710). If the word is identified in a known, learned, generated, or modified language an indicator is returned indicating that the speech has been identified (step 3720). Operation continues with step 3480 (FIG. 36).

Figure 40:
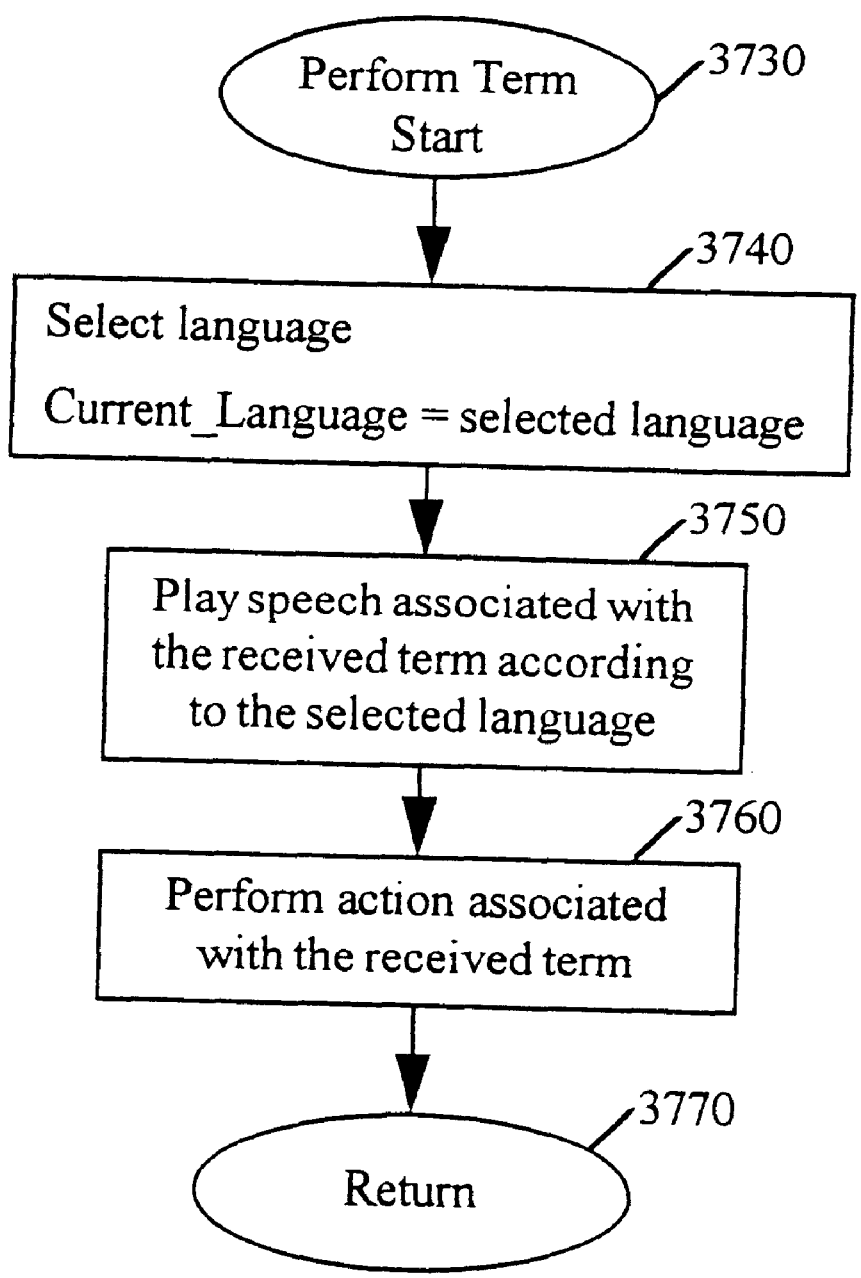

Reference is now made to FIG. 40 which is a simplified operational flow chart of a preferred implementation of step 3490 of FIG. 36 in greater detail, constructed and operative in accordance with a preferred embodiment of the present invention. Typical operation begins (step 3730) with selecting a language which becomes the current language, at random or in accordance with selection criteria (step 3740). Association set 2390 (FIG. 35) is then searched for an association between language in language set 2360 (FIG. 35) and the term or action (step 3750). The associated action is then performed (step 3760) and operation continues with step 3450 (FIG. 36) (step 3770).

Reference is now made to FIG. 41 which is a simplified block diagram of a logical implementation of the various sets described hereinabove with reference to FIG. 35 constructed and operative in accordance with a preferred embodiment of the present invention. A root entity 2780 typically comprises a list of terms comprising preset terminology and learned terminology. Preset terminology is typically preconfigured with toy 2240 (FIGS. 34A, 34B, 34C), and/or preconfigured in ROM, diskette, and/or CDROM, etc. for access by computer 2200 FIGS. 33, 34A, 34B and 34C). Learned terminology is typically acquired from a user, referred to herein as a "player." The terminology is preferably associated with two tables: a vocabulary table 2790 and a table of "emotions" 2800. Vocabulary table 2790 is typically used to provide fanciful FIG. 2210 (FIG. 33) and/or toy 2240 (FIG. 34A, 34B, and 34C) with the pronunciation of each term in the list of terms. The pronunciation may be effected via a voice file, a. sequence of phonemes, a text file, etc. as required to produce the necessary sound and according to its medium (i.e., microphone, rule-based or keyboard input, etc.). Table of emotions 2800 typically comprises toy emotions 2810, with toy alternately being referred to herein as "alien," and player emotions 2820. Each toy emotion typically comprises:

a need field that uniquely identifies the emotion;

a sequence of expressions that form the sounds, motions, etc. performed by the toy;

satisfaction that defines the response expected from the player; and gratitude that includes another sequence of expressions and/or a term by which the toy confirms to the player that his or her response was correct. Player emotions 2820 preferably has the same structure as toy emotions 2810.

Reference is now made to FIGS. 42 and 43 which are simplified block diagrams of possible implementations of various tables described in FIG. 41 constructed and operative in accordance with a preferred embodiment of the present invention. A table of terms 2830 typically includes a list of terms and a vocabulary in two languages. Each record contains a term field, the term's pronunciation in the two languages, a usage counter and a level field. The usage counter is useful to ensure that a term will not be under-used. The level field provides for a gradual and automatic increase in the number and complexity of terms available for selection. Typically, the level is automatically increased at a preset pace, such as every week or when the average usage value for a lower level reaches a certain preset value (e.g. 25). To introduce the player to the enhanced vocabulary fanciful FIG. 2210 (FIG. 33) and/or toy 2240 (FIGS. 34A, 34B, and 34C) are preferably equipped with a selection of stories each appropriate to a particular levels of vocabulary. Typically, when a level is increased, fanciful FIGS. 2210 (FIG. 33) and/or toy 2240 (FIG. 34A, 34B, and 34C) plays a story using the relevant vocabulary.

A toy emotion record 2840 and 2850 of FIG. 42 and 2860 and 2870 of FIG. 43 describes needs (or emotions), "cold", "happy", "right-hand" and "left-hand" respectively associated with fanciful FIG. 2210 (FIG. 33) and/or toy 2240 (FIGS. 34A, 34B, and 34C). Each toy emotion record typically comprises several sub-records (for example, each sub-record appears as a row of fields in the toy emotion records 2840, 2850, 2860 and 2870) with each sub-record containing the following fields: sub-record type, field identifier and optional parameters. The first sub-record comprises a need field type followed by a need value (such as cold or happy) as a record identifier. The next sub-records are the expressions, comprising a sub-record type expression type and relevant parameters. Following is a satisfaction sub-record that comprises a sub-record type field, an expected response type, and relevant parameters such as switch opening or closure, content of speech recorded from the player, etc. The last sub-records form a sequence of gratitude actions or the following need.

It is appreciated that the software components of the present invention may, if desired, be implemented in ROM (read-only memory) form. The software components may, generally, be implemented in hardware, if desired, using; conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow which are:

We claim:

1. A computer-controlled toy system for interacting with a computer-controlled fanciful figure comprising:
   at least one fanciful figure including a microphone, a speaker and an electrical power source;
   at least one computer;
   a bidirectional communication link interconnecting the fanciful figure and the at least one computer and enabling communication of speech from said microphone to said computer and from said at least one computer to said speaker; and
   translation software residing in the at least one computer and being operative to translate at least some of said speech in a first language into a second language, whereby a user speaking to said at least one fanciful figure in either of said first and second languages can receive a response in the other of said first and second languages.

2. A system for interacting with a computer-controlled fanciful figure according to claim 1 and wherein said speaker provides a speech output in a special language which is at least one of said first and second languages.

3. A system for interacting with a computer-controlled fanciful figure according to claim 2 wherein said special language is at least partly generated by said at least one computer.

4. A system for interacting with a computer-controlled fanciful figure according to claim 3 wherein said special language is at least partly generated by modifying at least one known language according to at least one language modification rule.

5. A system for interacting with a computer-controlled fanciful figure according to claim 4 and wherein said at least one computer is operative to receive said at least one language modification rule from a user.

6. A system for interacting with a computer-controlled fanciful figure according to claim 4 and wherein said at least one computer is operative to provide said at least one language modification rule to a user.

7. A system for interacting with a computer-controlled fanciful figure according to claim 3 wherein said special language is at least partly generated from a predefined set of phonemes.

8. A system for interacting with a computer-controlled fanciful figure according to claim 2 wherein said at least one computer is operative to receive at least a portion of said special language from a user.

9. A system for interacting with a computer-controlled fanciful figure according to claim 2 wherein said at least one fanciful figure is action induceable for producing an action.

10. A system for interacting with a computer-controlled fanciful figure according to claim 9 wherein said action comprises a movement.

11. A system for interacting with a computer-controlled fanciful figure according to claim 9 wherein said action comprises a sound.

12. A system for interacting with a computer-controlled fanciful figure according to claim 9 wherein said action comprises a light emission.

13. A system for interacting with a computer-controlled fanciful figure according to claim 9 wherein said speech output is identifiable with said action.

14. A system for interacting with a computer-controlled fanciful figure according to claim 13 wherein said at least one computer maintains a memory comprising at least one said speech output identifiable with said action.

15. A system for interacting with a computer-controlled fanciful figure according to claim 9 wherein said at least one computer is operative to induce said fanciful figure to produce said action.

16. A system for interacting with a computer-controlled fanciful figure according to claim 9 wherein a user induces said fanciful figure to produce said action and wherein said at least one computer is operative to detect said action.

17. A system for interacting with a computer-controlled fanciful figure according to claim 2 and further comprising at least one speech input apparatus and wherein said at least one computer is operative to receive a speech input via said at least one speech input apparatus.

18. A system for interacting with a computer-controlled fanciful figure according to claim 13 wherein said speech input is identifiable with said action.

19. A system for interacting with a computer-controlled fanciful figure according to claim 13 wherein said at least one computer maintains a memory comprising at least one said speech input identifiable with said action.

20. A system for interacting with a computer-controlled fanciful figure according to claim 2 and wherein said at least one computer is additionally operative to translate between said special language and at least one other language wherein said other language comprises a language of common discourse.

21. A system for interacting with a computer-controlled fanciful figure according to claim 2 wherein said at least one fanciful figure is displayable on a computer display.

22. A system for interacting with a computer-controlled fanciful figure according to claim 2 wherein said speech output apparatus is assembled with said at least one computer.

23. A system for interacting with a computer-controlled fanciful figure according to claim 2 wherein said fanciful figure is a toy in communication with said at least one computer.

24. A system for interacting with a computer-controlled fanciful figure according to claim 23 wherein said at least one computer is assembled with said toy.

25. A system for interacting with a computer-controlled fanciful figure according to claim 23 wherein said toy comprises at least one appendage that is actuable.

26. A system for interacting with a computer-controlled fanciful figure according to claim 23 wherein said toy comprises at least one appendage that is articulatable.

27. A system for interacting with a computer-controlled fanciful figure according to claim 23 wherein said speech output apparatus is assembled with said toy.

28. A system for interacting with a computer-controlled fanciful figure according to claim 2 wherein said language is a previously unknown language.

29. A system for interacting with a computer-controlled fanciful figure according to claim 17 wherein said at least one fanciful figure comprises a toy in communication with said at least one computer and said speech input apparatus is assembled with said toy.

30. A system for interacting with a computer-controlled fanciful figure according to claim 2 wherein said at least one fanciful figure comprises a plurality of fanciful figures.

31. A system for interacting with a computer-controlled fanciful figure according to claim 17 wherein said speech input apparatus is assembled with said at least one computer.

32. A system for interacting with a computer-controlled fanciful figure according to claim 2 wherein said special language is preassembled with said at least one computer.

* * * * *